(12) United States Patent
Nishi et al.

(10) Patent No.: US 9,847,100 B2
(45) Date of Patent: Dec. 19, 2017

(54) OPTICAL MEDIUM REPRODUCTION DEVICE AND OPTICAL MEDIUM REPRODUCTION METHOD

(71) Applicant: SONY CORPORATION, Tokyo (JP)

(72) Inventors: Noriaki Nishi, Kanagawa (JP); Shiori Tashiro, Saitama (JP); Nobuhiko Ando, Nagano (JP); Yutaka Tentaku, Kanagawa (JP); Junya Shiraishi, Tokyo (JP); Kimihiro Saito, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/322,618

(22) PCT Filed: Jun. 5, 2015

(86) PCT No.: PCT/JP2015/002839
§ 371 (c)(1),
(2) Date: Dec. 28, 2016

(87) PCT Pub. No.: WO2016/006157
PCT Pub. Date: Jan. 14, 2016

(65) Prior Publication Data
US 2017/0133049 A1    May 11, 2017

(30) Foreign Application Priority Data

Jul. 11, 2014 (JP) .................................. 2014-143274
Feb. 12, 2015 (JP) .................................. 2015-025667

(51) Int. Cl.
*G11B 7/0045* (2006.01)
*G11B 7/005* (2006.01)
(Continued)

(52) U.S. Cl.
CPC .......... *G11B 7/005* (2013.01); *G11B 7/00718* (2013.01); *G11B 7/13* (2013.01);
(Continued)

(58) Field of Classification Search
CPC ..... G11B 7/00718; G11B 7/005; G11B 7/133; G11B 20/10046; G11B 20/10037;
(Continued)

(56) References Cited

U.S. PATENT DOCUMENTS 8,953,426 B2 * 2/2015 Miyashita ........ G11B 20/10046
369/59.11

FOREIGN PATENT DOCUMENTS

| JP | 07-050030 | 2/1995 |
| JP | 10-143901 A | 5/1998 |

(Continued)

*Primary Examiner* — Nabil Hindi
(74) *Attorney, Agent, or Firm* — Chip Law Group

(57) ABSTRACT

An optical medium reproduction device includes: a detection unit configured to form detection signals of respective channels by dividing a cross-section of a beam returning from the optical medium into a plurality of regions and performing division into at least one channel corresponding to the region at an outer side in a radial direction, at least one channel corresponding to the region that is different in position in a tangential direction, and a channel corresponding to the other regions, and, in a case of forming the detection signals of the channels, form the detection signal of at least one of the channels by weighting and adding a signal in a predetermined region among the plurality of regions; a multi-input equalizer unit configured to include a plurality of equalizer units to which the respective detection signals of the plurality of channels are supplied, and configured to form an equalized signal on the basis of the detection signals of the plurality of channels; and a binarization unit configured to perform a binarization process on the equalized signal to obtain binary data.

15 Claims, 98 Drawing Sheets

(51) Int. Cl.
*G11B 7/135* (2012.01)
*G11B 20/10* (2006.01)
*G11B 7/007* (2006.01)
*G11B 7/13* (2012.01)
*G11B 7/1395* (2012.01)
*G11B 20/18* (2006.01)

(52) U.S. Cl.
CPC ............ *G11B 7/135* (2013.01); *G11B 7/1395* (2013.01); *G11B 20/10009* (2013.01); *G11B 20/10046* (2013.01); *G11B 20/18* (2013.01)

(58) Field of Classification Search
CPC .............. G11B 7/00456; G11B 7/0062; G11B 20/10009; G11B 20/10059

USPC ................................. 369/59.11, 59.22, 59.15
See application file for complete search history.

(56) References Cited

FOREIGN PATENT DOCUMENTS

| | | |
|---|---|---|
| JP | 2000-348361 | 12/2000 |
| JP | 2002-342938 A | 11/2002 |
| JP | 2009-283040 | 12/2009 |
| JP | 2009-283040 A | 12/2009 |
| JP | 2012-079385 A | 4/2012 |
| WO | 2014/054246 A1 | 4/2014 |
| WO | 2014/057674 A1 | 4/2014 |

\* cited by examiner

OPTICAL MEDIUM REPRODUCTION DEVICE AND OPTICAL MEDIUM REPRODUCTION METHOD

CROSS REFERENCE TO RELATED APPLICATIONS

This application is a U.S. National Phase of International Patent Application No. PCT/JP2015/002839 filed on Jun. 5, 2015, which claims priority benefit of Japanese Patent Application No. JP 2014-143274 filed in the Japan Patent Office on Jul. 11, 2014 and also claims priority benefit of Japanese Patent Application No. JP 2015-025667 filed in the Japan Patent Office on Feb. 12, 2015. Each of the above-referenced applications is hereby incorporated herein by reference in its entirety.

TECHNICAL FIELD

The present disclosure relates to an optical medium reproduction device and an optical medium reproduction method for reproducing an optical medium such as an optical disc.

BACKGROUND ART

As a method for increasing a density of an optical disc, one method is to increase a density in a linear-density direction by reducing a channel bit length, i.e., a mark length, and another method is to make a track pitch narrower. However, in the case where the density is increased in the linear-density direction, inter-symbol interference increases. Meanwhile, in the case where the track pitch is made narrower, leakage of information from an adjacent track (adjacent track crosstalk) increases. Methods for reducing the adjacent track crosstalk (hereinafter, simply referred to as "crosstalk" as appropriate) are proposed.

For example, Patent Literature 1 discloses that crosstalk is canceled by supplying reproduction signals of a track to be reproduced and tracks located on both sides thereof to adaptive equalizer units and controlling tap coefficients of the adaptive equalizer unit.

CITATION LIST

Patent Literature

Patent Literature 1: JP 2012-079385A

DISCLOSURE OF INVENTION

Technical Problem

According to a technology disclosed in Patent Literature 1, three beams are needed to simultaneously read the track to be reproduced and the tracks located on both sides thereof. Phases of reproduction signals read by the three beams need to be aligned. It is possible to sequentially reproduce three tracks with a single beam and synchronize reproduction signals. A memory for synchronization is needed. Therefore, the technology disclosed in Patent Literature 1 is problematic in that a configuration of an optical pickup is complicated, phase aligning is complicated, and a scale of a circuit is larger. Further, the technology disclosed in Patent Literature 1 does not mention increase in density in a linear-density direction.

Therefore, an object of the present disclosure is to provide an optical medium reproduction device and an optical medium reproduction method capable of reducing crosstalk with the use of a reproduction signal of a single track and increasing a density in a linear-density direction.

Solution to Problem

According to the present disclosure, an optical medium reproduction device optically reproduces an optical medium in which a plurality of tracks are provided, the optical medium reproduction device including: a detection unit configured to form detection signals of respective channels by dividing a cross-section of a beam returning from the optical medium into a plurality of regions and performing division into at least one channel corresponding to the region at an outer side in a radial direction, at least one channel corresponding to the region that is different in position in a tangential direction, and a channel corresponding to the other regions, and, in a case of forming the detection signals of the channels, form the detection signal of at least one of the channels by weighting and adding a signal in a predetermined region among the plurality of regions; a multi-input equalizer unit configured to include a plurality of equalizer units to which the respective detection signals of the plurality of channels are supplied, and configured to form an equalized signal on the basis of the detection signals of the plurality of channels; and a binarization unit configured to perform a binarization process on the equalized signal to obtain binary data.

According to the present disclosure, an optical medium reproduction device optically reproduces an optical medium in which a plurality of tracks are provided, the optical medium reproduction device including: an optical filter configured to, when a beam returning from the optical medium is incident, form a plurality of signals having space-optically different bands in a linear-density direction and a track-density direction; and a plurality of electrical filters to which the plurality of signals formed by the optical filter are supplied. A reproduction signal is obtained by combining outputs of the plurality of electrical filters.

Advantageous Effects of Invention

According to the present disclosure, crosstalk can be reduced by using only a reading output of a track to be reproduced. Therefore, it is unnecessary to use three beams for reading, and it is also unnecessary to continuously reproduce three tracks with a single beam and synchronize the three tracks with the use of a memory. Therefore, the present disclosure is advantageous in that a configuration of an optical pickup is not complicated, phase aligning is unnecessary, and the memory is not increased. With this, it is possible to increase a density of an optical disc with a simpler configuration. Further, the present disclosure can increase the density in a radial direction and a linear-density direction. However, effects are not necessarily limited to the effects described herein and may be any effect described in the present disclosure.

BRIEF DESCRIPTION OF DRAWINGS

FIGS. 30A, 30B and 30C are a graph showing an influence of a lens shift upon defocus characteristics.

FIG. 120 is a graph for explaining an example of a change in a value of Kd with respect to a detrack amount.

FIG. 121 is a schematic diagram showing another example of a region division pattern.

FIG. 122 is a schematic diagram showing a pattern HNST6.

FIG. 123 is a schematic diagram showing a pattern HiNS5.

FIG. 124 is a schematic diagram showing a pattern VT4.

FIG. 125 is a schematic diagram showing a pattern VHT4.

FIG. 126 is a schematic diagram showing a pattern VHi3.

FIG. 127 is a schematic diagram showing a pattern NST6.

FIG. 128 is a graph showing tap coefficients of electrical filters concerning the pattern NST6 whose density is further increased.

FIG. 129 is a graph showing frequency characteristics concerning the pattern NST6 whose density is further increased.

FIG. 130 is a block diagram used for explaining the present disclosure.

FIG. 131 is a schematic diagram showing an example of a reproducing optical system in another embodiment of the present disclosure.

Figure 132:
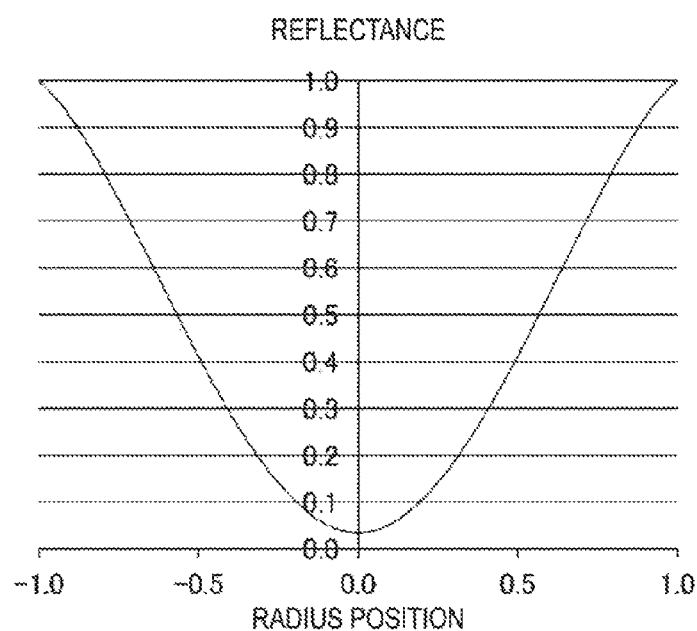

FIG. 132 is a graph showing a reflection characteristic of a beam splitter.

Figure 133:
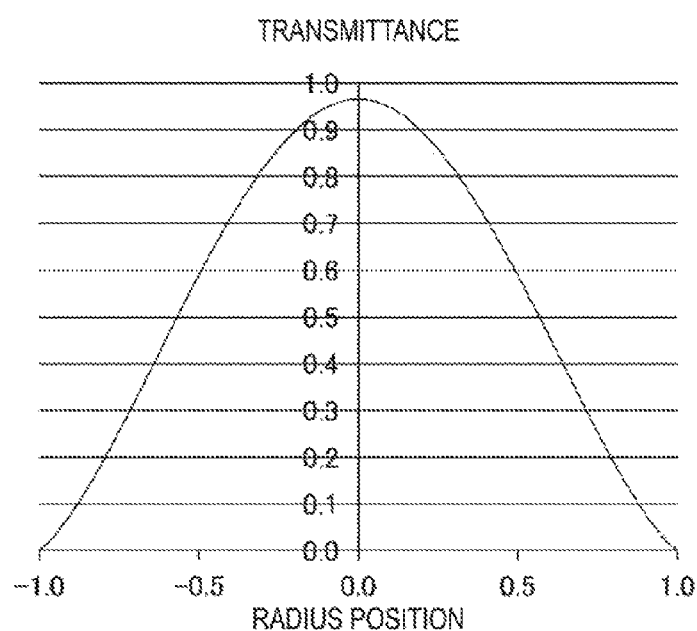

FIG. 133 is a graph showing a transmission characteristic of a beam splitter.

Figure 134:
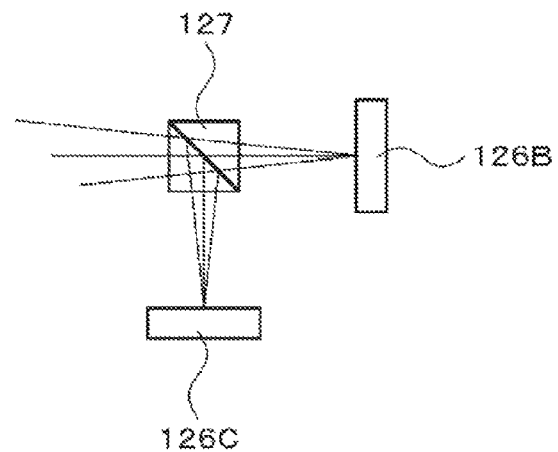

FIG. 134 is a schematic diagram showing an optical system including an additional beam splitter.

Figure 135:
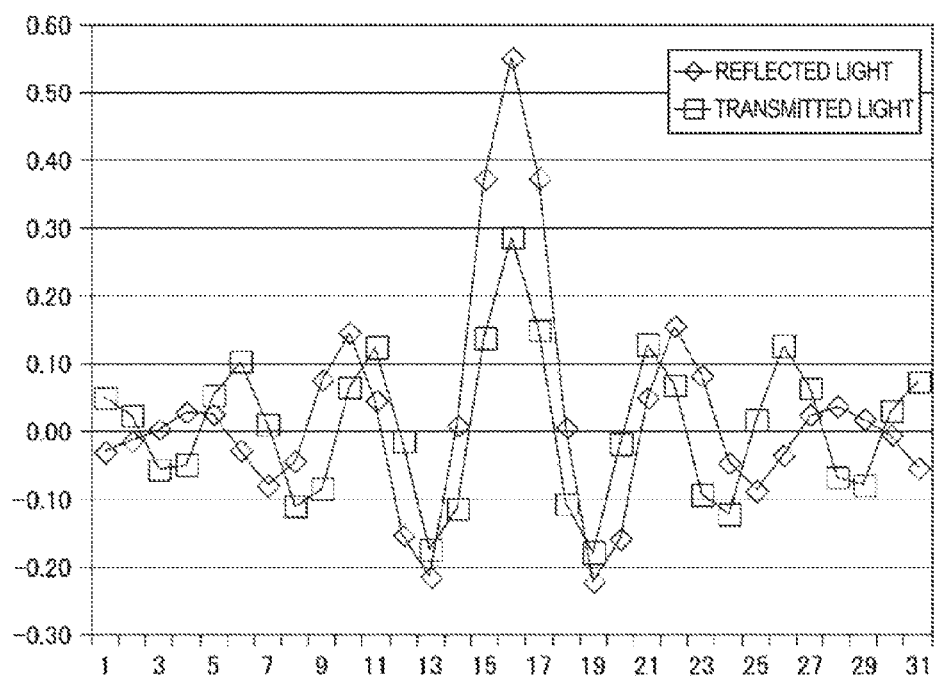

FIG. 135 is a graph showing an example of tap coefficients of electrical filters in another embodiment of the present disclosure.

Figure 136:
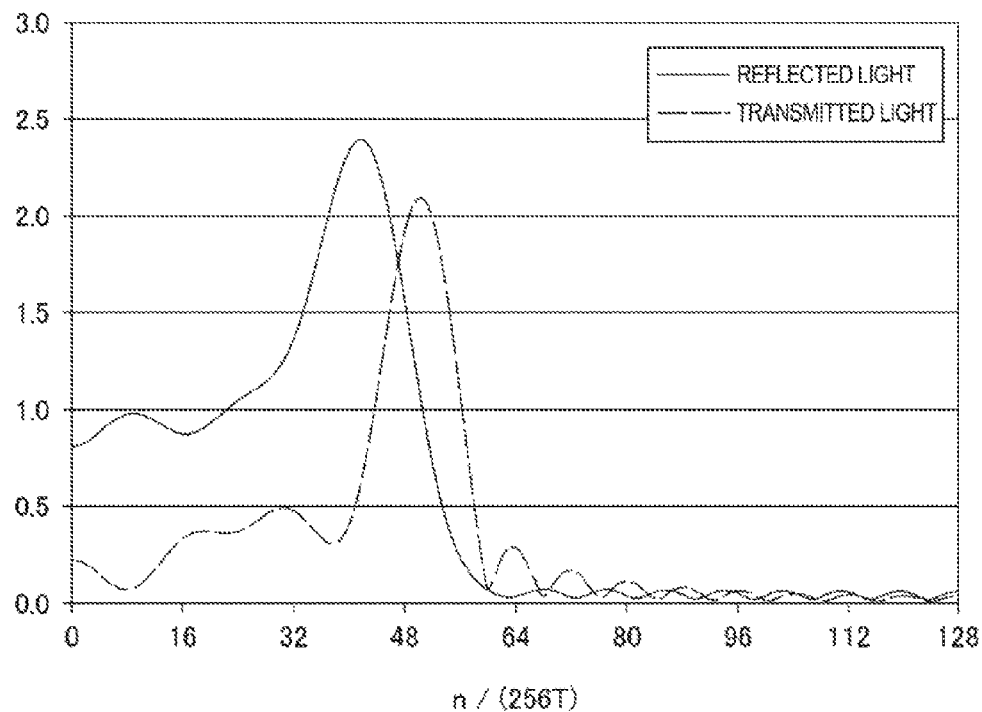

FIG. 136 is a graph showing an example of frequency characteristics of electrical filters in another embodiment of the present disclosure.

Figure 137:
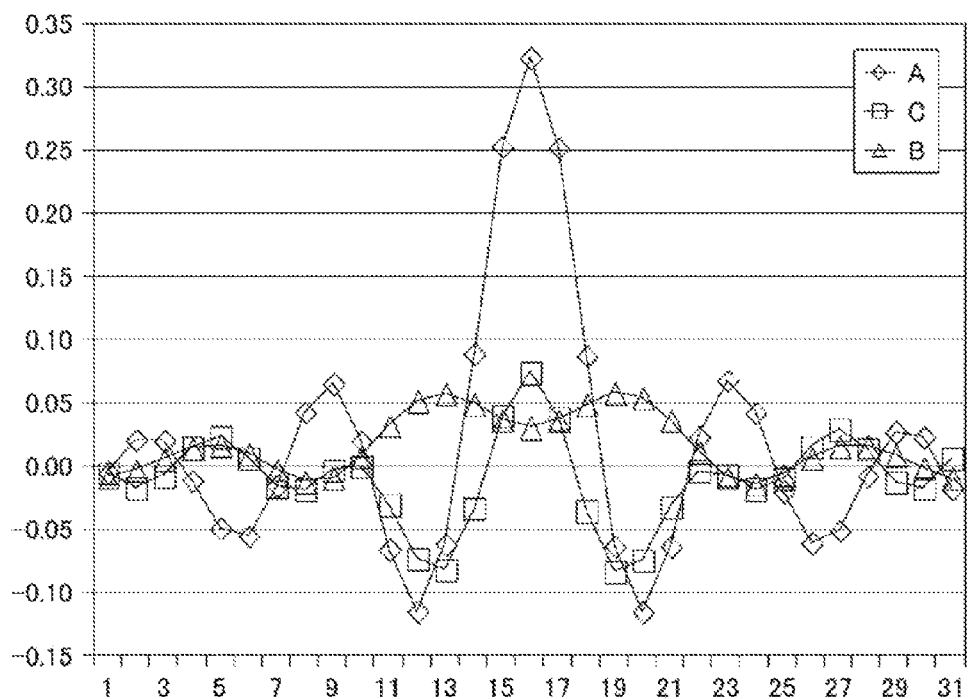

FIG. 137 is a graph showing another example of tap coefficients of electrical filters in another embodiment of the present disclosure.

Figure 138:
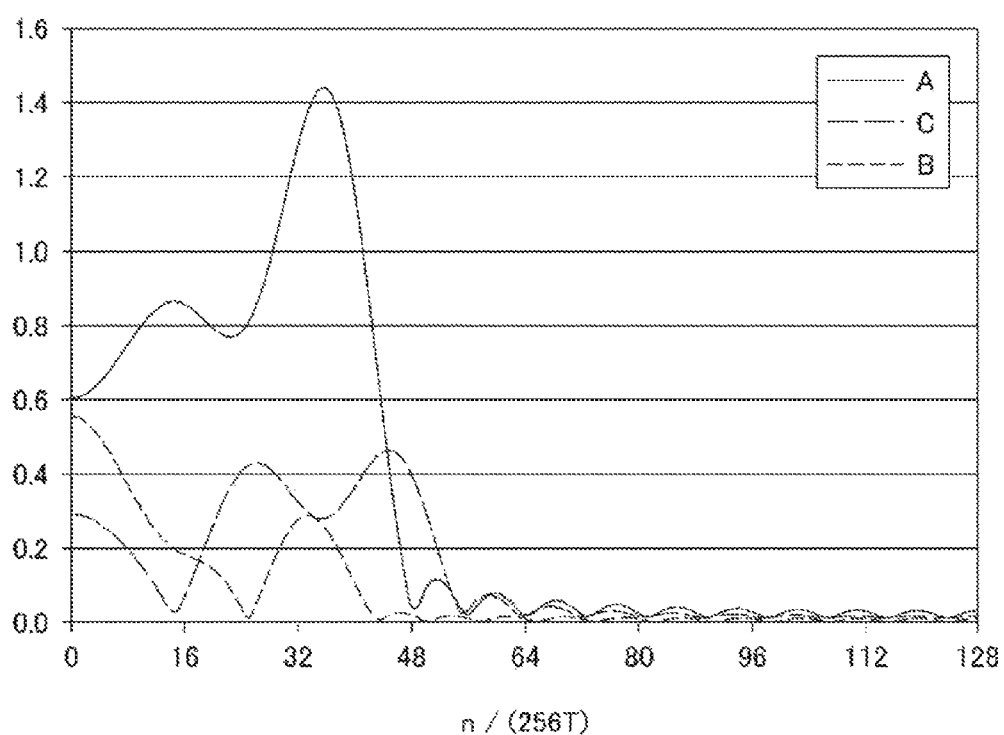

FIG. 138 is a graph showing another example of frequency characteristics of electrical filters in another embodiment of the present disclosure.

MODE(S) FOR CARRYING OUT THE INVENTION

The embodiments described below are suitable specific examples of this invention, and includes technically preferred various limitations. However, the scope of this invention is not limited to these embodiments, unless limitations to this invention are particularly stated in the description below.

It is noted that the description below will be provided in the following order.
<1. Embodiment>
<2. Other embodiment>
<3. Modification example>

1. Embodiment

"Optical Disc Device"

Figure 1:
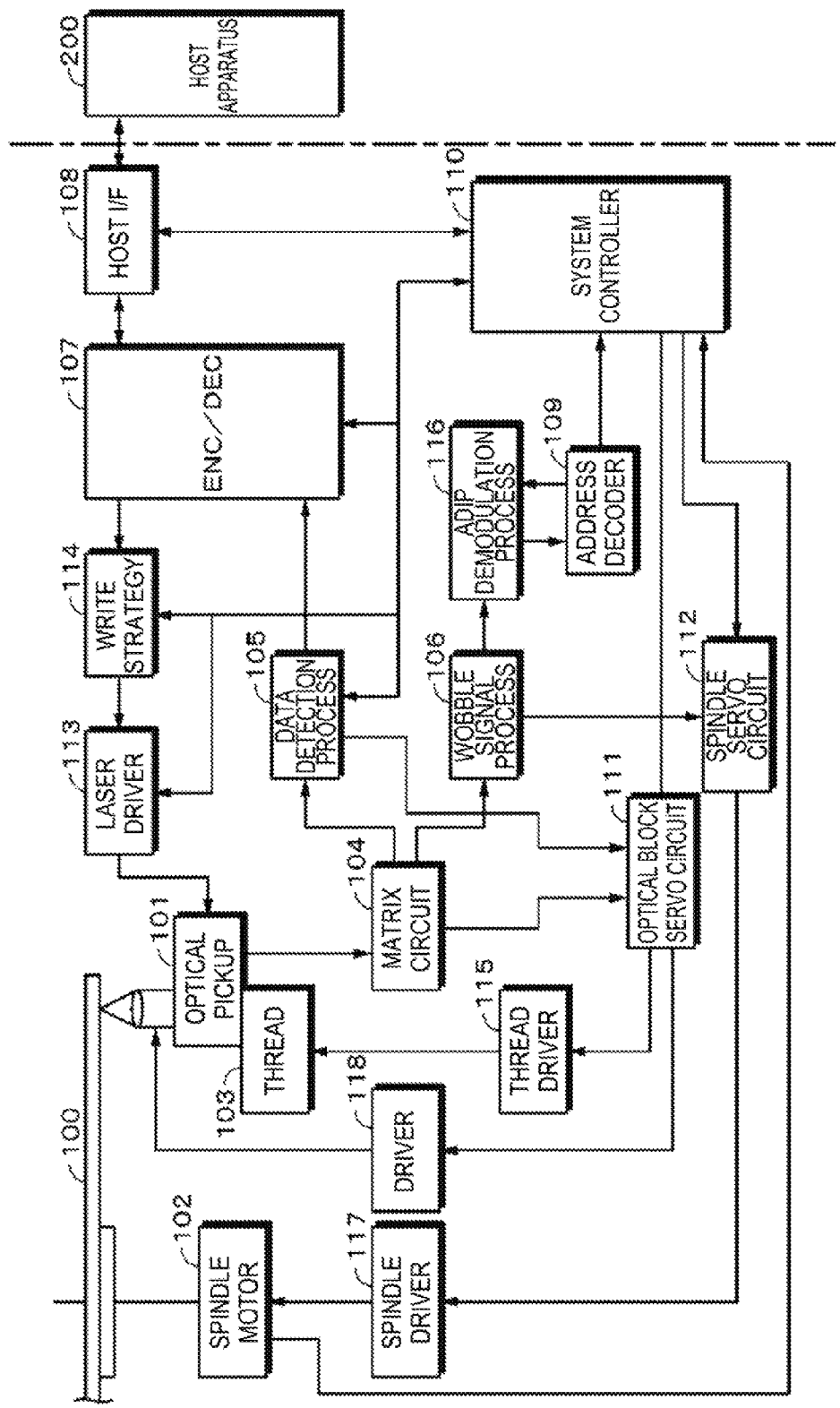
FIG. 1 is a block diagram showing a configuration of an optical disc device according to an embodiment of the present disclosure.

As shown in FIG. 1, an optical disc device to which the present disclosure is applied includes an optical pickup 101 that performs recording and reproduction of information on an optical disc 100 serving as an optical recording medium, and a spindle motor 102 that rotates the optical disc 100. A thread (feeding motor) 103 is provided to move the optical pickup 101 in a diameter direction of the optical disc 100.

As the optical disc 100, a high-density optical disc such as a Blu-ray (registered trademark) Disc (BD) can be used. The BD is a high-density optical disc having a recording capacity of approximately 25 gigabytes with a single layer on one side and a recording capacity of approximately 50 gigabytes with a dual layer on one side. In a BD standard, in order to reduce a beam spot diameter, a wavelength of a light source is set to 405 nm and a numerical aperture (NA) of an objective lens is set to be large, i.e., 0.85. In a CD standard, the wavelength of the light source is 780 nm, NA is 0.45, and the spot diameter is 2.11 μm. In a DVD standard, the wavelength of the light source is 650 nm, NA is 0.6, and the spot diameter is 1.32 μm. In the BD standard, the spot diameter can be reduced to 0.58 μm.

In recent years, there has been implemented BDXL (registered trademark) in which a large capacity of 100 GB is achieved with a triple layer and 128 GB is achieved with a quad layer by reducing a channel bit length, i.e., a mark length and increasing a density in a linear-density direction in the BD (Blu-ray (registered trademark) Disc).

In addition, in order to further increase the recording capacity, it is desirable to use an optical disc in which a method for recording data on both a groove track and a land track (referred to as "land/groove recording method" as appropriate) is adopted. A grooved part is referred to as "groove" and a track formed of a groove is referred to as "groove track". The groove is defined as a part irradiated with laser light when an optical disc is produced. An area between adjacent grooves is referred to as "land", and a track formed of a land is referred to as "land track". In the case of a multilayer optical disc in which a plurality of information recording layers are stacked, the recording capacity can be larger.

In the case where the high-density recordable optical disc 100 is mounted in the optical disc device, the optical disc is rotatably driven by the spindle motor 102 at the time of recording/reproduction at a constant linear velocity (CLU) or a constant angular velocity (CAV). In order to align phases of wobble grooves in a radial direction of the optical disc 100, a CAV or a zone CAV is preferable. At the time of reproduction, mark information recorded on a track of the optical disc 100 is read out by the optical pickup (optical head) 101. At the time of recording data on the optical disc 100, user data is recorded by the optical pickup 101 on the track of the optical disc 100 as a phase change mark or a pigment change mark.

In the case of a recordable disc, a recording mark using the phase change mark is recorded on a track formed of a wobbling groove, and the phase change mark is recorded with a linear density of 0.12 μm/bit and 0.08 μm/channel bit by an RLL (1, 7) PP modulation method (RLL; Run Length Limited, PP: Parity preserve/Prohibit rmtr (repeated minimum transition run-length)) or the like in the case of a BD having 23.3 GB per layer. Similarly, the phase change mark is recorded with a linear density corresponding to 0.0745 μm/channel bit in the case of a BD having 25 GB/layer, the phase change mark is recorded with a linear density corresponding to 0.05826 μm/channel bit in the case of BDXL (registered trademark) having 32 GB/layer, and the phase change mark is recorded with a linear density corresponding to 0.05587 μm/channel bit in the case of BDXL (registered trademark) having 33.4 GB/layer. Thus, the phase change mark is recorded with a density corresponding to the channel bit length in accordance with a type of a disc. Assuming that a channel clock cycle is "T", the mark length falls within a range of 2T to 8T. In the case of a reproduction-only disc, a groove has not been formed, but data modulated by the RLL (1, 7) PP modulation method has been similarly recorded as an embossed pit array.

As reproduction-only management information, for example, physical information of the disc is recorded by the embossed pit or the wobbling groove in an inner circumferential area or the like of the optical disc 100. Reading out of those kinds of information is also performed by the optical pickup 101. Further, reading out of ADIP information embedded as wobbling of the groove track of the optical disc 100 is also performed by the optical pickup 101.

The optical pickup 101 includes, for example, a laser diode serving as a laser light source, a photodetector for detecting reflected light, an objective lens serving as an output end of laser light, and an optical system that irradiates a recording surface of the disc with laser light through the objective lens and leads reflected light thereof to the photodetector. The objective lens is held in the optical pickup 101 to be movable in a tracking direction and a focus direction by a bi-axial mechanism. The entire optical pickup 101 is movable in the radial direction of the disc by the thread mechanism 103. A driving current is supplied to the laser diode of the optical pickup 101 from a laser driver 113, and the laser diode generates laser.

Reflected light from the optical disc 100 is detected by the photodetector and is supplied to a matrix circuit 104 as an electric signal corresponding to an amount of received light. The matrix circuit 104 includes a current/voltage conversion circuit, a matrix calculation/amplification circuit, and the like for output currents from a plurality of light-receiving elements serving as photodetectors and generates a necessary signal by performing a matrix calculation process. The current/voltage conversion circuit may be provided in the photodetector element in consideration of a signal transmission quality. For example, a reproduction information signal (RF signal) corresponding to reproduction data and a focus error signal and a tracking error signal for servo control are generated. Further, a signal related to wobbling of a groove, i.e., a push-pull signal is generated as a signal for detecting wobbling.

The reproduction information signal output from the matrix circuit 104 is supplied to a data detection processing unit 105, the focus error signal and the tracking error signal are supplied to an optical block servo circuit 111, and the push-pull signal is supplied to a wobble signal processing circuit 106.

The data detection processing unit 105 performs a binarization process of the reproduction information signal. For example, the data detection processing unit 105 performs an A/D conversion process of the RF signal, a reproduction clock generation process using PLL, a partial response (PR) equalization process, Viterbi decoding (maximum likelihood decoding), and the like and obtains a binary data string by performing a partial response maximum likelihood decoding process (PRML detection method: partial response maximum likelihood detection method). The data detection processing unit 105 supplies the binary data string, which is information read out from the optical disc 100, to an encoding/decoding unit 107 at a latter stage.

The encoding/decoding unit 107 performs a demodulation process of reproduction data at the time of reproduction and performs a modulation process of record data at the time of recording. That is, the encoding/decoding unit 107 performs data demodulation, de-interleave, ECC decoding, address decoding, and the like at the time of reproduction and performs ECC encoding, interleave, data modulation, and the like at the time of recording.

At the time of reproduction, the binary data string decoded in the data detection processing unit 105 is supplied to the encoding/decoding unit 107. The encoding/decoding unit 107 performs a demodulation process on the binary data string and therefore obtains reproduction data from the optical disc 100. That is, for example, the encoding/decoding unit 107 performs a demodulation process and an ECC decoding process for correcting errors on data which has been subjected to run-length limited code modulation such as RLL (1, 7) PP modulation and has been recorded on the optical disc 100 and therefore obtains reproduction data from the optical disc 100.

Data decoded as the reproduction data in the encoding/decoding unit 107 is transmitted to a host interface 108 and is transmitted to a host apparatus 200 in response to an instruction of a system controller 110. The host apparatus 200 is, for example, a computer device or an audio-visual (AV) system apparatus.

When recording/reproduction is performed on the optical disc 100, processing of ADIP information is performed. That is, the push-pull signal that is output from the matrix circuit 104 as a signal related to wobbling of a groove is converted into digitalized wobble data in the wobble signal processing circuit 106. A clock synchronized with the push-pull signal is generated by a PLL process. The wobble data is demodulated to a data stream forming an ADIP address in an ADIP demodulation processing unit 116 and is supplied to an address decoder 109. The address decoder 109 decodes the supplied data to obtain an address value and supplies the address value to the system controller 110.

At the time of recording, record data is transmitted from the host apparatus 200, and the record data is supplied to the encoding/decoding unit 107 via the host interface 108. The encoding/decoding unit 107 performs, as an encoding process of record data, addition of an error correcting code (ECC encoding), interleave, addition of a subcode, and the like. The data subjected to those processes is subjected to run-length limited code modulation such as the RLL (1-7) PP method.

The record data processed in the encoding/decoding unit 107 is supplied to a write strategy unit 114. The write strategy unit 114 performs, as a recording compensation process, laser driving pulse waveform adjustment on characteristics of a recording layer, a spot shape of laser light, a recording linear velocity, and the like. Then, a laser driving pulse is output to the laser driver 113.

The laser driver 113 supplies a current to the laser diode in the optical pickup 101 on the basis of the laser driving pulse subjected to the recording compensation process and emits laser light. Thus, a mark corresponding to the record data is formed on the optical disc 100.

The optical block servo circuit 111 generates various servo drive signals such as focus, tracking, and thread drive signals in accordance with the focus error signal and the tracking error signal supplied from the matrix circuit 104 and performs servo operation. That is, the optical block servo circuit 111 generates a focus drive signal and a tracking drive signal in accordance with the focus error signal and the tracking error signal, and a driver 118 drives a focus coil and a tracking coil of the bi-axial mechanism in the optical pickup 101. Thus, a tracking servo loop and a focusing servo loop are formed by the optical pickup 101, the matrix circuit 104, the optical block servo circuit 111, the driver 118, and the bi-axial mechanism.

In response to a track jump instruction from the system controller 110, the optical block servo circuit 111 performs track jump operation by turning off the tracking servo loop and outputting a jump drive signal. Further, the optical block servo circuit 111 generates a thread drive signal on the basis of a thread error signal obtained as a low frequency component of the tracking error signal, access execution control of the system controller 110, and the like, and then a thread driver 115 drives the thread mechanism 103.

A spindle servo circuit 112 performs control for CLU-rotating or CAV-rotating the spindle motor 102. The spindle servo circuit 112 generates a spindle error signal by obtaining, as current rotation speed information of the spindle motor 102, the clock generated by PLL for a wobble signal and comparing the clock with predetermined reference speed information. At the time of reproduction of data, a reproduction clock generated by PLL in the data detection processing unit 105 is the current rotation speed information of the spindle motor 102, and therefore the spindle error signal is generated by comparing the rotation speed information with the predetermined reference speed information. Then, the spindle servo circuit 112 outputs a spindle drive signal generated in accordance with the spindle error signal, thereby causing a spindle driver 117 to perform CLU-rotation or CAV-rotation of the spindle motor 102.

The spindle servo circuit 112 generates the spindle drive signal in accordance with a spindle kick/brake control signal supplied from the system controller 110 and also performs operation such as start, stop, acceleration, and deceleration of the spindle motor 102.

Various kinds of operation in such a servo system and a recording/reproduction system are controlled by the system controller 110 including a microcomputer. The system controller 110 performs various processes in response to commands supplied from the host apparatus 200 via the host interface 108. For example, in the case where a write command is transmitted from the host apparatus 200, the system controller 110 moves the optical pickup 101 to an address where writing is to be performed. Then, the system controller 110 causes the encoding/decoding unit 107 to perform the encoding process on data (for example, video data or audio data) transmitted from the host apparatus 200 as described above. Then, the laser driver 113 drives emission of laser light in accordance with the encoded data. In this way, recording is performed.

For example, in the case where a read command for requesting transmission of certain data recorded on the optical disc 100 is supplied from the host apparatus 200, the system controller 110 controls seek operation for the specified address. That is, the system controller 110 transmits an instruction to the optical block servo circuit 111 and causes the optical pickup 101 to perform access operation by using the address specified by a seek command as a target. Thereafter, the system controller 110 performs operation control needed to transmit data in such a specified data section to the host apparatus 200. That is, the system controller 110 reads out data from the optical disc 100, causes the data detection processing unit 105 and the encoding/decoding unit 107 to perform reproduction processes, and transmits required data.

Although the optical disc device connected to the host apparatus 200 has been described in the example of FIG. 1, the optical disc device may or may not be connected to another apparatus. In that case, an operation unit and a display unit are provided, and a configuration of an interface part via which data is input/output differs from that in FIG. 1. That is, it is only necessary to perform recording and reproduction in accordance with user's operation and provide a terminal portion for inputting/outputting various kinds of data. As a matter of course, other various configuration examples of the optical disc device are conceivable.

"Optical Pickup"

The optical pickup 101 for use in the above optical disc device will be described with reference to FIG. 2. The optical pickup 101 records information on the optical disc 100 and reproduces the information from the optical disc 100 with the use of, for example, laser light (beam) having a wavelength λ, of 405 nm. Laser light is emitted from a semiconductor laser (LD: laser diode) 1.

The optical disc 100 is irradiated with laser light that has passed through a collimator lens 2, a polarizing beam splitter (PBS) 3, and an objective lens 4. The polarizing beam splitter 3 has a separation surface that, for example, allows p-polarized light to be transmitted therethrough substantially 100% and reflects s-polarized light substantially 100%. Reflected light from a recording layer of the optical disc 100 returns through the same optical path and is incident on the polarizing beam splitter 3. By providing a λ/4 element (not shown) therebetween, the incident laser light is reflected by the polarizing beam splitter 3 substantially 100%.

The laser light reflected by the polarizing beam splitter 3 is condensed on a light-receiving surface of a photodetector 6 through a lens 5. The photodetector 6 includes, on the light-receiving surface, a light-receiving cell that performs photoelectric conversion on incident light. The light-receiving cell is divided into a plurality of regions by dividing lines that extend in the radial direction (diameter direction of disc) and/or a tangential direction (track direction) of the optical disc 100. The photodetector 6 outputs electric signals of a plurality of channels in accordance with light-receiving amounts of the respective regions of the light-receiving cell. A method for dividing a region will be described below.

Figure 2:
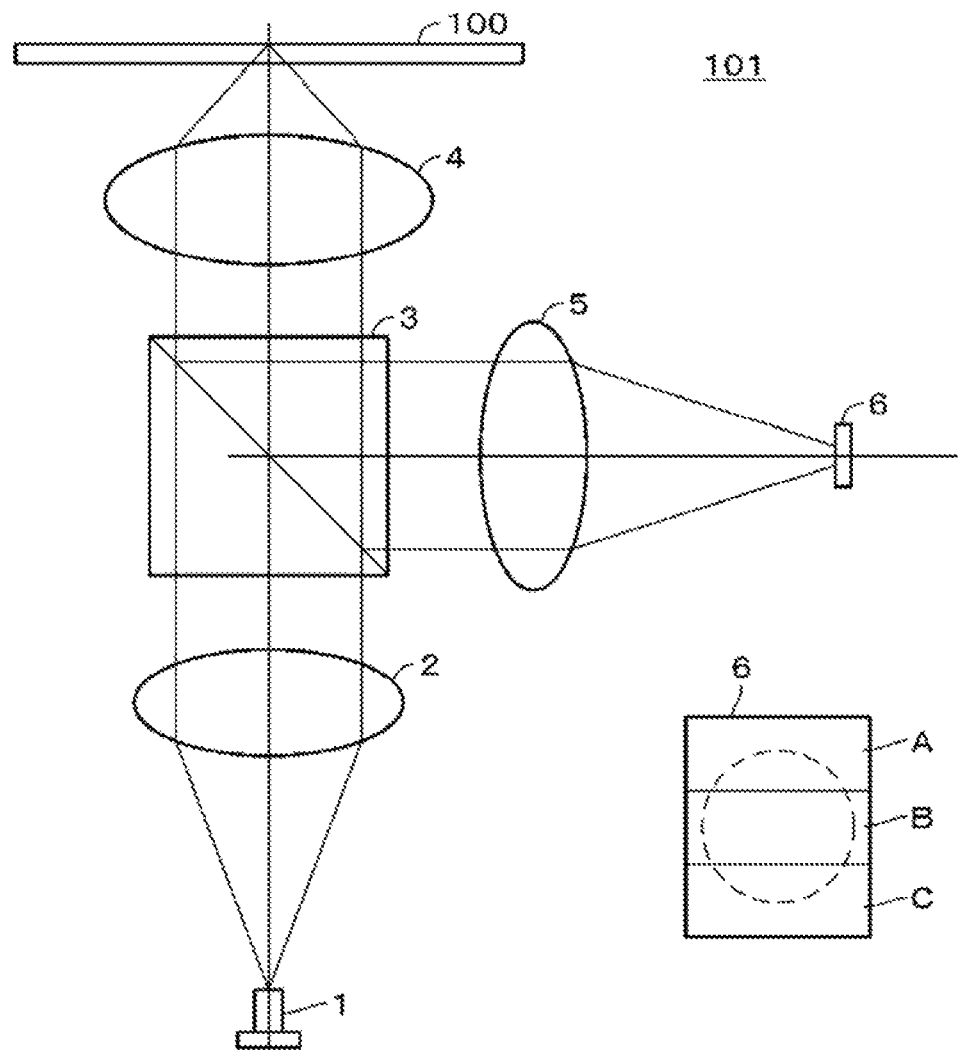
FIG. 2 is a schematic diagram showing a configuration of an optical pickup in an embodiment of the present disclosure.

The configuration of the optical pickup 101 of FIG. 2 includes minimum constituent elements for describing the present disclosure, and, for example, the focus error signal and the tracking error signal output to the optical block servo circuit 111 via the matrix circuit 104 and a signal for generating the push-pull signal output to the wobble signal processing circuit 106 via the matrix circuit 104 are not shown. In addition, various configurations other than the configuration shown in FIG. 2 are possible.

In the present disclosure, a cross-section of a luminous flux of a returning beam from the optical disc 100 is divided into a plurality of regions, and therefore reproduction information signals of the plurality of channels corresponding to the regions are obtained. As a method for obtaining a reproduction information signal in each region, a method other than the method for dividing the photodetector 6 can be used. For example, the following method may be used: an optical path conversion element for separating a plurality of regions is provided in an optical path leading to the photodetector 6 through the objective lens 4, and a plurality of beams separated by the optical path conversion element are supplied to different photodetectors. The optical path conversion element can be a diffraction element such as a holographic optical element or a refractive element such as a microlens array or microprism.

"Data Detection Processing Unit"

Figure 3:
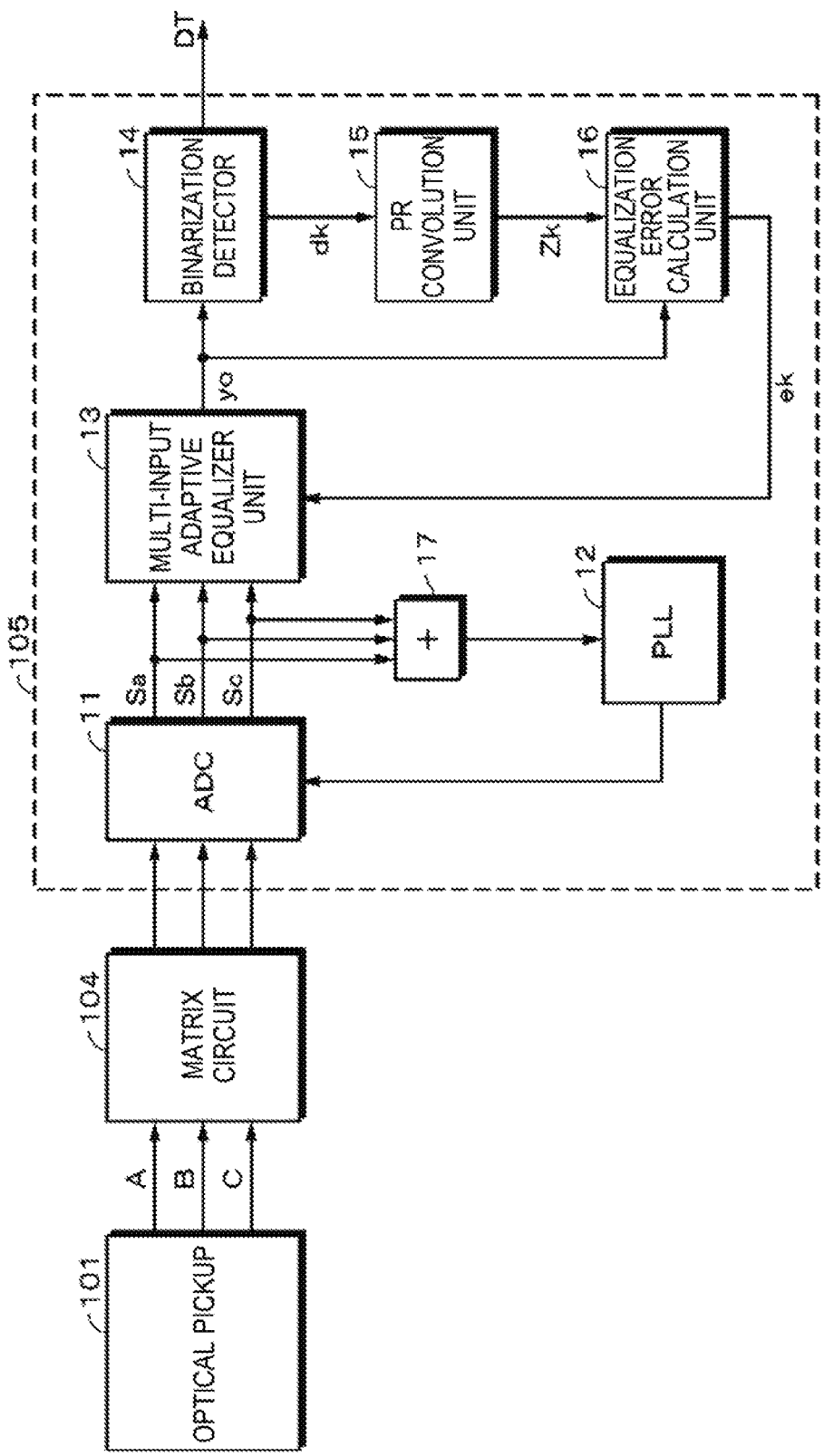
FIG. 3 is a block diagram of an example of a data detection processing unit in an embodiment.
Figure 4:
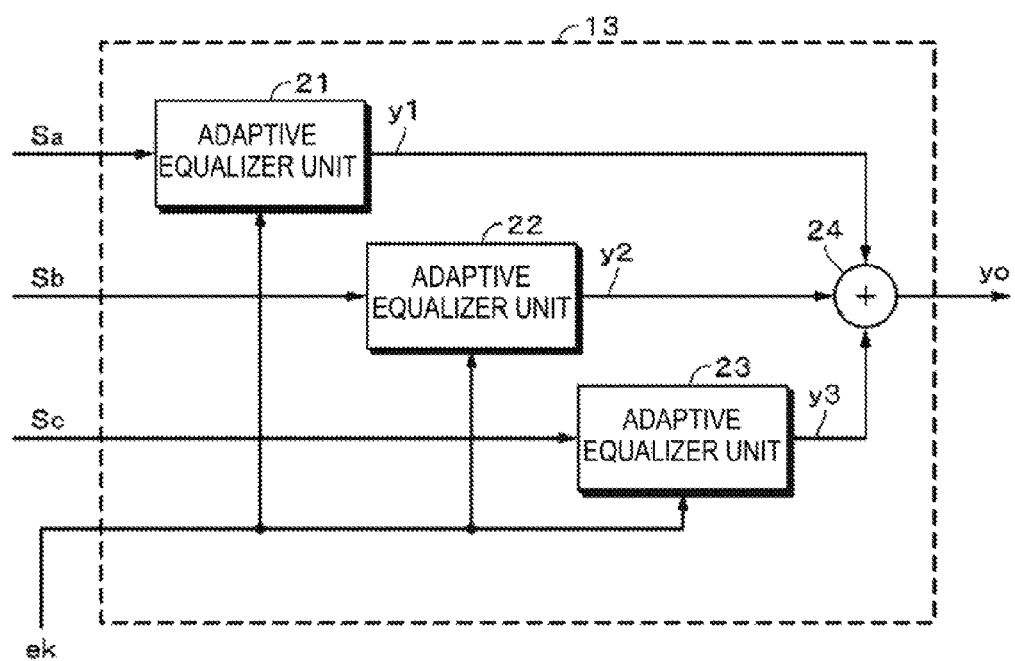
FIG. 4 is a block diagram of an example of a multi-input adaptive equalizer in the data detection processing unit.

As described above, detection signals, which are reproduced from the optical disc 100 by the optical pickup 101 and correspond to the regions, are supplied to the matrix circuit 104 and are converted into reproduction information signals of the plurality of channels corresponding to the regions. As shown in FIG. 3, the data detection processing unit 105 includes an A/D converter 11 to which reproduction information signals supplied from the matrix circuit 104 are supplied. FIG. 3 and FIG. 4 show an example where a cross-section of a luminous flux of a returning beam from the optical disc 100 is divided into, for example, three regions and reproduction information signals of three channels are obtained from the matrix circuit 104.

A clock for the A/D converter 11 is made up of a PLL 12. The reproduction information signals supplied from the matrix circuit 104 are converted into digital data in the A/D converter 11. The digitalized reproduction information signals of the three channels in regions A to C are denoted by Sa to Sc. A signal obtained by adding the reproduction information signals Sa to Sc in an adder circuit 17 is supplied to the PLL 12.

The data detection processing unit 105 further includes a multi-input adaptive equalizer unit 13, a binarization detector 14, a PR convolution unit 15, and an equalization error calculation unit 16. The multi-input adaptive equalizer unit 13 performs a PR adaptive equalization process based on the reproduction information signals Sa to Sc. That is, the reproduction information signals Sa to Sc are output via the adaptive equalizer unit, and an added equalized signal y0 is equalized to approximate a target PR waveform.

As a signal to be input to the PLL 12, output of the multi-input adaptive equalizer unit may be used. In this case, an initial coefficient of the multi-input adaptive equalizer is set to a value determined in advance.

The binarization detector 14 is, for example, a Viterbi decoder and performs a maximum likelihood decoding process on the equalized signal y0 that has been subjected to PR equalization, thereby obtaining binarized data DT. The binarized data DT is supplied to the encoding/decoding unit 107 shown in FIG. 1 and is subjected to a reproduction data demodulation process. In Viterbi decoding, a Viterbi detector configured by a plurality of states formed by using consecutive bits having a predetermined length as a unit and branches expressed by transitions therebetween is used and effectively detects a desired bit sequence among all possible bit sequences.

In an actual circuit, two registers, i.e., a register referred to as a path metric register and a register referred to as a path memory register are provided for each state. The path metric register stores a partial response sequence leading to the state and a path metric of a signal. The path memory register stores a flow of a bit sequence leading to the state. Further, a calculation unit referred to as a branch metric unit, which calculates a partial response sequence in the bit and a path metric of a signal, is provided for each branch.

The Viterbi decoder can associate various bit sequences in one-to-one correspondence by using one of paths passing a state. A path metric between a partial response sequence passing those paths and an actual signal (reproduction signal) is obtained by sequentially adding inter-state transitions forming the above paths, that is, by sequentially adding the above branch metrics in the branches.

A path achieving a smallest path metric can be selected by comparing magnitudes of path metrics that two branches or less reached in each state have and sequentially selecting a path having a smaller path metric. By transmitting this selection information to the path memory register, information expressing a path reaching each state with a bit sequence is stored. A value of the path memory register is sequentially updated and is finally converged to a bit sequence achieving a smallest path metric, and a result thereof is output.

The PR convolution unit 15 generates a target signal Zk by performing a convolution process of a binarization result as represented by the following expression. The target signal Zk is an ideal signal having no noise because the target signal Zk is obtained by convoluting a binarization detection result. For example, in the case of PR (1, 2, 2, 2, 1), a value P for each channel clock is (1, 2, 2, 2, 1). A constraint length thereof is 5. In the case of PR (1, 2, 3, 3, 3, 2, 1), the value P for each channel clock is (1, 2, 3, 3, 3, 2, 1). A constraint length thereof is 7. In the case where laser light has a wavelength λ=405 nm, the objective lens has NA=0.85, a track pitch is constantly 0.32 μm and a recording density is increased so that a capacity exceeds 35 GB, detection is difficult unless a detection ability is increased by increasing the constraint length of the partial response from 5 to 7. In the following expression, d denotes binarized data.

[Math 1]

$$Z_n = \sum_m P_m d_{n-m} \quad (1)$$

$P = (1, 2, 3, 3, 3, 2, 1)$
$P = (1, 2, 2, 2, 1)$

Figure 6:
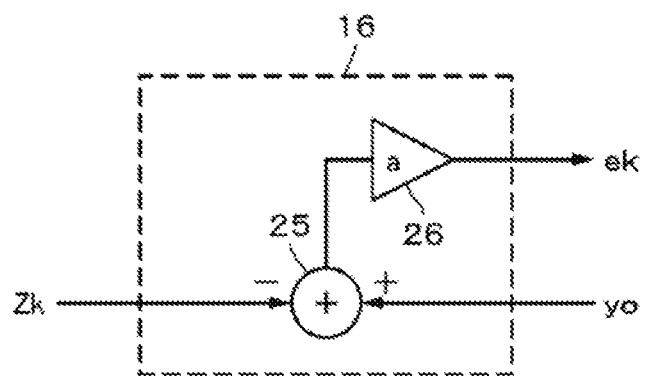
FIG. 6 is a block diagram of an example of an equalization error calculation unit.

The equalization error calculation unit 16 calculates an equalization error ek on the basis of the equalized signal y0 supplied from the multi-input adaptive equalizer unit 13 and the target signal Zk and supplies the equalization error ek to the multi-input adaptive equalizer unit 13 in order to perform tap coefficient control. As shown in FIG. 6, the equalization error calculation unit 16 includes a subtractor 25 and a coefficient multiplier 26. The subtractor 25 subtracts the target signal Zk from the equalized signal y0. The coefficient multiplier 26 multiplies a result of this subtraction by a predetermined coefficient a. As a result, the equalization error ek is generated.

As shown in FIG. 4, the multi-input adaptive equalizer unit 13 includes adaptive equalizer units 21, 22, and 23 and an adder 24. The above reproduction information signal Sa is input to the adaptive equalizer unit 22, the reproduction information signal Sa is input to the adaptive equalizer unit 21, and the reproduction information signal Sc is input to the adaptive equalizer unit 23. FIG. 4 shows a configuration of the multi-input adaptive equalizer unit 13 obtained in the case where the region division number is 3. The adaptive equalizer units are provided to correspond to the region division number.

Each of the adaptive equalizer units 21, 22, and 23 has parameters of the finite impulse response (FIR) filter the number of taps, calculation accuracy (bit resolution) thereof, and an update gain of adaptive calculation, and optimal values are set for each equalizer unit. The equalization error ek is supplied to each of the adaptive equalizer units 21, 22, and 23 as a coefficient control value for adaptive control.

Outputs y1, y2, and y3 of the adaptive equalizer units 21, 22, and 23 are added in the adder 24 to be output as the equalized signal y0 of the multi-input adaptive equalizer unit 13. An output target of the multi-input adaptive equalizer unit 13 is an ideal PR waveform obtained by convoluting a binarization detection result in PR (partial response).

Figure 5:
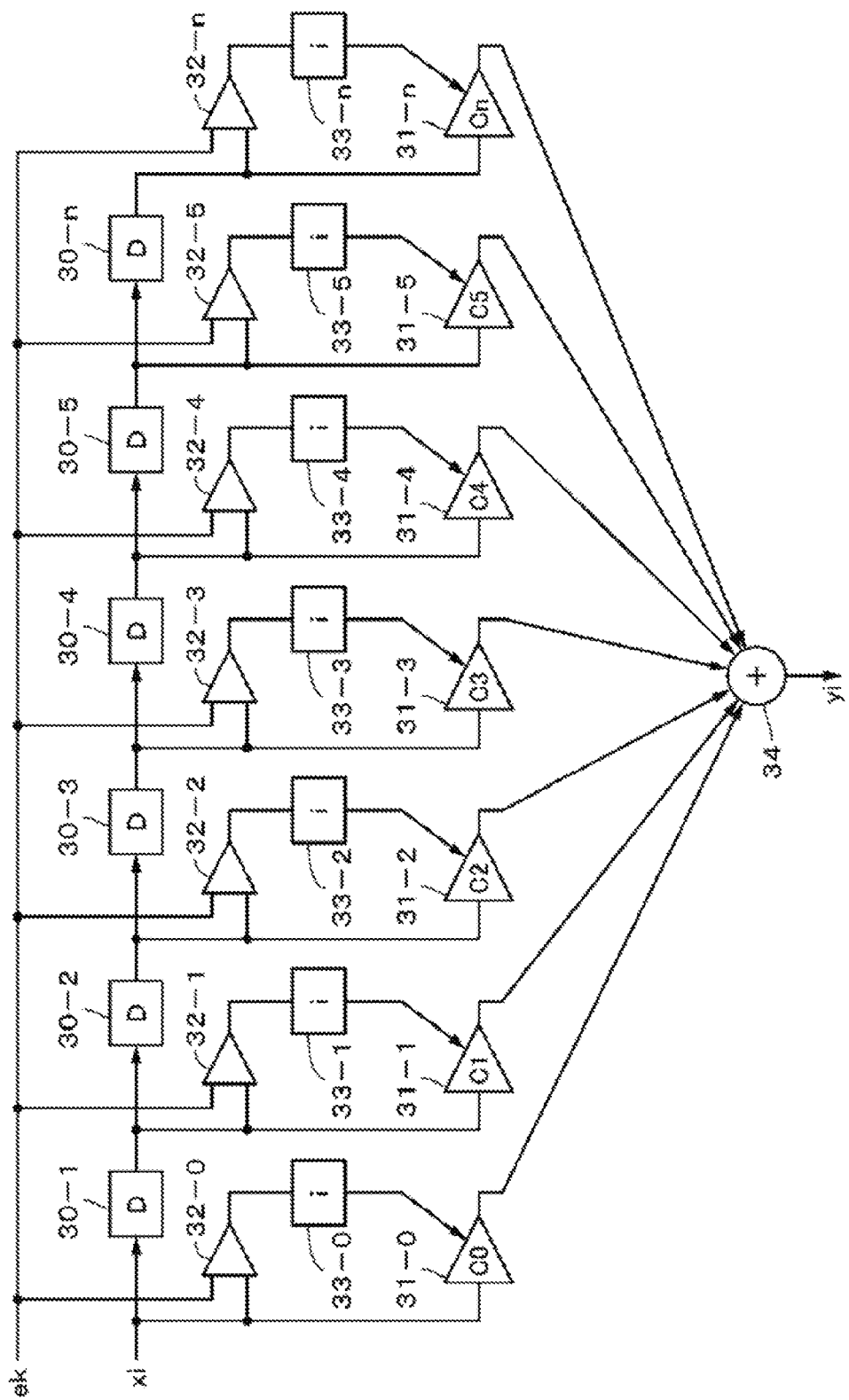
FIG. 5 is a block diagram of an example of the multi-input adaptive equalizer.

The adaptive equalizer unit 21 includes, for example, an FIR filter as shown in FIG. 5. The adaptive equalizer unit 21 is a filter having taps of n+1 stages including delay elements 30-1 to 30-$n$, coefficient multipliers 31-0 to 31-$n$, and an adder 34. The coefficient multipliers 31-0 to 31-$n$ multiply tap coefficients C0 to Cn by an input x at each point of time. Outputs of the coefficient multipliers 31-0 to 31-$n$ are added in the adder 34 and are extracted as an output y.

In order to perform an adaptive equalization process, the tap coefficients C0 to Cn are controlled. For this purpose, calculators 32-0 to 32-$n$, each of which receives the equalization error ek and each tap input and performs calculation, are provided. Further, integrators 33-0 to 33-$n$ that integrate outputs of the calculators 32-0 to 32-$n$ are provided. In each of the calculators 32-0 to 32-$n$, for example, $-1 \times ek \times x$ is calculated. Outputs of the calculators 32-0 to 32-$n$ are integrated in the integrators 33-0 to 33-$n$, respectively, and the tap coefficients C0 to Cn of the coefficient multipliers 31-0 to 31-$n$ are controlled to be changed on the basis of a result of this integration. The integrators 33-0 to 33-$n$ are integrated to adjust responsiveness of adaptive coefficient control.

In the data detection processing unit 105 having the above configuration, unnecessary signals such as crosstalk are reduced and binarized data is decoded.

The adaptive equalizer units 22 and 23 have a configuration similar to that of the adaptive equalizer unit 21. The adaptive equalizer units 21, 22, and 23 are supplied with the common equalization error ek and perform adaptive equalization. That is, the adaptive equalizer units 21, 22, and 23 optimize errors of input signal frequency components and phase distortion of the reproduction information signals Sa, Sb, and Sc, i.e., perform adaptive PR equalization. That is, the tap coefficients C0 to Cn are adjusted on the basis of a result of calculation of −1×ek×x in the calculators 32-0 to 32-*n*. This means that the tap coefficients C0 to Cn are adjusted to correct the equalization error.

Thus, the adaptive equalizer units 21, 22, and 23 perform adaptive control with the use of the equalization error ek so that the tap coefficients C0 to Cn have target frequency characteristics. The equalized signal y0 of the multi-input adaptive equalizer unit 13, which is obtained by adding the outputs y1, y2, and y3 of the adaptive equalizer units 21, 22, and 23 in the adder 24, is a signal having reduced crosstalk and the like.

"Patterns of Region Division"

Figure 7:
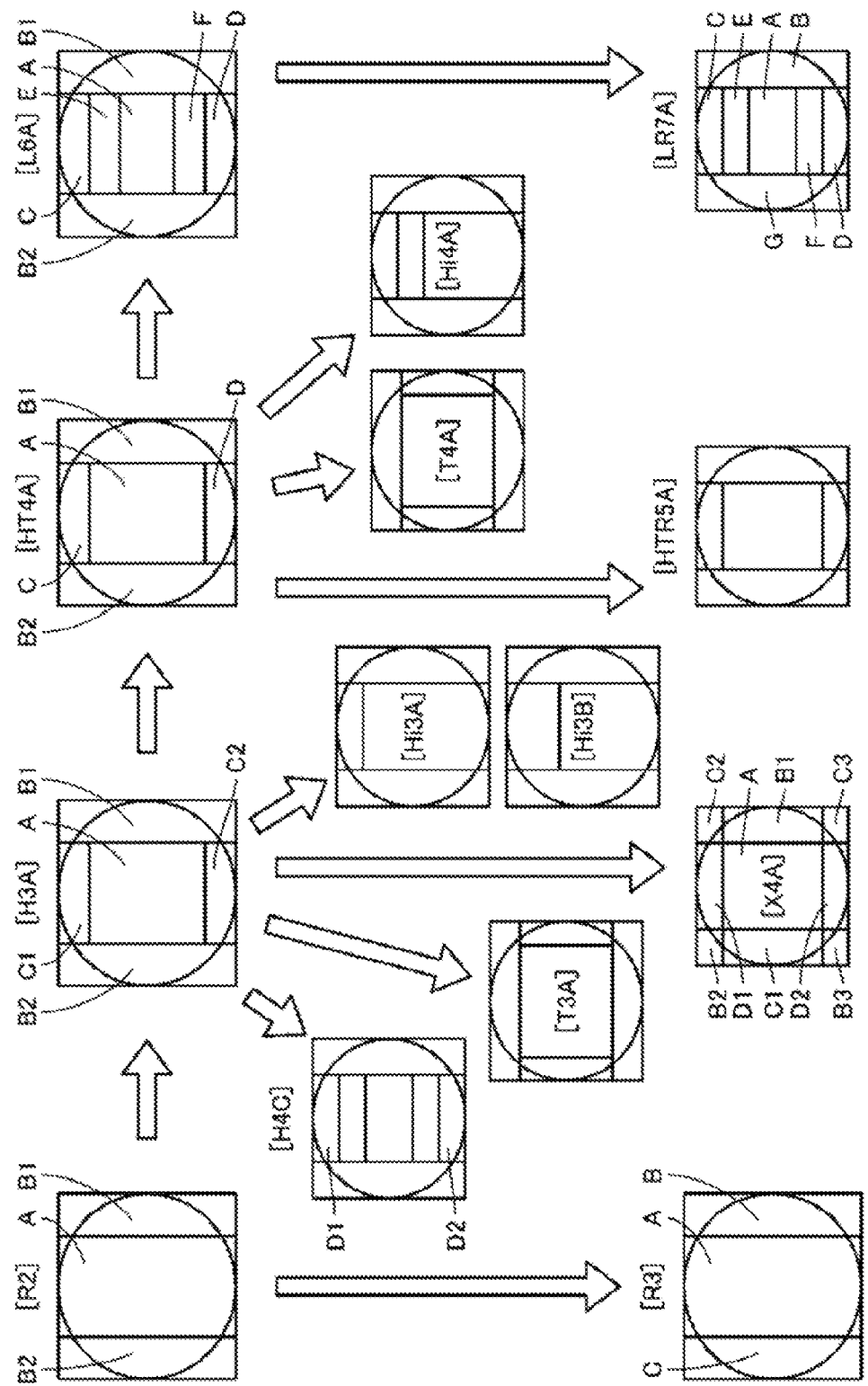
FIG. 7 is a schematic diagram for explaining a plurality of examples of a pattern of region division.

Exemplary patterns of region division in this specification will be described. As shown in FIG. 7, there are a plurality of patterns for dividing a cross-sectional region of a luminous flux of a beam returning from the optical disc 100. Each pattern will be described. A circle in FIG. 7 indicates a circumference of a cross-section of a luminous flux of a beam. A square indicates an area of a light-receiving cell of, for example, a photodetector for detection. A vertical direction of this region division diagram corresponds to a tangential direction of a returning luminous flux, and a horizontal direction thereof corresponds to a radial direction thereof. Region division patterns shown in FIG. 7 are merely examples, and patterns other than those shown in FIG. 7 are also possible. For example, a dividing line is not limited to a straight line and may be a curved line such as an arc.

Pattern R2

The pattern R2 is an example where a beam is divided in the radial direction into two regions, i.e., a region A and a region B (=B1+B2) by two dividing lines extending in the tangential direction. Electric signals corresponding to light-receiving signals in the regions B1 and B2 are added to be a signal of a channel. That is, an example of FIG. 3 is an example of two channels, i.e., an inner channel (region A) and an outer channel (regions B1+B2). Such region division is referred as the pattern R2.

Pattern R3

In the pattern R2, two outer regions are defined as regions B and C of different channels. A pattern of such region division is referred to as R3. Signals of three channels corresponding to three regions are obtained.

Pattern H3A

As compared with the pattern R2, the pattern H3A is a pattern in which the region A is vertically divided by dividing lines extending in the radial direction. Regions C1 and C2 are provided on upper and lower sides in the tangential direction, and the remaining central region is defined as A. That is, the pattern H3A is a pattern in which the cross-section of the beam is divided into three regions, i.e., the region A, the region (B1+B2), and the region C (=C1+C2). Signals of three channels corresponding to the three regions are obtained.

Pattern H4C

In the pattern H4C, regions D1 and D2 are provided by dividing each of the upper and lower regions C1 and C2 of the pattern H3A into two parts in the tangential direction. That is, the pattern H4C is a pattern in which the cross-section of the beam is divided into four regions, i.e., the region A, the region (B1+B2), the region C (=C1+C2), and a region D (=D1+D2). Signals of four channels corresponding to the four regions are obtained.

Pattern T3A

The pattern T3A is a pattern obtained by extending the upper and lower regions C1 and C2 of the pattern H3A to cover the regions B1 and B2. The pattern T3A is a pattern in which the cross-section of the beam is divided into three regions, i.e., the region A, the region (B1+B2), and the region C (=C1+C2). Signals of three channels corresponding to the three regions are obtained.

Pattern X4A

The pattern X4A is a pattern in which regions B2, B3, C2, and C3 are provided at four corners by extending the dividing lines that divide the region A in the tangential direction in the pattern H3A. The pattern X4A is a pattern in which the cross-section of the beam is divided into four regions, i.e., the region A, the region (B1+B2+B3), the region C (=C1+C2+C3), and the region D (D1+D2). Signals of four channels corresponding to the four regions are obtained.

Pattern Hi3A

The pattern Hi3A is a pattern obtained by reducing the dividing lines, i.e., providing a single dividing line in the tangential direction in the pattern H3A so that one of the upper and lower regions C1 and C2, i.e., the region C2 is not provided. As a result, a central position of the central region A is shifted downward in the tangential direction from a central position of the cross-section of the beam. Thus, signals of three channels including two channels that are different in central position in the tangential direction are obtained.

Pattern Hi3B

The pattern Hi3B is obtained by dividing a region in the same way as the pattern Hi3A. However, a width of the upper region C1 is larger than that of the pattern Hi3A.

Pattern HT4A

The pattern HT4A is a pattern in which the region C2 of the pattern H3A is defined as a region D of a fourth channel. The pattern HT4A is a pattern in which the cross-section of the beam is divided into four regions, i.e., the region A, the region (B1+B2), the region C, and the region D. Signals of four channels corresponding to the four regions and including three channels that are different in central position in the tangential direction are obtained.

HTR5A

The pattern HTR5A is a pattern in which the two outer regions B1 and B2 in the radial direction in the pattern HT4A are defined as regions of different channels, and signals of five channels are obtained.

Pattern T4A

The pattern T4A is a pattern obtained by extending the upper and lower regions C and D of the pattern HT4A to cover the regions B1 and B2. The pattern T4A is a pattern in which the cross-section of the beam is divided into four regions, i.e., the region A, the region (B1+B2), the region C, and the region D. Signals of four channels corresponding to the four regions and including three channels that are different in central position in the tangential direction are obtained.

Pattern Hi4A

The pattern Hi4A is a pattern obtained by providing a region D below and adjacent to the region C in the pattern HT4A. As a result, the central position of the central region A is shifted downward in the tangential direction from the central position of the cross-section of the beam. Signals of four channels including three channels that are different in central position in the tangential direction are obtained.

Pattern L6A

Adjacent regions E and F are provided below the upper and lower regions C and D, respectively, of the pattern HT4A. Signals of six channels including five channels that are different in central position in the tangential direction are obtained from the regions A to F.

Pattern LR7A

The pattern LR7A is a pattern in which the region B1 of the pattern L6A is defined as the region B and the region B2 of the pattern L6A is defined as a region G. Signals of seven channels are obtained from the regions A to G.

Hereinafter, description will be made on the basis of simulation results of the patterns. Simulation conditions are as follows.

Tp=0.225 µm (both land and groove) •NA=0.85 •PR (1233321)

Evaluation index: e-MLSE (described below)

Mark width=Tp×0.7 •Disc Noise and Amp Noise are present.

The linear density is indicated with the use of a plane capacity obtained when a disc has a diameter of 120 mm and the track pitch of Tp=0.32 µm.

In particular, in the case of "low linear density",

LD 35.18 (GB) . . . . The plane capacity is 35.18 GB in the case of 0.053 µm/channel bit and Tp=0.32 µm.

In the case of Tp=0.225 µm (both land and groove), the plane capacity is 50.0 GB including LD 35.18 GB.

In the case of "high linear density",

LD 41 (GB) . . . . The plane capacity is 41 GB in the case of 0.04547 µm/channel bit and Tp=0.32

In the case of Tp=0.225 µm (both land and groove), the plane capacity is 58.3 GB including LD 41 GB.

"Adaptive Filter Characteristics in Pattern R2"

The adaptive filter characteristics of the pattern R2 with a low linear density will be described as a comparison example of the present disclosure. Herein, region division positions in the radial direction are positions of ±0.55 where a pupil radius is 1.0. As described above, reproduction information signals of a plurality of channels are processed in the multi-input adaptive equalizer unit 13. The multi-input adaptive equalizer unit 13 includes adaptive equalizer units, the number of which is equal to the number of channels. Each adaptive equalizer unit is formed as an FIR filter, and tap coefficients thereof are adaptively controlled.

Figure 8:
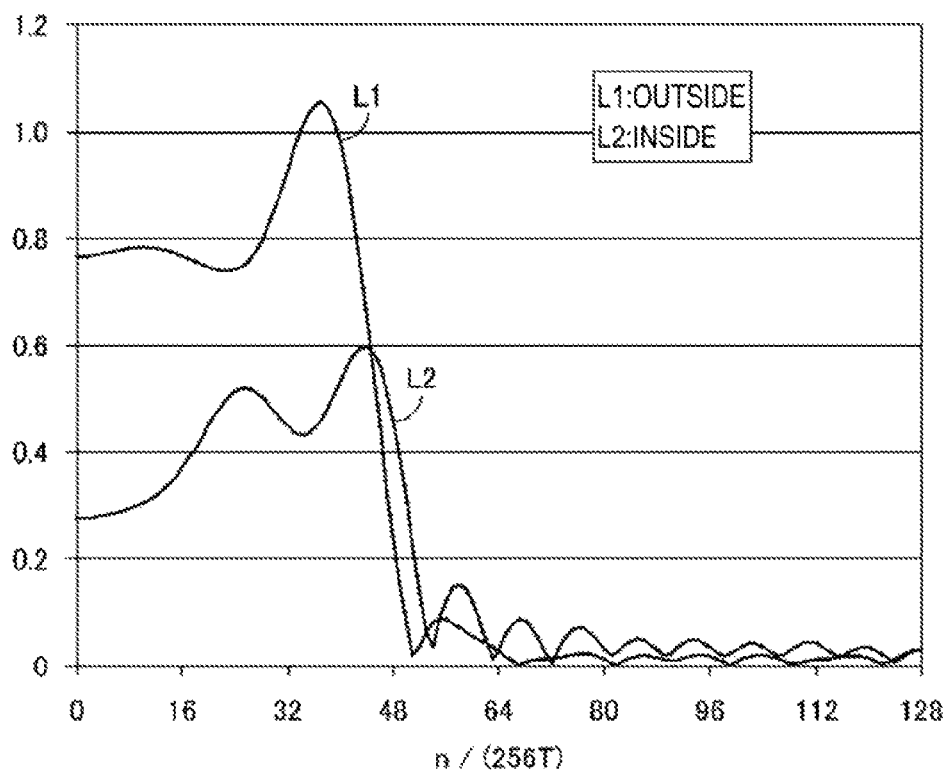
FIG. 8 is a graph showing frequency amplitude characteristics concerning a pattern R2.

FIG. 8 shows frequency amplitude characteristics obtained as a result of a simulation concerning the pattern R2. A characteristic L1 is a frequency amplitude characteristic of a channel corresponding to the outer region B, and a characteristic L2 is a frequency amplitude characteristic of a channel corresponding to the inner region A. The characteristics are exemplary characteristics at a perturbation origin. The perturbation origin herein means a state in which defocus, disc skew, and the like are all positioned at an origin and substantially the most favorable result can be basically obtained in the case where adaptive control is performed.

In the frequency amplitude characteristics, a horizontal axis is n/(256T) (n: value of horizontal axis). For example, in the case of (n=64), the horizontal axis is (64/256T)=(1/4T). For example, in the case where the RLL (1, 7) PP modulation method is used, the mark length falls within a range of 2T to 8T, where the channel clock cycle is "T". (1/4T) is a frequency obtained when a mark of 2T is repeated. In the characteristics of FIG. 8, the mark of 2T is in a frequency region where reproduction cannot be performed, and the mark of 3T can be reproduced.

Figure 9A:
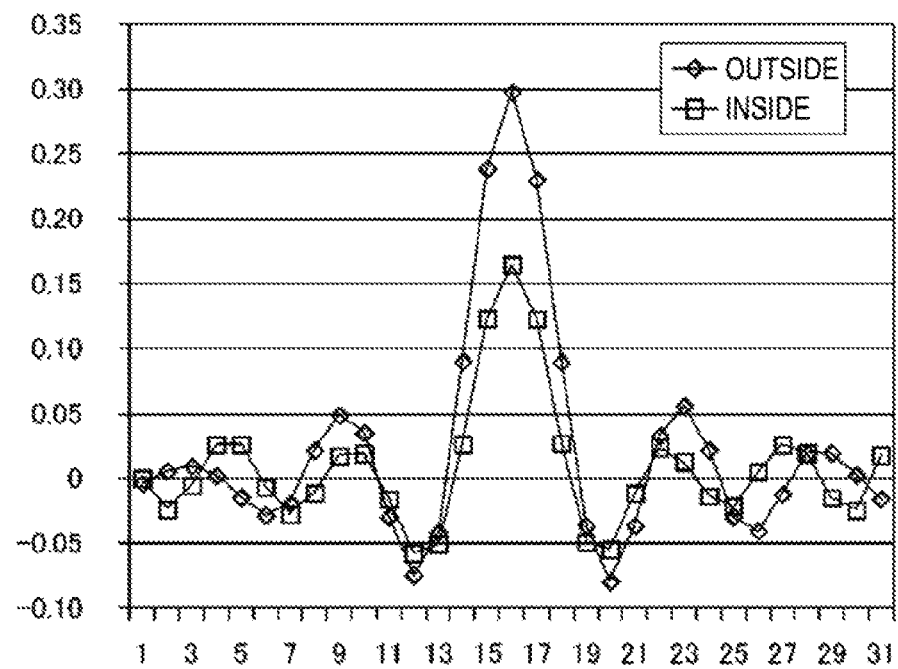
FIGS. 9A and 9B are graphs showing tap coefficients and frequency phase characteristics concerning the pattern R2.
Figure 9B:
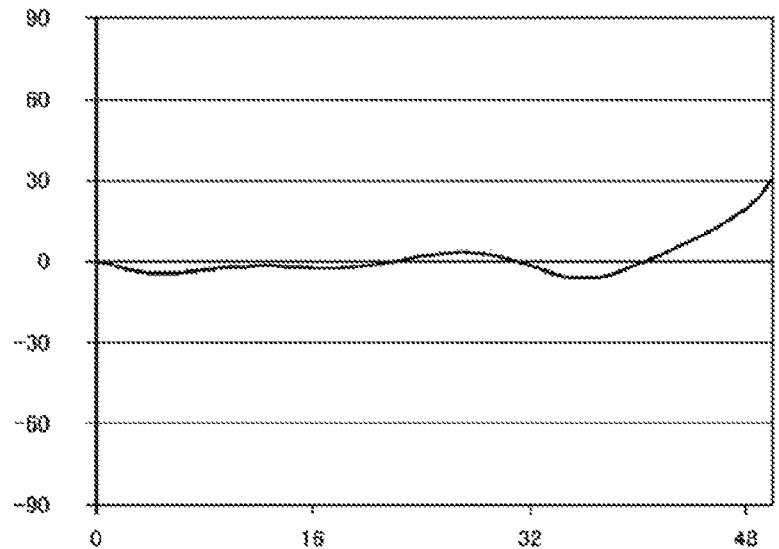

FIG. 9A shows tap coefficients of channels of the pattern R2. For example, the number of taps in the FIR filter is set to 31. FIG. 9B shows a frequency phase characteristics of the channels. The frequency phase characteristics indicate a phase difference between two channels. As shown in FIG. 9B, the phase difference between the two channels is small.

"Reproduction Performance"

Figure 10:
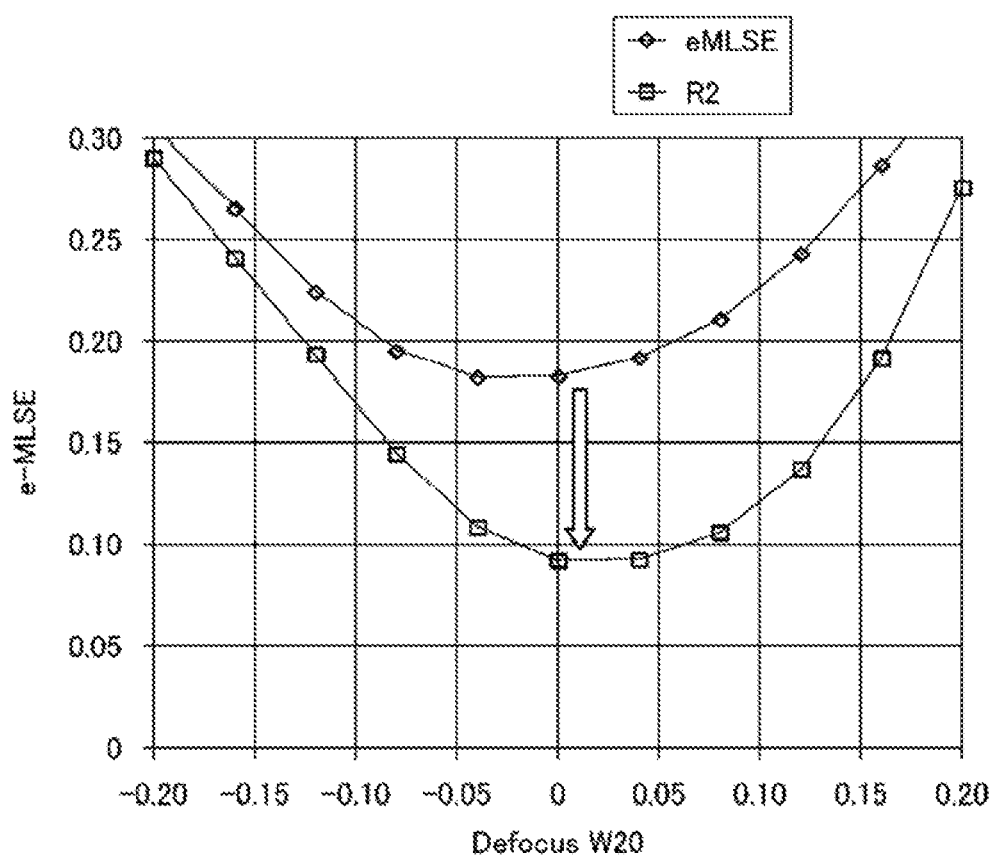
FIG. 10 is a graph for explaining a defocus margin concerning the pattern R2.
Figure 11:
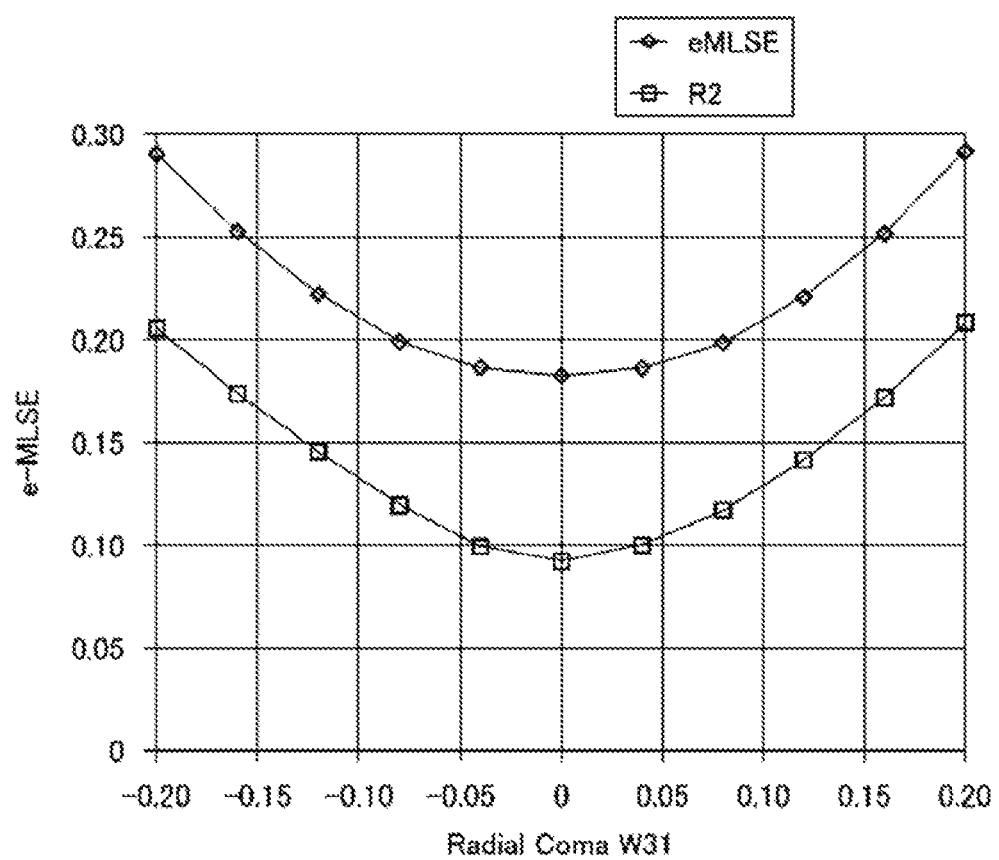
FIG. 11 is a graph for explaining a margin for comatic aberration in a radial direction concerning the pattern R2.

FIG. 10 and FIG. 11 show simulation results of reproduction performance concerning the pattern R2. FIG. 10 and FIG. 11 show effects of region division of the pattern R2 with a low linear density.

The linear density is indicated with the use of a plane capacity obtained when a disc has the diameter of 120 mm and the track pitch of Tp=0.32 µm.

In particular, in the case of "low linear density",

LD 35.18 (GB) . . . . The plane capacity is 35.18 GB in the case of 0.053 µm/channel bit and Tp=0.32 µm.

In the case of Tp=0.225 µm (both land and groove), the plane capacity is 50.0 GB including LD 35.18 GB.

NA=0.85 •PR (1233321) •Evaluation index: e-MLSE

Mark width=Tp×0.7 •Disc Noise and Amp Noise are present.

The region division positions in the radial direction are positions of ±0.55 where the pupil radius is 1.0.

In the above conditions, the e-MLSE is improved.

In the case where no division is performed (graph indicated by e-MLSE), there is no margin width satisfying the e-MLSE≤15%. On the contrary, as shown in FIG. 10, a defocus margin W20 has a total width of 0.21 (corresponding to ±0.18 µm). As shown in FIG. 11, a radial comatic aberration margin W31 has a total width of 0.25 (corresponding to ±0.44 deg.).

A horizontal axis in the graph of FIG. 10 indicates a defocus amount normalized by a wavelength. A value 0 means the defocus amount of 0. When reproduction is actually performed, de-focus is generated and therefore it is necessary to have a margin for the defocus.

In a graph of (normalized defocus amount vs. index), reproduction performance is higher as a value of the e-MLSE is smaller. As an example, it is preferable that the value of the e-MLSE be substantially 0.15 or less. Therefore, the defocus margin corresponds to a width of a range where the value of the e-MLSE is substantially 0.15 or less. The defocus margin is larger as the width is larger.

In addition to the defocus margin, a margin for skew of the disc is also important as a margin. FIG. 11 shows a margin for third-order comatic aberration W31 (aberration coefficient normalized by wavelength) corresponding to the skew in the radial direction of the disc. As an example, it is preferable that the value of the e-MLSE be substantially 0.15 or less. Therefore, the comatic aberration margin corresponds to the width of the range where the value of the e-MLSE is substantially 0.15 or less. The radial disc skew margin is larger as the width is larger.

A vertical axis of each of the graphs in FIG. 10 and FIG. 11 is an index for indicating reproduction performance. For example, a value of i-MLSE is known as the index. A maximum likelihood sequence error (MLSE) is an index corresponding to an error probability calculated by using a difference between a target level that is set with the use of Viterbi-detected data and a level of an actual signal. In the case of BDXL (registered trademark), calculation is performed by weighting a data pattern that easily causes some errors with the use of a method called i-MLSE.

In the case where the recording density is increased as compared with BDXL (registered trademark), a data pattern that easily causes an error is different. As a result, an error of the i-MLSE which is a conventional signal index value is problematic. In view of this, in the present disclosure, a signal evaluation value with new data patterns needed to improve accuracy of a signal index value with a higher linear density, which is different from the i-MLSE, is used to explain an effect. Hereinafter, such a new index value having improved accuracy is referred to as e-MLSE.

The following three data patterns are added in the e-MLSE.

A bit written as 1 in a pattern string indicates an error pattern, which is a part where bit inversion occurs, as contrasted with a detected pattern.
Additional pattern (1): 10111101
Additional pattern (2): 1011110111101
Additional pattern (3): 10111100111101

With a linear density equivalent to that of a conventional BDXL (registered trademark) for which accuracy of the i-MLSE is sufficient, the e-MLSE and the i-MLSE are substantially the same. With a higher linear density, a difference caused by improvement in accuracy appears. Both the e-MLSE and the i-MLSE have the same theoretical correlation between index value and error rate which is important in practical use. Therefore, although both the e-MLSE and the i-MLSE are different in calculation and a range of an applicable linear density, evaluation values of signal quality indicated by both the e-MLSE and the i-MLSE may be similarly comprehended. In the present disclosure, an index other than the e-MLSE may be used.

In the case of the pattern R2, amplitude phase characteristics that a crosstalk component originally has are used as they are, and signal characteristics are improved by using an inter-channel balance of amplitude characteristics and hardly changing an inter-channel phase difference. The pattern R2 is a pattern obtained by dividing a beam into inner and outer regions in the radial direction and can suppress crosstalk generated from an adjacent track when the track pitch is made narrower. Therefore, in an example where region division is performed only in the radial direction such as the pattern R2, deterioration of a signal caused by, for example, inter-symbol interference in the tangential direction cannot be sufficiently prevented. In the present disclosure described below, description will be made in consideration of this point.

"Region Division is Further Performed in Tangential Direction (Patterns H3A and H4C)"

Figure 12:
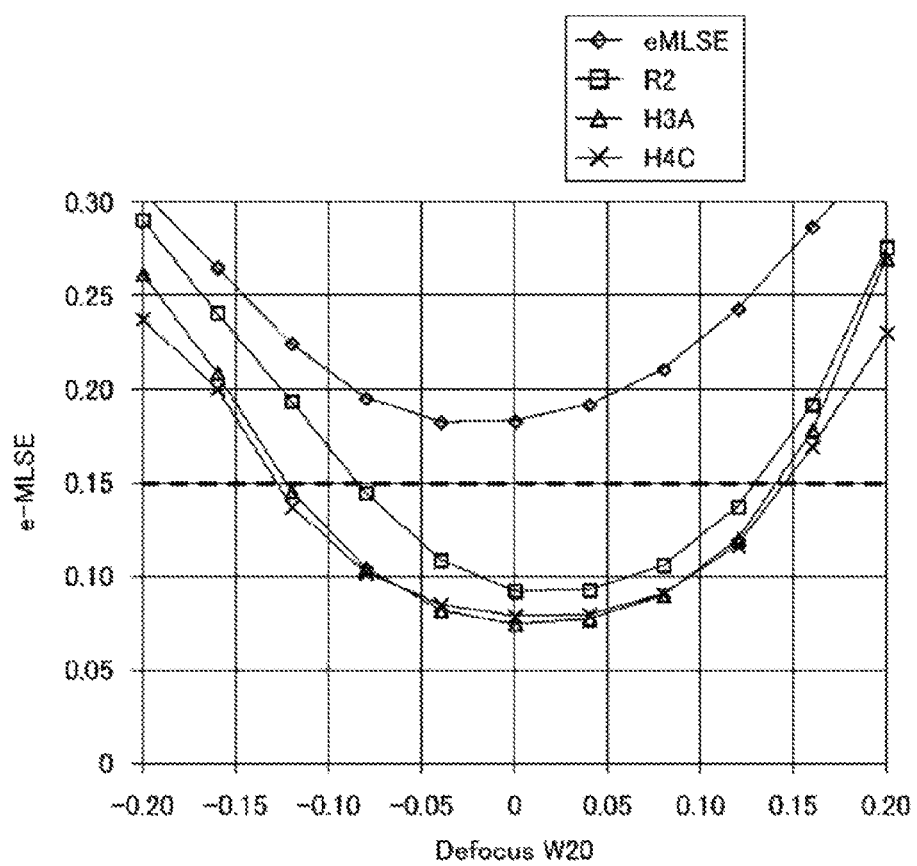
FIG. 12 is a graph for explaining defocus margins concerning patterns H3A and H4C.
Figure 13:
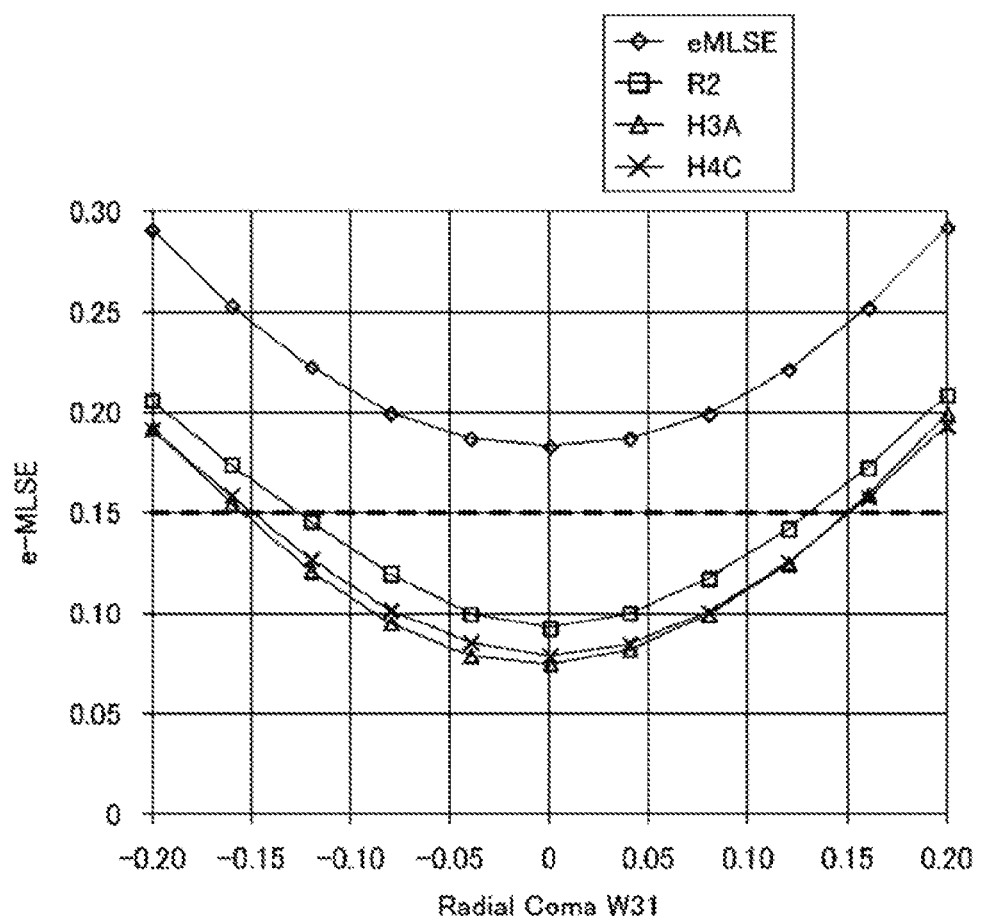
FIG. 13 is a graph for explaining margins for comatic aberration in a radial direction of a disc concerning the patterns H3A and H4C.
Figure 14:
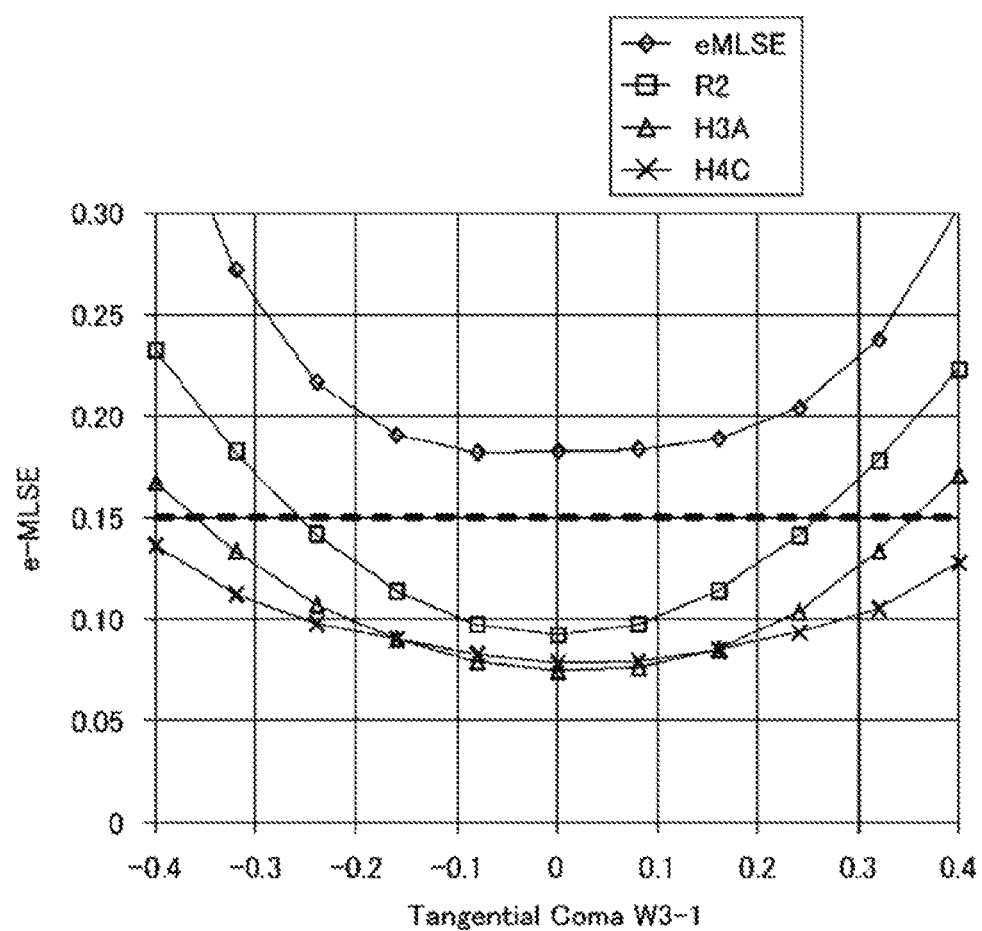
FIG. 14 is a graph for explaining margins for comatic aberration in a tangential direction of a disc concerning the patterns H3A and H4C.

As an example where region division is further performed in the tangential direction, reproduction performance of the patterns H3A and H4C (see FIG. 7) is shown in FIG. 12, FIG. 13, and FIG. 14. FIG. 12 is a graph of (normalized defocus amount vs. index). FIG. 13 is a graph of (normalized skew amount in radial direction vs. index). FIG. 14 is a graph of (normalized skew amount in tangential direction vs. index).

FIG. 12, FIG. 13, and FIG. 14 show effects of division in the tangential direction with a low linear density.

Simulation was performed in the following conditions.
LD 35.18 (GB) . . . 0.053 μm/channel bit
In the case of Tp=0.225 μm (both land and groove), the plane capacity is 50.0 GB.
NA=0.85 •PR (1233321) •Evaluation index: e-MLSE
Mark width=Tp×0.7 •Disc Noise and Amp Noise are present.
The region division positions in the radial direction are positions of ±0.55 in common where the pupil radius is 1.0, and the region division positions in the tangential direction are positions of ±0.65 and ±0.30.

As is clear from FIG. 12 to FIG. 14, in the case where region division is further performed in the tangential direction, the bottom of the graph becomes lower and the margin is increased, as compared with the pattern R2 in which region division is performed only in the radial direction.

In the above conditions, the margins are improved in the pattern H3A as follows.

The defocus margin W20 has the total width of 0.27 (corresponding to ±0.23 μm). The radial comatic aberration margin W31 has the total width of 0.30 (corresponding to ±0.53 deg.).

In the above conditions, the margins are improved in the pattern H4C as follows.

The defocus margin W20 has the total width of 0.275 (corresponding to ±0.235 The radial comatic aberration margin W31 has the total width of 0.30 (±0.53 deg.).

As described above, as compared with a case where division is performed only in the radial direction, it is possible to improve reproduction performance by performing region division not only in the radial direction but also in the tangential direction. In the description of this specification, it is assumed that the tap coefficients of the adaptive equalizer unit (FIR filter) are adaptively controlled. However, in the case where the best tap coefficients are obtained as a result of simulation, it is possible to use an equalizer unit in which the tap coefficients are fixed or use a filter having equivalent characteristics other than the FIR filter, such as an analog filter or a digital filter. Although the adaptive equalizer unit is superior in terms of performance, processing and hardware can be simplified because adaptive control of the tap coefficients is not needed. It is also possible to use fixed-type equalizer units for some of a plurality of channels and use adaptive equalizer units for the other channels.

"Adaptive Electro-Optical Filter Characteristics in Pattern H3A"

Figure 15:
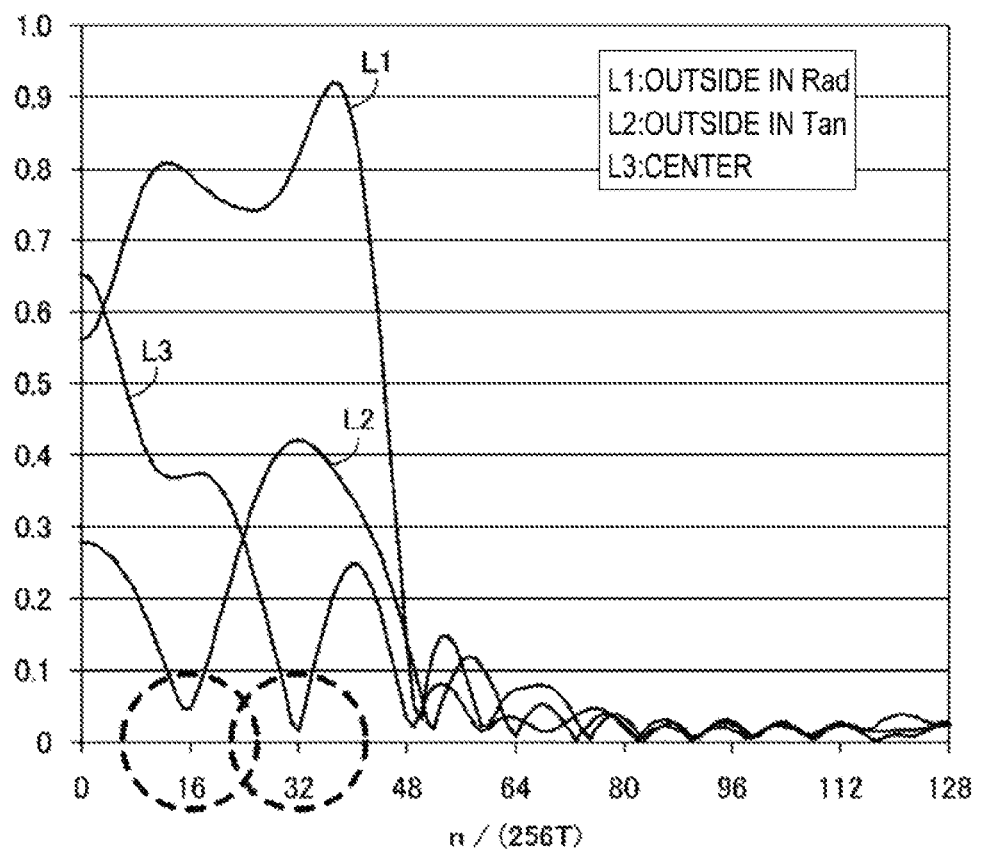
FIG. 15 is a graph showing frequency amplitude characteristics concerning the pattern H3A.

Adaptive electro-optical filter characteristics of the pattern H3A with a low linear density will be described. FIG. 15 shows frequency amplitude characteristics obtained as a result of simulation concerning the pattern H3A (see FIG. 7). The characteristic L1 is a frequency amplitude characteristic of a channel corresponding to the outer region B in the radial direction. A characteristic L2 is a frequency amplitude characteristic of a channel corresponding to the outer region C in the tangential direction. A characteristic L3 is a frequency amplitude characteristic of a channel corresponding to the central region A. The characteristics are exemplary characteristics at the perturbation origin.

Figure 16A:
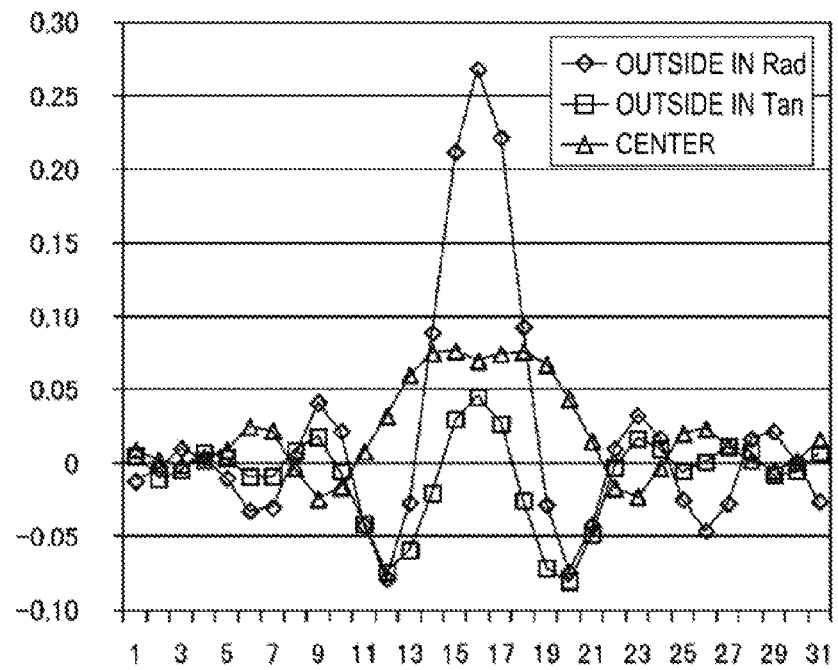
FIGS. 16A and 16B are graphs showing tap coefficients and frequency phase characteristics concerning the pattern H3A.
Figure 16B:
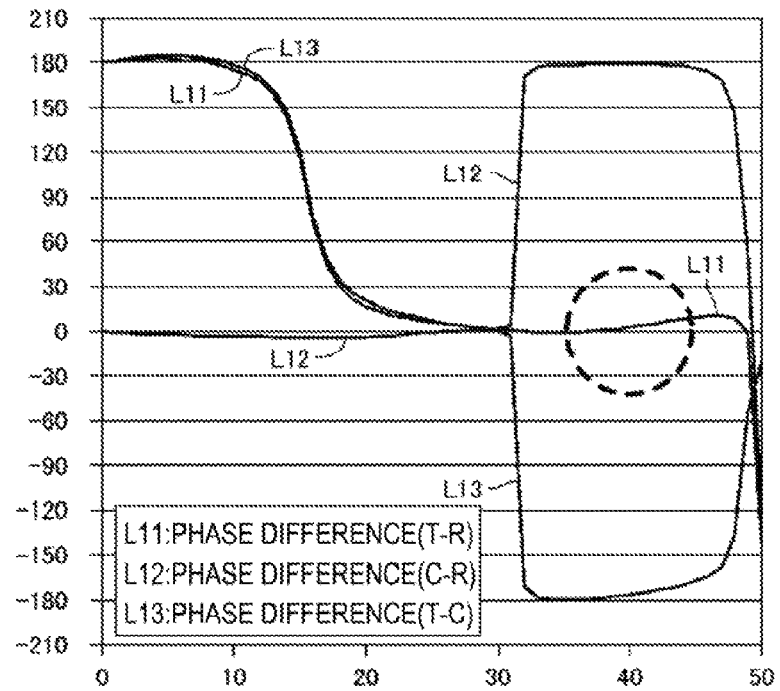

FIG. 16A shows tap coefficients of the channels of the pattern H3A. For example, the number of taps in the FIR filter is set to 31. FIG. 16B shows frequency phase characteristics of the channels. The frequency phase characteristics indicate a phase difference between two channels of three channels. A characteristic L11 indicates a phase difference between reproduction information signals of channels corresponding to the outer region C in the tangential direction and the outer region B in the radial direction. A characteristic L12 indicates a phase difference between reproduction information signals of channels corresponding to the central region A and the outer region B in the radial direction. A characteristic L13 indicates a phase difference between reproduction information signals of channels corresponding to the outer region C in the tangential direction and the central region A.

As described above, the filter characteristics of H3A have the following features.

Filters having frequency characteristics that are largely different in amplitude and phase are formed in respective regions of the three channels, and favorable reproduction signals can be reproduced.

In a frequency band corresponding to a 3T signal (in the vicinity of a value 43 in the horizontal axis, which is surrounded by a broken line), a phase of the outer region C in the tangential direction and a phase of the outer region B in the radial direction are shifted by 180 deg. from the central region.

The central region has a characteristic that interrupts a frequency band corresponding to a 4T signal (in the vicinity of a value 32 in the horizontal axis, which is surrounded by a broken line), and a false signal caused by crosstalk is suppressed.

An outer side in the tangential direction should contribute to reproduction of a short mark and interrupts a frequency band corresponding to an 8T signal (in the vicinity of a value 16 in the horizontal axis, which is surrounded by a broken line).

As described above, a high-pass filter, a low-pass filter, a band-pass filter, a band-stop (or notch) filter, and the like are provided in each region. Therefore, the filter characteristics which cannot be achieved by applying only optics or only electricity are achieved.

Figure 17:
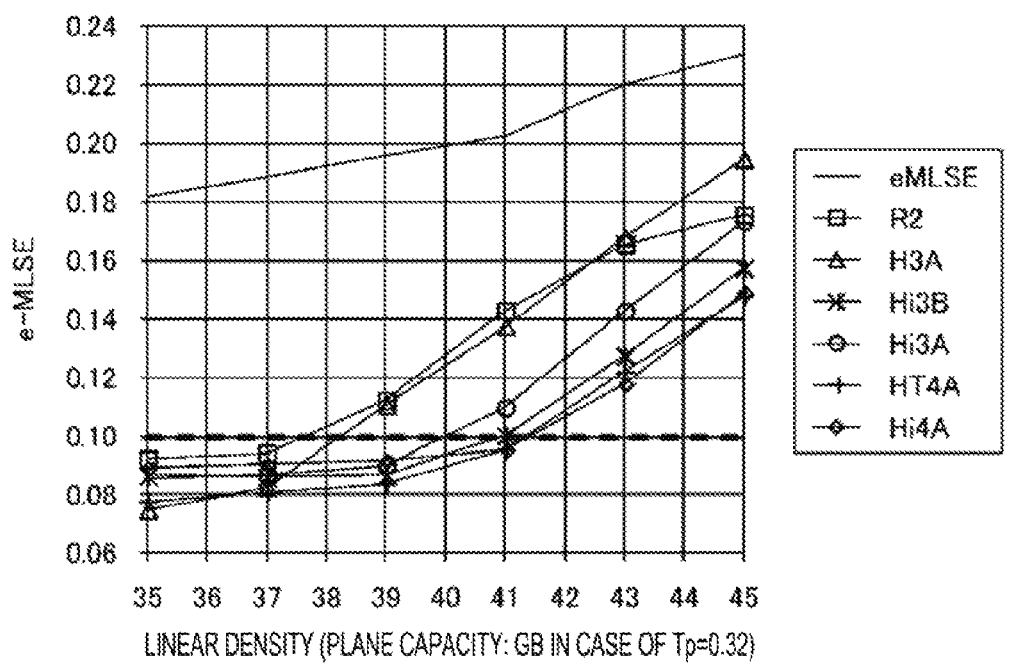
FIG. 17 is a graph showing a relationship between fixed linear density and index.

FIG. 17 shows a relationship between linear density and index in a fixed condition of (NA=0.85, Tp=0.225, PR (1233321)). In the case where channels that are different in central position in the tangential direction are provided, it is possible to favorably reproduce a signal with a higher linear density even in the same PR class. The characteristics can be improved by optimizing division positions in the tangential direction as in the pattern Hi3B. In the case of e-MLSE≤10% at the center of perturbation, the patterns R2 and H3A are up to LD 38 GB. Meanwhile, Hi3B, HT4A, and Hi4A can be up to LD 41 GB.

"High Linear Density Effect of Division in Tangential Direction"

Figure 18:
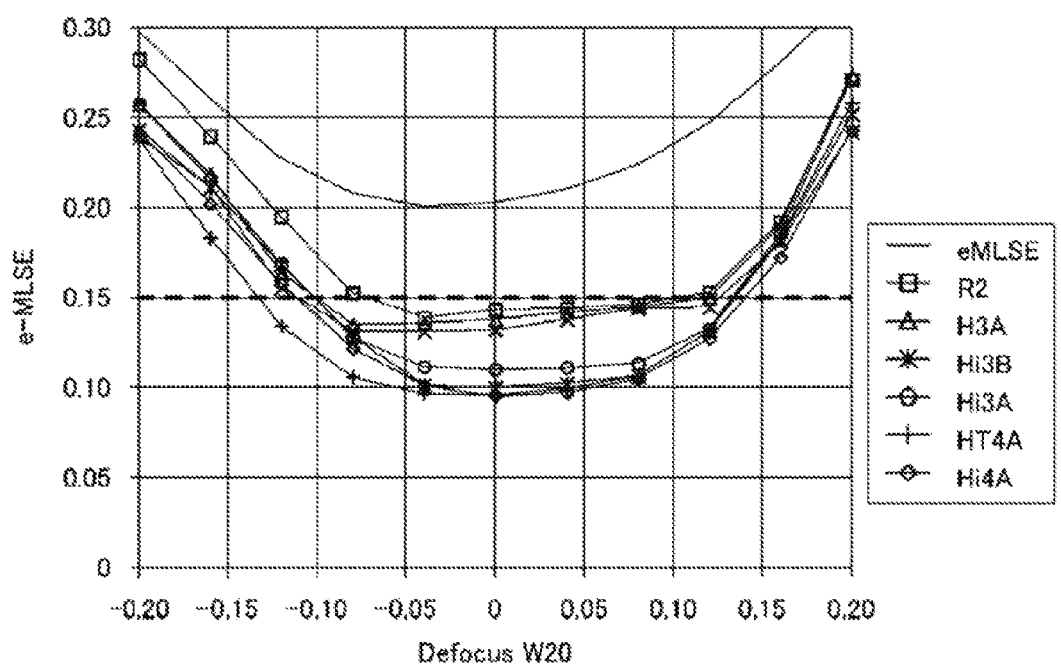
FIG. 18 is a graph used for explaining a defocus margin.
Figure 19:
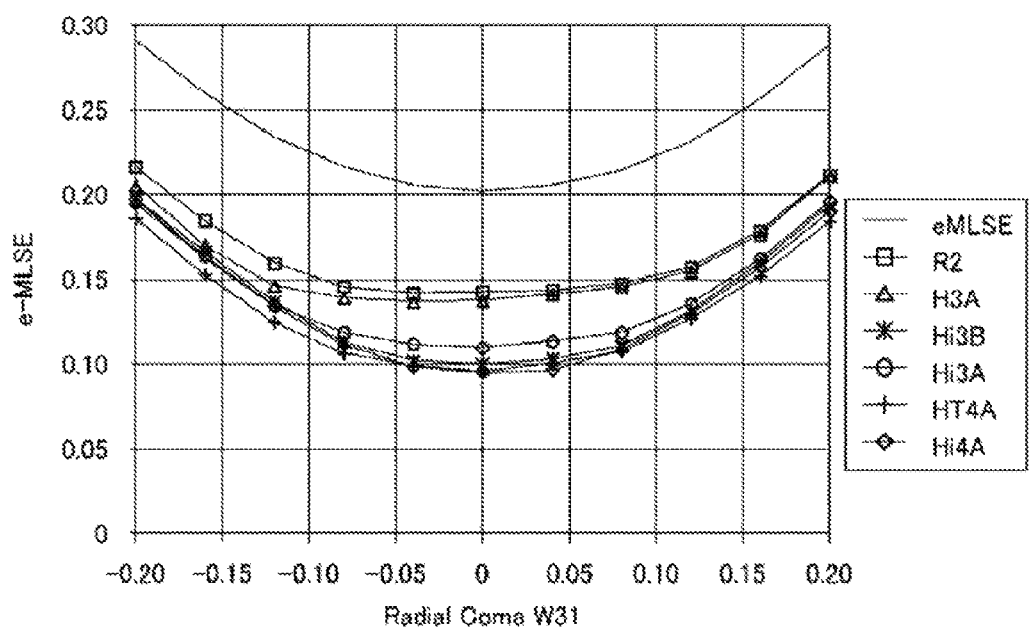
FIG. 19 is a graph used for explaining a comatic aberration margin in the radial direction.

Reproduction performance of the patterns H3A, Hi3A, Hi3B, HT4A, and Hi4A and reproduction performance of the patterns R2 and H3A for comparison (see FIG. 7) are shown in FIG. 18 and FIG. 19. FIG. 18 is a graph of (normalized defocus amount vs. index). FIG. 19 is a graph of (normalized skew amount in radial direction vs. index).

FIG. 18 and FIG. 19 show effects of division in the tangential direction with a high linear density.

Simulation was performed in the following conditions.
LD 41 (GB) . . . 0.04547 μm/channel bit
In the case of Tp=0.225 μm (both land and groove), the plane capacity is 58.3 GB including LD 41 (GB).
NA=0.85 •PR (1233321) •Evaluation index: e-MLSE
Mark width=Tp×0.7 •Disc Noise and Amp Noise are present.
The region division positions in the radial direction are positions of ±0.55 in common where the pupil radius is 1.0, and the region division positions in the tangential direction are positions of ±0.30 and ±0.65.

As is clear from FIG. 18 and FIG. 19, with a high density of LD 41 GB, the e-MLSE is changed in the vicinity of 15% in the patterns R2 and H3A having no channels that are different in central position in the tangential direction. Meanwhile, the patterns Hi3A, Hi3B, HT4A, and Hi4A having channels that are different in central position in the tangential direction sufficiently have a margin width satisfying e-MLSE≤15%. In particular, the pattern HT4A with LD 41 GB has a margin width equivalent to that in the pattern H3A with LD 35.18 GB.

"Adaptive Electro-Optical Filter Characteristics in Pattern HT4A"

Figure 20:
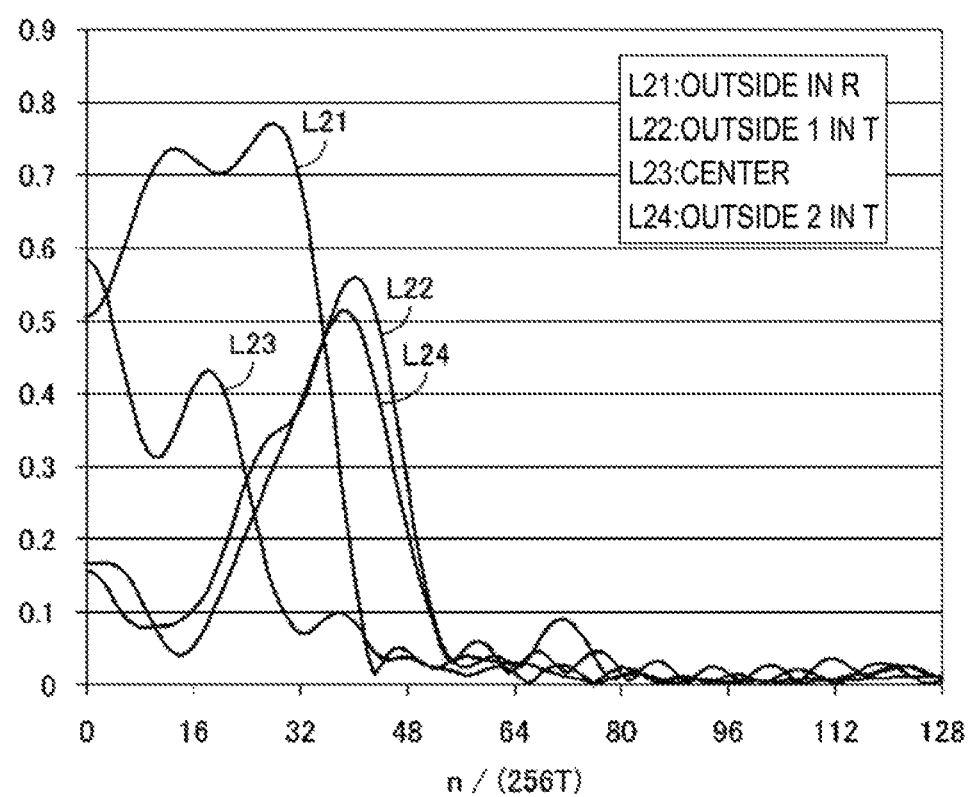
FIG. 20 is a graph showing frequency amplitude characteristics concerning a pattern HT4A.

Adaptive electro-optical filter characteristics in the pattern HT4A (see FIG. 7) with a high linear density will be described. FIG. 20 shows frequency amplitude characteristics obtained as a result of simulation concerning the pattern HT4A. A characteristic L21 indicates a frequency amplitude characteristic of a channel corresponding to the outer region B in the radial direction. A characteristics L22 indicates a frequency amplitude characteristic of a channel corresponding to the outer region C in the tangential direction. A characteristic L23 indicates a frequency amplitude characteristic of a channel corresponding to the central region A. A characteristic L24 indicates a frequency amplitude characteristic of a channel corresponding to the outer region D in the tangential direction. The characteristics are exemplary characteristics at the perturbation origin.

Figure 21A:
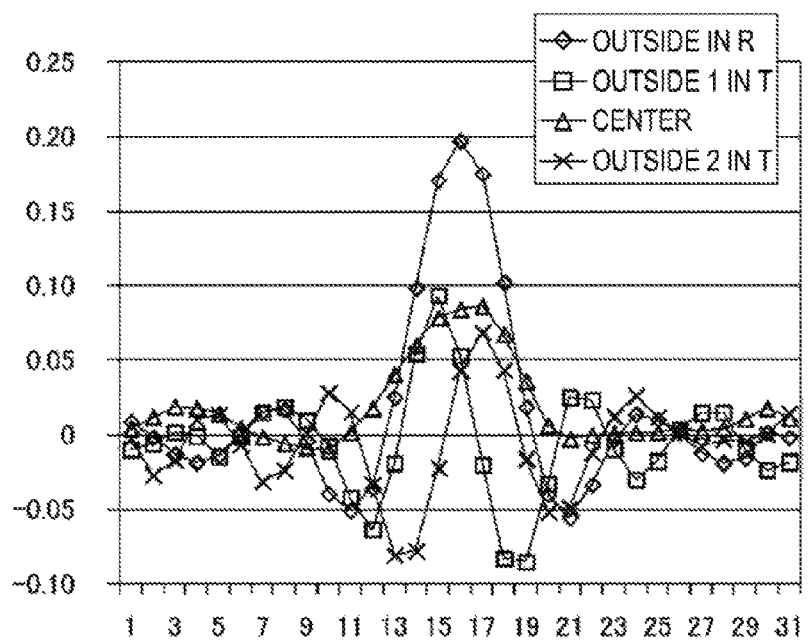
FIGS. 21A and 21B are graphs showing tap coefficients and frequency phase characteristics concerning the pattern HT4A.
Figure 21B:
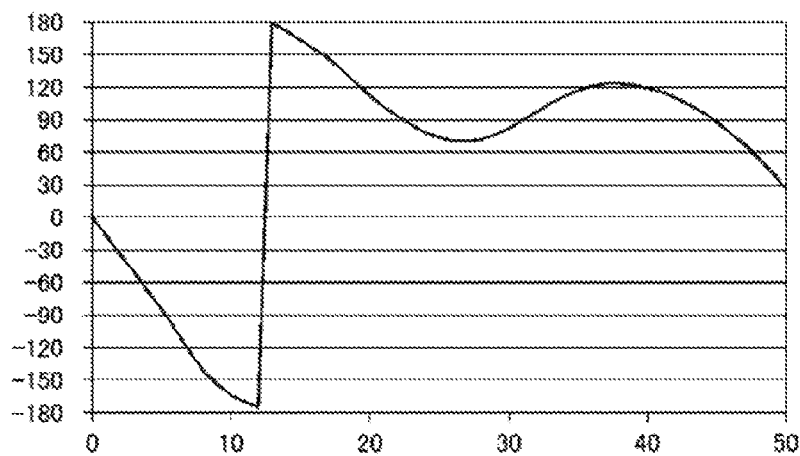

FIG. 21A shows tap coefficients of channels of the pattern HT4A. For example, the number of taps in the FIR filter is set to 31. FIG. 21B shows frequency phase characteristics of respective channels. The frequency phase characteristics indicate a phase difference between a channel corresponding to the outer region C in the tangential direction and a channel corresponding to the outer region D in the tangential direction.

The filter characteristics of HT4A have the following features.

As in the pattern H3A, the central region has a low-pass like characteristic and the outer region in the tangential direction has a high-pass like characteristic (Herein, a band-pass characteristic that allows passing of a band corresponding to shorter marks in a frequency band contributing to signal reproduction is referred to as a relatively high-pass like characteristic.).

In the pattern HT4A, the outer regions in the tangential direction are two independent channels. The two regions form a filter having a phase difference falling within the range of approximately 120 to 90 deg. in frequency bands corresponding to 3T and 4T (in the vicinity of values 43 and 32 in the horizontal axis) (corresponding to two clocks, as is clear from the tap coefficients). With this, it is possible to detect a short mark with a higher sensitivity, as compared with a reproduction amplitude of a simple total sum signal. In reproduction of a short mark, favorable reproduction signal characteristics in a high linear density region are achieved by also using the phase difference between the regions.

Figure 22:
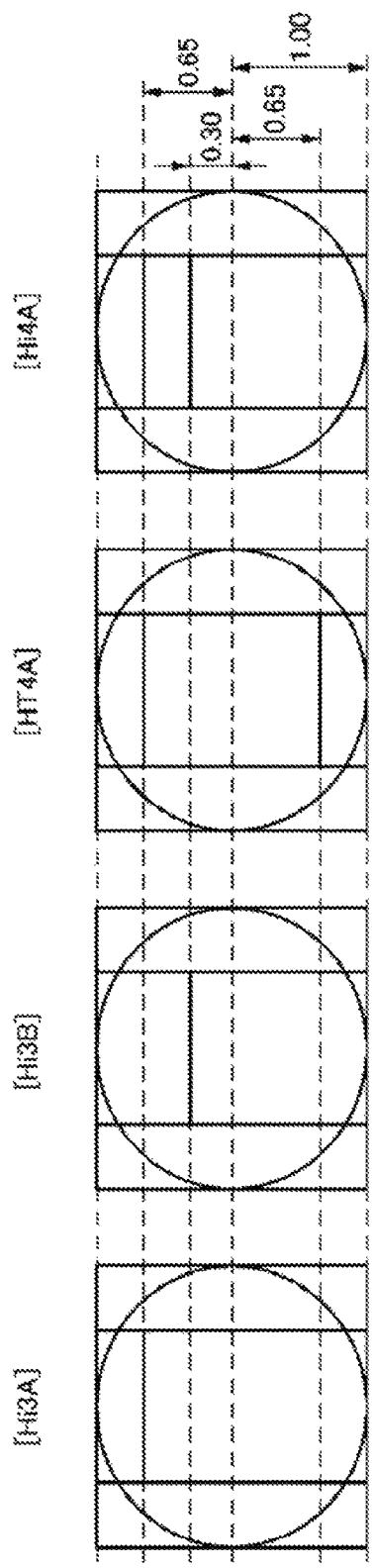
FIG. 22 is a schematic diagram showing a specific example of region division.

As is clear from the above graphs of linear density dependence, the characteristics can be improved without depending on the linear density by changing the division position in some cases as in the case of the pattern Hi3B from the pattern Hi3A, and the characteristics are inverted depending on the linear density in some case as in the case of HT4A and Hi4A. FIG. 22 shows several specific examples of region division. In the case where a linear density (plane capacity) which is more important for the system is determined, it is possible to optimize a division pattern therefor.

"Characteristic Optimization by Region Division"

Optimization of a division pattern will be described by taking the case of a low linear density with which various kinds of division patterns exhibit favorable characteristics.
LD 35.18 (GB) . . . 0.053 μm/channel bit •In the case of Tp=0.225 μm (both land and groove), the plane capacity is 50 GB.
NA=0.85 •PR (1233321) •Evaluation index: e-MLSE
Mark width=Tp×0.7 •Disc Noise and Amp Noise are present.

Figure 23:
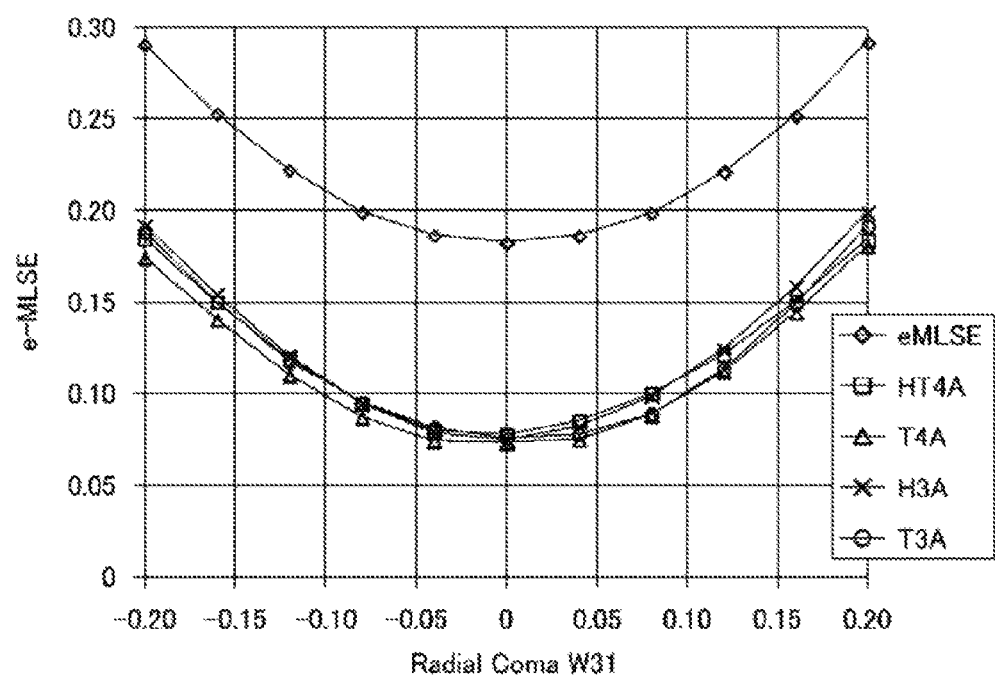
FIG. 23 is a graph showing increase in margin of radial comatic aberration caused by a change of division position.
Figure 24A:
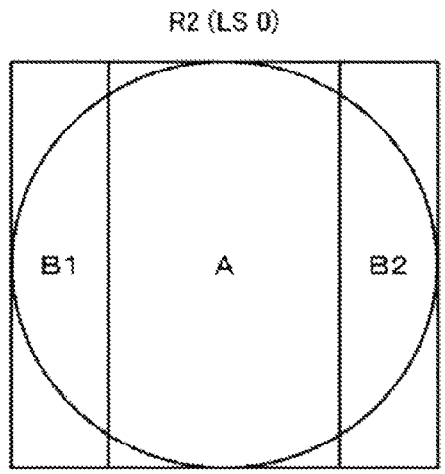
FIGS. 24A, 24B, 24C and 24D are schematic diagrams each of which shows an example influenced by a lens shift.
Figure 24B:
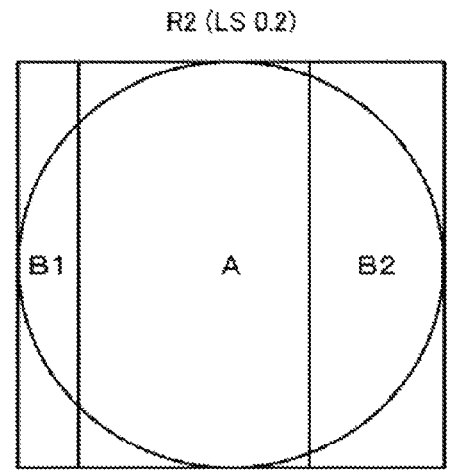
Figure 24C:
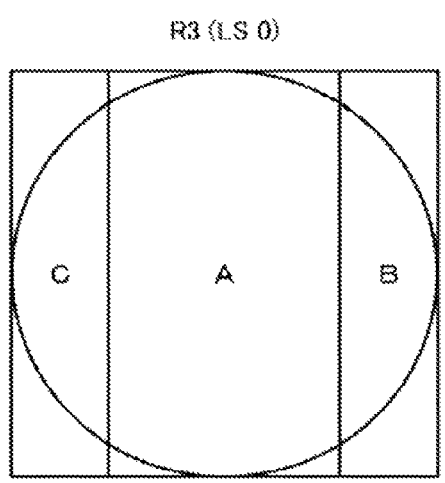
Figure 24D:
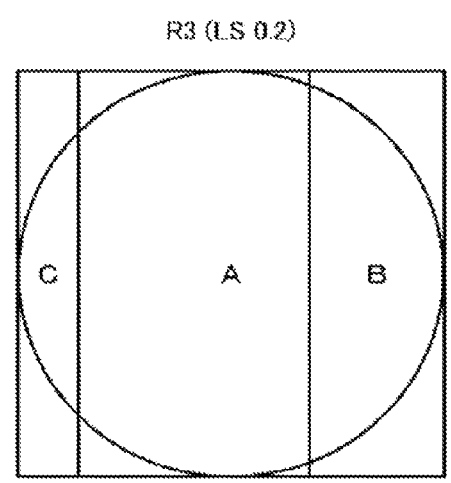

FIG. 23 shows increase in margin of radial comatic aberration caused by changing the division positions. In the patterns HT4A and H3A, the division positions are ±0.55 in the radial direction and are ±0.65 in the tangential direction. In the patterns T4A and T3A, the division positions are ±0.7 in the radial direction and are ±0.6 in the tangential direction, and a division shape at four corners is also changed.

As is clear from FIG. 23, in the pattern HT4A, the radial comatic aberration W31 has the total width of 0.32 (corresponding to ±0.56 deg.). In the pattern T4A, the radial comatic aberration W31 has the total width of 0.34 (corresponding to ±0.60 deg.). In the pattern H3A, the radial comatic aberration W31 has the total width of 0.30 corresponding to ±0.53 deg.). In the pattern T3A, the radial comatic aberration W31 has the total width of 0.32 (corresponding to ±0.56 deg.).

"Effect Obtained by Independently Providing Outer Regions Divided in Radial Direction"

FIGS. 24A, 24B, 24C and 24D shows patterns obtained by dividing a beam into three regions only in the radial direction. FIGS. 24A, 24B, 24C and 24D shows cases where a visual field is moved in a pseudo way in accordance with a lens shift (denoted by LS in FIGS. 24A, 24B, 24C and 24D) of the objective lens. R2 (regions A, B1 and B2) and R3 (regions A, B, and C) are assumed as patterns. It is assumed that a lens shift of 0.2 occurs in the radial direction (0.2 corresponds to 10% because a cross-section of a luminous flux of a beam has a diameter of 2.0.).

"Effect 1 Obtained by Independently Providing Outer Regions Divided in Radial Direction"

Figure 25:
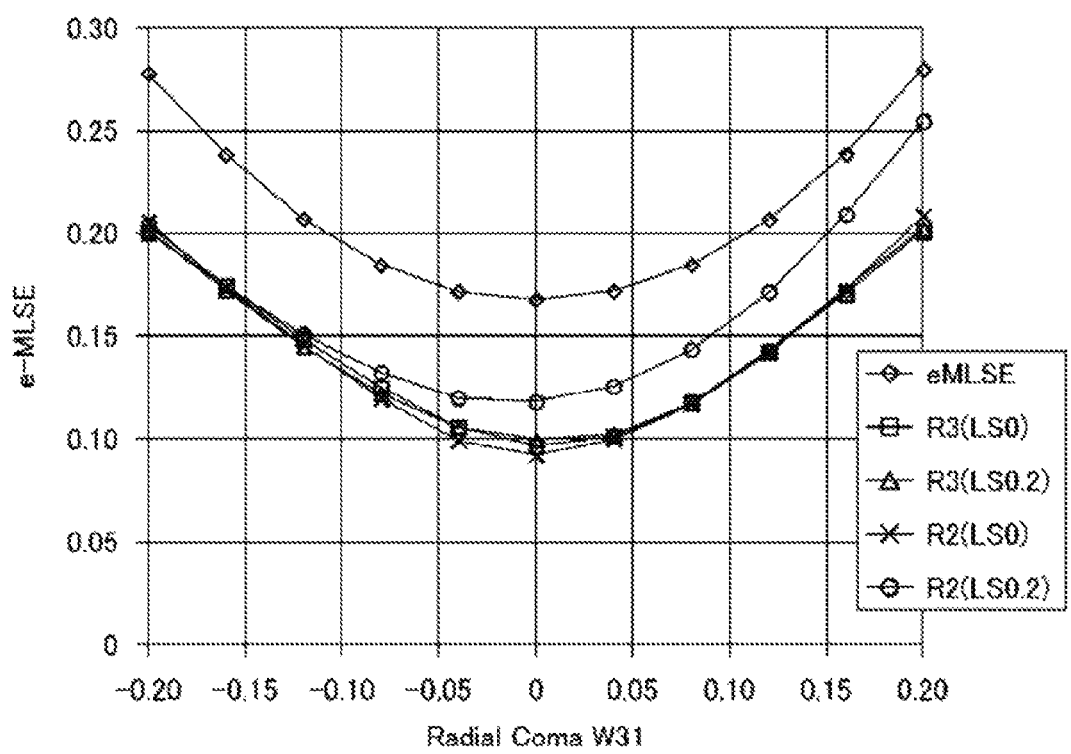
FIG. 25 is a graph showing an influence of a lens shift upon radial comatic aberration.

FIG. 25 is a graph showing a simulation result of the margins of the radial comatic aberration concerning those patterns. As shown in FIG. 25, the margin of the comatic aberration in the pattern of R2 (LS 0.2) is decreased. That is, in the case where a beam is divided in the radial direction, an influence of visual field movement can be reduced by independently providing two outer regions. There is another method for reducing an influence of the visual field movement as described below.

"Change of Margin of Radial Comatic Aberration at the Time of Lens Shift"

Figure 26B:
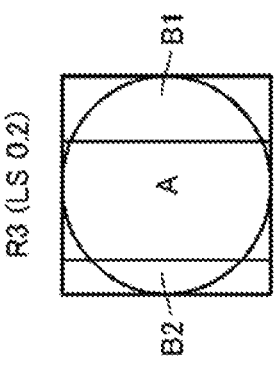
FIGS. 26A, 26B and 26C are a graph showing an influence of a lens shift upon radial comatic aberration.
Figure 26C:
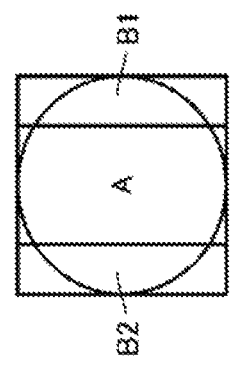
Figure 26A:
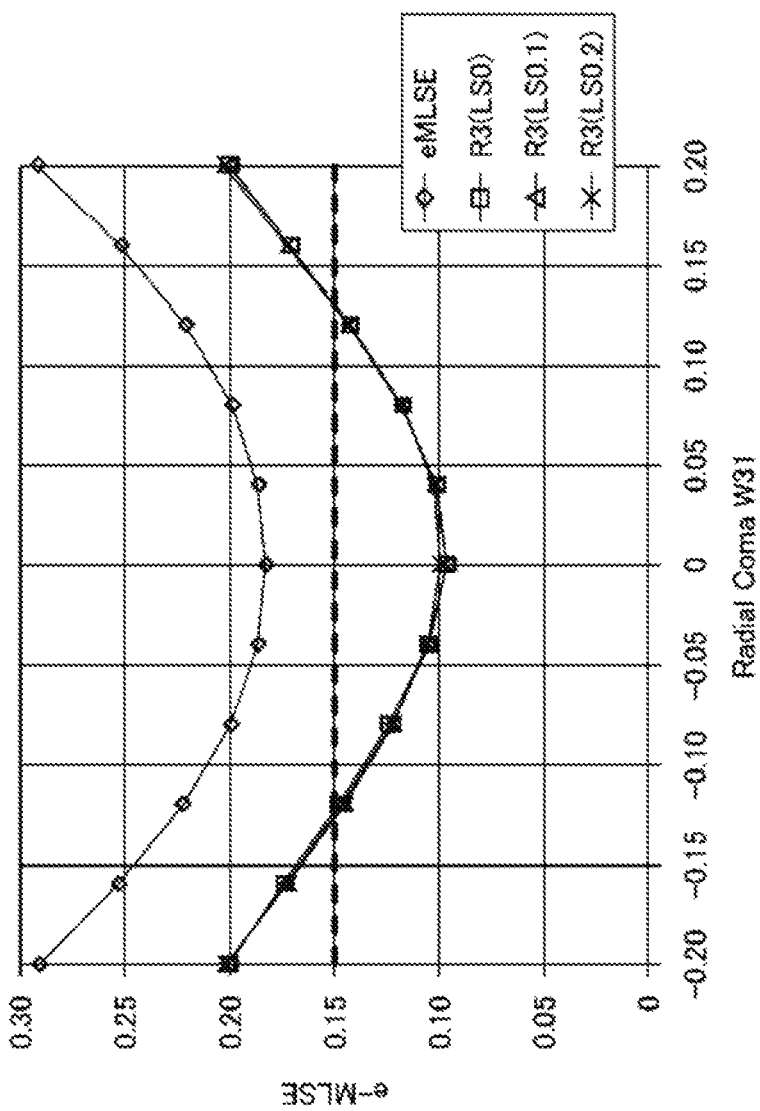

FIG. 26A shows a change of radial comatic aberration characteristics caused by pseudo visual field movement (0.1 shift and 0.2 shift) concerning the pattern R3. FIG. 26B shows a 0.2 shift, and FIG. 26C shows no shift. As is clear from FIG. 26A, a change of a margin width of radial comatic aberration caused by visual field movement can be suppressed by optimizing a division width.

Figure 27B:
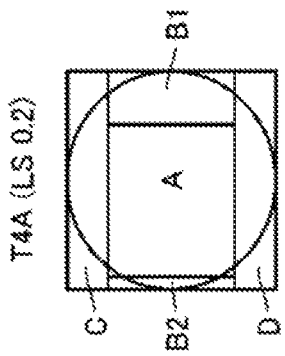
FIGS. 27A, 27B and 27C are a graph showing an influence of a lens shift upon radial comatic aberration.
Figure 27C:
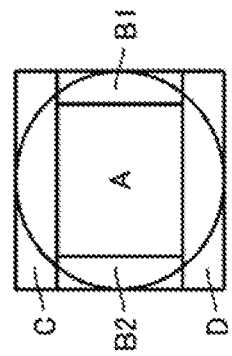
Figure 27A:
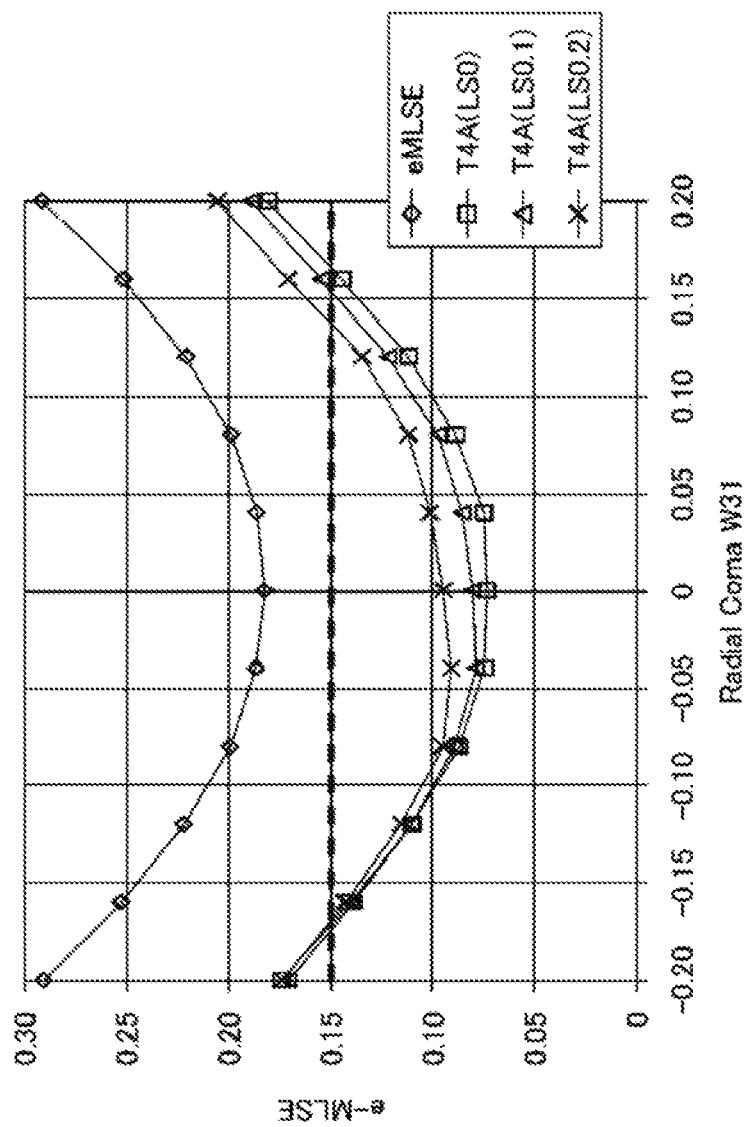

FIG. 27A shows a change of radial comatic aberration characteristics caused by pseudo visual field movement (0.1 shift and 0.2 shift) concerning the pattern T4A. FIG. 27B shows a 0.2 shift, and FIG. 27C shows no shift. As is clear from FIG. 27A, the margin width caused by visual field movement can be ensured. However, the center slightly shifts.

Figure 28B:
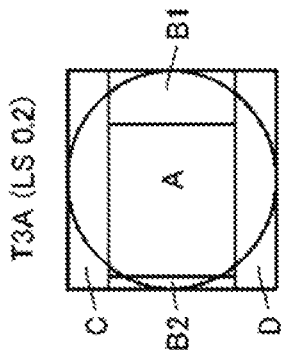
FIGS. 28A, 28B and 28C are a graph showing an influence of a lens shift upon radial comatic aberration.
Figure 28C:
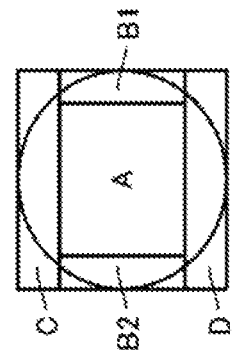
Figure 28A:
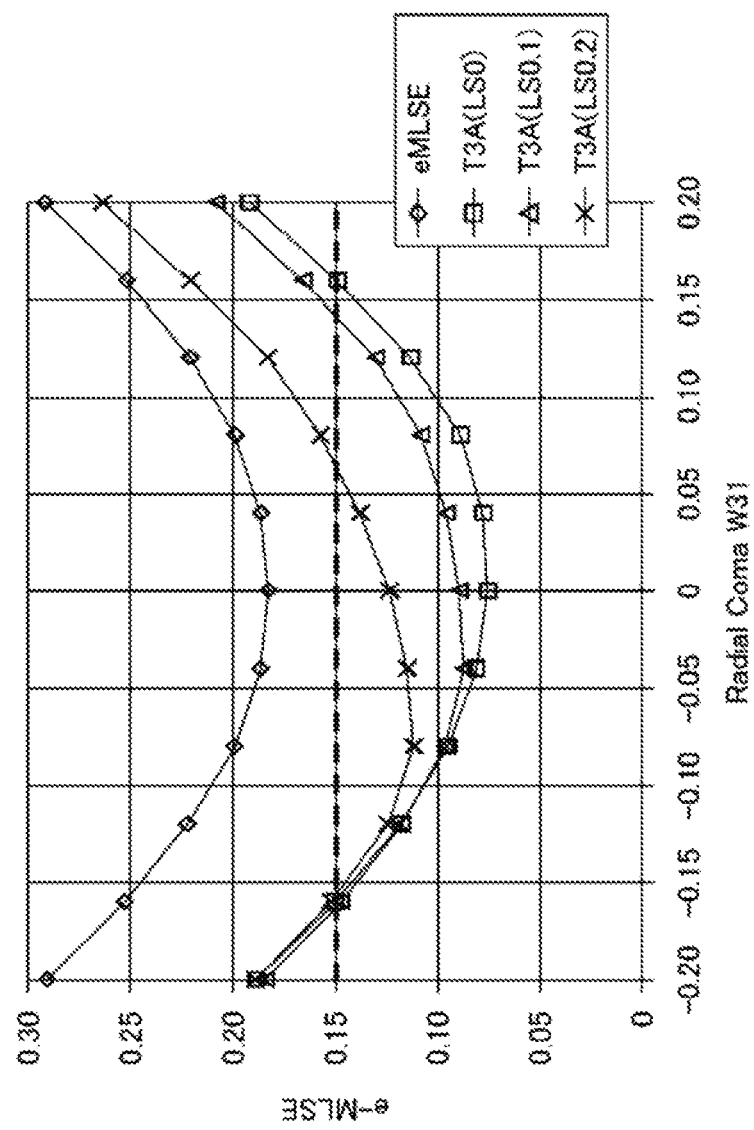

FIG. 28A shows a change of radial comatic aberration characteristics caused by pseudo visual field movement (0.1 shift and 0.2 shift) concerning the pattern T3A. FIG. 28B shows a 0.2 shift, and FIG. 28C shows no shift. As is clear from FIG. 28A, the margin width caused by visual field movement is abruptly reduced. Therefore, in the case of the pattern T3A, it is necessary to suppress a visual field movement amount.

"Change of Defocus Margin at the Time of Lens Shift"

Figure 29B:
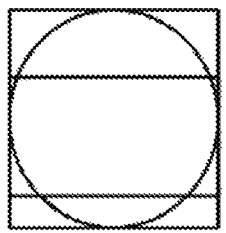
FIGS. 29A, 29B and 29C are a graph showing an influence of a lens shift upon defocus characteristics.
Figure 29C:
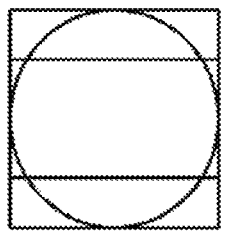
Figure 29A:
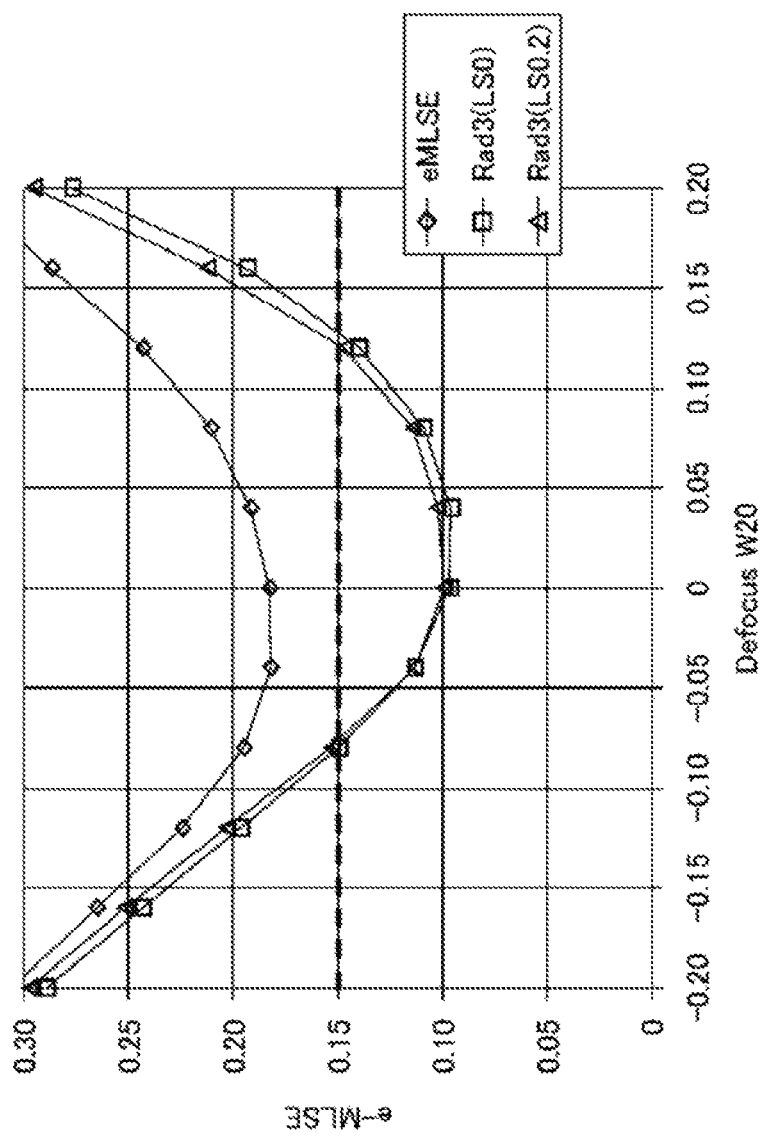

FIG. 29A shows a change of defocus characteristics caused by pseudo visual field movement (0.1 shift and 0.2 shift) concerning the pattern R3. FIG. 29B shows a 0.2 shift, and FIG. 29C shows no shift. As is clear from FIG. 29A, a change of a defocus margin width caused by visual field movement can be suppressed by optimizing a division width.

Figure 30A:
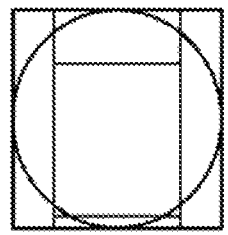
Figure 30A:
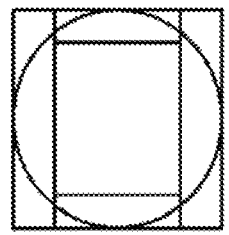
Figure 30A:
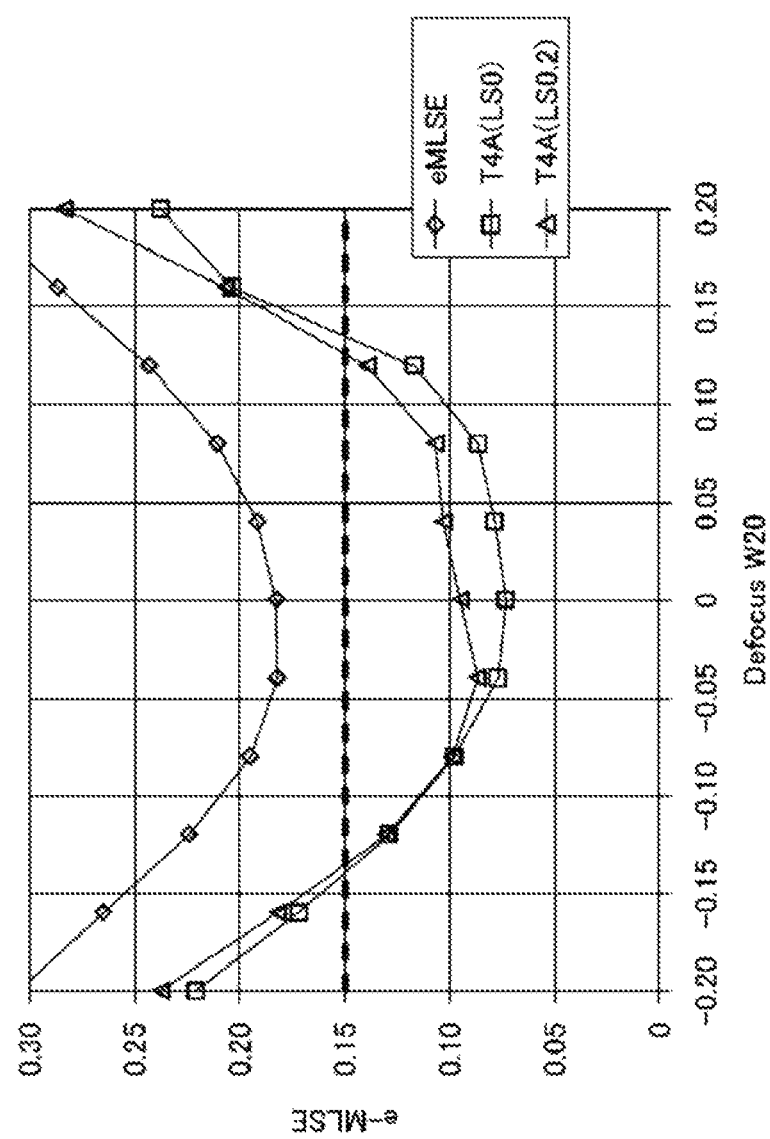

FIG. 30A shows a change of defocus characteristics caused by pseudo visual field movement (0.1 shift and 0.2 shift) concerning the pattern T4A. FIG. 30B shows a 0.2 shift, and FIG. 30C shows no shift. As is clear from FIG. 30A, the defocus margin width caused by visual field movement can be ensured.

Figure 31A:
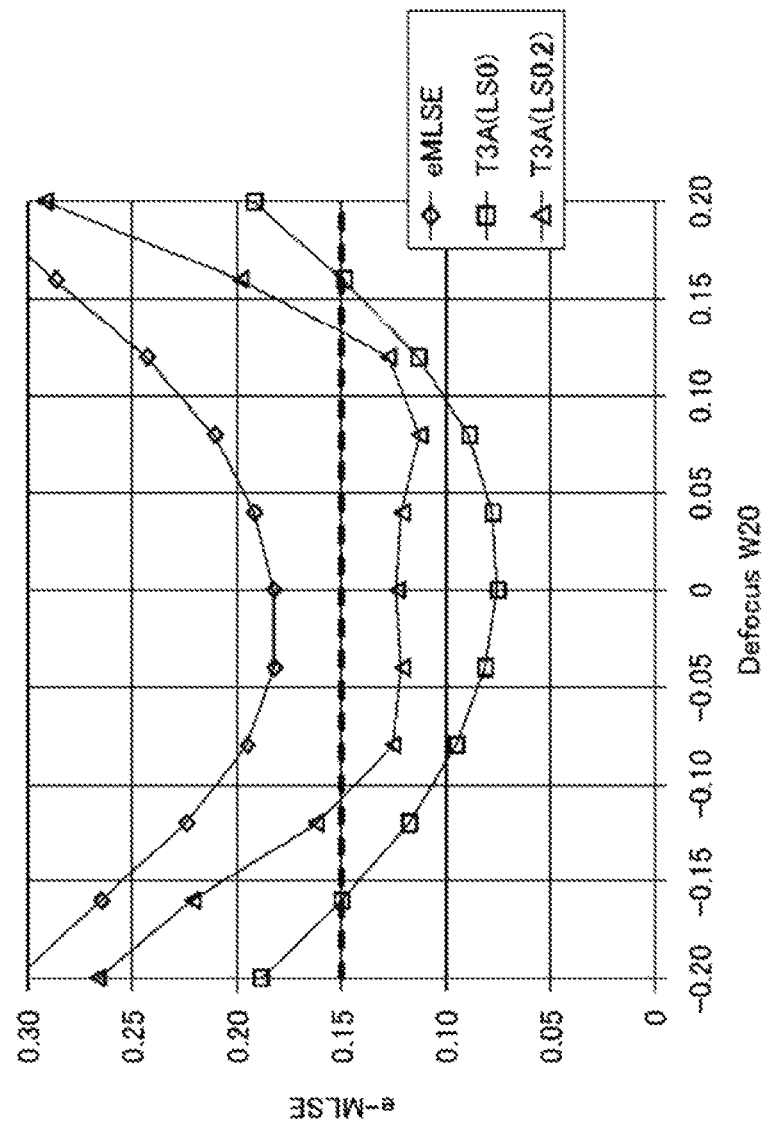
FIGS. 31A, 31B and 31C are a graph showing an influence of a lens shift upon defocus characteristics.
Figure 31B:
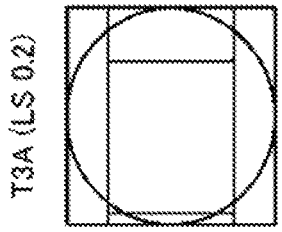
Figure 31C:
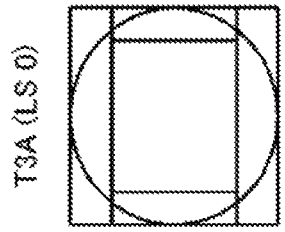

FIG. 31A shows a change of defocus characteristics caused by pseudo visual field movement (0.1 shift and 0.2 shift) concerning the pattern T3A. FIG. 31B shows a 0.2 shift, and FIG. 31C shows no shift. As is clear from FIG. 31A, the defocus margin width caused by visual field movement is abruptly reduced. Therefore, in the case of the pattern T3A, it is necessary to suppress the visual field movement amount.

"Pattern that has Three Channels and is Strong Against Lens Shift"

As is clear from the above characteristics shown in FIG. 26A, the pattern R3 has three channels and is strong against the lens shift, as compared with the pattern T3A. That is, the radial comatic aberration margin is ±0.125 (corresponding to ±0.44 deg.) with no lens shift and is ±0.125 (corresponding to ±0.44 deg.) with a lens shift of 0.2.

Figure 32B:
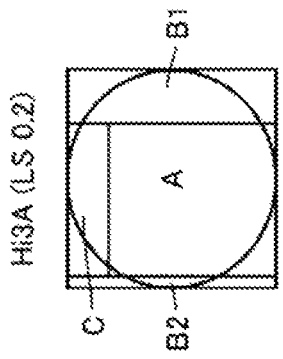
FIGS. 32A, 32B and 32C are a graph showing an influence of a lens shift upon radial comatic aberration.
Figure 32C:
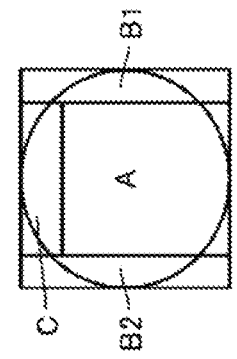
Figure 32A:
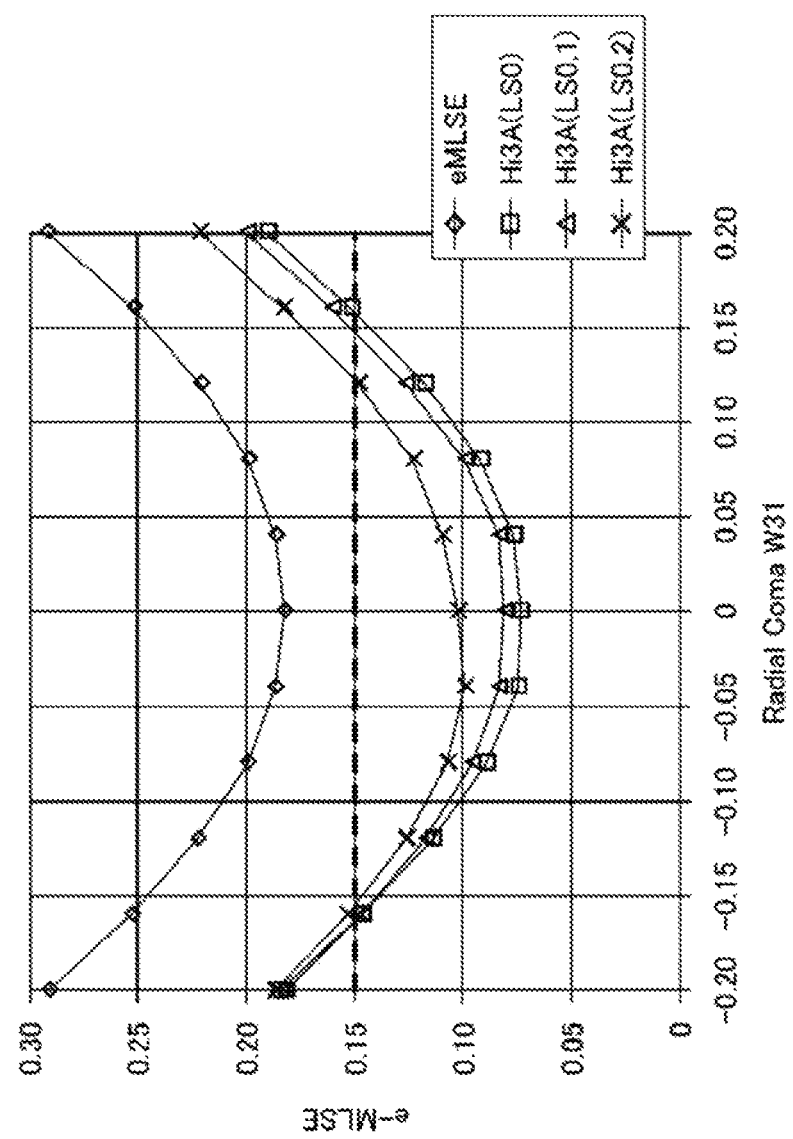

A pattern that has three channels and is strong against a lens shift is Hi3A. FIG. 32A shows a change of radial comatic aberration characteristics caused by pseudo visual field movement (0.1 shift and 0.2 shift) concerning the pattern Hi3A. FIG. 32B shows a 0.2 shift, and FIG. 32C shows no shift. As is clear from FIG. 32A, the margin width caused by visual field movement can be ensured to the same degree as the pattern T4A (see FIGS. 27A, 27B and 27C) having four channels. That is, the radial comatic aberration margin is ±0.16 (corresponding to ±0.56 deg.) with no lens shift and is −0.155 to +0.12 (corresponding to −0.54 deg. to +0.42 deg.) with a lens shift of 0.2.

Figure 33A:
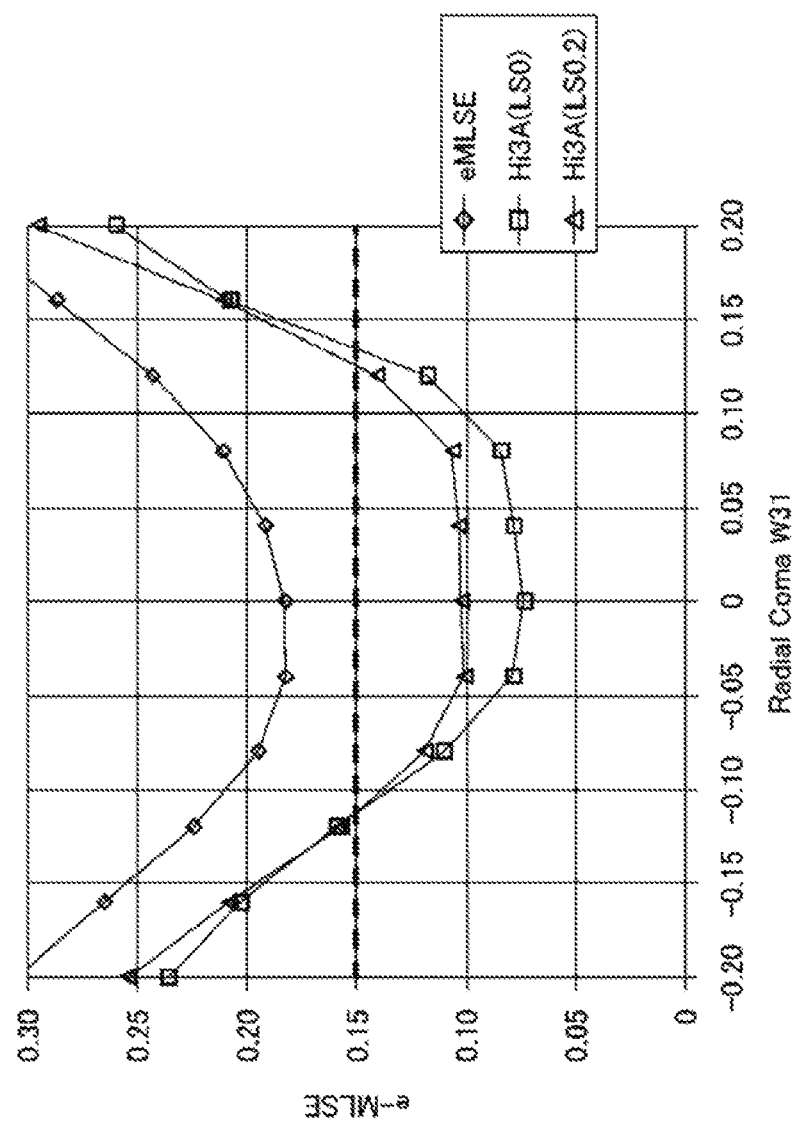
FIGS. 33A, 33B and 33C are a graph showing an influence of a lens shift upon defocus characteristics.
Figure 33B:
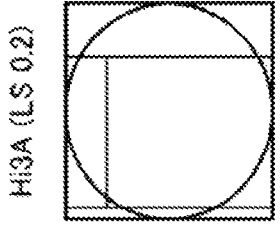
Figure 33C:
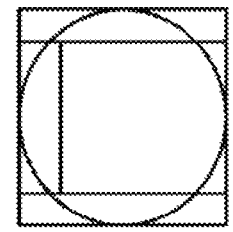

FIG. 33A shows a change of defocus characteristics caused by pseudo visual field movement (0.1 shift and 0.2 shift) concerning the pattern Hi3A. FIG. 33B shows a 0.2 shift, and FIG. 33C shows no shift. As is clear from FIG. 33A, the margin width caused by visual field movement can be ensured to the same degree as the pattern T4A (see FIGS. 29A, 29B and 29C) having four channels. That is, the defocus margin is 0.25 (corresponding to ±0.21 μm) with no lens shift and is 0.24 (corresponding to ±0.20 μm) with a lens shift of 0.2.

"Pattern that has Four Channels and is Strong Against Lens Shift"

As is clear from the characteristics illustrated in FIG. 27A, the pattern T4A has four channels and is strong against the lens shift, as compared with the pattern T3A. That is, the radial comatic aberration margin is ±0.17 (corresponding to ±0.60 deg.) with no lens shift and is −0.17 to +0.135 (corresponding to −0.60 deg. to +0.47 deg.) with a lens shift of 0.2.

Figure 34B:
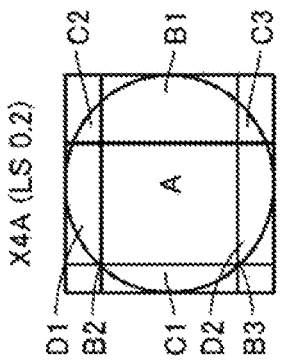
FIGS. 34A, 34B and 34C are a graph showing an influence of a lens shift upon radial comatic aberration.
Figure 34C:
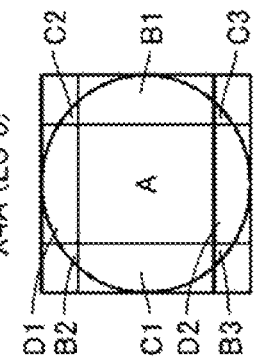
Figure 34A:
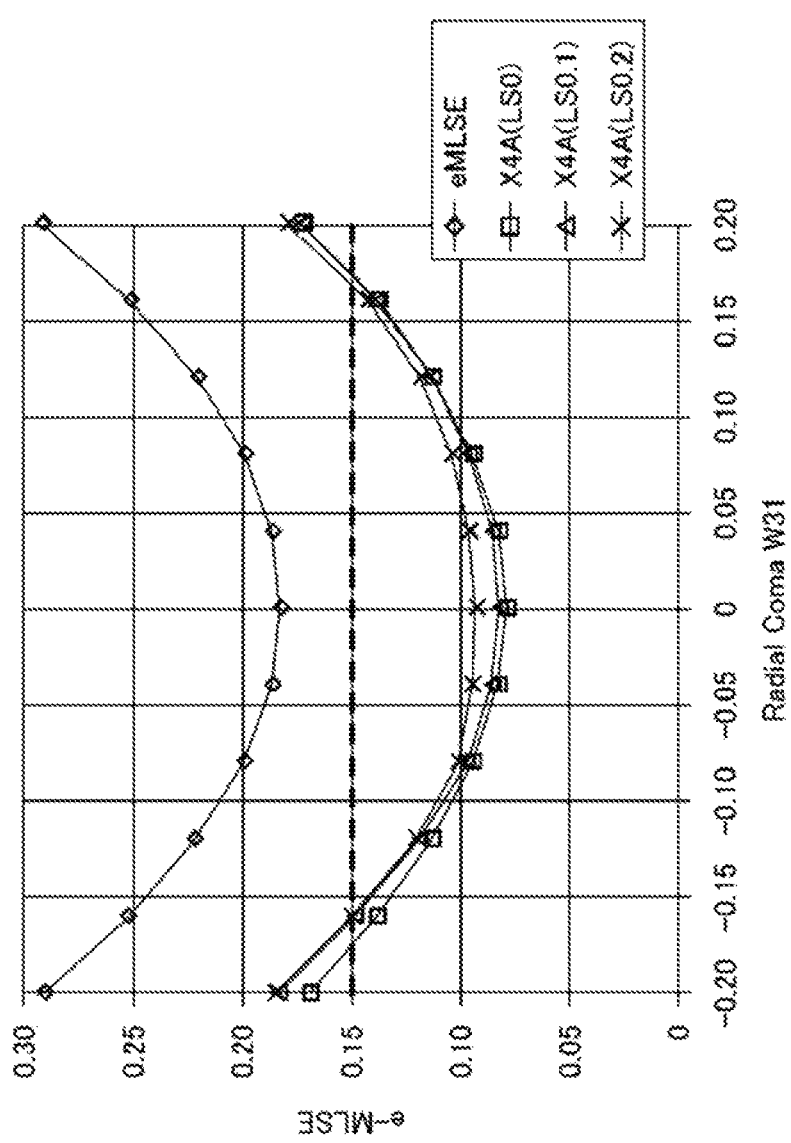

A pattern that has four channels and is strong against a lens shift is X4A. FIG. 34A shows a change of radial comatic aberration characteristics caused by pseudo visual field movement (0.1 shift and 0.2 shift) concerning the pattern X4A. FIG. 34B shows a 0.2 shift, and FIG. 34C shows no shift. As is clear from FIG. 34A, there is substantially no change of a margin of radial comatic aberration caused by visual field movement. That is, the radial comatic aberration margin is ±0.17 (corresponding to ±0.60 deg.) with no lens shift and is ±0.16 (corresponding to ±0.56 deg.) with a lens shift of 0.2.

Figure 35B:
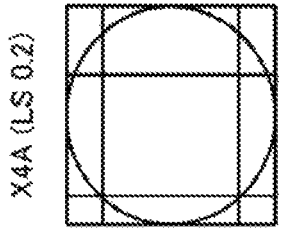
FIGS. 35A, 35B and 35C are a graph showing an influence of a lens shift upon defocus characteristics.
Figure 35C:
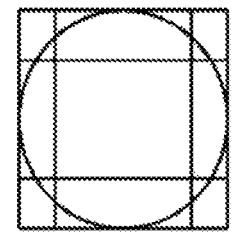
Figure 35A:
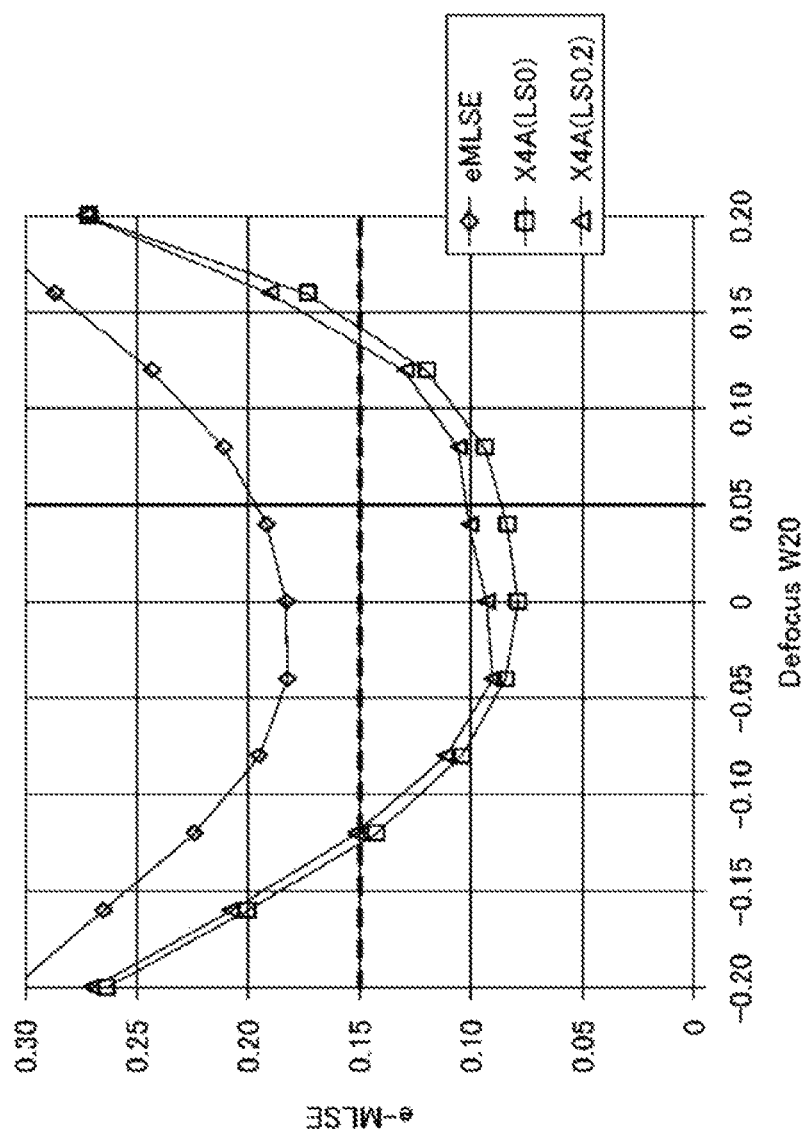

FIG. 35A shows a change of defocus characteristics caused by pseudo visual field movement (0.1 shift and 0.2 shift) concerning the pattern X4A. FIG. 35B shows a 0.2 shift, and FIG. 35C shows no shift. As is clear from FIG. 35A, a change of the defocus margin caused by visual field movement is small. That is, the defocus margin is 0.265 (corresponding to ±0.225 μm) with no lens shift and is 0.25 (corresponding to ±0.21 μm) with a lens shift of 0.2.

"Effect 2 Obtained by Independently Providing Outer Regions Divided in Radial Direction"

Figure 36:
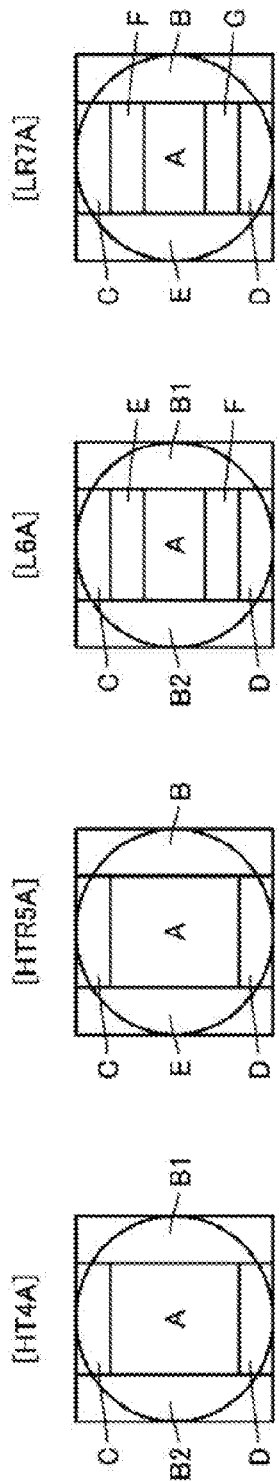
FIG. 36 is a schematic diagram showing a specific example of a pattern of region division.
Figure 37:
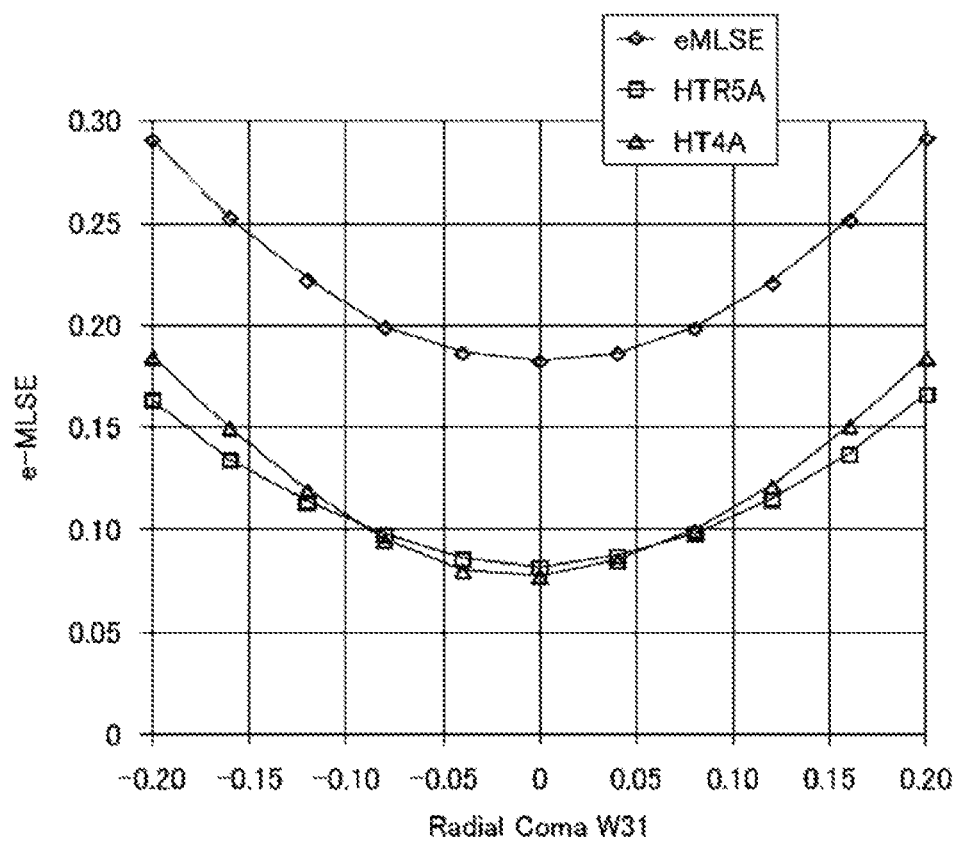
FIG. 37 is a graph used for explaining a comatic aberration margin in the radial direction.
Figure 38:
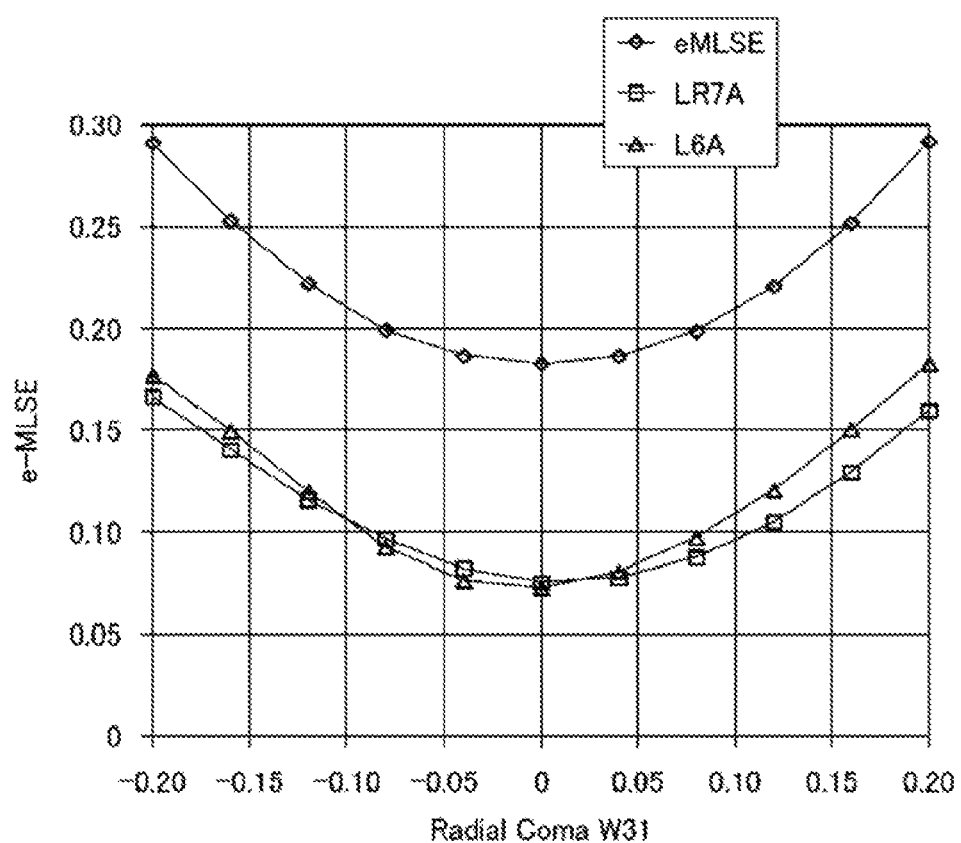
FIG. 38 is a graph used for explaining a comatic aberration margin in the radial direction.

FIG. 36 shows the patterns HT4A, HTR5A, L6A, and LR7A. FIG. 37 and FIG. 38 show radial comatic aberration characteristics of those patterns. FIG. 37 shows radial comatic aberration characteristics of the patterns HT4A and HTR5A obtained when region division is not performed. FIG. 38 shows radial comatic aberration characteristics of the patterns LR7A and L6A obtained when region division is not performed. As is clear from FIG. 37 and FIG. 38, the radial comatic aberration margin can be increased by combining division in the radial direction with division in the tangential direction.

As described above, in the case where increase in density of the optical disc is achieved by reducing a channel bit length, i.e., a mark length to increase a density in the linear-density direction and making a track pitch narrower to increase a density in a track-density direction, recording marks are two-dimensionally provided on a signal recording surface.

Figure 39:
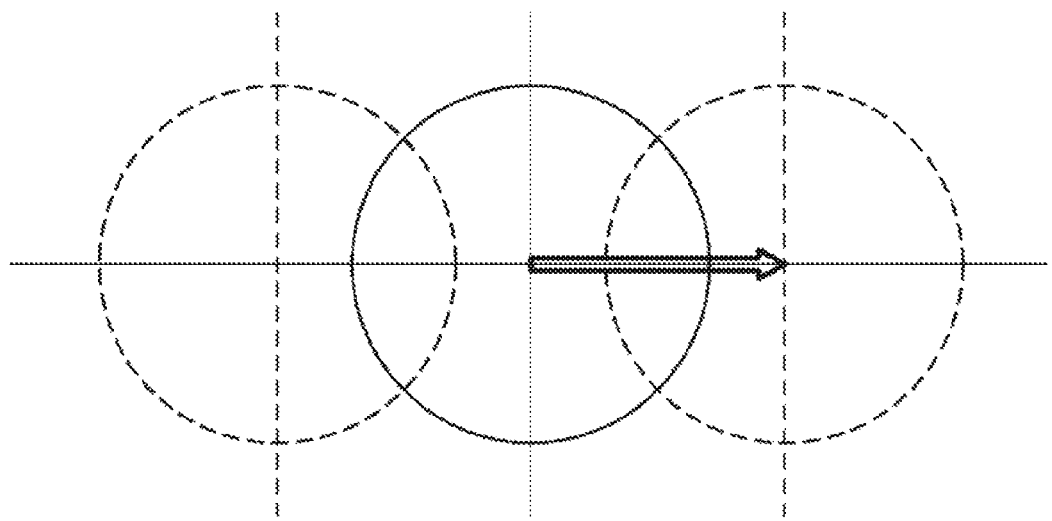
FIG. 39 is a schematic diagram used for explaining a shift amount of diffracted light.
Figure 40:
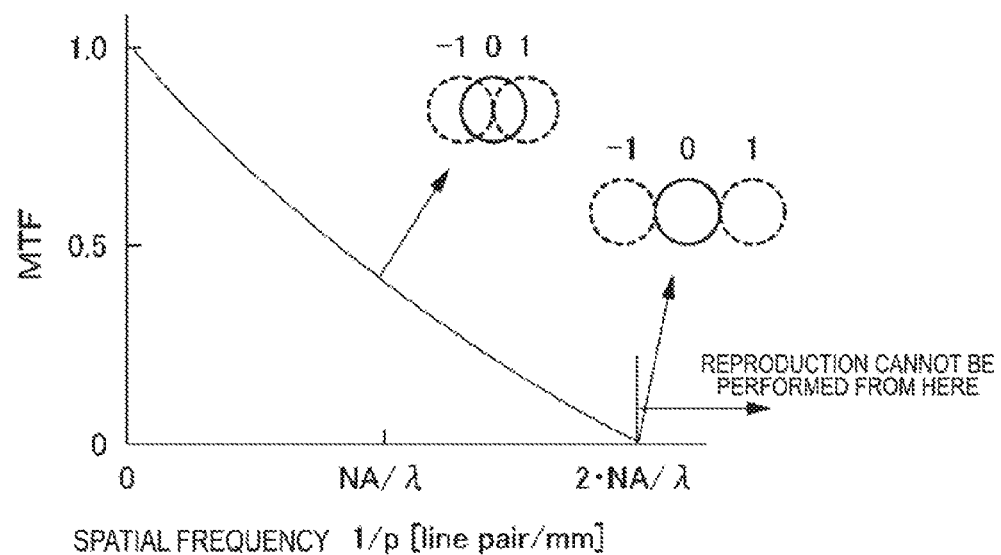
FIG. 40 is a graph showing a spatial frequency characteristic of a modulation transfer function (MTF).

A reproduction signal in the optical disc detects a change in brightness/darkness caused when beams of diffracted light generated by periodic structures such as a recording mark and a groove are overlapped and interfere with each other. In ±1st-order diffracted light caused by a periodic structure of a period p, as shown in FIG. 39, a central shift amount is expressed by $\lambda/(NA \cdot p)$ in the case where the pupil radius is 1, and an amplitude of the reproduction signal is increased as overlap thereof is increased, whereas the amplitude is reduced as the overlap is reduced. When the overlap is eliminated, i.e., the shift amount $\lambda/(NA \cdot p)=2$, the amplitude becomes zero. As a result, a spatial frequency characteristic of a modulation transfer function (MTF) is shown in FIG. 40. A cut-off spatial frequency is $1/p=2NA/\lambda$, because of $\lambda/(NA \cdot p)=2$, and, in the case where a periodic structure smaller than this continues, the amplitude becomes zero.

Figure 41:
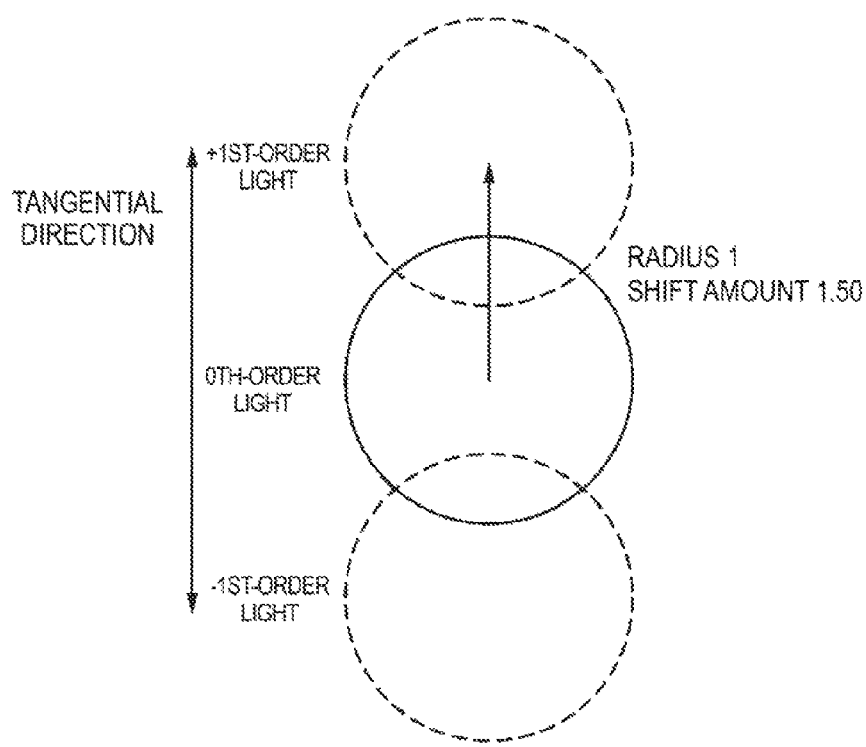
FIG. 41 is a schematic diagram used for explaining a shift of diffracted light.
Figure 42:
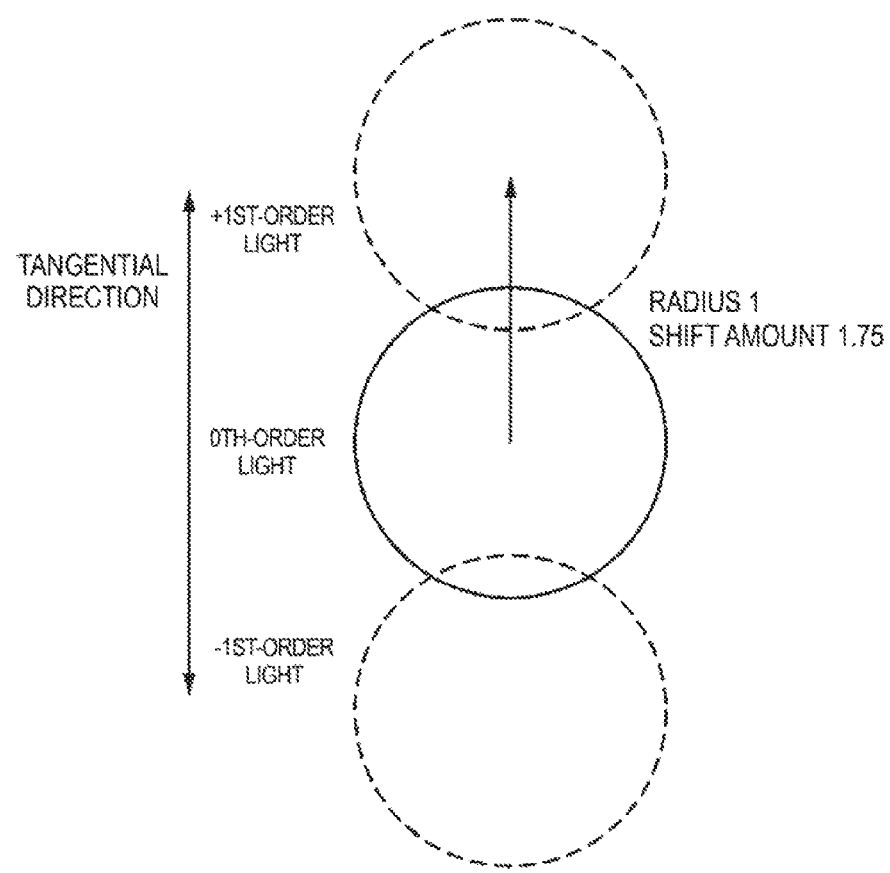
FIG. 42 is a schematic diagram used for explaining a shift of diffracted light.

When this is applied to a system having a wavelength of 405 nm and NA=0.85 described above, the periodic structure becomes the smallest periodic structure capable of reproducing $p=\lambda/(2NA)=238$ nm because of $1/p=2NA/\lambda$. This means that, in a system having 53 nm/channel bit in RLL (1, 7) PP, which has been taken as an example of a low linear density, the shortest 2T mark/space is 53 nm×2×2=212 nm and therefore exceeds the cut-off spatial frequency, and continuation of 2T mark/space becomes the amplitude of zero. The shift amount is $\lambda/(NA \cdot p)=1.50$ with respect to a periodic structure corresponding to 3T mark/space 53 nm×3×2=318 nm, and therefore regions where 0th-order light and ±1st-order light are overlapped in FIG. 41 contribute to signal reproduction. Similarly, also in a system having 45.47 nm/channel bit, which has been taken as an example of a high linear density, the shortest 2T mark/space is 45.47 nm×2×2=182 nm and therefore exceeds the cut-off spatial frequency, and the shift amount is $\lambda/(NA \cdot p)=1.75$ with respect to a periodic structure corresponding to 3T mark/space of 45.47 nm×3×2=273 nm, and therefore regions where 0th-order light and ±1st-order light are overlapped in FIG. 42 contribute to signal reproduction. Even in the case of the density at which the amplitude of 2T mark/space is zero, signal processing is not broken down because of PRML. However, reproduction quality of a short mark is an important element.

As described above, in the electro-optical filter characteristics of the patterns H3A and HT4A, the outer regions in the tangential direction are filters that allow the frequency bands corresponding to short marks such as 3T and 4T to perform high-band pass, and the central regions are low-pass filters that allow a frequency band corresponding to a long mark of 5T or more to mainly pass therethrough. As is clear from comparison between FIG. 41 and FIG. 42, this means that a region that should contribute more to reproduction of a band corresponding to a space-optically short mark and a region that should contribute more to reproduction of a band corresponding to a long mark are effectively separated, and, in each region, a frequency component in which a ratio of a reproduction signal component of the own track is supposed to be high is emphasized and a frequency component in which a ratio of a reproduction signal component of an adjacent track is supposed to be high is suppressed, is blocked, or is offset by achieving a balance with another signal, thereby improving reproduction signal quality of the own track. Further, in the case of HT4A, it is possible to detect a short mark with a higher sensitivity, as compared with a reproduction amplitude of a simple total sum signal because signals from the two outer regions in the tangential direction have a phase difference. As is clear from comparison between FIG. 41 and FIG. 42, in the case of a high linear density, not only the regions that can contribute to reproduction of 2T mark/space but also the regions that can contribute to reproduction of 3T mark/space are supposed to be reduced and therefore reproduction of a simple total sum signal is supposed to be greatly unfavorable. However, deterioration in characteristics is suppressed by increase in sensitivity using phase difference detection.

As described above, a favorable reproduction signal, in which inter-symbol interference and leakage of a signal from an adjacent track are reduced, can be obtained by performing region division in the tangential direction and radial direction in order to separate a signal into a plurality of signals having space-optically different bands in the linear-density direction and/or track-density direction, applying signals from respective regions to electrical filters having different characteristics optimal therefor, such as a high-pass filter, a low-pass filter, a band-pass filter, and a band-stop (or notch) filter, and adding the signals again.

Figure 43:
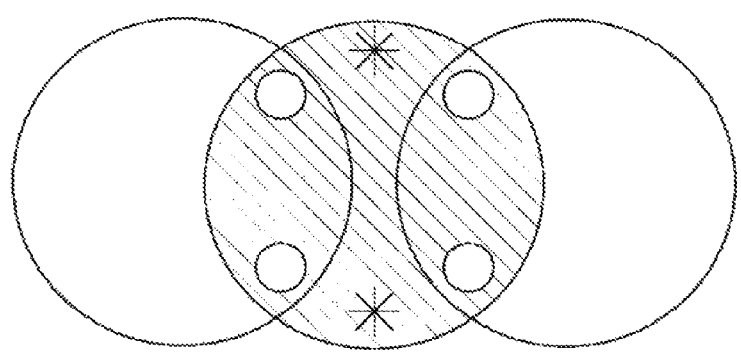
FIG. 43 is a schematic diagram used for explaining optimization of an optical filter.

Hereinabove, the case where region division is performed simply in the tangential direction and radial direction has been described. However, when filters for effectively separating signals in regions having space-optically different bands separate not only signals in regions of 0th-order light serving as diffracted light caused by a track structure, which are indicated by * in FIG. 43 and corresponding to reproduction of a short mark as described above, but also signals in regions of interference regions (indicated by ○) with ±1st-order diffracted light caused by the track structure, and therefore it is possible to improve e-MLSE at a perturbation center position and increase various margins such as a radial comatic aberration margin.

[Pattern IVT4]

Figure 44:
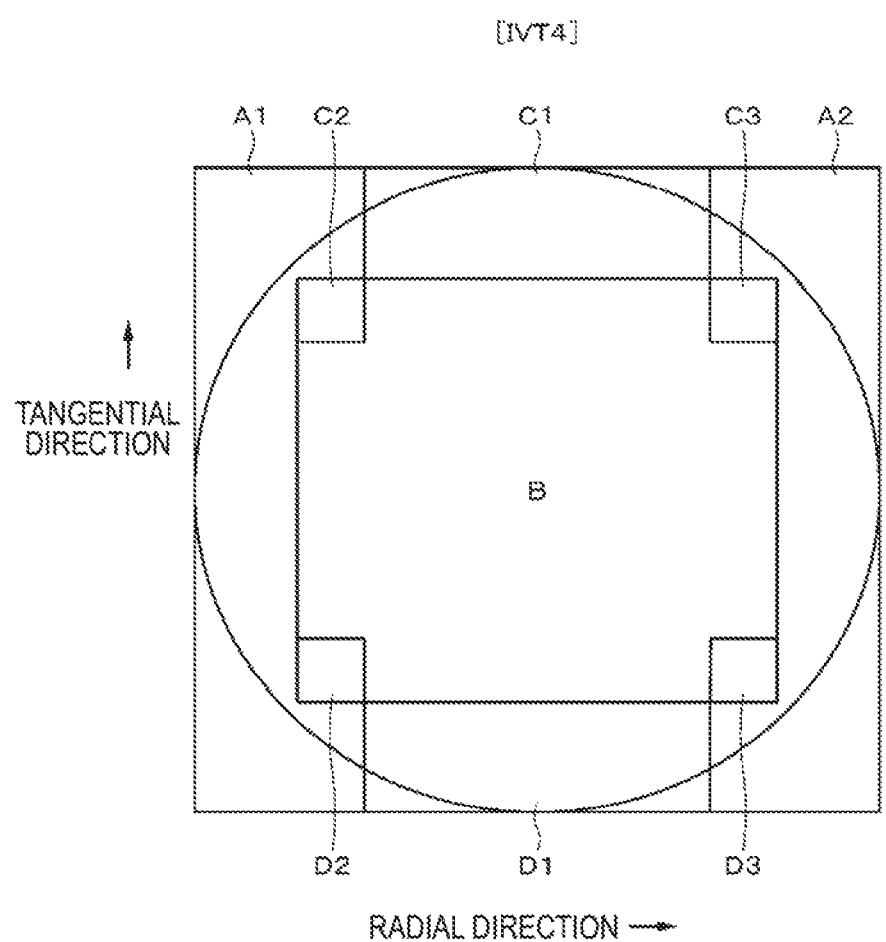
FIG. 44 is a schematic diagram showing a region division pattern IVT4.

A pattern IVT4 shown in FIG. 44 is an example of four channels. That is, a beam is divided into regions, i.e., the outer region A (=A1+A2) in the radial direction, the central region B, and the upper region C (C1+C2+C3) and the lower region D (D1+D2+D3) in the tangential direction. Signals of the four channels corresponding to the respective regions are obtained. Herein, the region division positions in the radial direction are positions of ±0.5 and ±0.7 where the pupil radius is 1.0. The region division positions in the tangential direction are positions of ±0.45 and ±0.65 where the pupil radius is 1.0.

Description will be made on the basis of simulation results of the above pattern IVT4. Simulation conditions are as follows as in the case of "low linear density" described above.

LD 35.18 (GB) . . . 0.053 μm/channel bit

In the case of Tp=0.32 μm, the plane capacity is 35.18 GB.

Tp=0.225 μm (both land and groove) •NA=0.85 •PR (1233321) •Evaluation index: e-MLSE Mark width=Tp×0.7 •Disc Noise and Amp Noise are present.

"Reproduction Performance"

FIG. 45 to FIG. 49 show simulation results of reproduction performance concerning the pattern IVT4. FIG. 45 to FIG. 49 show effects of region division of the pattern IVT4 with a low linear density. In each drawing, e-MLSE shows a characteristic obtained in the case where region division is not performed.

Figure 45:
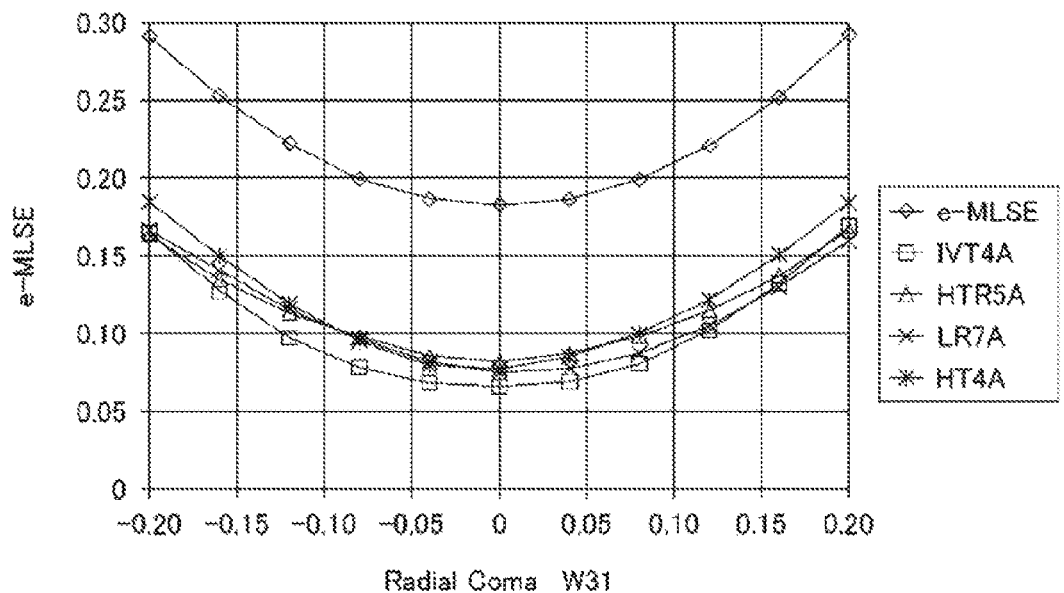
FIG. 45 is a graph for explaining a margin for comatic aberration in a radial direction concerning IVT4.

FIG. 45 shows comparison between a radial comatic aberration margin of the pattern IVT4 and the radial comatic aberration margins W31 of other patterns HTR5A, LR7A, and HT4A described above. A vertical axis indicates an index e-MLSE, which is similar to the vertical axes in other graphs described above, and a horizontal axis indicates normalized radial comatic aberration. It is found that a radial disc skew margin of the pattern IVT4 is favorable, as compared with other patterns.

Figure 46:
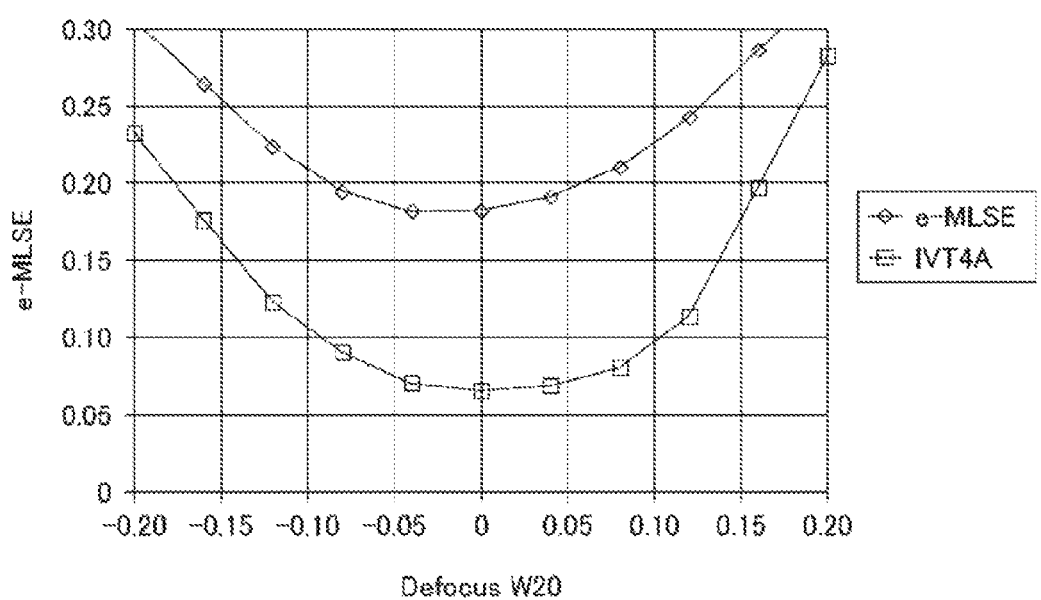
FIG. 46 is a graph for explaining a defocus margin concerning IVT4.

FIG. 46 shows a defocus margin, and a horizontal axis of a graph in FIG. 46 indicates a defocus amount W20 normalized by a wavelength. A value 0 means the defocus amount of 0. When reproduction is actually performed, defocus is generated and therefore it is necessary to have a margin for the defocus.

In a graph of (normalized defocus amount vs. index), reproduction performance is higher as a value of the e-MLSE is smaller. As an example, it is preferable that the value of the e-MLSE be substantially 0.15 or less. Therefore, the defocus margin corresponds to a width of a range where the value of the e-MLSE is substantially 0.15 or less. The defocus margin is larger as the width is larger. The pattern IVT4 has a satisfactory margin.

Figure 47:
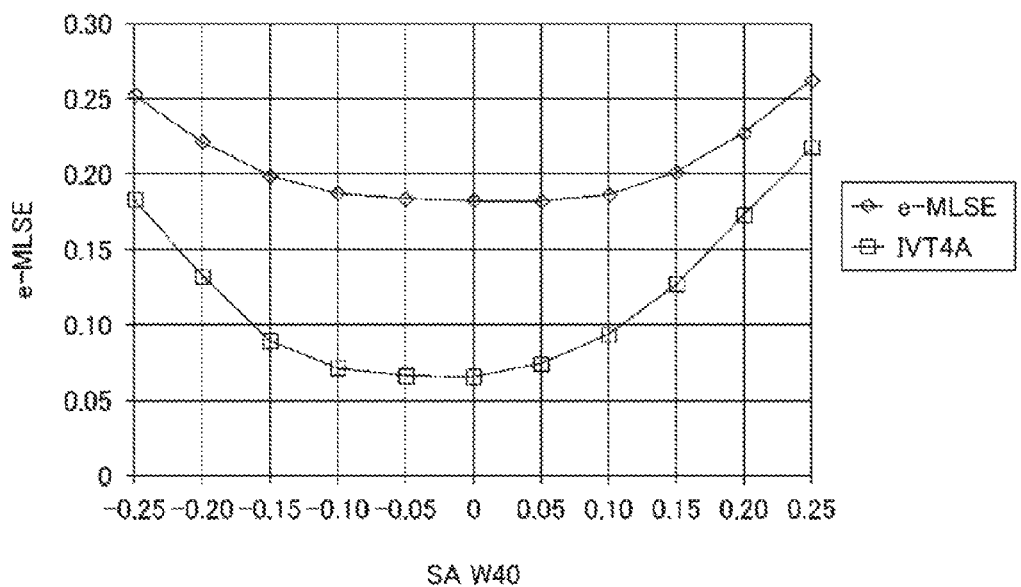
FIG. 47 is a graph for explaining a spherical aberration margin concerning IVT4.

FIG. 47 shows a margin of spherical aberration SA. A horizontal axis of a graph in FIG. 47 indicates a normalized spherical aberration amount W40. The pattern IVT4 has a satisfactory spherical aberration margin.

Figure 48:
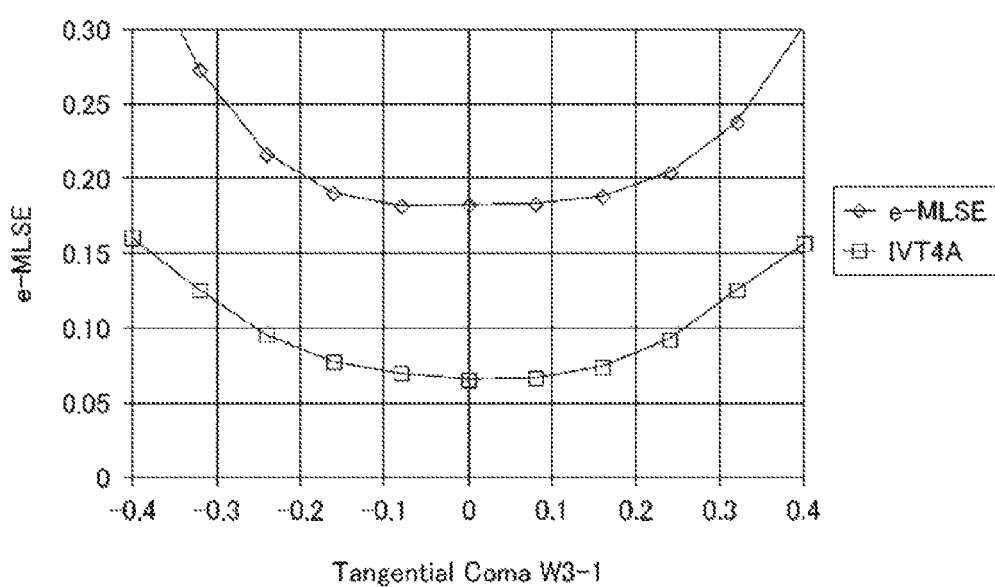
FIG. 48 is a graph for explaining a margin for comatic aberration in a tangential direction concerning IVT4.

FIG. 48 shows a tangential comatic aberration margin. A horizontal axis of a graph in FIG. 48 indicates a normalized tangential comatic aberration amount W3-1. The pattern IVT4 has a satisfactory tangential comatic aberration margin.

Figure 49:
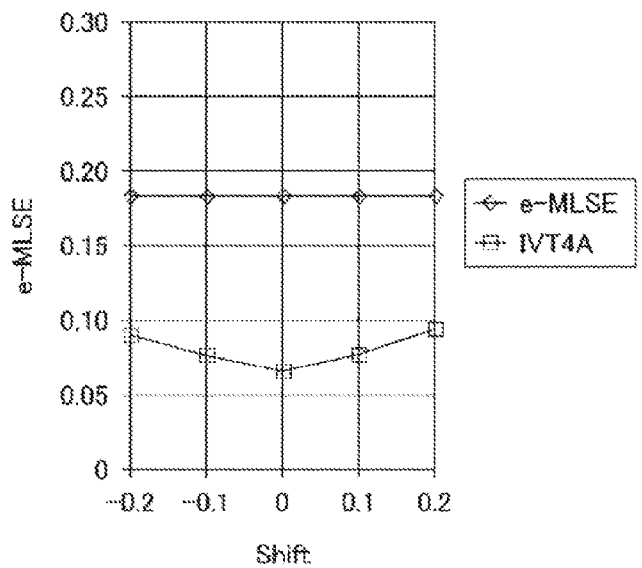
FIG. 49 is a graph for explaining a case where a pattern is shifted in a radial direction concerning IVT4.

FIG. 49 shows a margin obtained in the case where the pattern is shifted in the radial direction. A horizontal axis of a graph in FIG. 49 indicates a normalized shift amount, which has been described above as pseudo visual field movement, and FIG. 49 is a graph showing a change in e-MLSE obtained in a state in which other perturbation is zero when LS is shifted only by ±0.1 and ±0.2 including the direction. It is found that the pattern IVT4 has a shift margin substantially equal to that of T4A.

"Electrical Filters Optimal for Pattern IVT4"

Figure 50:
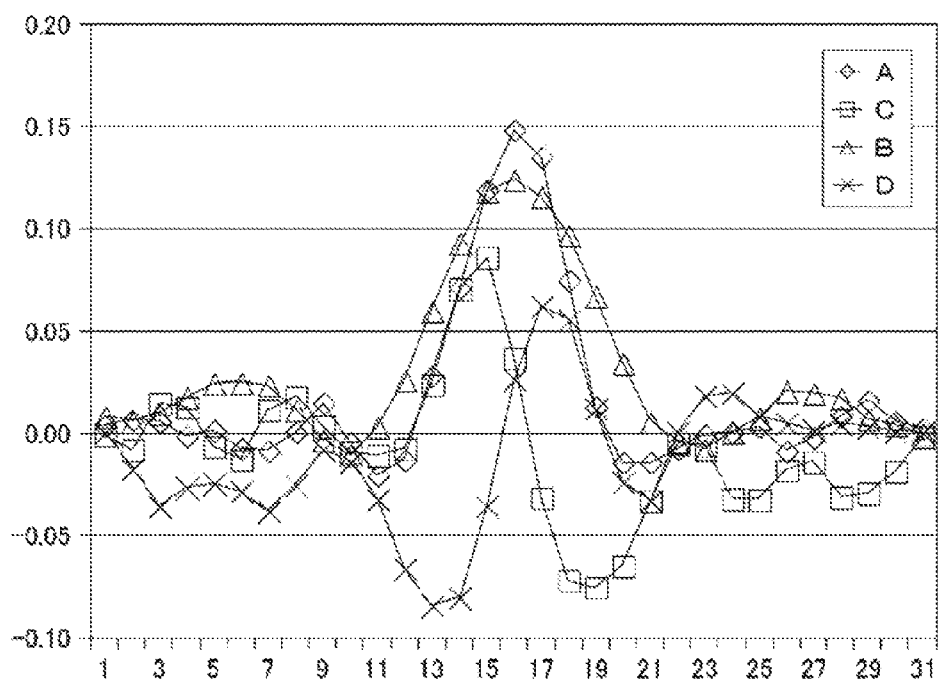
FIG. 50 is a graph showing an example of tap coefficients of electrical filters optimal for IVT4.
Figure 51:
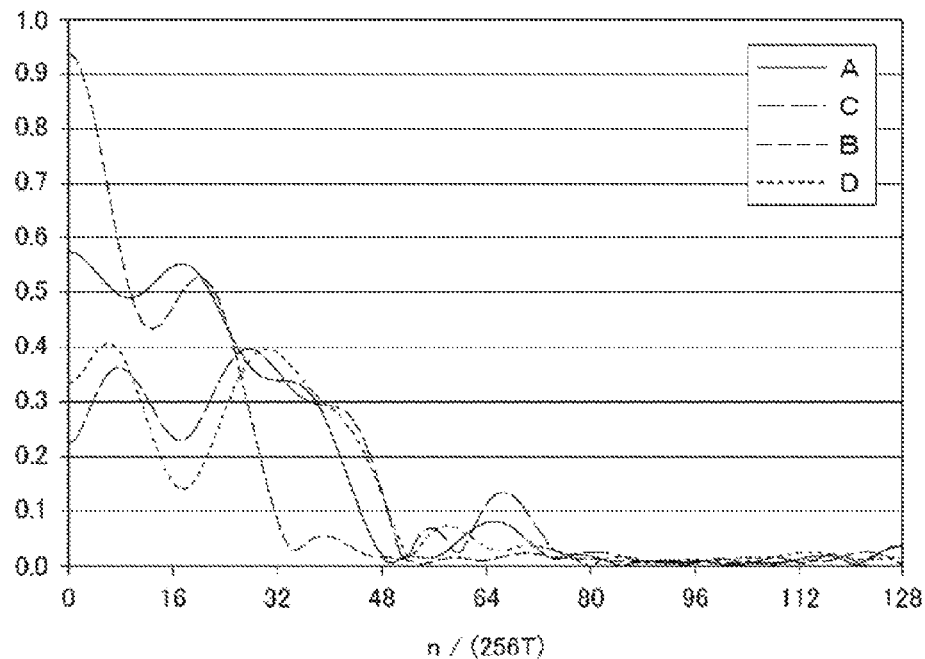
FIG. 51 is a graph showing frequency characteristics of electrical filters optimal for IVT4.
Figure 52:
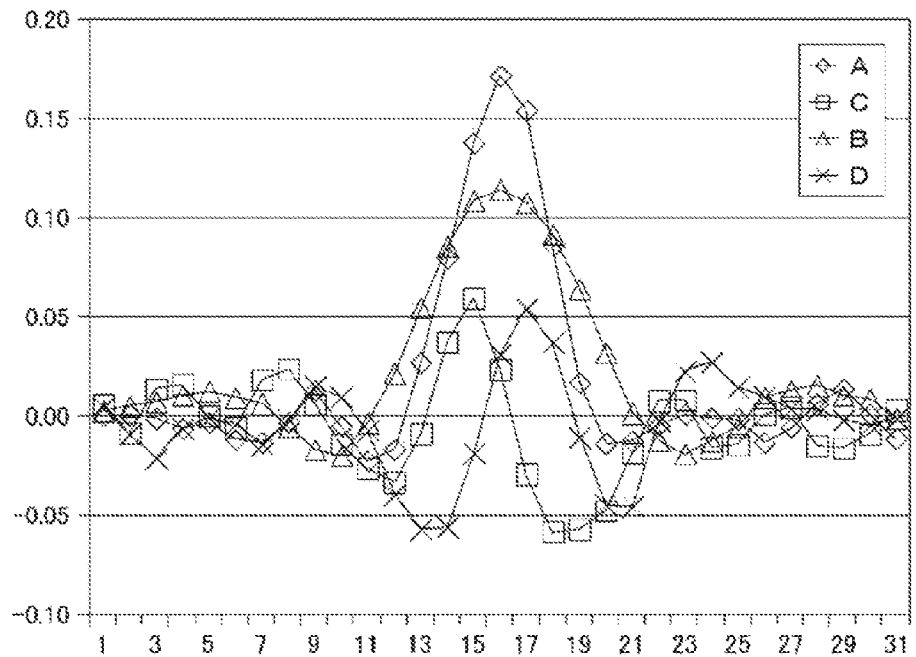
FIG. 52 is a graph showing an example of tap coefficients of electrical filters optimal for IVT4.
Figure 53:
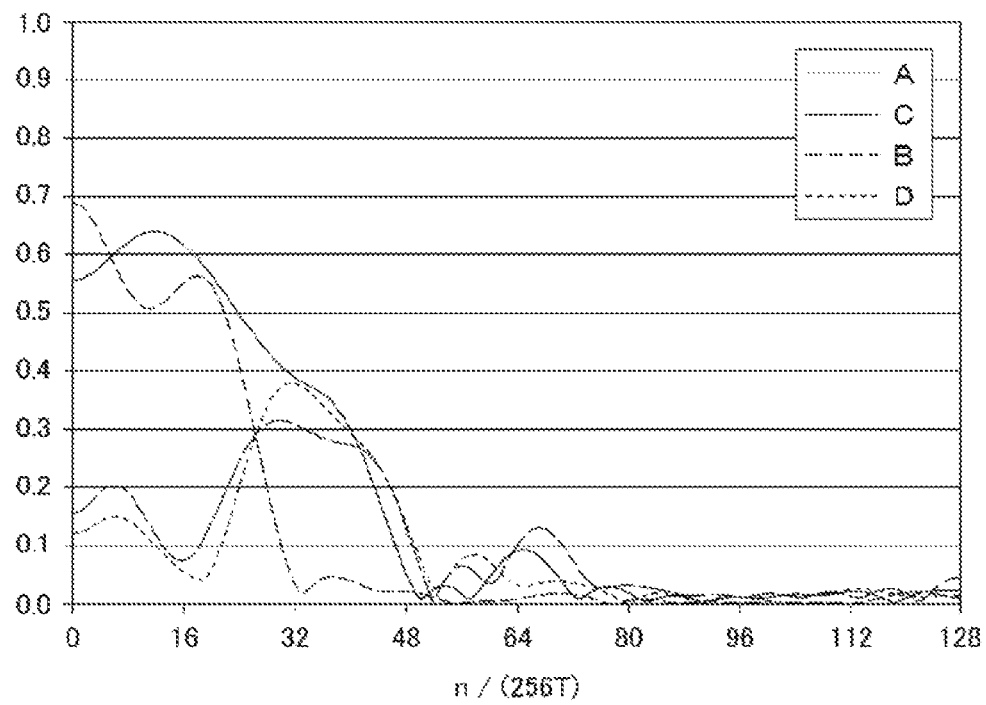
FIG. 53 is a graph showing frequency characteristics of electrical filters optimal for IVT4.

Electrical filters optimal for the above pattern IVT4 will be described. FIG. 52 shows an example of values of coefficients of 31 taps in the electrical filters where W31=0 in FIG. 45, i.e., at the perturbation origin. The electrical filters are formed as FIR filters. FIG. 53 shows frequency amplitude characteristics of the respective channels corresponding to the regions A to D obtained in the case where the coefficients are set as described above. FIG. 50 shows an example of values of coefficients of 31 taps in the electrical filters where W31=−0.16. FIG. 51 shows frequency amplitude characteristics of the respective channels of A to D obtained in the case where the coefficients are set as described above.

In the frequency amplitude characteristics, the horizontal axis is n/(256T) (n: value in horizontal axis). For example, in the case of (n=64), (64/256T)=(1/4T) is satisfied. In the case where, for example, the RLL (1, 7) PP modulation method is used, the mark length falls within a range of 2T to 8T where the channel clock cycle is "T". (1/4T) is a frequency obtained when a mark of 2T is repeated. In the characteristics shown in FIG. 51 and FIG. 53, the frequency amplitude characteristics of C, D, and A keep a substantially similar shape, and desired electro-optical filter characteristics can be maintained in bands corresponding to 4T (in the vicinity of a value 32 in the horizontal axis) and 3T (in the vicinity of a value 43 in the horizontal axis), regardless of presence/absence of radial comatic aberration, and the pattern IVT4 has a favorable radial disc skew margin, as compared with other patterns.

The filter characteristics of IVT4 at the perturbation origin, which are shown in FIG. 52 and FIG. 53, have the following features. The central region has a low-pass like characteristic, and the outer regions in the tangential direction have a high-pass like characteristic (Herein, a band-pass characteristic that allows passing of a band corresponding to shorter marks in a frequency band contributing to signal reproduction is referred to as a relatively high-pass like characteristic.).

In the pattern IVT4, the outer regions in the tangential direction are two independent channels, and filters are formed so that tap coefficients of channels corresponding to the two regions have a phase difference of about two clocks. With this, it is possible to detect a short mark with a higher sensitivity, as compared with a reproduction amplitude of a simple total sum signal. Regarding reproduction of a short mark, favorable reproduction signal characteristics are achieved by also using a phase difference between regions.

In the bands corresponding to 4T (in the vicinity of the value 32 in the horizontal axis) and 3T (in the vicinity of the value 43 in the horizontal axis), the region B that hardly includes a signal component in the bands suppresses a crosstalk component and other noise components existing in the region with the low-pass filter characteristic, and the crosstalk component is reduced by a phase difference between C and D, and then the crosstalk component that still remains is cancelled by a balance of the frequency amplitude characteristics with A. As a result, it is unnecessary to raise the frequency amplitude characteristics of C, D, and A more than necessary, and this also achieves favorable reproduction signal characteristics.

When comparing characteristics in FIG. 51 showing the frequency amplitude characteristics of the respective channels obtained when radial comatic aberration is generated with characteristics in FIG. 53 showing the frequency amplitude characteristics of the respective channels having the above features at the perturbation origin, the frequency amplitude characteristics of C, D, and A keep a substantially similar shape and desired electro-optical filter characteristics can be maintained in bands corresponding to 4T (in the vicinity of the value 32 in the horizontal axis) and 3T (in the vicinity of the value 43 in the horizontal axis), regardless of presence/absence of radial comatic aberration, and the pattern IVT4 has a favorable radial disc skew margin, as compared with other patterns.

[Pattern NST6]

Figure 54:
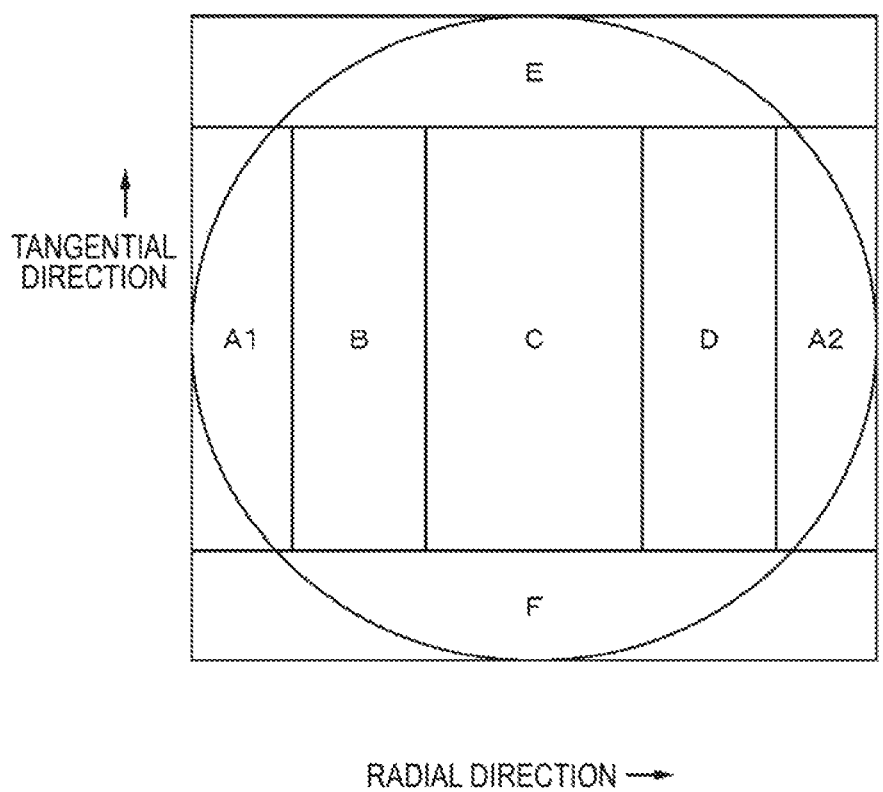
FIG. 54 is a schematic diagram showing a region division pattern NST6.

A pattern NST6 shown in FIG. 54 is an example of six channels. This pattern is considered as a pattern in which the central region of T4A is further divided into three regions in the radial direction. That is, a beam is divided into regions, i.e., the outer region A (=A1+A2) in the radial direction, the upper region E and the lower region F in the tangential direction, and the three central regions B, C, and D. The three central regions are such that a region close to the region A1 is the region B, a region close to the region A2 is the region D, and the exact central region is a region C, and signals of six channels corresponding to the respective regions are obtained. Herein, region division positions in the radial direction are positions of ±0.3 and ±0.75 where the pupil radius is 1.0, and region division positions in the tangential direction are positions of ±0.65 (division positions are slightly adjusted from the region division of T4A described above in consideration of a change in various characteristics caused by division or the like of the central region).

Description will be made on the basis of simulation results of the above pattern NST6. Simulation conditions are as follows as in the case of "low linear density" described above.

LD 35.18 (GB) . . . 0.053 µm/channel bit

In the case of Tp=0.225 µm (both land and groove), the plane capacity is 50.0 GB.

NA=0.85 •PR (1233321) •Evaluation index: e-MLSE

Mark width=Tp×0.7 •Disc Noise and Amp Noise are present.

As shown in FIG. 14, it is found that, when the division number of regions having space-optically different bands is increased in the tangential direction, i.e., in a direction corresponding the linear-density direction as in the pattern H4C as compared with the above pattern H3A, a tangential comatic aberration margin is increased in accordance with the division number in the tangential direction. The pattern NST6 is obtained by also applying this way of thinking to the radial direction.

In this division pattern NST6, the division number of regions having space-optically different bands in the radial direction is increased, and, although the pattern NST6 is different from IVT4, the pattern NST6 also detects signals corresponding to interference regions with ±1st-order diffracted light caused by the track structure. With this, it is possible to increase various margins such as a radial comatic aberration margin while keeping favorable e-MLSE at the perturbation center position.

"Reproduction Performance"

FIG. 55 to FIG. 59 show simulation results of reproduction performance concerning the pattern NST6. FIG. 55 to FIG. 59 show effects of region division of the pattern NST6 with a low linear density. In each drawing, e-MLSE shows a characteristic obtained in the case where region division is not performed.

Figure 55:
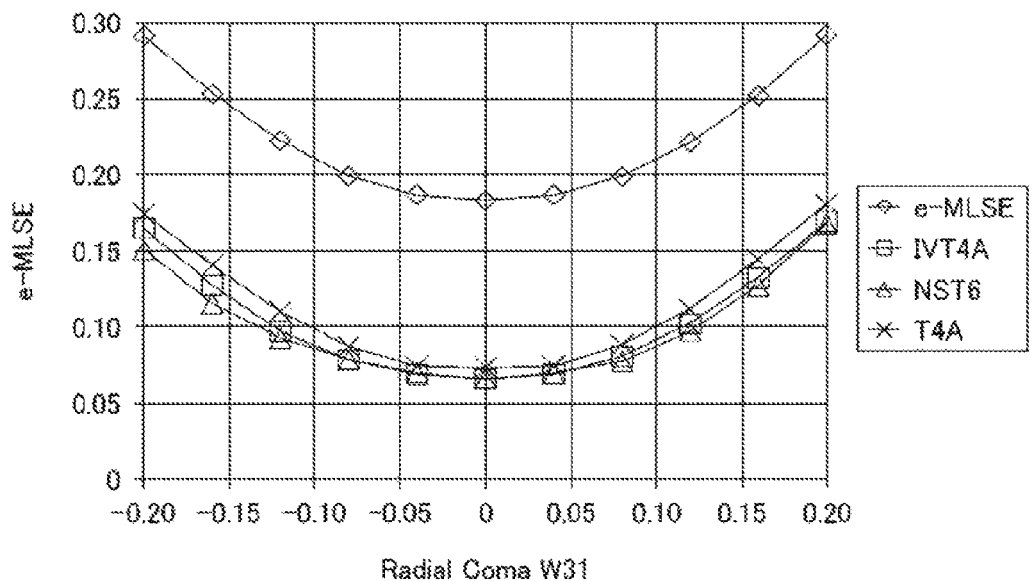
FIG. 55 is a graph for explaining a margin for comatic aberration in a radial direction concerning NST6.

FIG. 55 shows a radial comatic aberration margin of the pattern NST6 and radial comatic aberration margins of other patterns T4A and IVT4 described above for comparison. A vertical axis indicates an index e-MLSE, which is similar to the vertical axes in other graphs described above, and a horizontal axis indicates normalized radial comatic aberration W31. It is found that the radial disc skew margin of the pattern NST6 is favorable as compared with those of the patterns T4A and IVT4 because the division number of regions having space-optically different bands in the radial direction is increased and, although the pattern NST6 is different from IVT4, the pattern NST6 also detects signals corresponding to the interference regions with ±1st-order diffracted light caused by the track structure.

Figure 56:
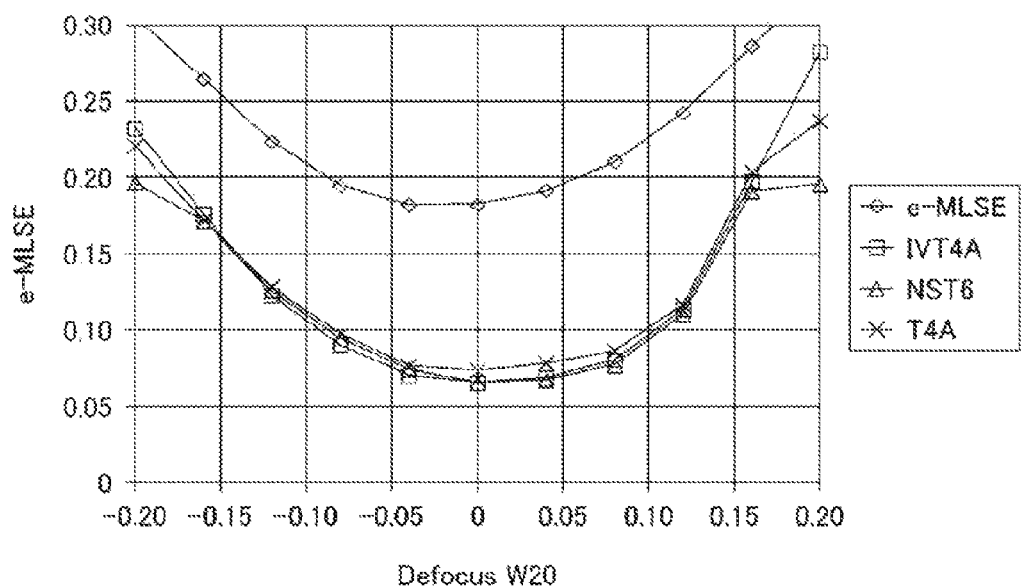
FIG. 56 is a graph for explaining a defocus margin concerning NST6.

FIG. 56 shows a defocus margin, and a horizontal axis of a graph in FIG. 56 indicates a defocus amount W20 normalized by a wavelength. A value 0 means the defocus amount of 0.

Figure 57:
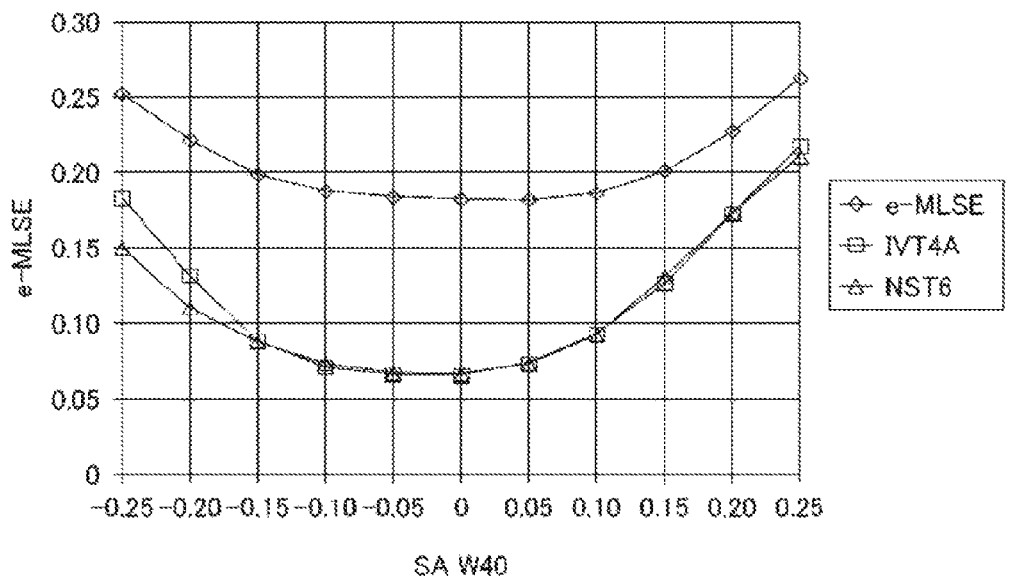
FIG. 57 is a graph for explaining a spherical aberration margin concerning NST6.

FIG. 57 shows a margin of spherical aberration SA. A horizontal axis of a graph in FIG. 57 indicates a normalized spherical aberration amount W40. It is found that the spherical aberration margin of the pattern NST6 is favorable, as compared with that of the pattern IVT4.

Figure 58:
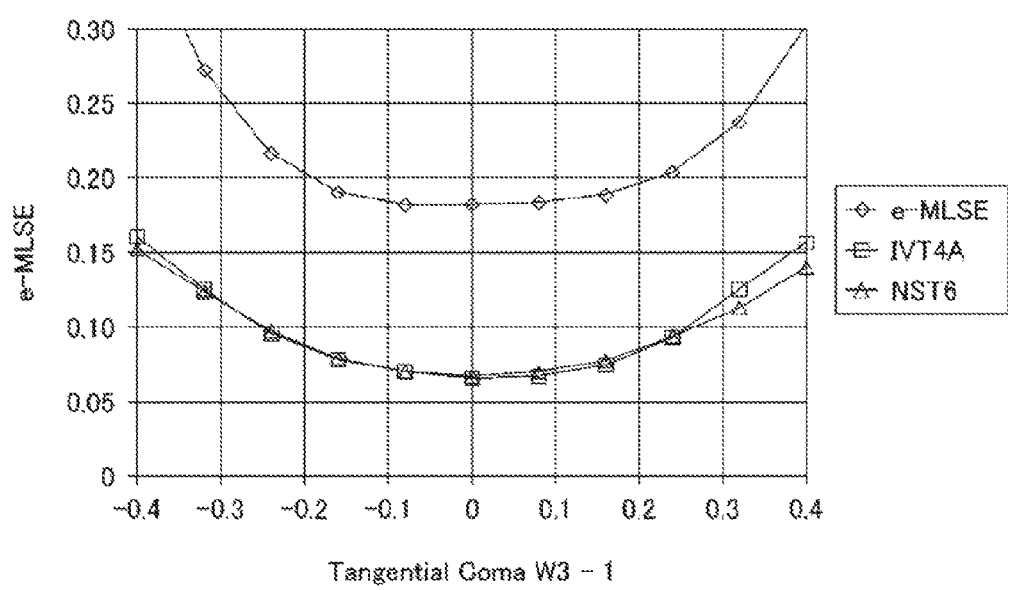
FIG. 58 is a graph for explaining a margin for comatic aberration in a tangential direction concerning NST6.

FIG. 58 shows a tangential comatic aberration margin. A horizontal axis of a graph in FIG. 58 indicates a normalized tangential comatic aberration amount W3-1. It is found that the tangential comatic aberration margin of the pattern NST6 is favorable, as compared with that of the pattern IVT4.

Figure 59:
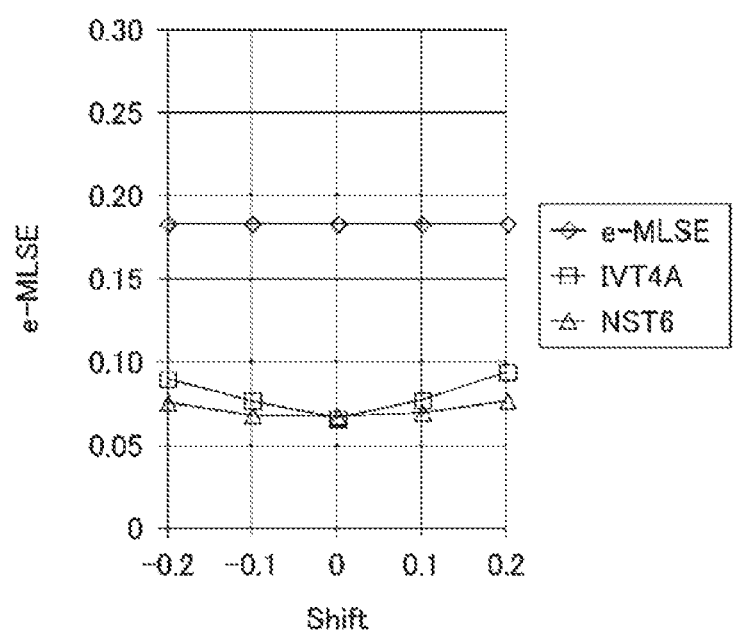
FIG. 59 is a graph for explaining a case where a pattern is shifted in a radial direction concerning NST6.

FIG. 59 shows a margin obtained in the case where the pattern is shifted in the radial direction. A horizontal axis of the graph in FIG. 59 indicates a normalized shift amount. It is found that the shift margin of the pattern NST6 is favorable, as compared with that of the pattern IVT4.

[Pattern IVNST6]

Figure 60:
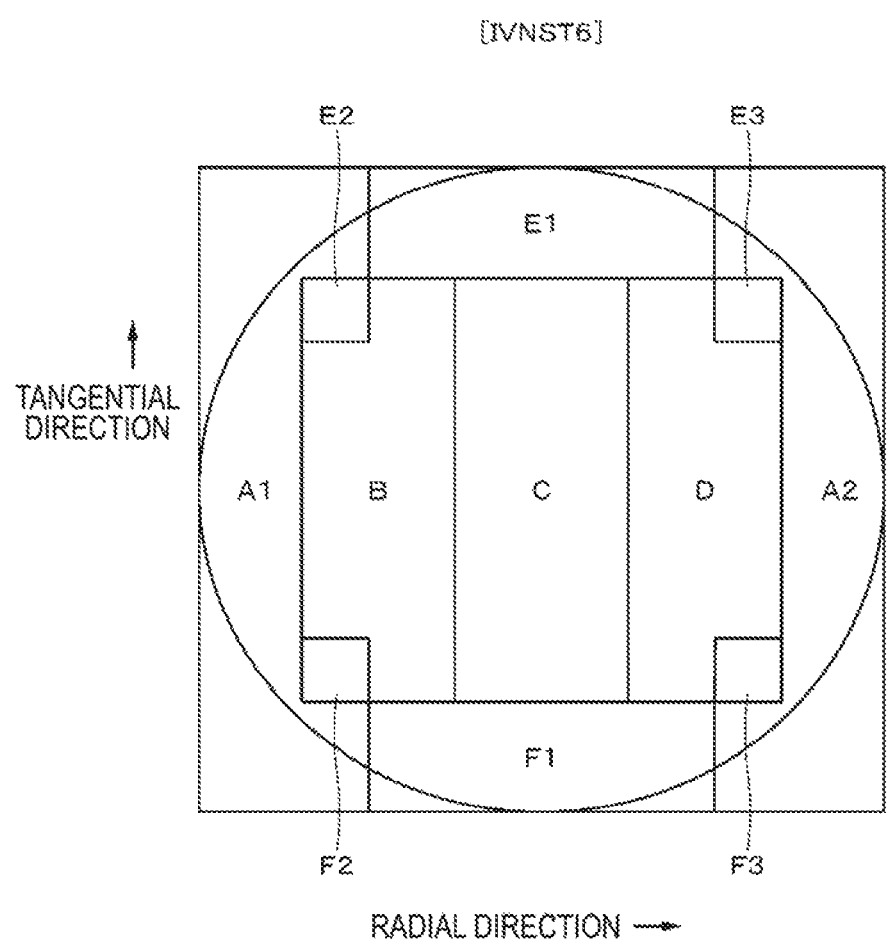
FIG. 60 is a schematic diagram showing a region division pattern IVNST6.

A pattern IVNST6b shown in FIG. 60 is an example of six channels. The pattern IVNST6 is a pattern in which advantages of the above division patterns IVT4 and NST6 are combined. That is, when considering the pattern IVT4 as a basis, it is considered that the central region B in FIG. 44 is further divided into three regions in the radial direction in order to increase the division number of regions having space-optically different bands in the radial direction in the same way as NST6 with respect to T4A. Further, when considering the pattern NST6 as a basis, it is also considered that the regions A1 and A2 are extended to the region E and the region F, a part (E2) of the region E and a part (F2) of the region F enter the region B, and a part (E3) of the region E and a part (F3) of the region F enter the region B. Herein, region division positions in the radial direction are positions of ±0.25, ±0.5, and ±0.7 where the pupil radius is 1.0, and region division positions in the tangential direction are positions of ±0.45 and ±0.65. This pattern suppresses deterioration in a pattern shift in the radial direction, the deterioration being remarkable in the pattern IVT4, and is the best solution in almost all characteristics.

Description will be made on the basis of simulation results of the above pattern IVNST6. Simulation conditions are as follows as in the case of "low linear density" described above.

LD 35.18 (GB) . . . 0.053 µm/channel bit

In the case of Tp=0.225 µm (both land and groove), the plane capacity is 50.0 GB.

NA=0.85 •PR (1233321) •Evaluation index: e-MLSE

Mark width=Tp×0.7 • Disc Noise and Amp Noise are present.

"Reproduction Performance"

FIG. 61 to FIG. 65 show simulation results of reproduction performance concerning the pattern IVNST6. FIG. 61 to FIG. 65 show effects of region division of the pattern IVNST6 with a low linear density. In each drawing, e-MLSE shows a characteristic obtained in the case where region division is not performed.

Figure 61:
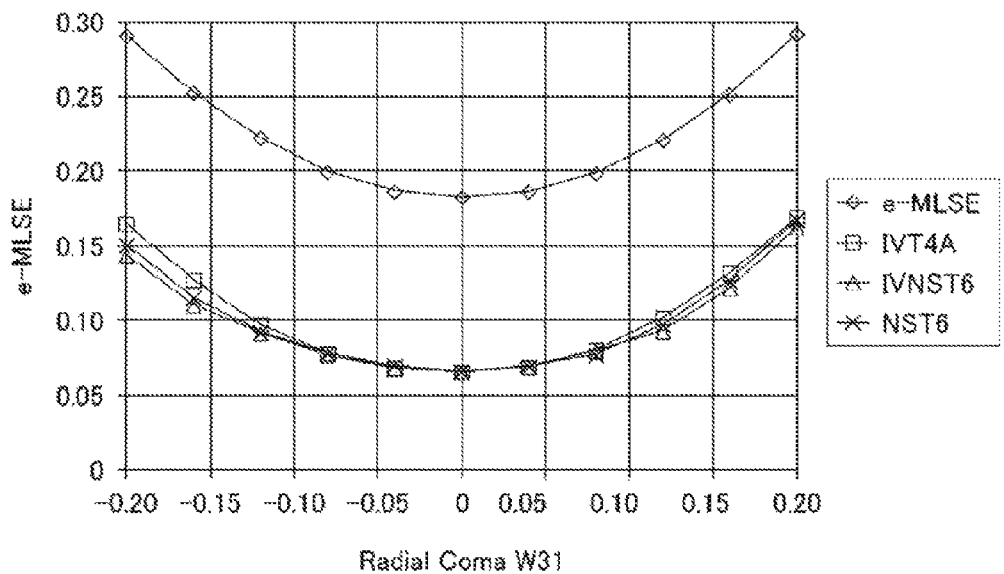
FIG. 61 is a graph for explaining a margin for comatic aberration in a radial direction concerning IVNST6.

FIG. 61 shows radial comatic aberration margins concerning the pattern IVNST6, the above pattern NST6, and the above pattern IVT4. A vertical axis indicates an index e-MLSE, which is similar to the vertical axes in other graphs described above, and a horizontal axis indicates normalized radial comatic aberration W31. It is found that the radial disc skew margin of the pattern IVNST6 is the best.

Figure 62:
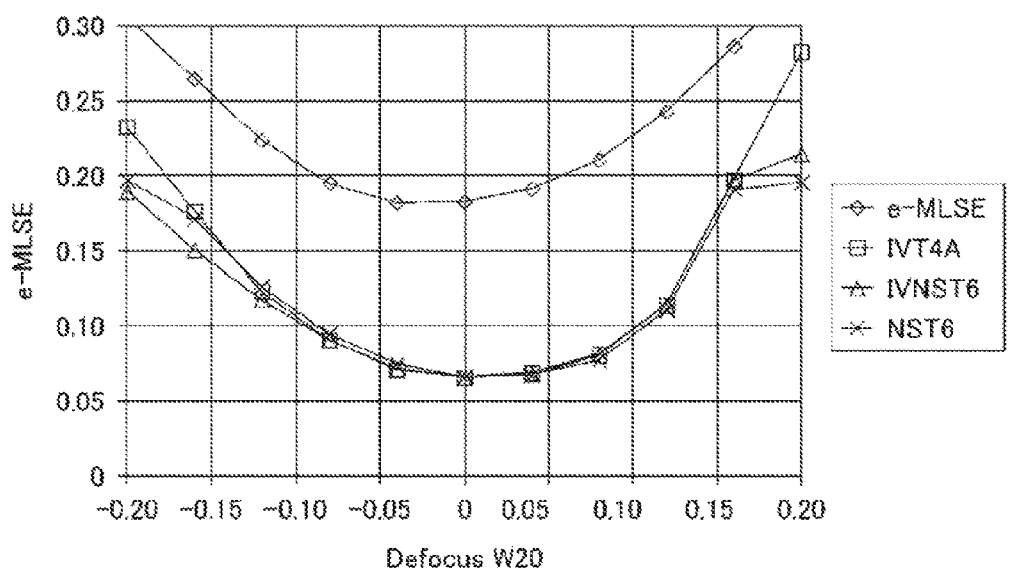
FIG. 62 is a graph for explaining a defocus margin concerning IVNST6.

FIG. 62 shows a defocus margin, and a horizontal axis of a graph in FIG. 62 indicates a defocus amount W20 normalized by a wavelength. It is found that the defocus margin of the pattern IVNST6 is the best.

Figure 63:
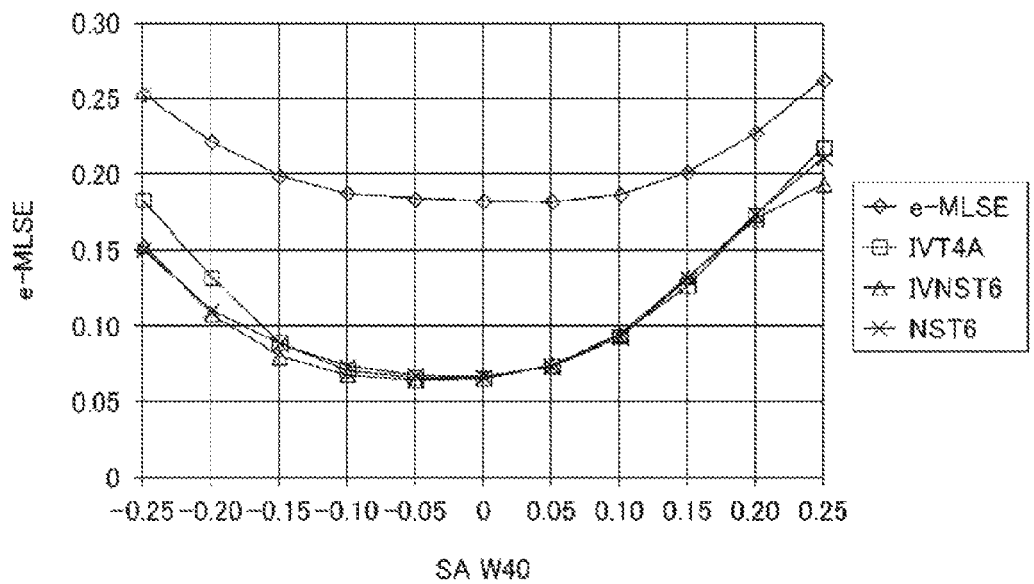
FIG. 63 is a graph for explaining a spherical aberration margin concerning IVNST6.

FIG. 63 shows a margin of the spherical aberration SA. A horizontal axis of a graph in FIG. 63 indicates a normalized spherical aberration amount W40. It is found that the spherical aberration margin of the pattern IVNST6, as well as the spherical aberration margin of the pattern NST6, is the best.

Figure 64:
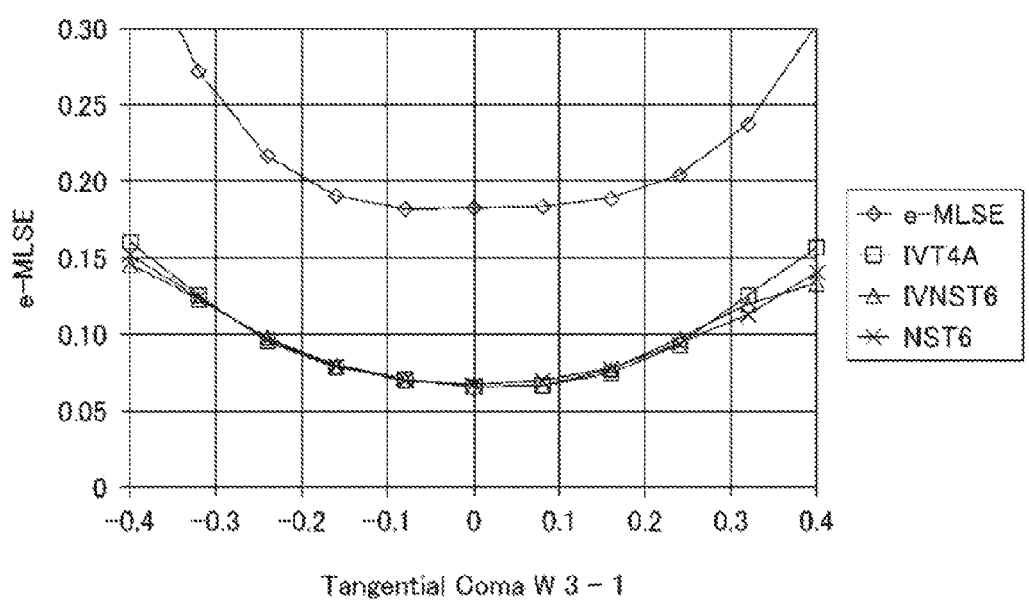
FIG. 64 is a graph for explaining a margin for comatic aberration in a tangential direction concerning IVNST6.

FIG. 64 shows a tangential comatic aberration margin. A horizontal axis of a graph in FIG. 64 indicates a normalized tangential comatic aberration amount W3-1. It is found that the tangential comatic aberration margin of the pattern IVNST6 is the best.

Figure 65:
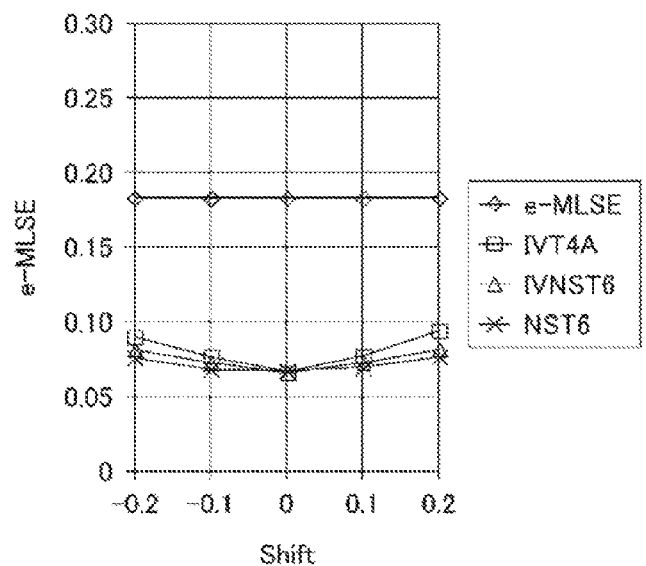
FIG. 65 is a graph for explaining a case where a pattern is shifted in a radial direction concerning IVNST6.

FIG. 65 shows a margin obtained in the case where the pattern is shifted in the radial direction. A horizontal axis of a graph in FIG. 65 indicates a normalized shift amount. It is found that the shift margin of the pattern IVNST6 is favorable, as compared with that of the pattern IVT4.

"Electrical Filters Optimal for Pattern IVNST6"

Figure 66:
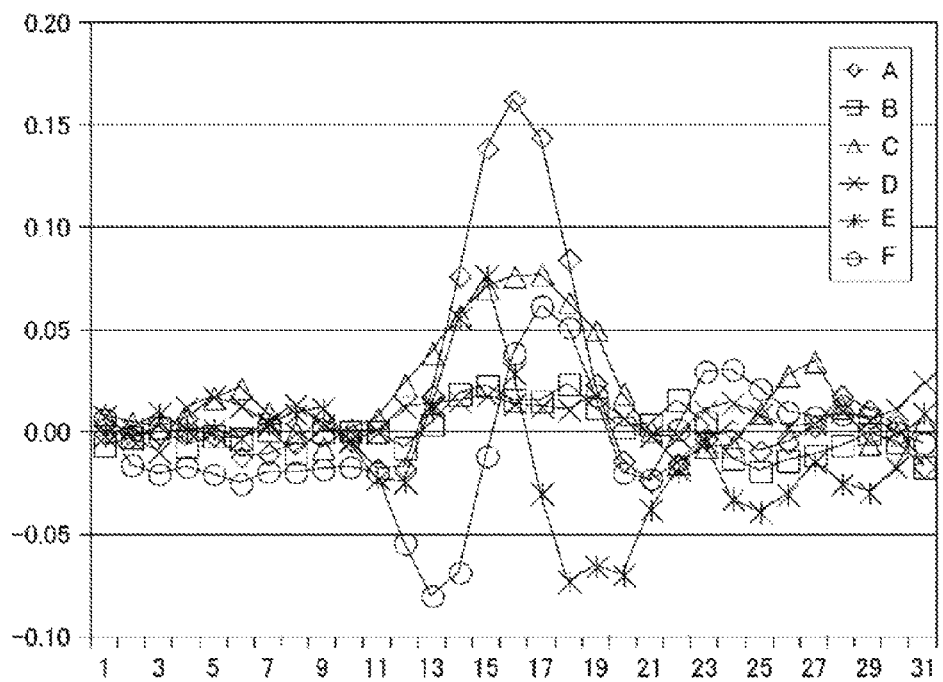
FIG. 66 is a graph showing an example of tap coefficients of electrical filters optimal for IVNST6.
Figure 67:
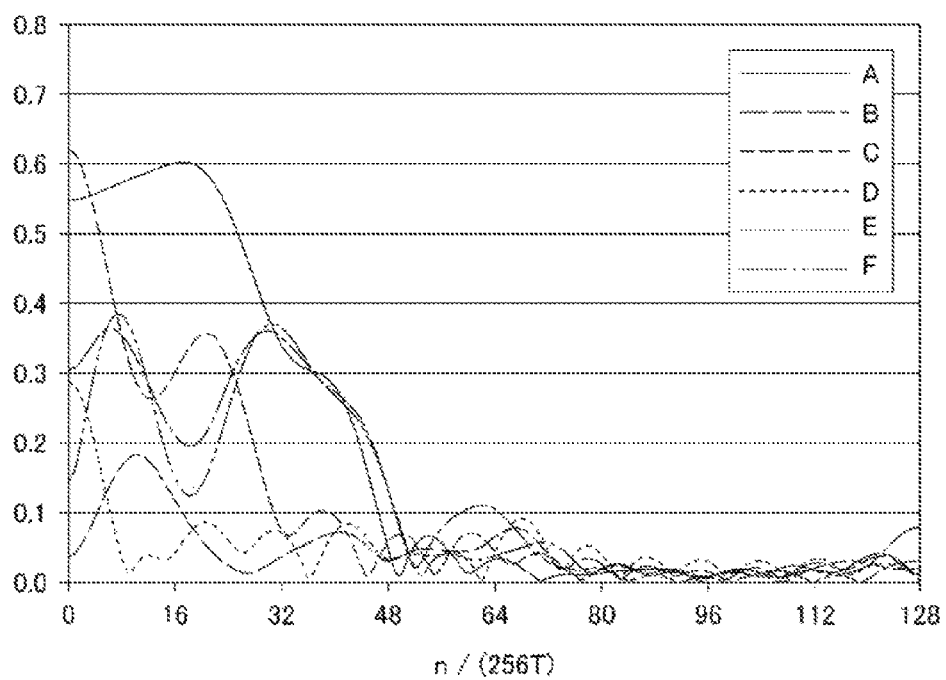
FIG. 67 is a graph showing frequency characteristics of electrical filters optimal for IVNST6.
Figure 68:
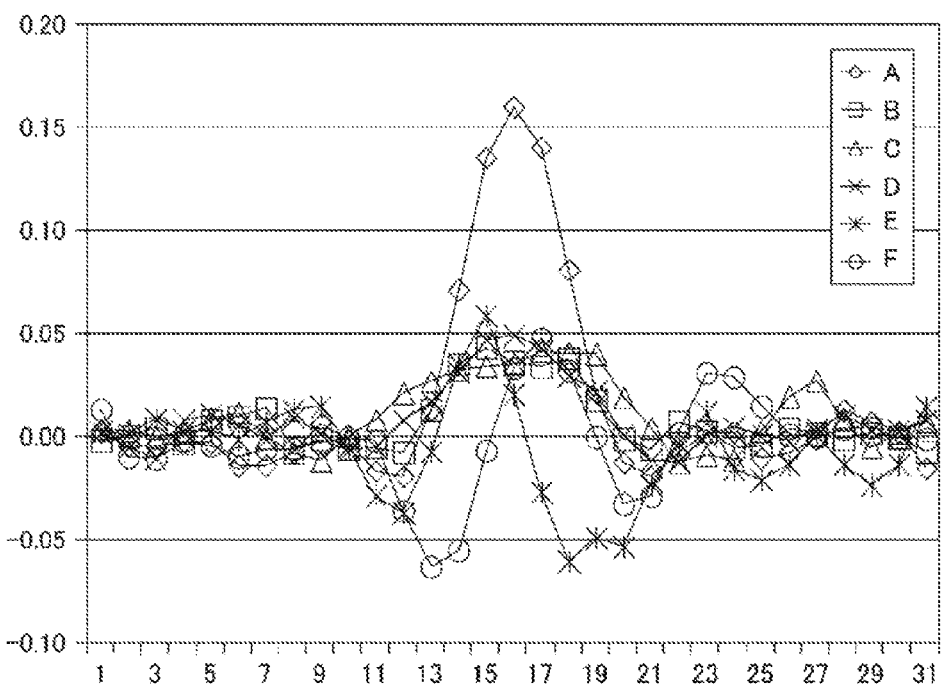
FIG. 68 is a graph showing an example of tap coefficients of electrical filters optimal for IVNST6.
Figure 69:
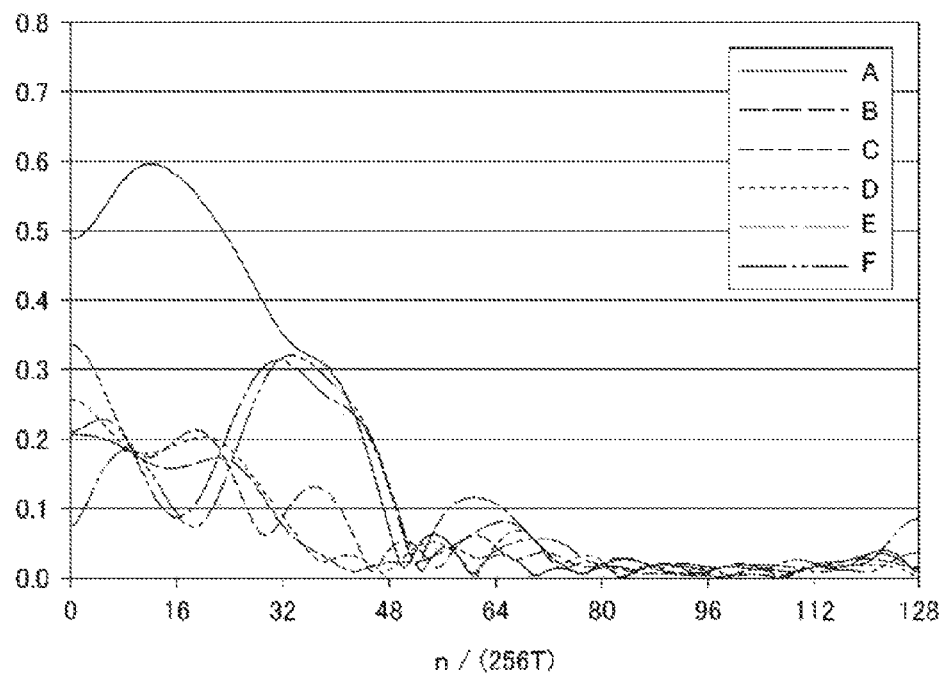
FIG. 69 is a graph showing frequency characteristics of electrical filters optimal for IVNST6.

Electrical filters optimal for the above pattern IVNST6 will be described. FIG. 68 shows an example of values of the coefficients of 31 taps in the electrical filters where W31=0 in FIG. 61, i.e., at the perturbation origin. The electrical filters are formed as FIR filters. FIG. 69 shows frequency amplitude characteristics of the respective channels corresponding to the regions A to F obtained in the case where the coefficients are set as described above. FIG. 66 shows an example of values of the coefficients of 31 taps in the electrical filters where W31=−0.16. FIG. 67 shows frequency amplitude characteristics of the respective channels of A to F obtained in the case where the coefficients are set as described above.

The filter characteristics of IVNST6 at the perturbation origin, which are shown in FIG. 68 and FIG. 69, have the following features. The outer regions in the tangential direction, as well as the outer regions in the pattern IVT4, have a high-pass like characteristic (Herein, a band-pass characteristic that allows passing of a band corresponding to shorter marks in a frequency band contributing to signal reproduction is referred to as a relatively high-pass like characteristic.).

In the pattern IVNST6, also, as well as in the pattern IVT4, the outer regions in the tangential direction are two independent channels, and filters are formed so that tap coefficients of channels corresponding to the two regions have a phase difference of about two clocks. With this, it is possible to detect a short mark with a higher sensitivity, as compared with a reproduction amplitude of a simple total sum signal. Regarding reproduction of a short mark, favorable reproduction signal characteristics are achieved by also using a phase difference between regions.

Although a single central region is provided in IVT4, the central region is divided into three regions in the radial direction in IVNST6. However, the three regions B, C, and D basically have a low-pass like characteristic as in IVT4, and there is no great difference in filter characteristics among the three regions at the perturbation origin.

In the bands corresponding to 4T (in the vicinity of a value 32 in the horizontal axis) and 3T (in the vicinity of a value 43 in the horizontal axis), the regions B, C, and D that hardly include a signal component in the bands suppresses a crosstalk component and other noise components existing in the regions with the low-pass filter characteristic, and the crosstalk component is reduced by a phase difference between E and F, and the crosstalk component that still remains is cancelled by a balance of the frequency amplitude characteristics with A. As a result, it is unnecessary to raise the frequency amplitude characteristics of E, F, and A more than necessary, and this also achieves favorable reproduction signal characteristics.

As is clear from comparison between characteristics in FIG. 66 showing the tap coefficients of the respective channels obtained when radial comatic aberration is generated and FIG. 67 showing the frequency amplitude characteristics with characteristics in FIG. 68 showing the tap coefficients of the respective channels at the perturbation origin and FIG. 69 showing the frequency amplitude characteristics, the filters are such that, when the radial comatic aberration of W31=−0.16 is generated, among the three central channels of B, C, and D, C (exact center) is strengthened and B and D are considerably weakened, and E and F are strengthened to some extent. Further, as is clear from FIG. 67 and FIG. 69, as in the case of IVT4, the frequency amplitude characteristics of E, F, and A keep a substantially similar shape, and desired electro-optical filter characteristics can be maintained in the bands corresponding to 4T and 3T, regardless of presence/absence of the radial comatic aberration. With this, the most favorable radial disc skew margin can be achieved in the pattern IVNST6.

Figure 70:
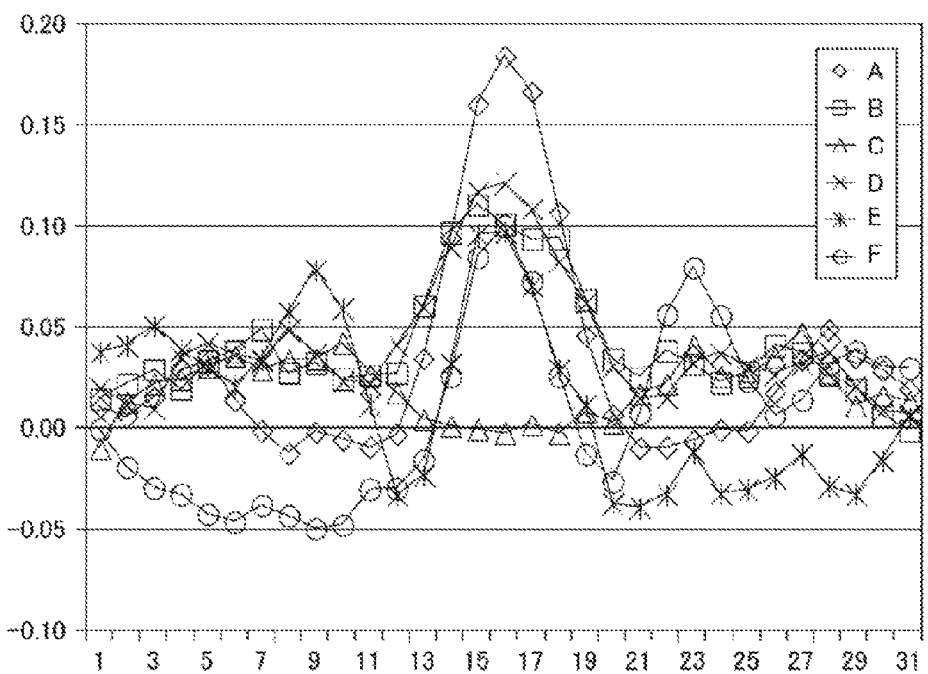
FIG. 70 is a graph showing an example of tap coefficients of electrical filters optimal for IVNST6.
Figure 71:
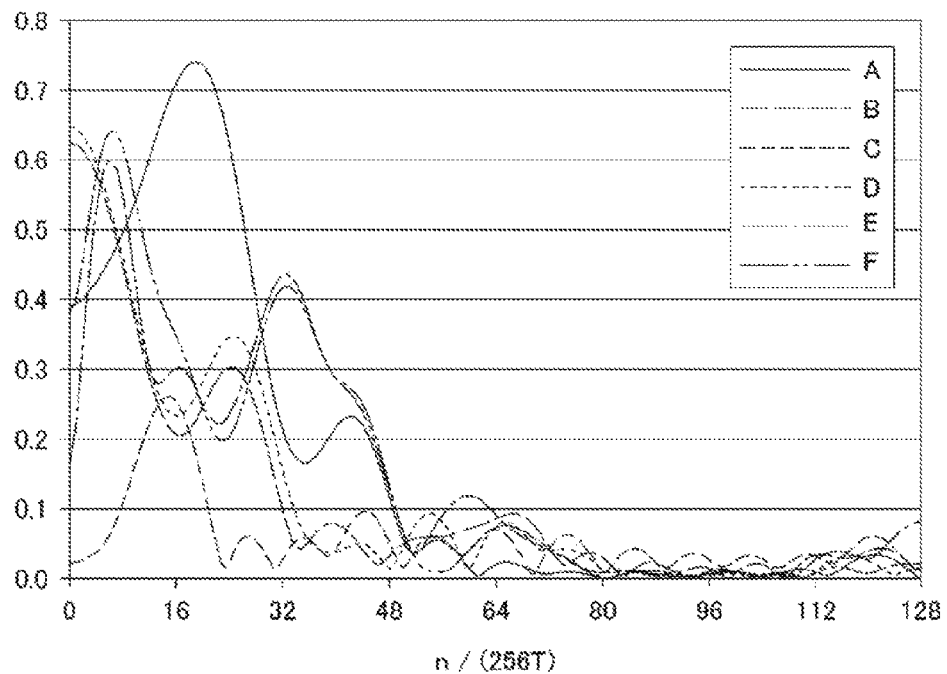
FIG. 71 is a graph showing frequency characteristics of electrical filters optimal for IVNST6.

FIG. 70 shows an example of values of the coefficients of 31 taps in the electrical filters where W20=−0.16 in characteristics of the defocus W20 in FIG. 62. The electrical filters are formed as FIR filters. FIG. 71 shows frequency amplitude characteristics of the respective channels of A to F obtained in the case where the coefficients are set as described above.

As is clear from comparison between characteristics in FIG. 70 showing the tap coefficients of the respective channels obtained in a state in which defocus is generated and FIG. 71 showing the frequency amplitude characteristics with characteristics in FIG. 68 showing the tap coefficients of the respective channels at the perturbation origin and FIG. 69 showing the frequency amplitude characteristics, the filters are such that, when the defocus of W20=−0.16 is generated, among the three central channels of B, C, and D, C (exact center) is weakened and the phase is reversed in the vicinity of 8T to perform band-pass (reversal of the phase is also found on the basis of the tap coefficients in FIG. 70) and B and D are strengthened. In addition, regarding E and F, as is clear from the tap coefficients in FIG. 70, the filters are such that a phase difference is reduced and E and F are strengthened.

Figure 72:
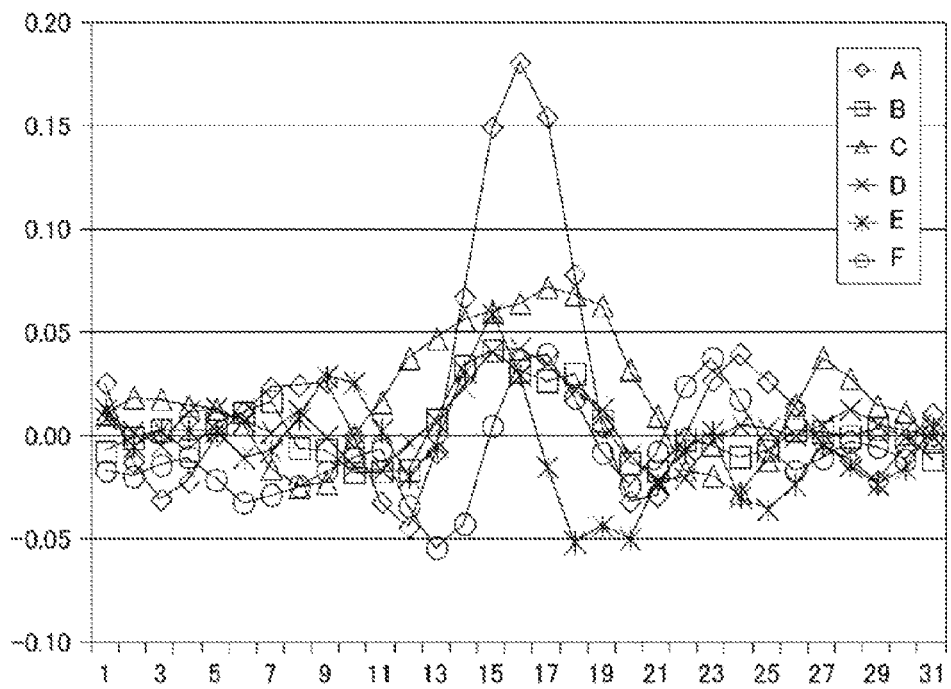
FIG. 72 is a graph showing an example of tap coefficients of electrical filters optimal for IVNST6.
Figure 73:
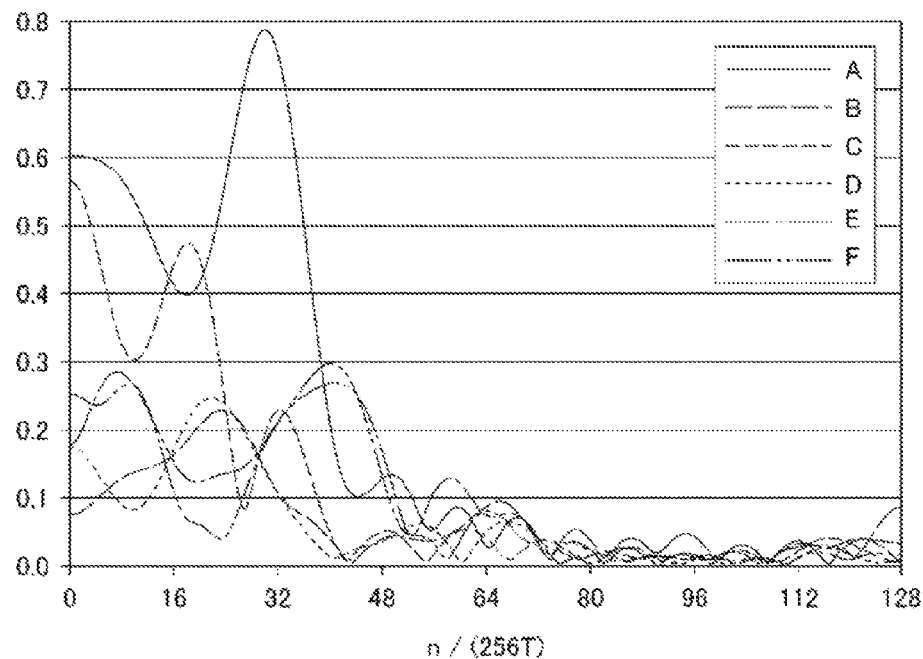
FIG. 73 is a graph showing frequency characteristics of electrical filters optimal for IVNST6.

FIG. 72 shows an example of values of the coefficients of 31 taps in the electrical filters where W40=−0.20 in characteristics of the spherical aberration SA in FIG. 63. The electrical filters are formed as FIR filters. FIG. 73 shows frequency amplitude characteristics of the respective channels of A to F obtained in the case where the coefficients are set as described above.

As is clear from comparison between characteristics in FIG. 72 showing the tap coefficients of the respective channels obtained in a state in which spherical aberration is generated and FIG. 73 showing the frequency amplitude characteristics with characteristics in FIG. 68 showing the tap coefficients of the respective channels at the perturbation origin and FIG. 69 showing the frequency amplitude characteristics, the filters are such that, when the spherical aberration of W40=−0.20 is generated, among the three central channels of B, C, and D, C (exact center) is strengthened.

As described above, increase in various margins is achieved by independently changing the filter characteristics of the three central regions B, C, and D in accordance with the kind of perturbation.

"Perturbation/Aberration Detection Using Change in Electrical Filter Characteristics"

As described above, in a state in which perturbation or aberration exists, the filter characteristics (tap coefficients) of the respective channels are characteristically changed depending on kinds of the perturbation or aberration (see Table 1).

TABLE 1

| Channel | Radial comatic aberration (W31) | Defocus (W20) | Spherical aberration (W40) |
| --- | --- | --- | --- |
| A | | | |
| B | Weakened (DOWN) | Strengthened (UP) | |
| C | Strengthened (UP) | Weakened (DOWN) | Strengthened (UP) |
| D | Weakened (DOWN) | Strengthened (UP) | |
| E | Strengthened (UP) | Strengthened (UP) | Weakened (DOWN) |
| F | Strengthened (UP) | Strengthened (UP) | Weakened (DOWN) |

The change in filter characteristics (tap coefficients) of the respective channels is different depending on the kind and the magnitude of perturbation, and therefore it is possible to detect what kind of perturbation is generated in the state from the filter characteristics (tap coefficients) and to what degree the perturbation is generated. That is, it is possible to detect radial aberration or spherical aberration by using distribution of the tap coefficients of the FIR filters. Further, it is possible to detect defocus or tangential comatic aberration by using the distribution of the tap coefficients of the FIR filters. Furthermore, it is possible to detect detrack or parallactic movement by using the distribution of the tap coefficients of the FIR filters.

In order to achieve a state in which an RF reproduction characteristic is the best, it is possible to use indexes such as i-MLSE and e-MLSE. However, based on those indexes, it is possible to find only whether or not the RF reproduction characteristic approaches to the best state, and it is impossible to obtain information on, for example, whether to reduce the comatic aberration, whether to shift the defocus, or whether to shift the spherical aberration. On the contrary, for example, in the case of IVNST6 (the same applies to NST6), it is possible to detect whether to reduce the radial comatic aberration, whether to shift the defocus, or whether to shift the spherical aberration on the basis of the change in the filter characteristics (tap coefficients) of the central regions B, C, and D which are three regions divided in the radial direction and the change in the filter characteristics (tap coefficients) of the outer regions E and F in the tangential direction, and it is possible to make adjustment to eliminate a factor in a shift of the filter characteristics (tap coefficients) from the perturbation origin.

"Optimization of Electrical Filters: Defocus Characteristics and the Number of Taps"

Figure 74:
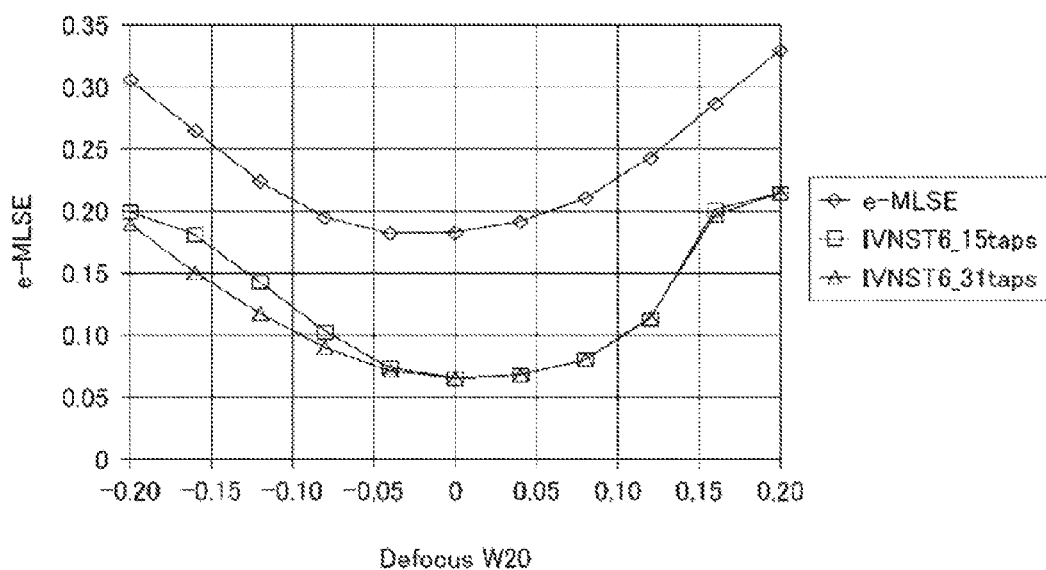
FIG. 74 is a graph for explaining a defocus margin obtained in the case where the number of taps is changed concerning IVNST6.

FIG. 74 shows simulation results of defocus characteristics of the above pattern IVNST6. The simulation conditions are similar to the simulation conditions described above. FIG. 74 shows the case where the number of taps of the FIR filters is 31 as described above and the case where the number of taps is 15.

As described above, FIG. 70 shows an example of values of the coefficients of 31 taps in the electrical filters where W20=−0.16, and FIG. 71 shows the frequency amplitude characteristics of the respective channels of A to F. In the frequency characteristics, the filters are such that, among the three central channels of B, C, and D, C (exact center) is weakened, the phase is reversed in the vicinity of 8T to perform band-pass, and B and D are strengthened.

Figure 75:
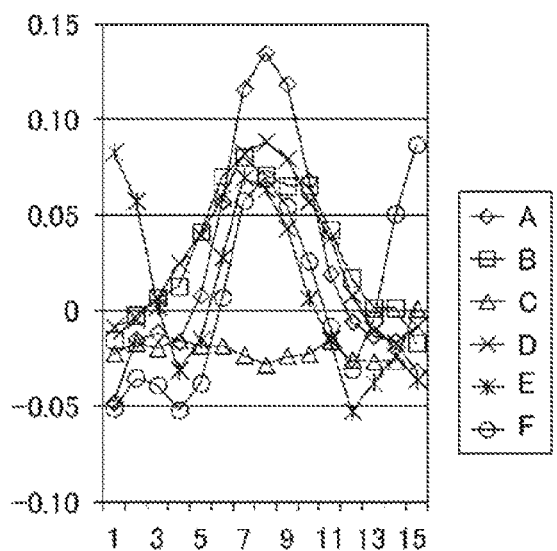
FIG. 75 is a graph showing an example of tap coefficients obtained in the case where the number of taps is changed concerning IVNST6.
Figure 76:
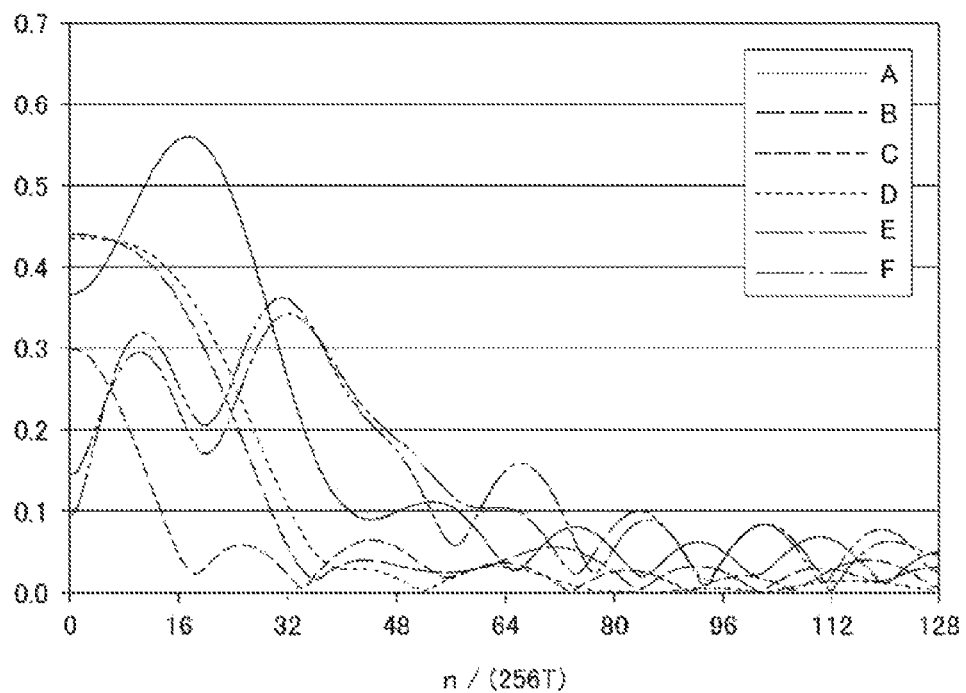
FIG. 76 is a graph showing frequency characteristics obtained in the case where the number of taps is changed concerning IVNST6.

Meanwhile, FIG. 75 shows an example of values of coefficients of 15 taps in the electrical filters where W20=−0.16, and FIG. 76 shows the frequency amplitude characteristics of the respective channels in A to F. The frequency characteristics are different from the frequency characteristics of the case of 31 taps (FIG. 71) and cannot achieve desired filter characteristics. The channel C serves as a low-pass filter instead of a band-pass filter having a reversed phase. Therefore, there is a difference in margin caused by the number of taps at the time of defocus.

Herein, a difference caused by the number of taps concerning the defocus margin of IVNST6 has been described as an example. However, the same applies to other patterns and other margins. In the case of RLL (1, 7) PP, there is a recording mark from 2T to 8T, and therefore, in order to achieve desired filter characteristics also in a frequency corresponding to 8T mark/space, it is desirable to have a tap coefficient within the range of a 16T width or more in the case where an FIR filter is used.

[Pattern NST6H]

Figure 77:
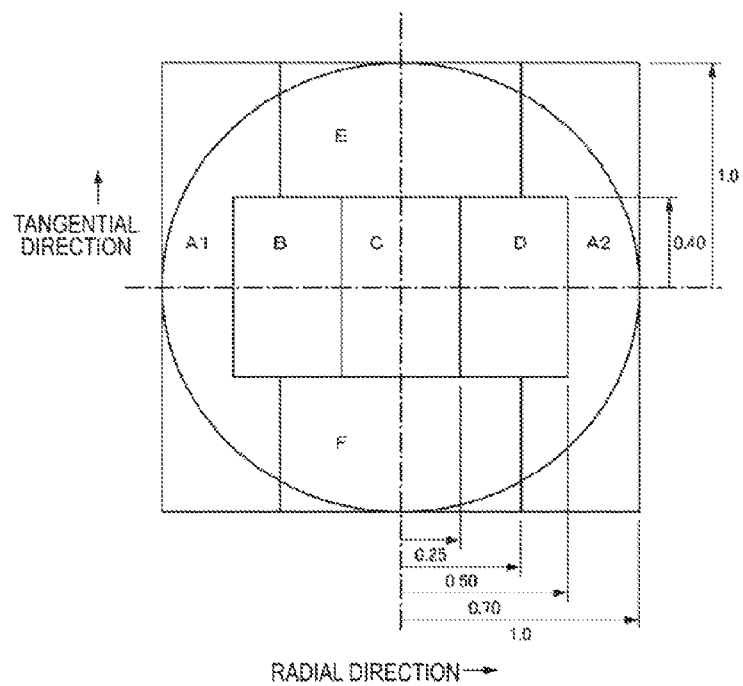
FIG. 77 is a schematic diagram showing a region division pattern NST6H.

A pattern NST6H shown in FIG. 77 is another example of six channels. This pattern is a pattern in which the central region is further divided into three regions in the radial direction. That is, a beam is divided into regions, i.e., the outer region A (=A1+A2) in the radial direction, the upper region E and the lower region F in the tangential direction, and the three central regions B, C, and D. The three central regions are such that a region close to the region A1 is the region B, a region close to the region A2 is the region D, and the exact central region is a region C, and signals of six channels corresponding to the respective regions are obtained. Herein, region division positions of the central regions in the radial direction are positions of ±0.25 and ±0.70 where the pupil radius is 1.0, and region division positions in the tangential direction are positions of ±0.40.

Figure 78:
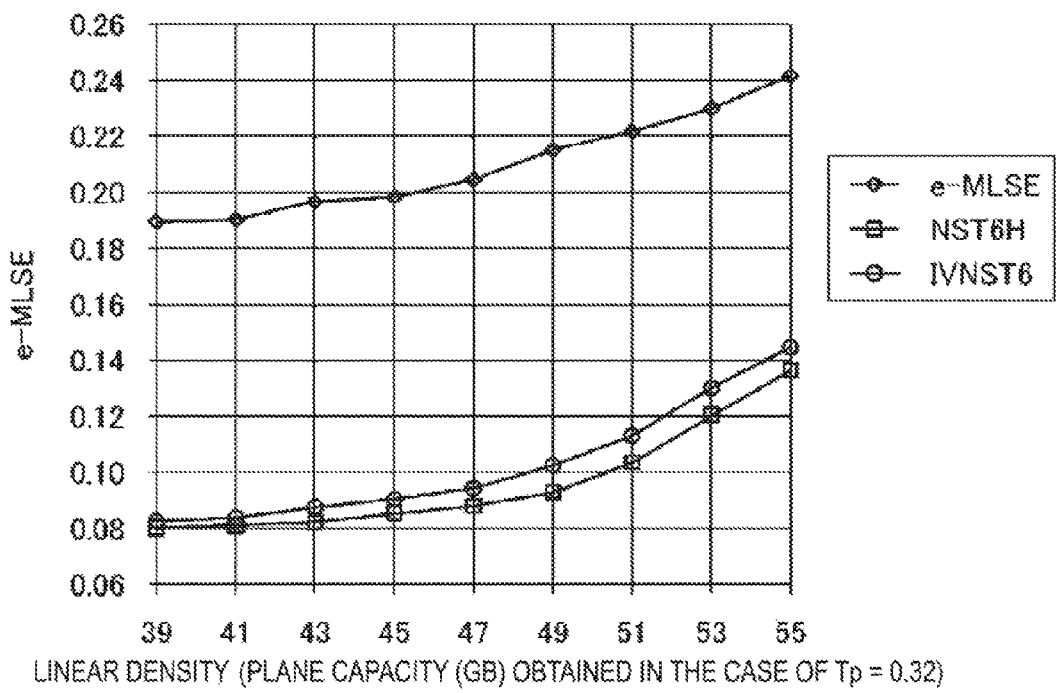
FIG. 78 is a graph used for explaining NST6H.

FIG. 78 shows simulation results obtained in the case of six channels. When IVNST6 (the same applies to NST6) is changed to NST6H, areas (amount of light) of the outer channels in the radial direction are large and areas (amount of light) of the outer channels in the tangential direction are large, which are effective in increasing linear density.

[Pattern IVTSP5] (the Number of Channels is Reduced while Characteristics are being Maintained)

Figure 79:
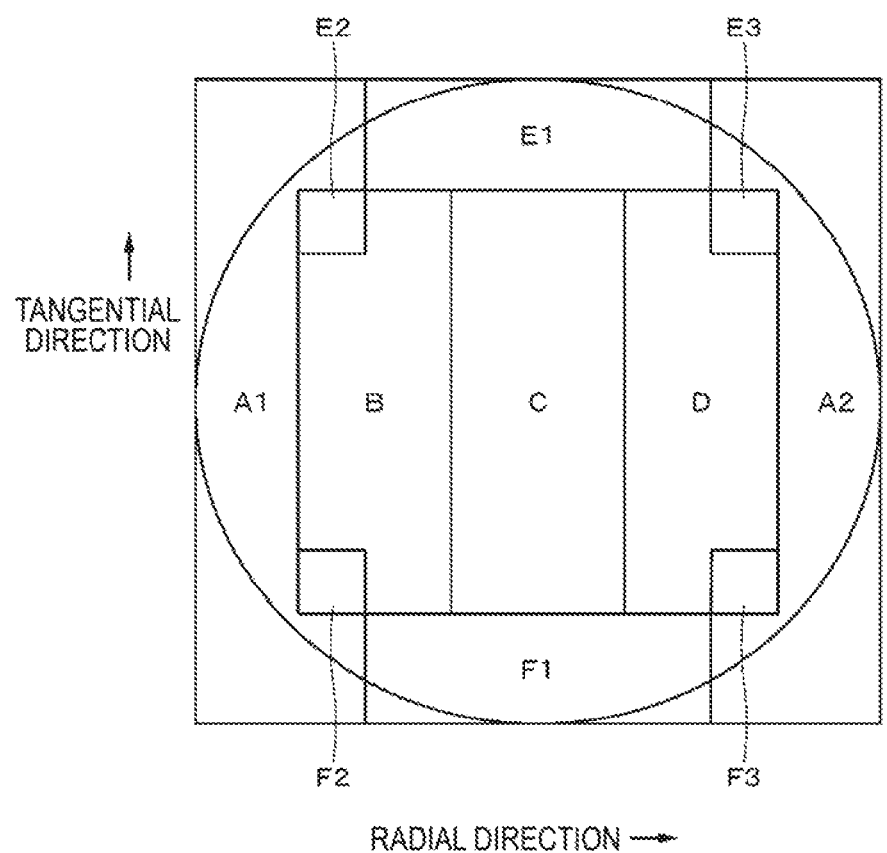
FIG. 79 is a schematic diagram showing a region division pattern IVTSP5.

As described above, the pattern IVNST6 shown in FIG. 60 (FIG. 79) is the best solution in substantially all characteristics. However, in some cases, it is desirable to reduce the number of channels in accordance with restriction of power consumption, the number of pins, a circuit scale, and the like of the signal processing circuit. A pattern IVTSP5 is a pattern in which the number of channels are reduced from six channels to five channels while the characteristics are being maintained. Herein, the region division positions in the radial direction are positions of ±0.25, ±0.5, and ±0.7 where the pupil radius is 1.0, and the region division positions in the tangential direction are positions of ±0.45 and ±0.65.

In terms of a method of reducing the number of channels, among the six channels of A to F in the pattern IVNST6, A, E, and F are maintained as they are, and signals of C are distributed to B and D, and thus five channels are achieved. That is, a signal of the channel B is set to B+(Ks×C), and a signal of the channel D is set to D+(Ks×C). A pattern in which the number of channels is reduced as described above is referred to as "pattern IVTSP5".

Description will be made on the basis of simulation results of the above pattern IVTSP5. Simulation conditions are as follows as in the case of "low linear density" described above.

LD 35.18 (GB) . . . 0.053 μm/channel bit
In the case of Tp=0.225 μm (both land and groove), the plane capacity is 50.0 GB.
NA=0.85 •PR (1233321) •Evaluation index: e-MLSE
Mark width=Tp×0.7 •Disc Noise and Amp Noise are present.

"Reproduction Performance"

FIG. 80 to FIG. 84 show simulation results of reproduction performance concerning the pattern IVTSP5. In each drawing, e-MLSE shows a characteristic obtained in the case where region division is not performed.

Figure 80:
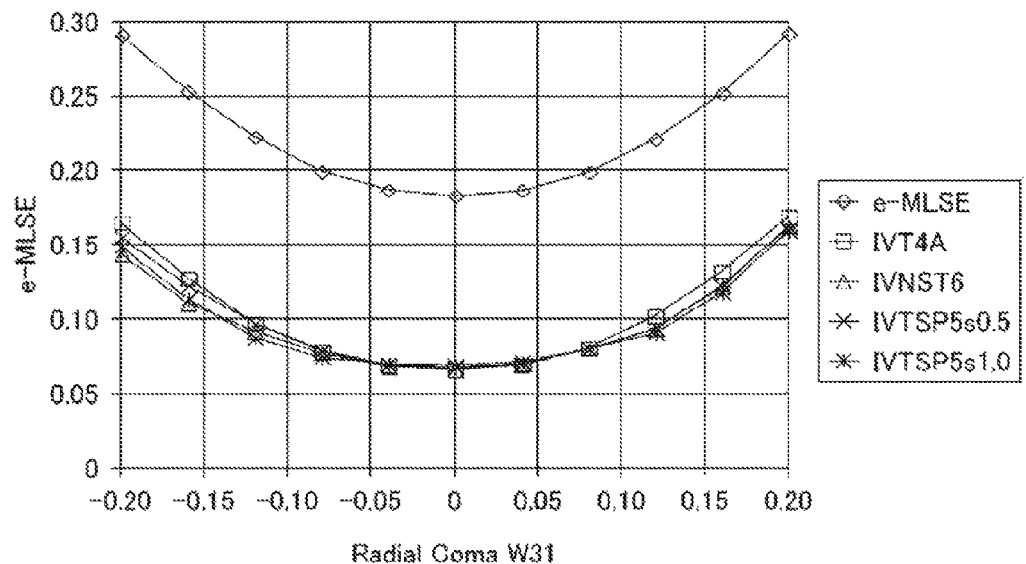
FIG. 80 is a graph for explaining a margin for comatic aberration in a radial direction concerning IVTSP5.

FIG. 80 shows radial comatic aberration margins concerning a pattern IVTSP5s0.5, a pattern IVTSP5s1.0, the above pattern IVNST6, and the above pattern IVT4. A vertical axis indicates an index e-MLSE, which is similar to the vertical axes in other graphs described above, and a horizontal axis indicates normalized radial comatic aberration W31. IVTSP5s0.5 means IVTSP5 where Ks=0.5. IVTSP5s1.0 means IVTSP5 where Ks=1.0.

Figure 81:
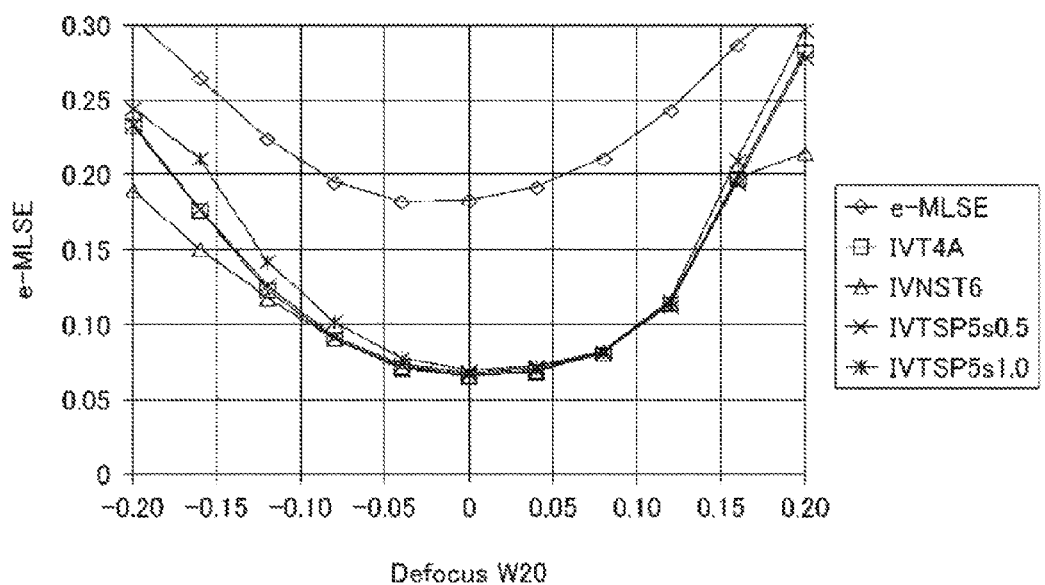
FIG. 81 is a graph for explaining a defocus margin concerning IVTSP5.

FIG. 81 shows defocus margins concerning the pattern IVTSP5s0.5, the pattern IVTSP5s1.0, the pattern IVNST6, and the pattern IVT4. A horizontal axis of a graph in FIG. 81 indicates a defocus amount W20 normalized by a wavelength. A value 0 means the defocus amount of 0. When reproduction is actually performed, defocus is generated and therefore it is necessary to have a margin for the defocus.

In a graph of (normalized defocus amount vs. index), reproduction performance is higher as a value of the e-MLSE is smaller. As an example, it is preferable that the value of the e-MLSE be substantially 0.15 or less. Therefore, the defocus margin corresponds to a width of a range where the value of the e-MLSE is substantially 0.15 or less. The defocus margin is larger as the width is larger.

Figure 82:
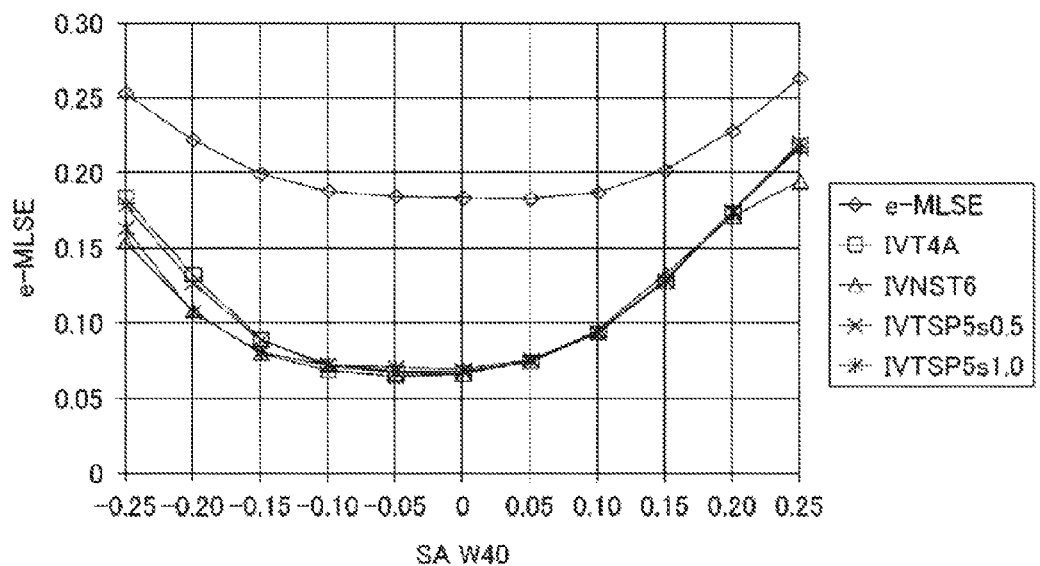
FIG. 82 is a graph for explaining a spherical aberration margin concerning IVTSP5.

FIG. 82 shows margins of the spherical aberration SA concerning the pattern IVTSP5s0.5, the pattern IVTSP5s1.0, the pattern IVNST6, and the pattern IVT4. A horizontal axis of a graph in FIG. 82 indicates a normalized spherical aberration amount W40.

Figure 83:
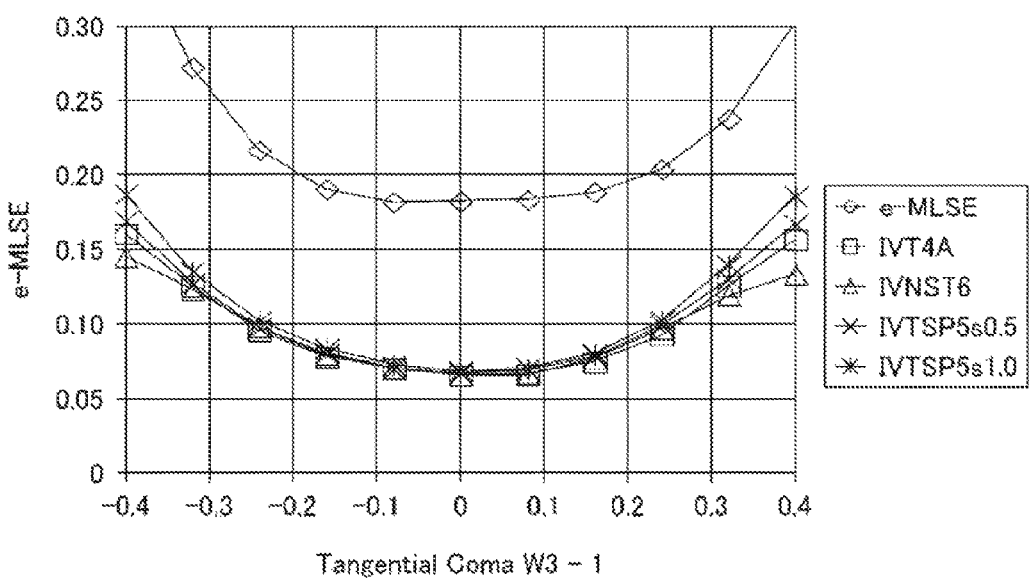
FIG. 83 is a graph for explaining a margin for comatic aberration in a tangential direction concerning IVTSP5.

FIG. 83 shows tangential comatic aberration margins concerning the pattern IVTSP5s0.5, the pattern IVTSP5s1.0, the pattern IVNST6, and the pattern IVT4. A horizontal axis of a graph in FIG. 83 indicates a normalized tangential comatic aberration amount W3-1.

Figure 84:
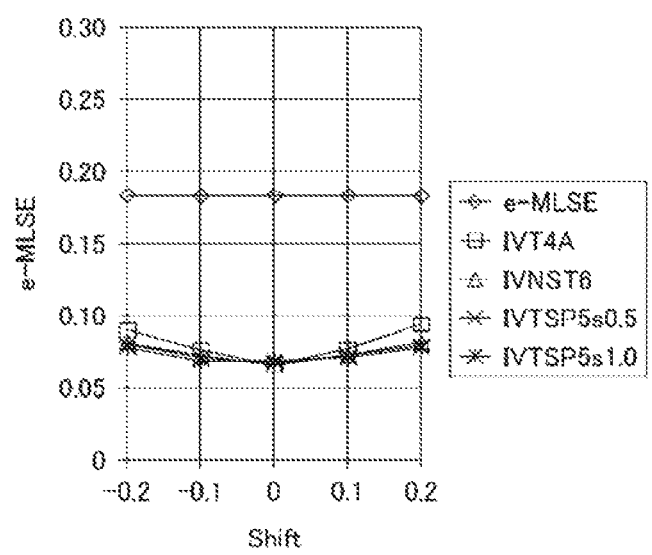
FIG. 84 is a graph for explaining a case where a pattern is shifted in a radial direction concerning IVTSP5.

FIG. 84 shows margins obtained in the case where the patterns are shifted in the radial direction concerning the pattern IVTSP5s0.5, the pattern IVTSP5s1.0, the pattern IVNST6, and the pattern IVT4. A horizontal axis of a graph in FIG. 84 indicates a normalized shift amount.

As is clear from those characteristics, when a ratio (Ks) of signals between regions is changed, it is found that "defocus margin and tangential comatic aberration margin" and "radial comatic aberration margin and spherical aberration margin" have a relationship of trade-off. It is also possible to switch a plurality of Ks and use the Ks depending on a difference in medium or the like.

In IVTSP5, a simple ratio of B to C to D is (B:C:D=1: 2Ks:1). When considering the above filter characteristics of the pattern IVNST6 as a basis, it is desirable to relatively strengthen C in the radial comatic aberration margin and the spherical aberration margin, and therefore (Ks>0.5) is advantageous to the two margins. As is clear from the graphs of Ks=0.5 and Ks=1.0, the simulation results also show the above point.

[Pattern IVTSM4] (the Number of Channels is Reduced while Characteristics are being Maintained)

Figure 85:
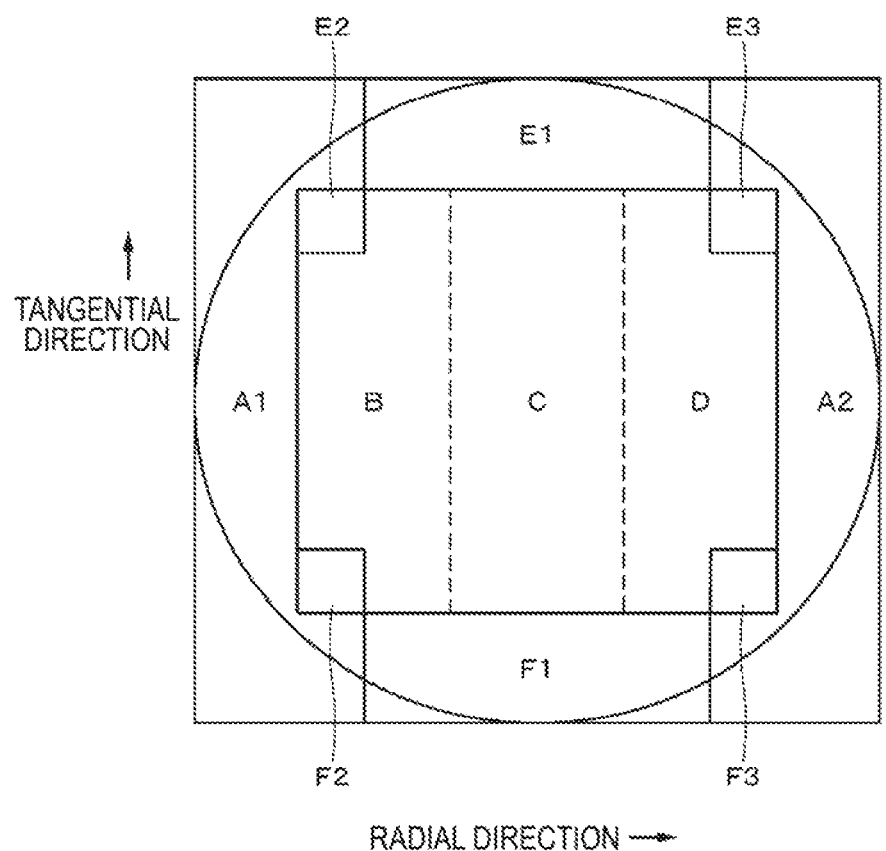
FIG. 85 is a schematic diagram used for explaining a pattern IVTSM4 in which the number of channels is reduced.

Although various characteristics of IVNST6 are improved as compared with IVT4, the radial comatic aberration margin and the spherical aberration margin can be improved by a way of thinking similar to the way of thinking regarding conversion from IVNST6 to IVTSP5 described above. A pattern IVTSM4 in which the number of channels are reduced from six channels to four channels while characteristics are being maintained will be described. As shown in FIG. 85, optically or electrically weighting the central regions (B, C, and D) is effective. Herein, the region division positions in the radial direction are positions of ±0.25, ±0.5, and ±0.7 where the pupil radius is 1.0, and the region division positions in the tangential direction are positions of ±0.45 and ±0.65.

In terms of a method of reducing the number of channels, among the six channels of A to F in the pattern IVNST6, A, E, and F are maintained as they are, and signals of the channels B, C, and D are set as a single channel of (C+Ksm×B+Ksm×D). A pattern in which the number of channels is reduced as described above is referred to as "pattern IVTSM4".

Description will be made on the basis of simulation results of the above pattern IVTSM4. Simulation conditions are as follows as in the case of "low linear density" described above. In each drawing, e-MLSE shows a characteristic obtained in the case where region division is not performed.

LD 35.18 (GB) . . . 0.053 μm/channel bit
In the case of Tp=0.225 μm (both land and groove), the plane capacity is 50.0 GB.
NA=0.85 •PR (1233321) •Evaluation index: e-MLSE
Mark width=Tp×0.7 • Disc Noise and Amp Noise are present.

"Reproduction Performance"

FIG. 86 to FIG. 90 show simulation results of reproduction performance concerning the pattern IVTSM4. In each drawing, e-MLSE shows a characteristic obtained in the case where region division is not performed.

Figure 86:
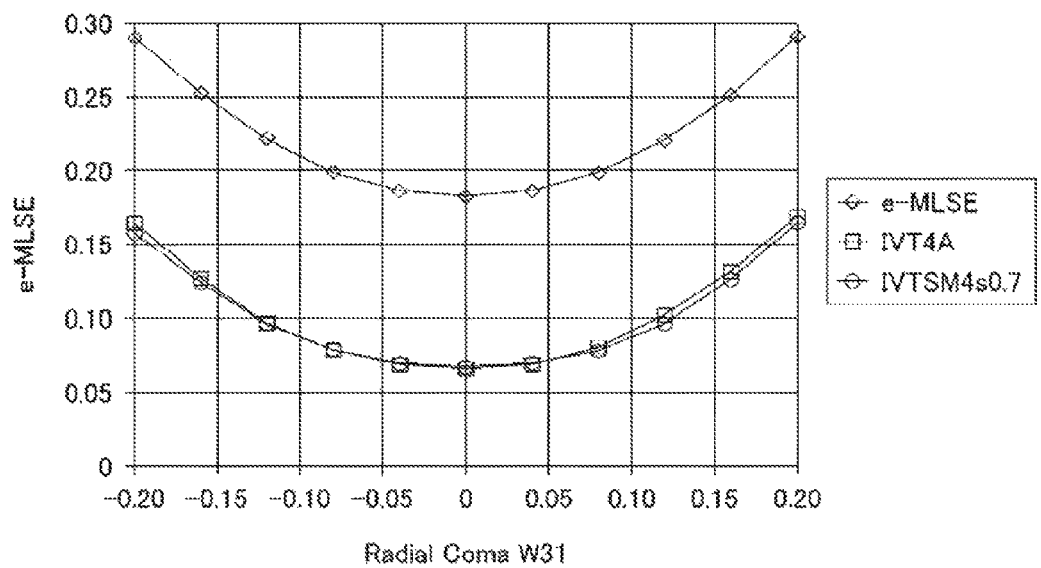
FIG. 86 is a graph for explaining a margin for comatic aberration in a radial direction concerning IVTSM4.

FIG. 86 shows radial comatic aberration margins concerning a pattern IVTSM4s0.7 and the above pattern IVT4. A vertical axis indicates an index e-MLSE, which is similar to the vertical axes in other graphs described above, and a horizontal axis indicates normalized radial comatic aberration W31. IVTSM4s0.7 means IVTSM4 where Ksm=0.7.

Figure 87:
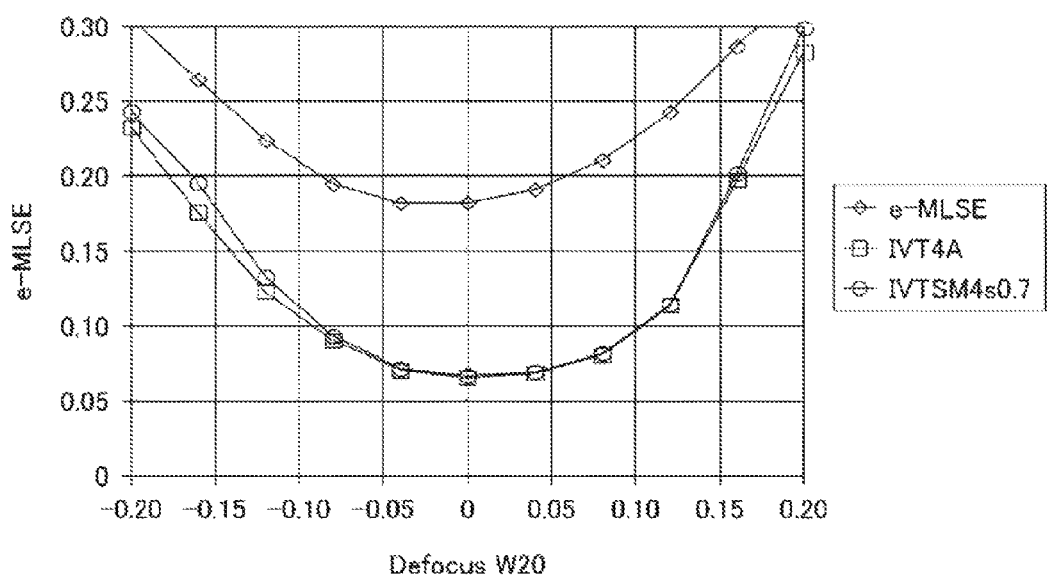
FIG. 87 is a graph for explaining a defocus margin concerning IVTSM4.

FIG. 87 shows defocus margins concerning the pattern IVTSM4s0.7 and the pattern IVT4. A horizontal axis of a graph in FIG. 87 indicates a defocus amount W20 normalized by a wavelength.

Figure 88:
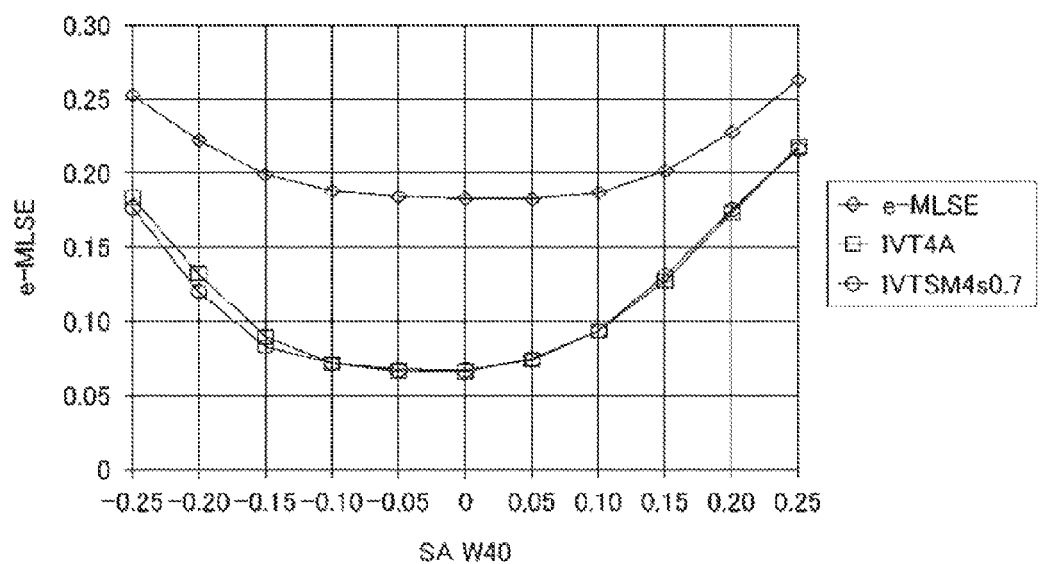
FIG. 88 is a graph for explaining a spherical aberration margin concerning IVTSM4.

FIG. 88 shows margins of the spherical aberration SA concerning the pattern IVTSM4s0.7 and the pattern IVT4. A horizontal axis of a graph in FIG. 88 indicates a normalized spherical aberration amount W40.

Figure 89:
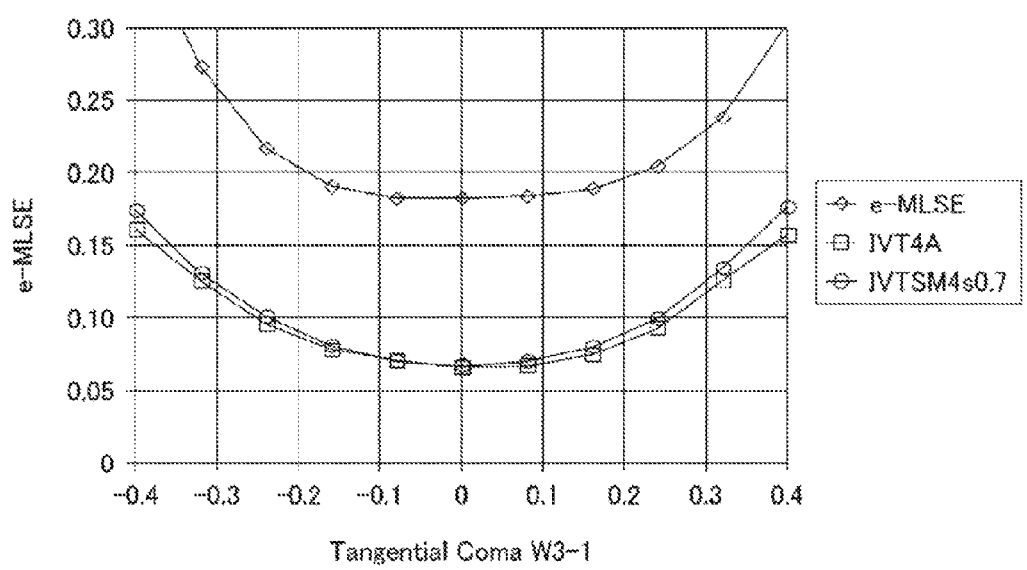
FIG. 89 is a graph for explaining a margin for comatic aberration in a tangential direction concerning IVTSM4.

FIG. 89 shows tangential comatic aberration margins concerning the pattern IVTSM4s0.7 and the pattern IVT4. A horizontal axis of a graph in FIG. 89 indicates a normalized tangential comatic aberration amount W3-1.

Figure 90:
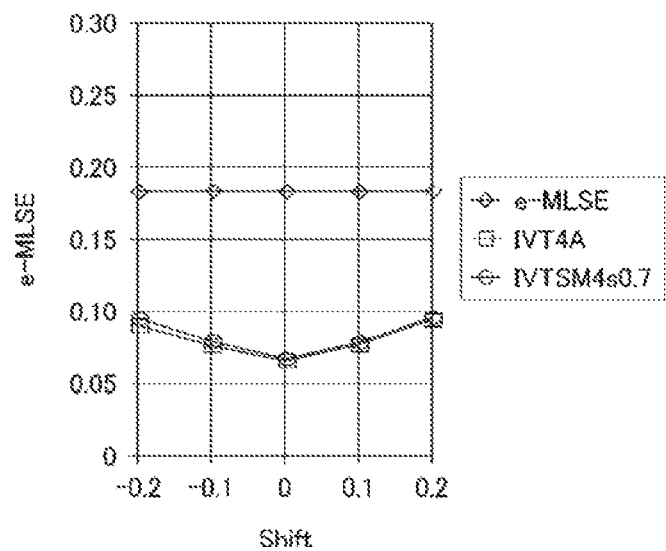
FIG. 90 is a graph for explaining a case where a pattern is shifted in a radial direction concerning IVTSM4.

FIG. 90 shows margins obtained in the case where the patterns are shifted in the radial direction concerning the pattern IVTSM4s0.7 and the pattern IVT4. A horizontal axis of a graph in FIG. 90 indicates a normalized shift amount.

As is clear from those characteristics, although the radial comatic aberration margin and the spherical aberration margin are improved, the defocus margin and the tangential comatic aberration margin slightly become narrower. Note that a pattern shift in the radial direction, which is remarkably deteriorated in IVT4, is not improved. Also in this case, it is also possible to switch a plurality of Ksm and use the Ksm depending on a difference in medium or the like.

[Pattern IVNS5] (the Number of Channels is Reduced while Characteristics are being Maintained)

Figure 91:
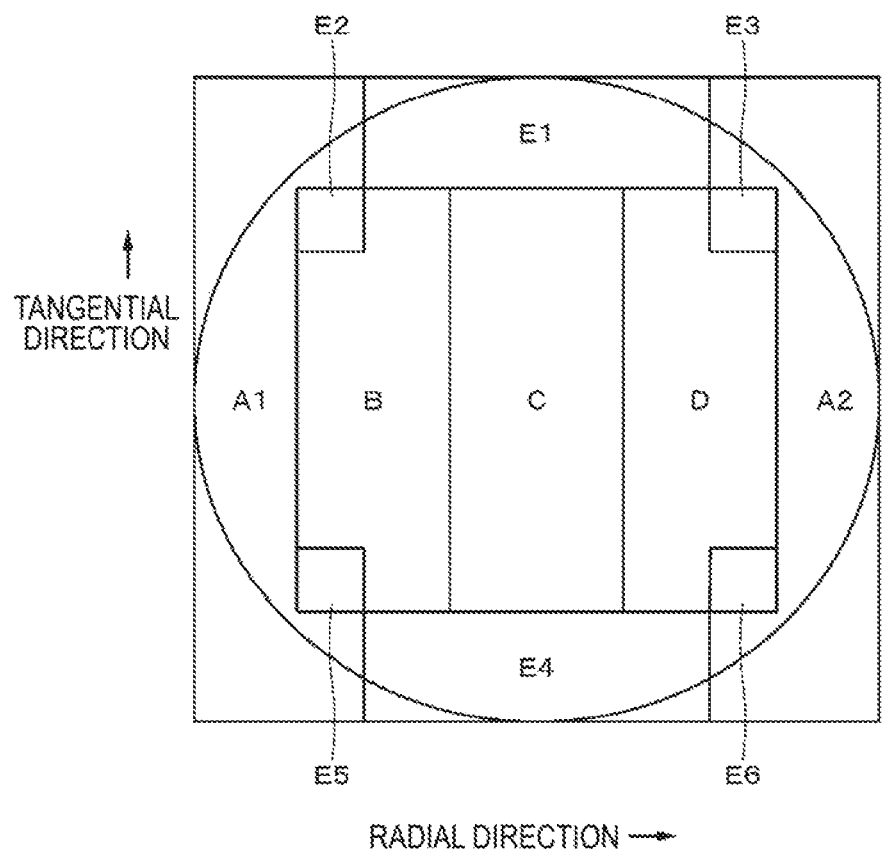
FIG. 91 is a schematic diagram showing a region division pattern IVNS5.

In the case where the linear-density is not considerably high, desired characteristics are obtained even in the case where channels whose center positions are different in the tangential direction are not provided. That is, as shown in FIG. 91, the two channels (E and F) of the pattern IVNST6 in the tangential direction are integrated into a single channel (E). Regions F1, F2, and F3 of the channel F are changed to regions E4, E5, and E6 of the channel E. A pattern in which the number of channels is reduced as described above is referred to as "pattern IVNS5". Herein, the region division positions in the radial direction are positions of ±0.25, ±0.5, and ±0.7 where the pupil radius is 1.0, and the region division positions in the tangential direction are positions of ±0.45 and ±0.65.

Description will be made on the basis of simulation results of the above pattern IVNS5. Simulation conditions are as follows as in the case of "low linear density" described above. In each drawing, e-MLSE shows a characteristic obtained in the case where region division is not performed.

LD 35.18 (GB) . . . 0.053 µm/channel bit

In the case of Tp=0.225 µm (both land and groove), the plane capacity is 50.0 GB.

NA=0.85 •PR (1233321) •Evaluation index: e-MLSE

Mark width=Tp×0.7 •Disc Noise and Amp Noise are present.

"Reproduction Performance"

FIG. 92 to FIG. 96 show simulation results of reproduction performance concerning the pattern IVNS5. In each drawing, e-MLSE shows a characteristic obtained in the case where region division is not performed.

Figure 92:
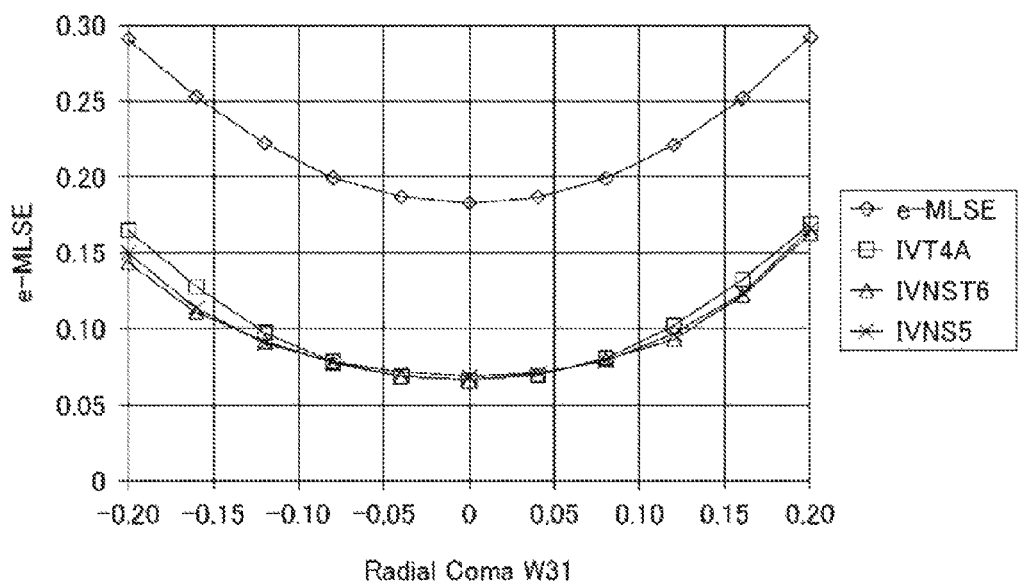
FIG. 92 is a graph for explaining a margin for comatic aberration in a radial direction concerning IVNS5.

FIG. 92 shows radial comatic aberration margins concerning the pattern IVNS5, the above pattern IVT4, and the above pattern IVNST6. A vertical axis indicates an index e-MLSE, which is similar to the vertical axes in other graphs described above, and a horizontal axis indicates normalized radial comatic aberration W31.

Figure 93:
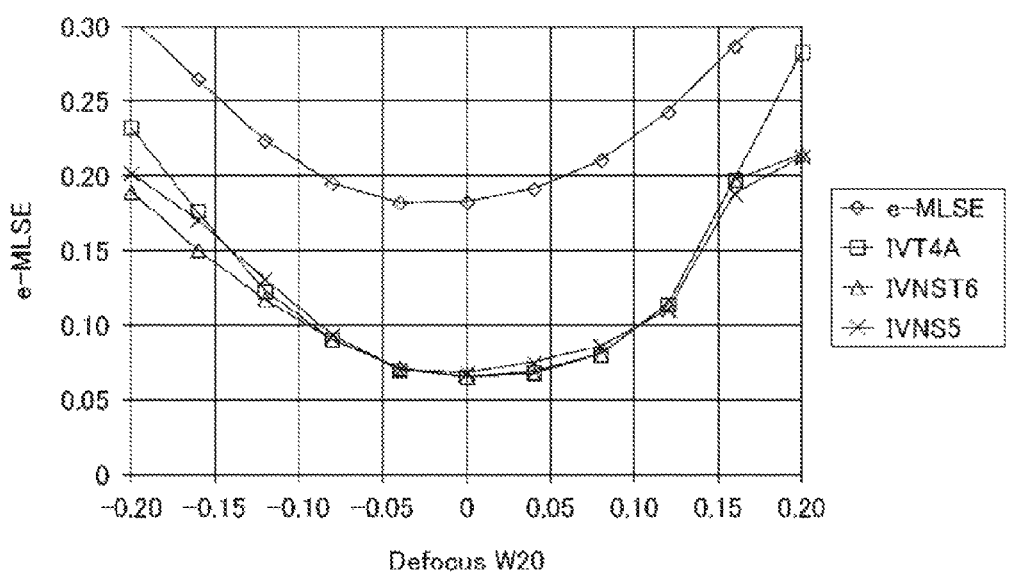
FIG. 93 is a graph for explaining a defocus margin concerning IVNS5.

FIG. 93 shows defocus margins concerning the pattern IVNS5, the pattern IVT4, and the pattern IVNST6. A horizontal axis of a graph in FIG. 93 indicates a defocus amount W20 normalized by a wavelength.

Figure 94:
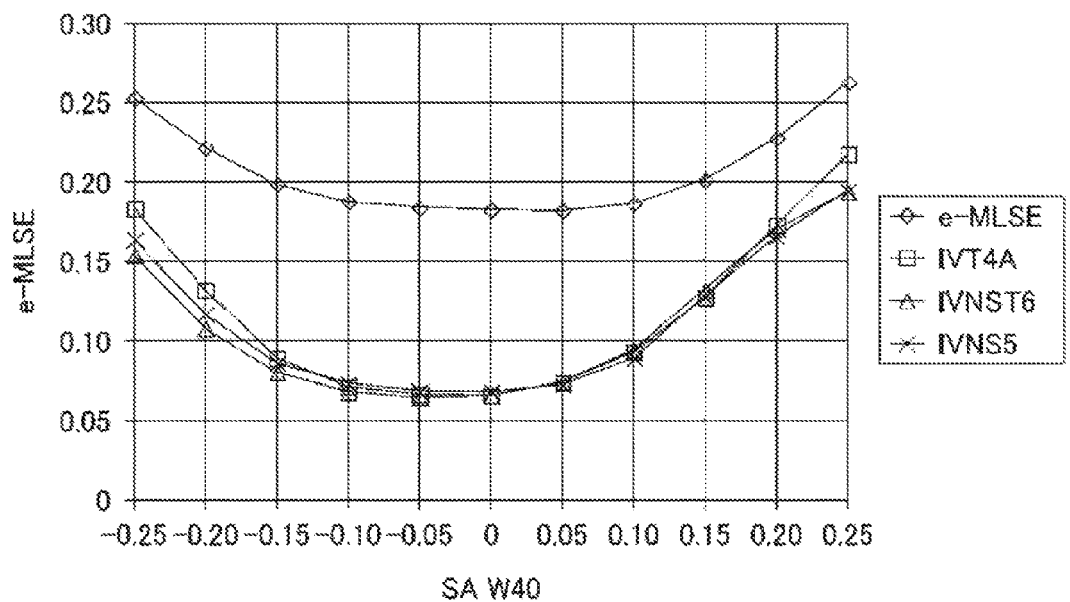
FIG. 94 is a graph for explaining a spherical aberration margin concerning IVNS5.

FIG. 94 shows margins of the spherical aberration SA concerning the pattern IVNS5, the pattern IVT4, and the pattern IVNST6. A horizontal axis of a graph in FIG. 94 indicates a normalized spherical aberration amount W40.

Figure 95:
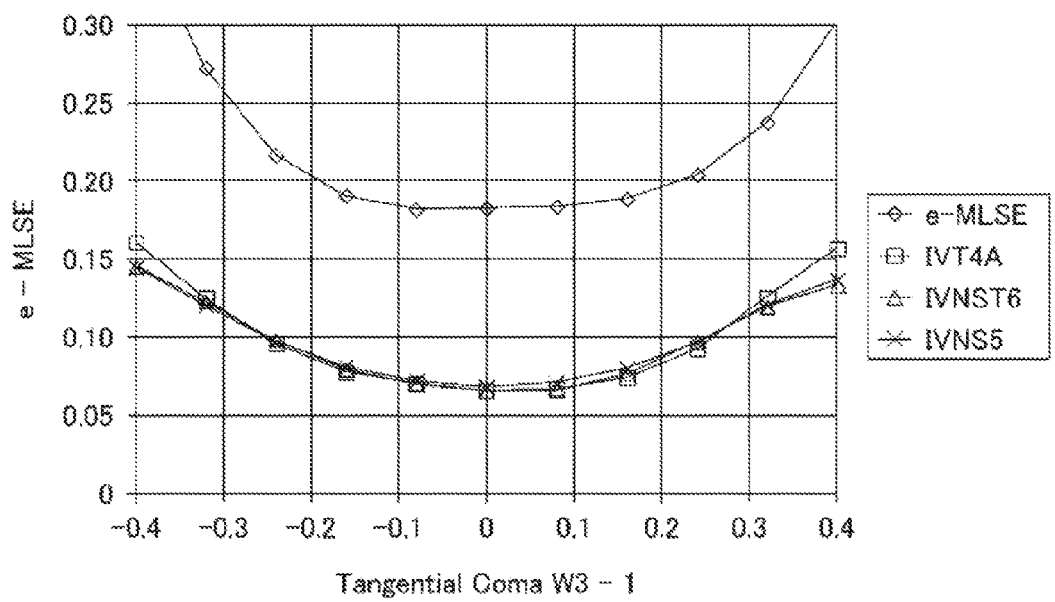
FIG. 95 is a graph for explaining a margin for comatic aberration in a tangential direction concerning IVNS5.

FIG. 95 shows tangential comatic aberration margins concerning the pattern IVNS5, the pattern IVT4, and the pattern IVNST6. A horizontal axis of a graph in FIG. 89 indicates a normalized tangential comatic aberration amount W3-1.

Figure 96:
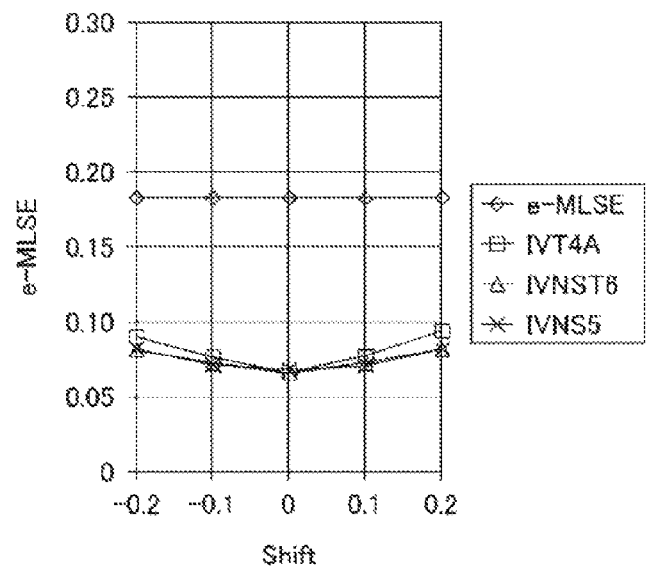
FIG. 96 is a graph for explaining a case where a pattern is shifted in a radial direction concerning IVNS5.

FIG. 96 shows margins obtained in the case where the patterns are shifted in the radial direction concerning the pattern IVNS5, the pattern IVT4, and the pattern IVNST6. A horizontal axis of a graph in FIG. 96 indicates a normalized shift amount.

As is clear from those characteristics, in the case where the linear-density is not considerably high, desired characteristics are obtained even in the case where channels whose center positions are different in the tangential direction are not provided.

"Electrical Filters Optimal for Pattern IVNS5"

Figure 97:
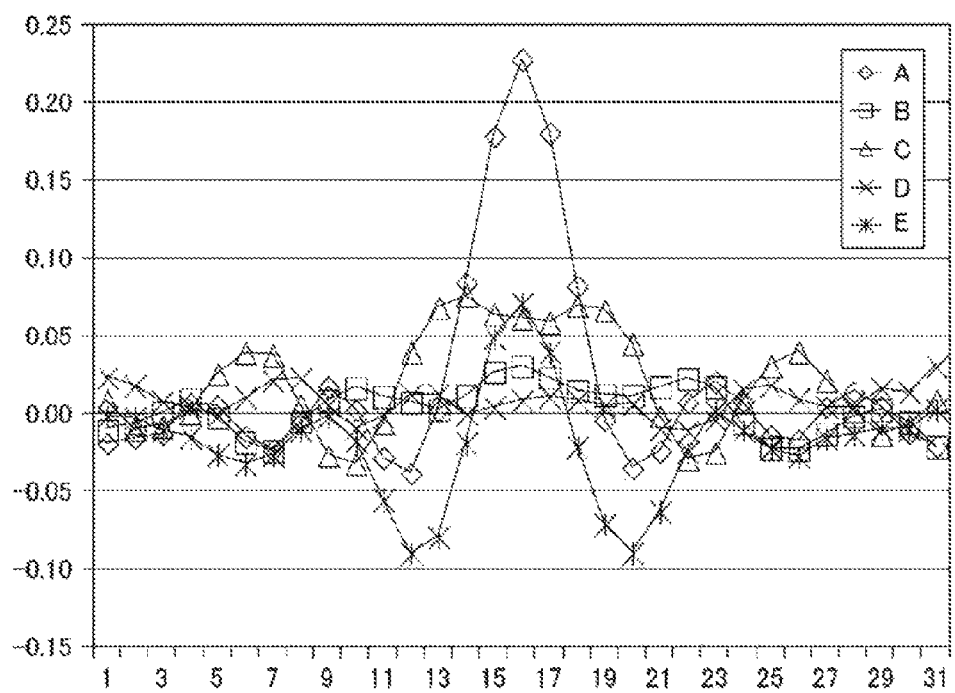
FIG. 97 is a graph showing an example of tap coefficients of electrical filters optimal for IVNS5.
Figure 98:
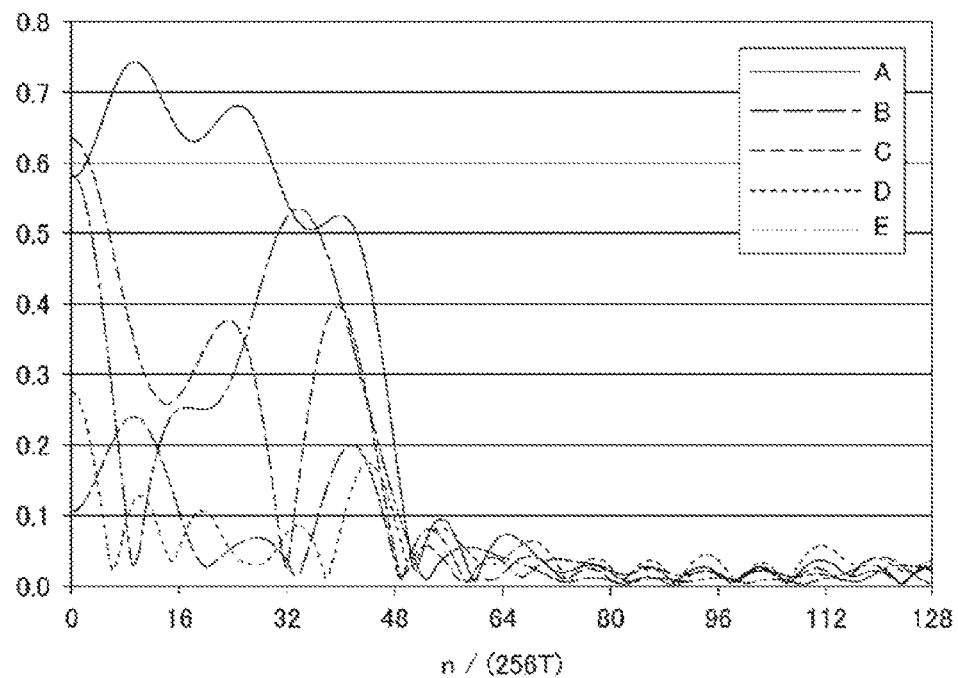
FIG. 98 is a graph showing frequency characteristics of electrical filters optimal for IVNS5.
Figure 99:
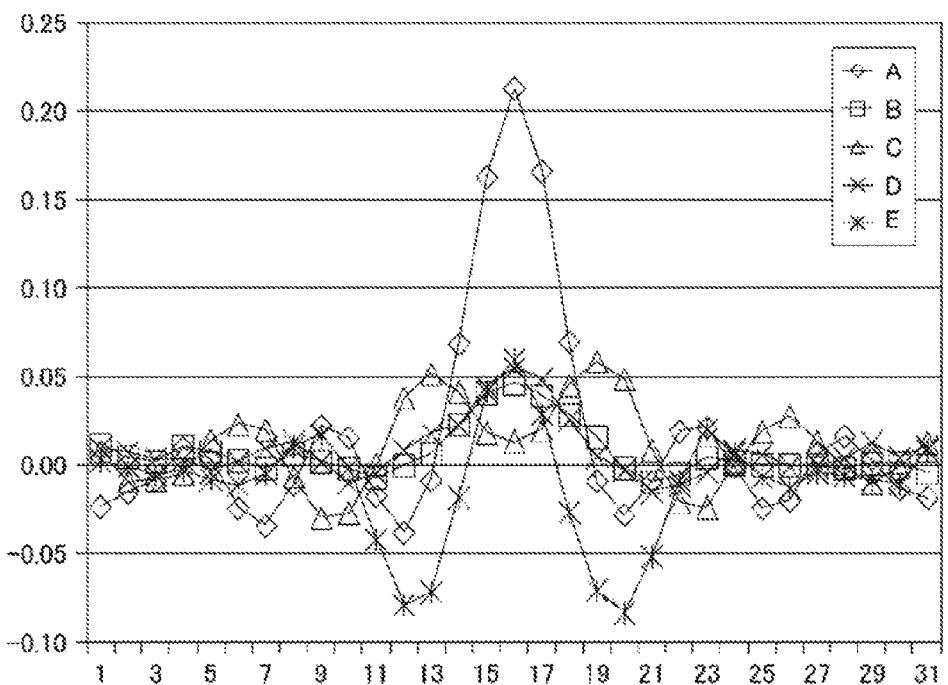
FIG. 99 is a graph showing an example of tap coefficients of electrical filters optimal for IVNS5.
Figure 100:
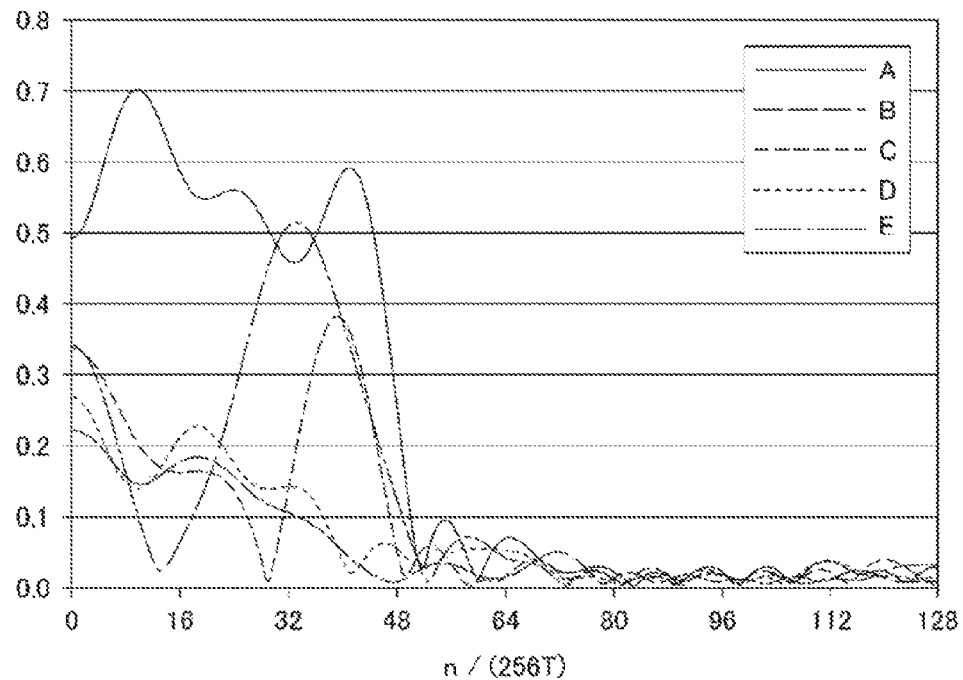
FIG. 100 is a graph showing frequency characteristics of electrical filters optimal for IVNS5.

Electrical filters optimal for the above pattern IVNS5 will be described. FIG. 99 shows an example of values of the coefficients of 31 taps in the electrical filters where W31=0 in FIG. 92, i.e., at the perturbation origin. The electrical filters are formed as FIR filters. FIG. 100 shows frequency amplitude characteristics of the respective channels corresponding to the regions A to E obtained in the case where the coefficients are set as described above. FIG. 97 shows an example of values of the coefficients of 31 taps in the electrical filters where W31=−0.16. FIG. 98 shows frequency amplitude characteristics of the respective channels of A to E obtained in the case where the coefficients are set as described above.

The filter characteristics of IVNS5 at the perturbation origin, which are shown in FIG. 99 and FIG. 100, have the following features. Filter characteristics of E corresponding to the outer regions in the tangential direction and A corresponding to the outer regions in the radial direction are similar to the filter characteristics of the outer regions in the tangential direction and the outer regions in the radial direction in H3A shown in FIG. 15 and FIGS. 16A and 16B. Although, regarding the central regions B, C, and D which are three regions divided in the radial direction, there is no great difference among the three regions B, C, and D at the perturbation origin in the above IVNST6, the exact central region C and the regions B and D on both sides of the exact central region C already have different filter characteristics at the perturbation origin. The central region C blocks a frequency band corresponding to a 4T signal (in the vicinity of a value 32 in the horizontal axis) which is similar to that of the central region in H3A and has a phase that is reversed from those of other channels at 180 deg. in a frequency band corresponding to a 3T signal (in the vicinity of a value 43 in the horizontal axis) (which is also found on the basis of a tap in the vicinity of the center in FIG. 99). On the contrary, B and D have filter characteristics similar to those of B and D in IVNST6.

As is clear from comparison between characteristics in FIG. 97 showing the tap coefficients of the respective channels obtained when radial comatic aberration is generated and FIG. 98 showing the frequency amplitude characteristics with characteristics in FIG. 99 showing the tap coefficients of the respective channels at the perturbation origin and FIG. 100 showing the frequency amplitude characteristics, the filters are such that, when the radial comatic aberration of W31=−0.16 is generated, among the three central channels of B, C, and D, C (exact center) is strengthened and B and D are considerably weakened in the same way as the case of IVNST6. With this, the favorable radial disc skew margin can be achieved in the pattern IVNS5, which is close to the radial disc skew margin in IVNST6.

Figure 101:
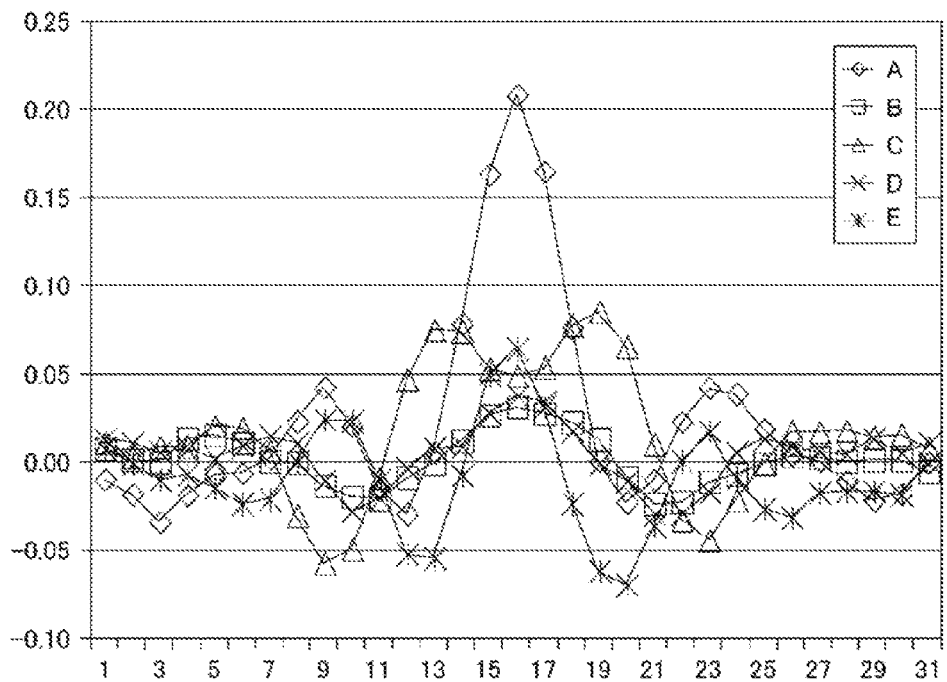
FIG. 101 is a graph showing an example of tap coefficients of electrical filters optimal for IVNS5.
Figure 102:
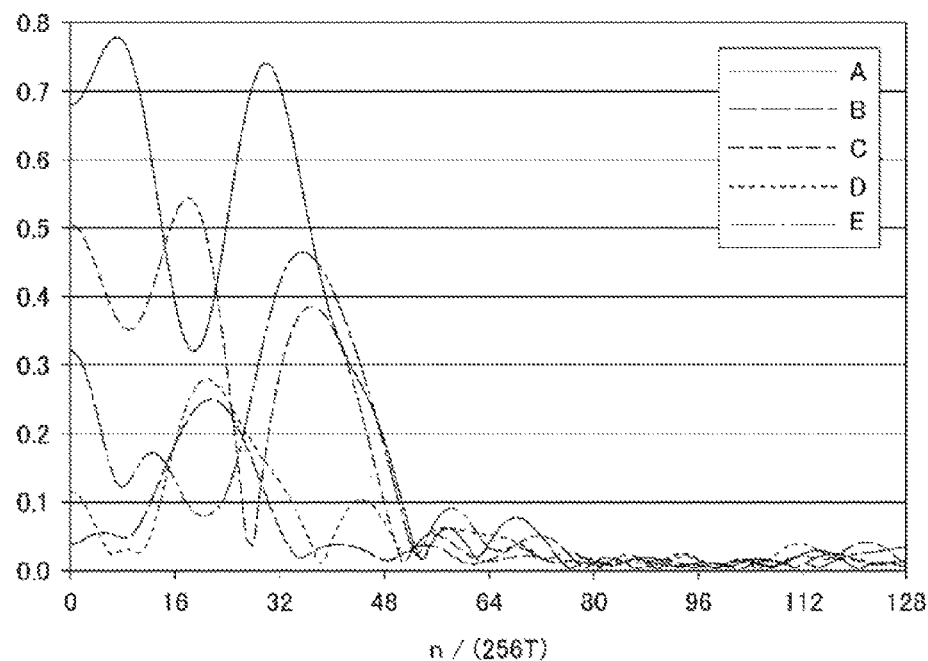
FIG. 102 is a graph showing frequency characteristics of electrical filters optimal for IVNS5.

FIG. 101 shows an example of values of the coefficients of 31 taps in the electrical filters where W40=−0.20 in characteristics of the spherical aberration SA in FIG. 94. The electrical filters are formed as FIR filters. FIG. 102 shows frequency amplitude characteristics of the respective channels of A to E obtained in the case where the coefficients are set as described above.

FIG. 101 shows an example of values of the coefficients of 31 taps in the electrical filters where W40=−0.20 in characteristics of the spherical aberration SA in FIG. 94. The electrical filters are formed as FIR filters. FIG. 102 shows frequency amplitude characteristics of the respective channels of A to E obtained in the case where the coefficients are set as described above.

As is clear from comparison between characteristics in FIG. 101 showing the tap coefficients of the respective channels obtained in a state in which spherical aberration is generated and FIG. 102 showing the frequency amplitude characteristics with characteristics in FIG. 99 showing the tap coefficients of the respective channels at the perturbation origin and FIG. 100 showing the frequency amplitude characteristics, the filters are such that, when the spherical aberration of W40=−0.20 is generated, among the three central channels of B, C, and D, C (exact center) is strengthened.

As is clear from comparison between FIG. 100 showing the characteristics at the perturbation origin and FIG. 98 showing the characteristics obtained in a state in which the radial comatic aberration is generated and comparison between FIG. 100 showing the characteristics at the perturbation origin and FIG. 102 showing characteristics obtained in a state in which the spherical aberration is generated, increase in margins for the radial comatic aberration and the spherical aberration is achieved by dividing the central portion into three channels B, C, and D in the case of the pattern IVNS5 as well as in the case of IVNST6. In the case of IVNS5, frequency characteristics of the filters are already different among C (exact center), B, and D in a state of the perturbation center, which is clearer than the case of IVNST6. In addition, the frequency characteristics of the filters are further changed among C (exact center), B, and D where the radial comatic aberration W31=−0.16 or the spherical aberration W40=−20.

"Perturbation/Aberration Detection Using Change in Electrical Filter Characteristics"

As described above, in IVNS5, as well as in IVNST6, in a state in which perturbation or aberration exists, the filter characteristics (tap coefficients) of the respective channels are characteristically changed depending on kinds of the perturbation or aberration (see Table 2).

TABLE 2

| Channel | Radial comatic aberration (W31) | Spherical aberration (W40) |
| --- | --- | --- |
| A | | |
| B | Weakened (DOWN) | |
| C | Strengthened (UP) | Strengthened (UP) |
| D | Weakened (DOWN) | |
| E | | |

The change in filter characteristics (tap coefficients) of the respective channels is different depending on the kind and the magnitude of perturbation, and therefore it is possible to detect what kind of perturbation is generated in the state from the filter characteristics (tap coefficients) and to what degree the perturbation is generated, and it is possible to make adjustment to eliminate a factor in a shift of the filter characteristics (tap coefficients) from the perturbation origin.

[Pattern IVSP4] (the Number of Channels is Reduced while Characteristics are being Maintained)

It is possible to consider IVSP4 on the basis of IVNS5 in the same way as IVTSP5 considered on the basis of IVNST6. That is, it is possible to reduce the number of channels in accordance with restriction of power consumption, the number of pins, a circuit scale, and the like of the signal processing circuit by using a method of optically or electrically sharing the central region C.

In terms of a method of reducing the number of channels, among the five channels of A to E in the pattern IVNS5 (see FIG. 91), A and E are maintained as they are, and signals of C are distributed to B and D, and thus four channels are achieved. That is, a signal of the channel B is set to B+(Ks×C), and a signal of the channel D is set to D+(Ks×C). A pattern in which the number of channels is reduced as described above is referred to as "pattern IVSP4".

Description will be made on the basis of simulation results of the above pattern IVSP4. Simulation conditions are as follows as in the case of "low linear density" described above.

LD 35.18 (GB) . . . 0.053 μm/channel bit
In the case of Tp=0.225 μm (both land and groove), the plane capacity is 50.0 GB.
NA=0.85 •PR (1233321) •Evaluation index: e-MLSE
Mark width=Tp×0.7 •Disc Noise and Amp Noise are present.

"Reproduction Performance"

FIG. 103 to FIG. 111 show simulation results of reproduction performance concerning the pattern IVSP4. In each drawing, e-MLSE shows a characteristic obtained in the case where region division is not performed.

Figure 103:
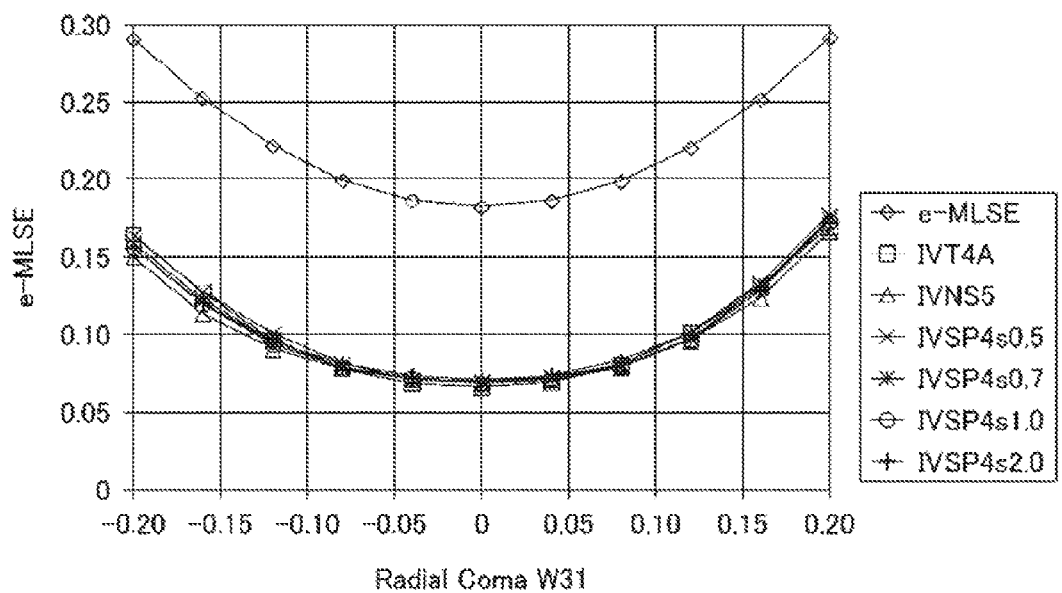
FIG. 103 is a graph for explaining a margin for comatic aberration in a radial direction concerning a pattern IVSP4 in which the number of channels is reduced.

FIG. 103 shows radial comatic aberration margins concerning IVSP4s0.5, IVSP4s0.7, IVSP4s1.0, IVSP4s2.0, the above pattern IVNS5, and the above pattern IVT4. A vertical axis indicates an index e-MLSE, which is similar to the vertical axes in other graphs described above, and a horizontal axis indicates normalized radial comatic aberration W31. IVSP4s0.5 means IVSP4 where Ks=0.5. IVSP4s0.7 means IVSP4 where Ks=0.7. IVSP4s1.0 means IVSP4 where Ks=1.0. IVSP4s2.0 means IVSP4 where Ks=2.0.

Figure 104:
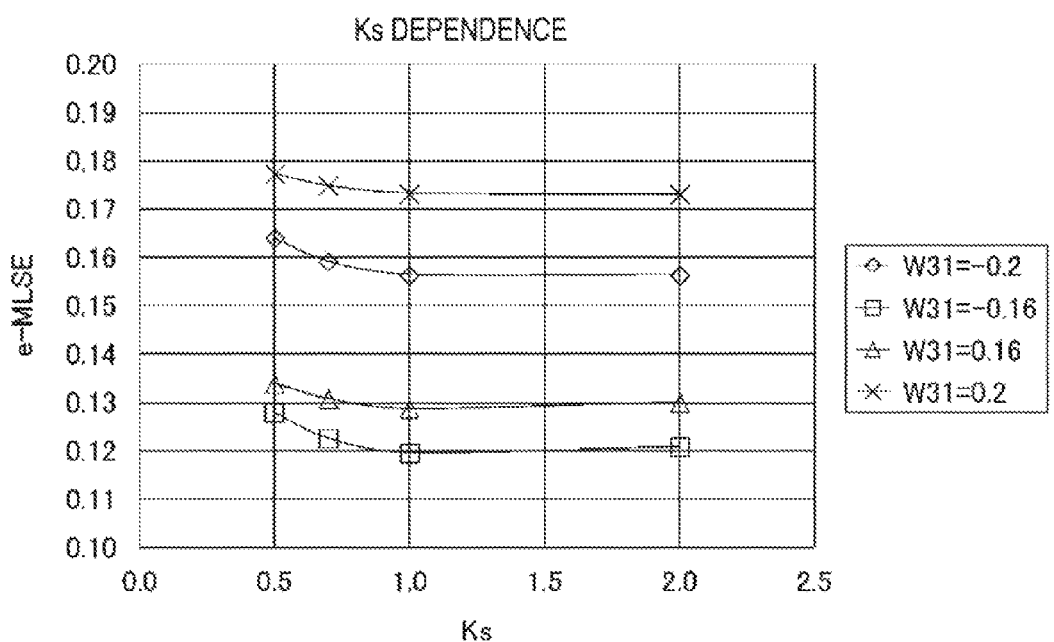
FIG. 104 is a graph showing coefficient dependence of a margin for comatic aberration in a radial direction.

FIG. 104 shows dependence of the radial comatic aberration margin on the coefficient Ks. The radial comatic aberration margin is remarkably deteriorated in a direction in which Ks becomes small. The radial comatic aberration margin is the best in the vicinity of Ks=1.

Figure 105:
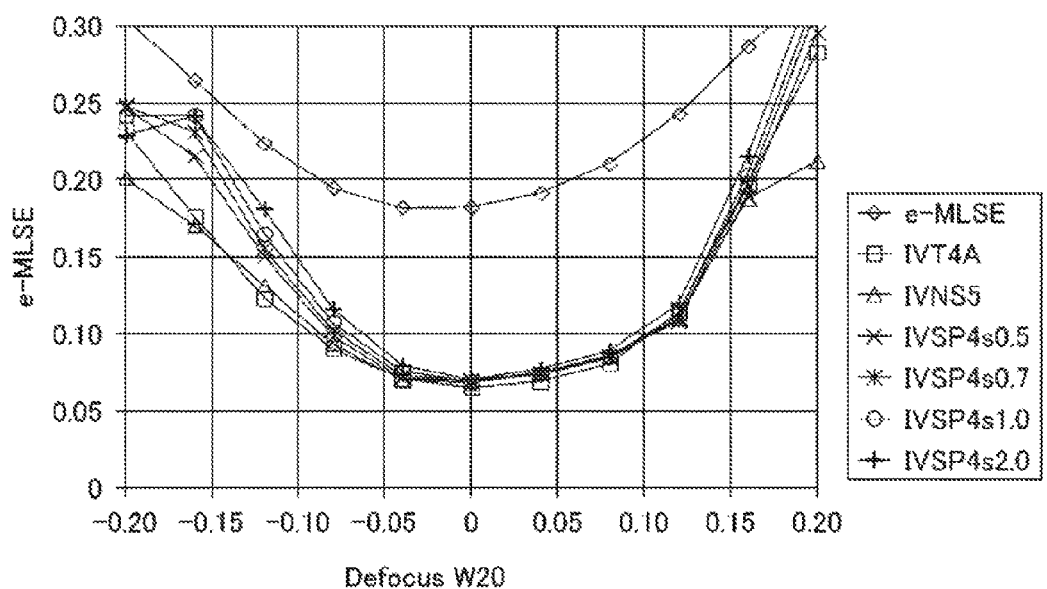
FIG. 105 is a graph for explaining a defocus margin concerning IVSP4.

FIG. 105 shows defocus margins concerning IVSP4s0.5, IVSP4s0.7, IVSP4s1.0, IVSP4s2.0, IVNS5, and IVT4. A horizontal axis of a graph in FIG. 105 indicates a defocus amount W20 normalized by a wavelength.

Figure 106:
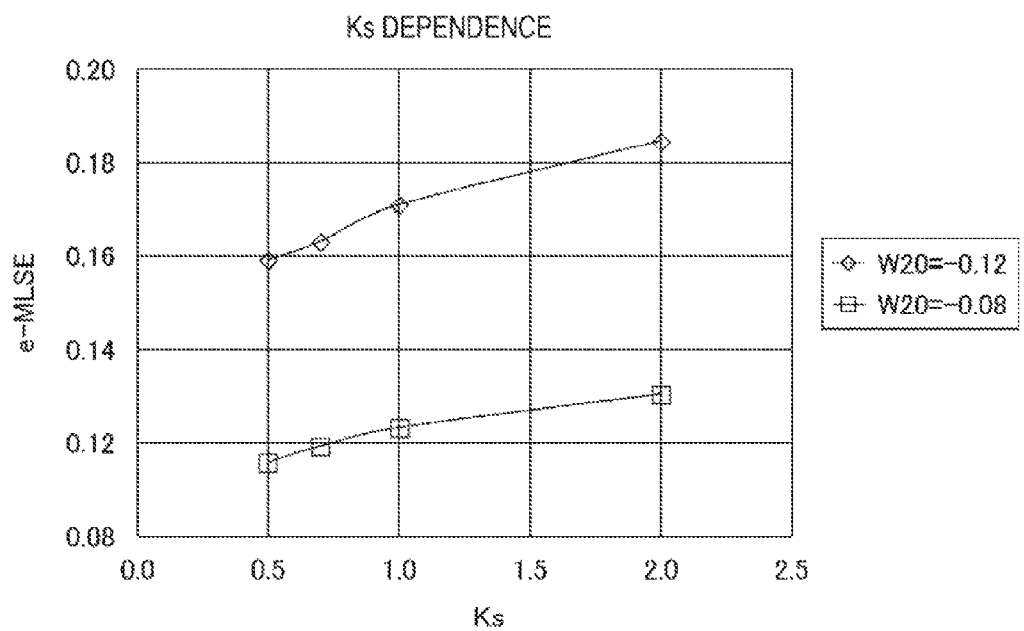
FIG. 106 is a graph showing coefficient dependence of a defocus margin.

FIG. 106 shows dependence of the defocus margin on the coefficient Ks. The defocus margin is favorable when Ks is small.

Figure 107:
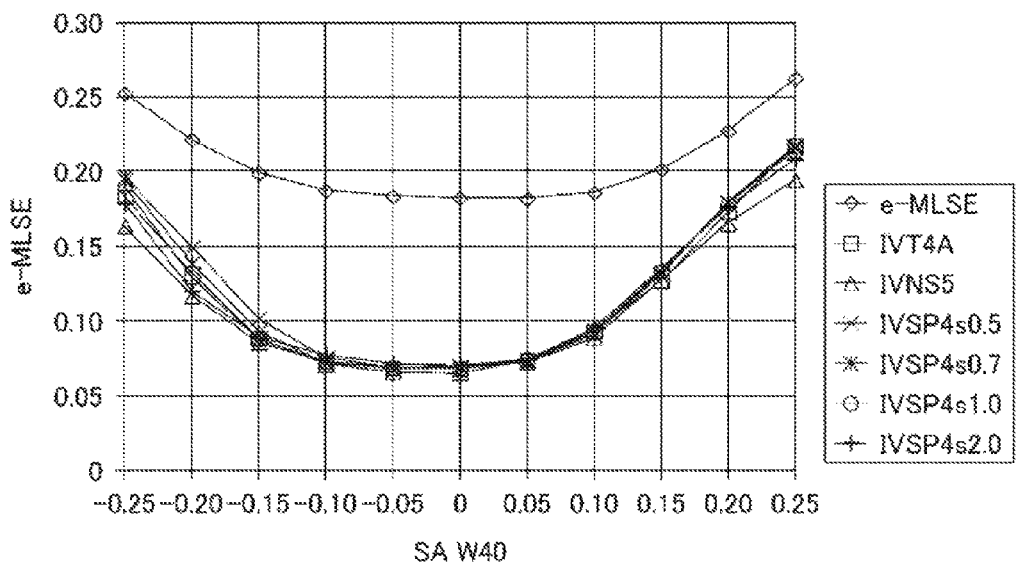
FIG. 107 is a graph for explaining a spherical aberration margin concerning IVSP4.

FIG. 107 shows margins of the spherical aberration SA concerning IVSP4s0.5, IVSP4s0.7, IVSP4s1.0, IVSP4s2.0, IVNS5, and IVT4. A horizontal axis of a graph in FIG. 107 indicates a normalized spherical aberration amount W40.

Figure 108:
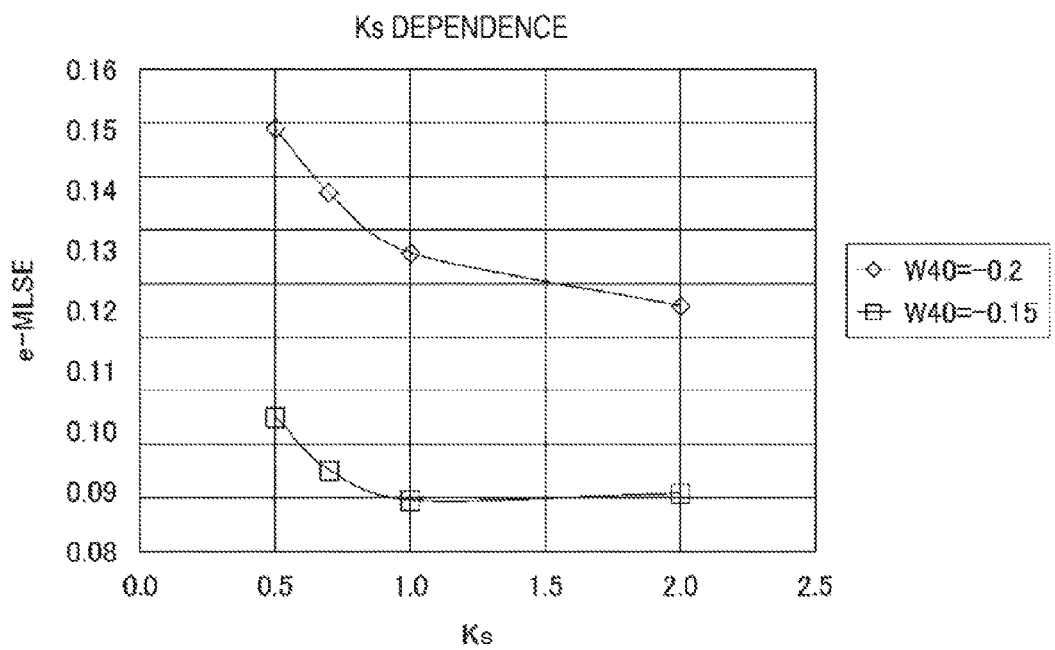
FIG. 108 is a graph showing coefficient dependence of a spherical aberration margin.

FIG. 108 shows dependence of the spherical aberration margin on the coefficient Ks. The spherical aberration margin is favorable when Ks is large.

Figure 109:
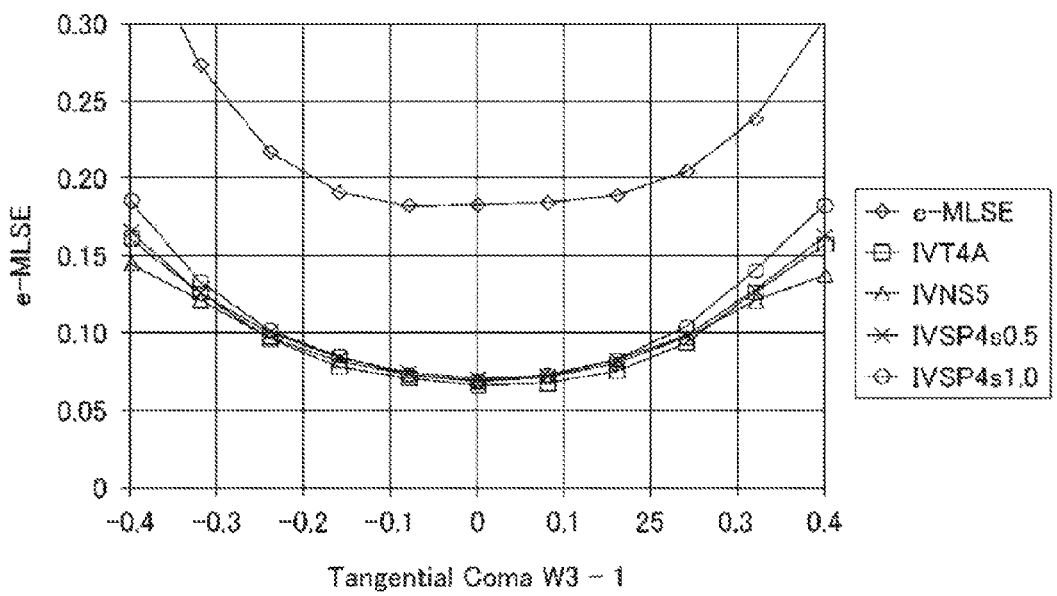
FIG. 109 is a graph for explaining a margin for comatic aberration in a tangential direction concerning IVSP4.

FIG. 109 shows tangential comatic aberration margins concerning IVSP4s0.5, IVSP4s1.0, IVNS5, and IVT4. A horizontal axis of a graph in FIG. 109 indicates a normalized tangential comatic aberration amount W3-1.

Figure 110:
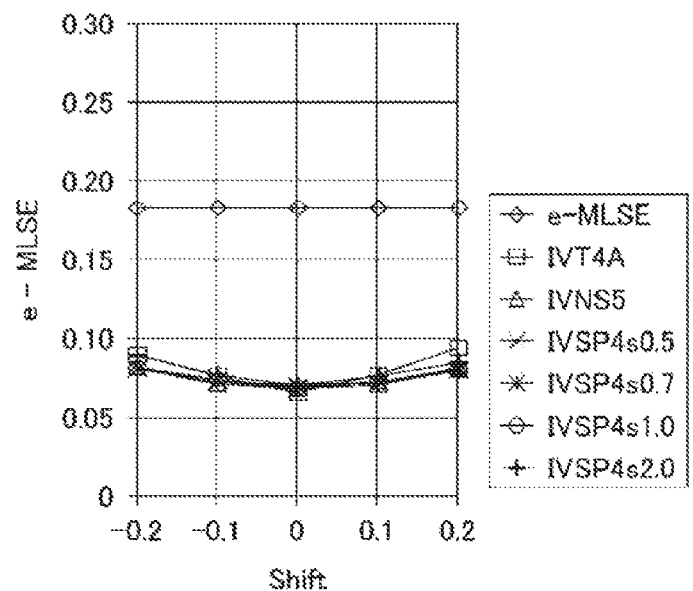
FIG. 110 is a graph for explaining a case where a pattern is shifted in a radial direction concerning IVSP4.
Figure 111:
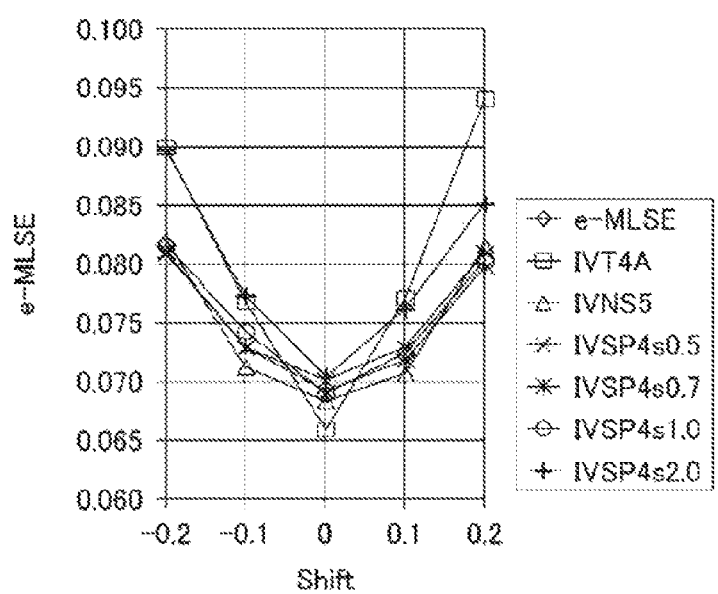
FIG. 111 is a graph for explaining a case where a pattern is shifted in a radial direction concerning IVSP4.

FIG. 110 shows margins obtained in the case where the patterns are shifted in the radial direction concerning IVSP4s0.5, IVSP4s0.7, IVSP4s1.0, IVSP4s2.0, IVNS5, and IVT4. A horizontal axis of a graph in FIG. 110 indicates a normalized shift amount. Similarly, FIG. 111 shows margins obtained in the case where the patterns are shifted in the radial direction. As compared with FIG. 110, the vertical axis (e-MLSE) is enlarged, and therefore the graphs are easily distinguished.

As is clear from those characteristics, when a ratio (Ks) of signals between regions is changed, it is found that "defocus margin and tangential comatic aberration margin" and "radial comatic aberration margin and spherical aberration margin" have a relationship of trade-off. It is also possible to switch a plurality of Ks and use the Ks depending on a difference in medium or the like.

[Pattern IVos4] (the Number of Channels is Reduced while Characteristics are being Maintained)

By using a method of optically or electrically sharing the central region C in IVNS5 as well as in IVSP4, it is possible to reduce the number of channels in accordance with restriction of power consumption, the number of pins, a circuit scale, and the like of the signal processing circuit.

Figure 112:
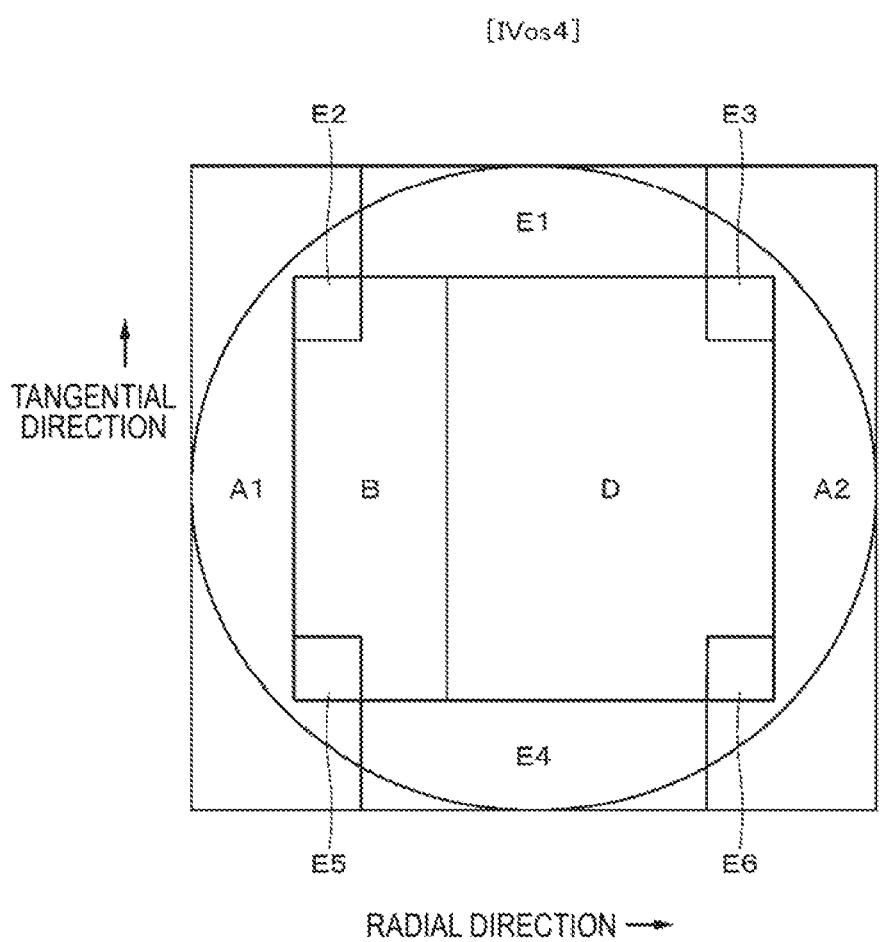
FIG. 112 is a schematic diagram used for explaining a pattern IVos4 in which the number of channels is reduced.

In terms of a method of reducing the number of channels, among the five channels of A to E in the pattern IVNS5 (see FIG. 91), A and E are maintained as they are, and signals of C are distributed to B and D, and thus four channels are achieved. That is, a signal of the channel B is set to B+(Ks1×C), and a signal of the channel D is set to D+(Ks2×C) (Ks1≠Ks2). In the case of (Ks1=0, Ks2=1), pattern division is similar to pattern division shown in FIG. 112. A pattern in which the number of channels is reduced as described above is referred to as "pattern IVos4". Herein, region division positions in the radial direction are positions of ±0.25, ±0.5, and ±0.7 where the pupil radius is 1.0, and the region division positions in the tangential direction are positions of ±0.45 and ±0.65.

Description will be made on the basis of simulation results of the above pattern IVos4. Simulation conditions are as follows as in the case of "low linear density" described above.

LD 35.18 (GB) . . . 0.053 µm/channel bit
In the case of Tp=0.225 µm (both land and groove), the plane capacity is 50.0 GB.
NA=0.85 •PR (1233321) •Evaluation index: e-MLSE
Mark width=Tp×0.7 •Disc Noise and Amp Noise are present.

"Reproduction Performance"

FIG. 113 to FIG. 118 show simulation results of reproduction performance concerning the pattern IVos4. In each drawing, e-MLSE shows a characteristic obtained in the case where region division is not performed.

Figure 113:
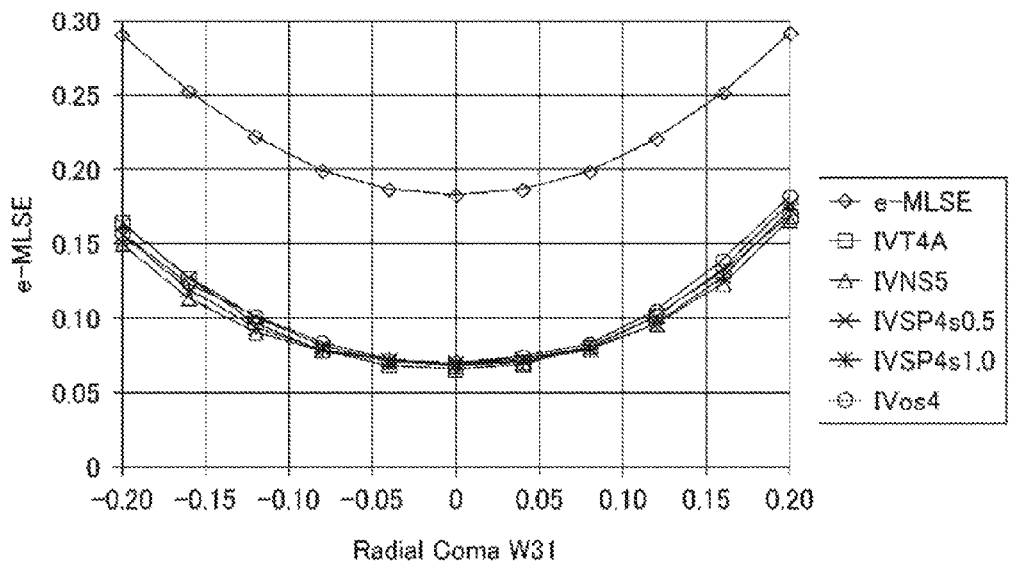
FIG. 113 is a graph for explaining a margin for comatic aberration in a radial direction concerning IVos4.

FIG. 113 shows radial comatic aberration margins concerning IVos4, IVSP4s0.5, IVSP4s1.0, IVNS5, and IVT4. A vertical axis indicates an index e-MLSE, which is similar to the vertical axes in other graphs described above, and a horizontal axis indicates normalized radial comatic aberration W31. IVos4 indicates a characteristic in the case of (Ks1=0, Ks2=1).

Figure 114:
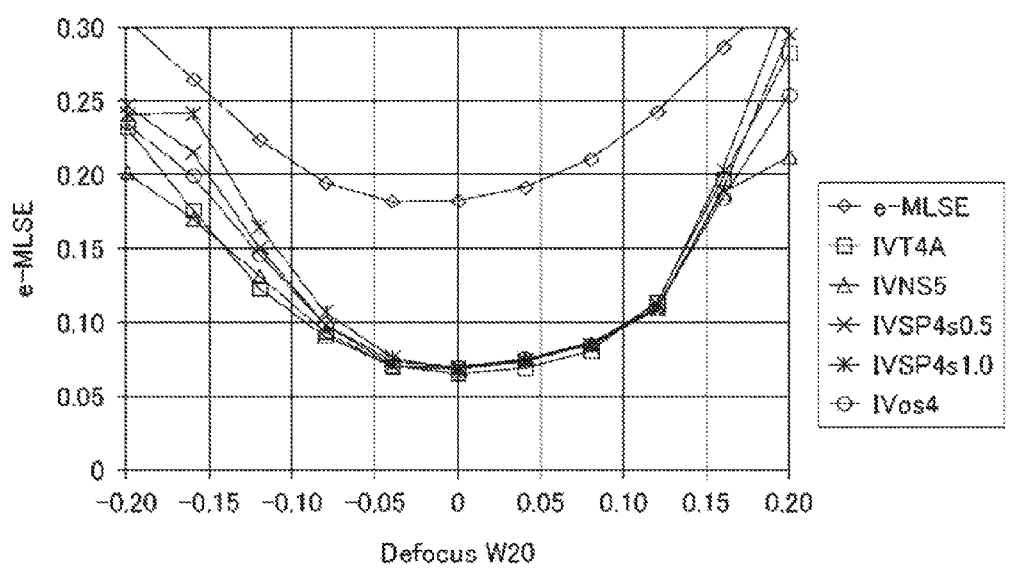
FIG. 114 is a graph for explaining a defocus margin concerning IVos4.

FIG. 114 shows defocus margins concerning IVos4, IVSP4s0.5, IVSP4s1.0, IVNS5, and IVT4. A horizontal axis of a graph in FIG. 114 indicates a defocus amount W20 normalized by a wavelength.

Figure 115:
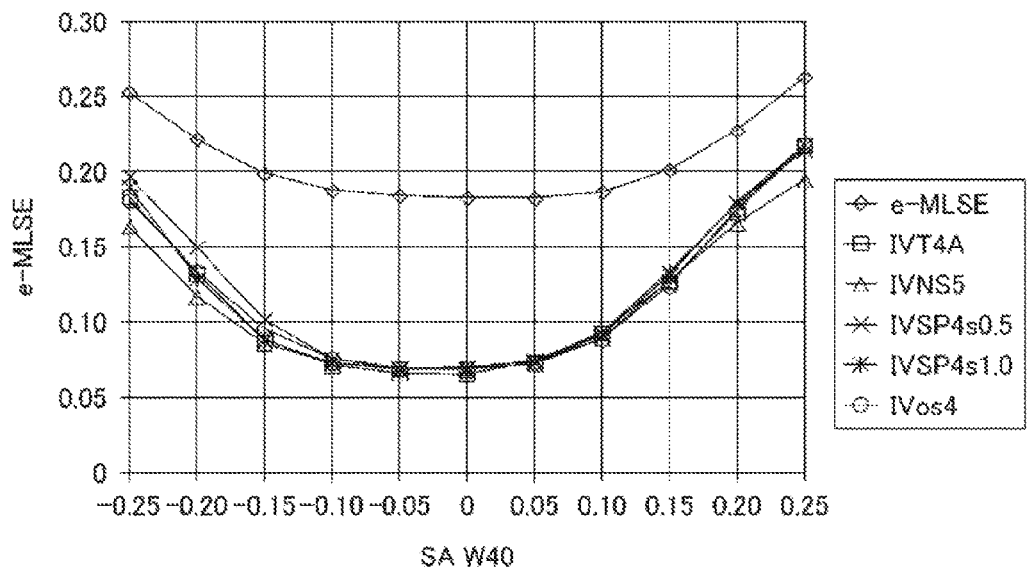
FIG. 115 is a graph for explaining a spherical aberration margin concerning IVos4.

FIG. 115 shows margins of the spherical aberration SA concerning IVos4, IVSP4s0.5, IVSP4s1.0, IVNS5, and IVT4. A horizontal axis of a graph in FIG. 115 indicates a normalized spherical aberration amount W40.

Figure 116:
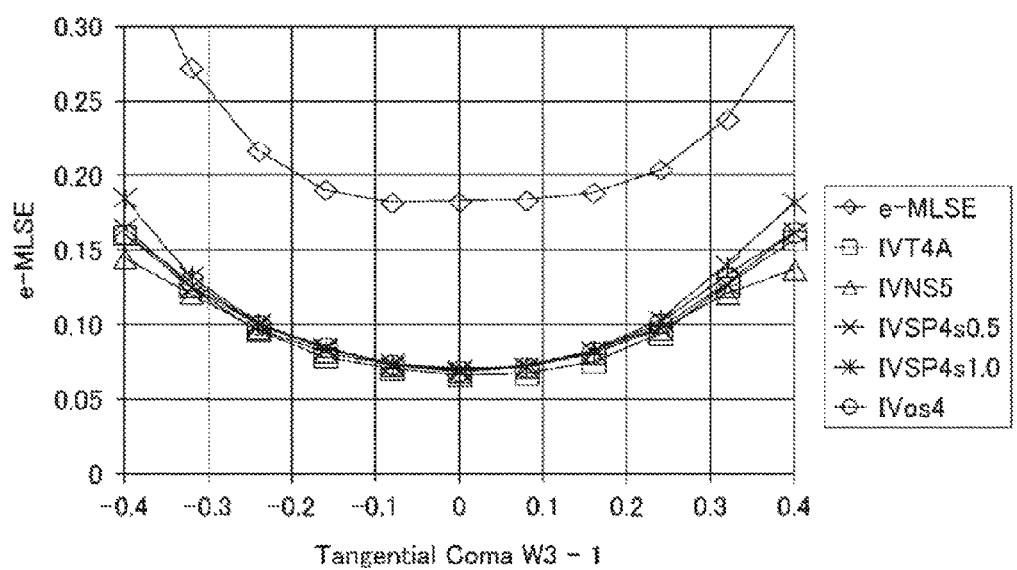
FIG. 116 is a graph for explaining a margin for comatic aberration in a tangential direction concerning IVos4.

FIG. 116 shows tangential comatic aberration margins concerning IVos4, IVSP4s0.5, IVSP4s1.0, IVNS5, and IVT4. A horizontal axis of a graph in FIG. 116 indicates a normalized tangential comatic aberration amount W3-1.

Figure 117:
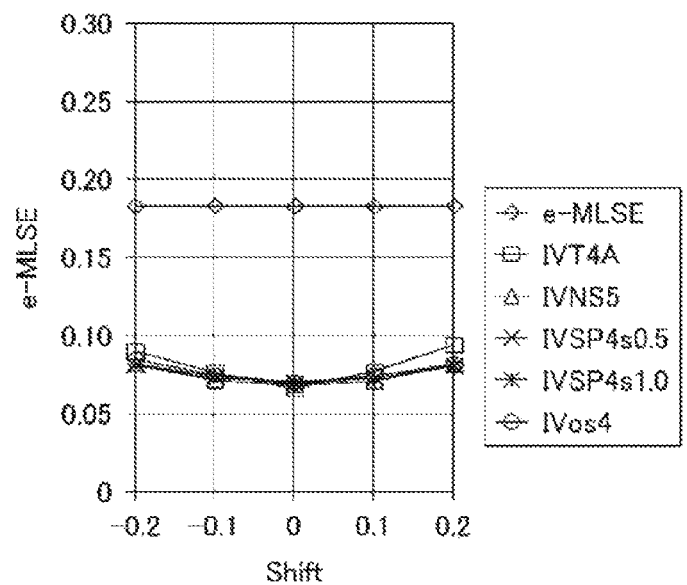
FIG. 117 is a graph for explaining a case where a pattern is shifted in a radial direction concerning IVos4.
Figure 118:
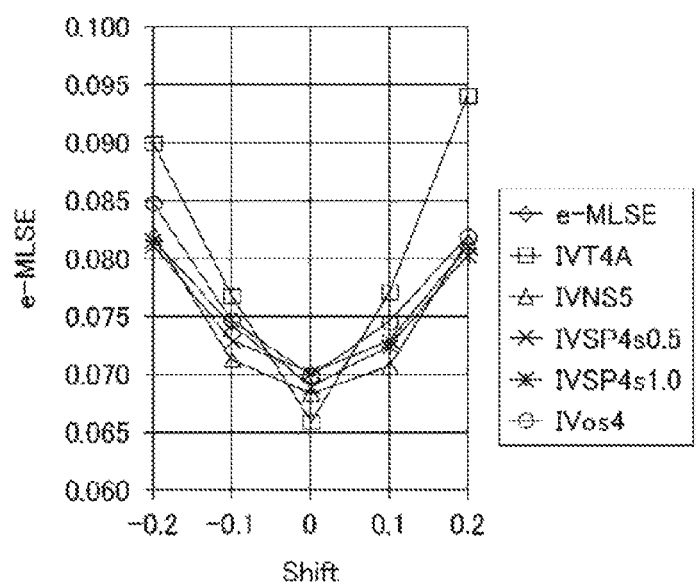
FIG. 118 is a graph for explaining a case where a pattern is shifted in a radial direction concerning IVos4.

FIG. 117 shows margins obtained in the case where the patterns are shifted in the radial direction concerning IVos4, IVSP4s0.5, IVSP4s1.0, IVNS5, and IVT4. A horizontal axis of a graph in FIG. 117 indicates a normalized shift amount. Similarly, FIG. 118 shows margins obtained in the case where the patterns are shifted in the radial direction. As compared with FIG. 117, the vertical axis (e-MLSE) is enlarged, and therefore the graphs are easily distinguished.

As is clear from those characteristics, IVos4 has more favorable characteristics than IVSP4s0.5. It is possible to switch a plurality of Ks and use the Ks depending on a difference in medium or the like, and it is also possible to change a balance between Ks1 and Ks2.

Hereinabove, flows from IVNST6, which is obtained by dividing the central region in IVT4 into three regions in the radial direction, to IVTSP5, IVTSM4, IVNS5, IVSP4, and IVos4 have been described. Those relationships are shown in Table 3.

TABLE 3

|  | IVT4 | IVNST6 | IVTSP5 | IVTSM4 | IVNS5 | IVSP4 | IVos4 |
|---|---|---|---|---|---|---|---|
| channel 1 | A | A | A | A | A | A | A |
| channel 2 | B + C + D | B | B + Ks × C | C + Ksm × B + Ksm × D | B | B + Ks × C | B + Ks1 × C |
| channel 3 | E | C | D + Ks × C | E | C | D + Ks × C | D + Ks2 × C |
| channel 4 | F | D | E | F | D | E + F | E + F |
| channel 5 |  | E | F |  | E + F |  |  |
| channel 6 |  | F |  |  |  |  |  |

Although each channel is represented by a calculation expression in the table, it is unnecessary to detect a signal as an independent signal, and beams of light may be detected by the same light reception unit when the light is received by a detection element or may be separately received and electrically calculated thereafter.

[Improvement in Detrack Characteristic by Control of Ratio (Coefficient) at the Time of Reduction in the Number of Channels]

In the present disclosure, there has been described the case where, in order to reduce the number of channels, Ks, Ksm, Ks1, Ks2, and the like are used to switch coefficients as necessary. Processing of multiplying the coefficients can be performed by optical attenuation or electrical signal processing. That is, it is unnecessary to differentiate the frequency characteristics, and making only a ratio thereof variable can be achieved by a method using an optical element such as a liquid crystal element or an electrical method such as an addition subtraction amplifier.

Although IVTSM4 (FIG. 85) has been described as an example of the pattern in which the number of channels is reduced from six channels to four channels, improvement in characteristics by control of the ratio will be described by using a pattern IVT4VG in which a channel including the central B, C, and D regions of IVTSM4 is changed as an example. In the pattern IVT4VG, among the six channels of A to F in the pattern IVNST6, A (channel 1), E (channel 3), and F (channel 4) are maintained as they are and a signal of a channel 2 is formed by the following weighting addition expression.

Channel 2: $Kd \times B + C + (2-Kd) \times D$ (where $0 \leq Kd \leq 1$)

Figure 119:
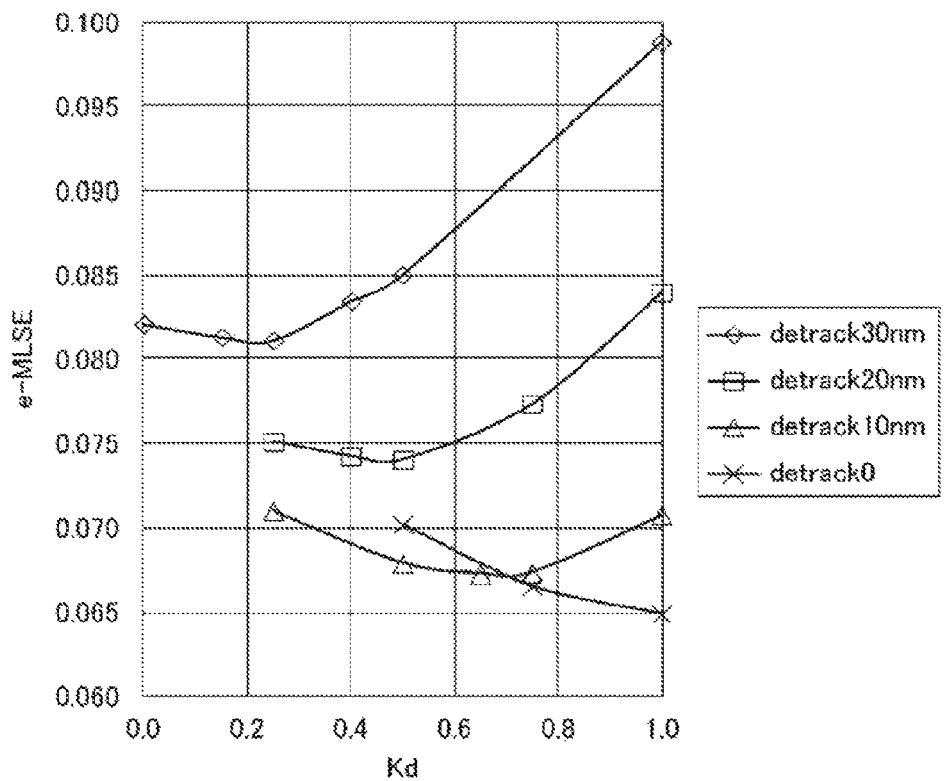
FIG. 119 is a graph for explaining Kd vs. e-MLSE in each detrack amount.

FIG. 119 shows simulation results of a relationship between Kd and e-MLSE obtained in the case where a detrack amount is 0 nm, 10 nm, 20 nm, and 30 nm. The detrack amount is an amount of shift in the radial direction between the center of a beam spot and the center of the track. For example, in the case where the detrack amount is 0 nm, i.e., there is no track shift, e-MLSE is the smallest where (Kd=1). The channel 2 in this case is (B+C+D). Further, in the case where the detrack amount is [30 nm], e-MLSE is the smallest (in the vicinity of Kd=0.25). The channel 2 in this case is (0.25B+C+1.75D).

Based on those simulation results, a value of the coefficient Kd that causes e-MLSE to be the smallest is found, and therefore a table or relational expression defining a relationship between the detrack amount and Kd is prepared in advance. When the detrack amount is detected by some method such as the use of a tracking error or the like and Kd is set by applying the detected detrack amount to the table or relational expression, e-MLSE can be the smallest. That is, it is possible to suppress signal deterioration.

It is possible to suppress signal deterioration not only by using a method of separately detecting the detrack amount but also by changing the coefficient Kd with the use of the following expression.

$Kd=1-\alpha(B-D)/(B+D)$

Figure 120:
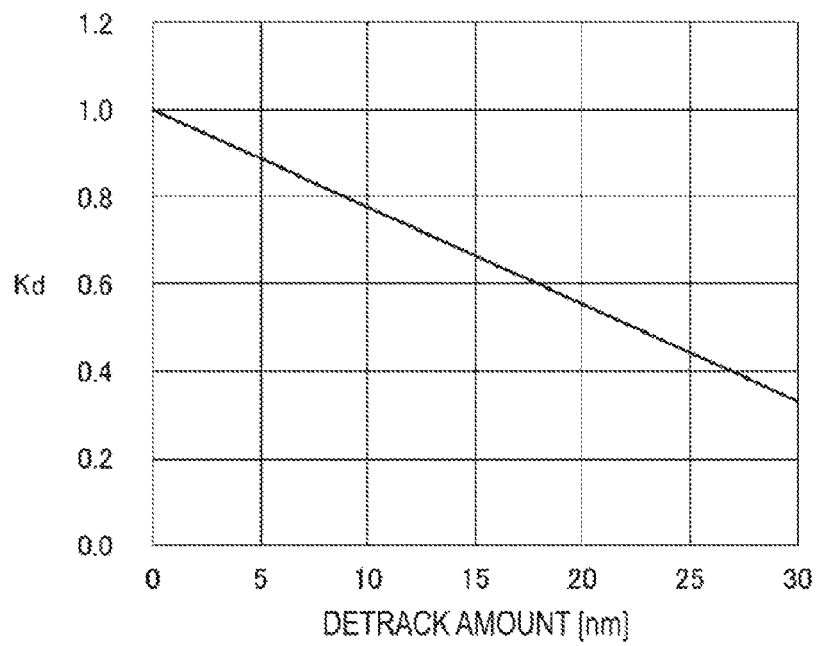

The constant $\alpha$ is set to a value that causes Kd to change so as to match with the simulation results as much as possible. As an example, FIG. 120 shows a change in Kd obtained in the case where ($\alpha$=3.5) is set. FIG. 120 shows (Kd=1 where the detrack amount=0 nm), (Kd=0.77 where the detrack amount=10 nm), (Kd=0.55 where the detrack amount=20 nm), and (Kd=0.33 where the detrack amount=30 nm). As is clear from the simulation results shown in FIG. 119, such a change in Kd can reduce signal deterioration. However, a value of $\alpha$ may be another value. Further, a low-pass change amount in the term of (B–D)/(B+D) may be used. Note that RF signals B and D are used as represented by the above expression, and it is unnecessary to provide a detection circuit of the detrack amount or a supply path of a detection signal. Therefore, it is possible to simplify a configuration of the signal processing.

[Another Example of Region Division Pattern]

Figure 121:
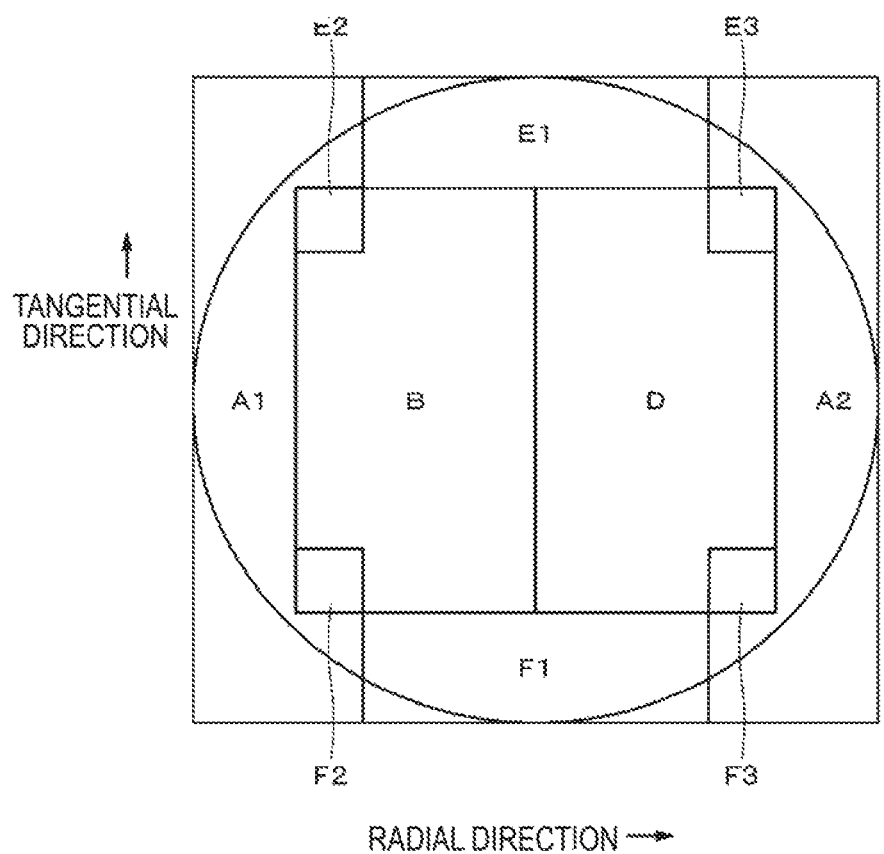

In the region division pattern IVNST6 shown in FIG. 60, the central region is divided into three regions of B, C, and D in the radial direction. As shown in FIG. 121, a region division pattern may be a pattern in which the region C is omitted and the regions B and D are provided. RF signals in the respective regions B and D may be weighted and added. Further, instead of the regions B and D, the region A may be divided into regions A1 and A2 and RF signals in A1 and A2 may be weighted and added.

Although the region division pattern IVT4VG and the region division pattern in FIG. 121 have been described, the present disclosure can also be applied to region division patterns in addition to the above patterns, the region division patterns being patterns in which the number of channels is reduced. Although, in the above description, a ratio of weighting addition is changed depending on the detrack amount, the ratio may be changed in accordance with visual field movement (lens shift).

In order to increase the defocus margin, the tangential comatic aberration margin, the radial comatic aberration margin, the spherical aberration margin, and the like, Ks, Ksm, Ks1, Ks2, and the like may be changed.

Figure 122:
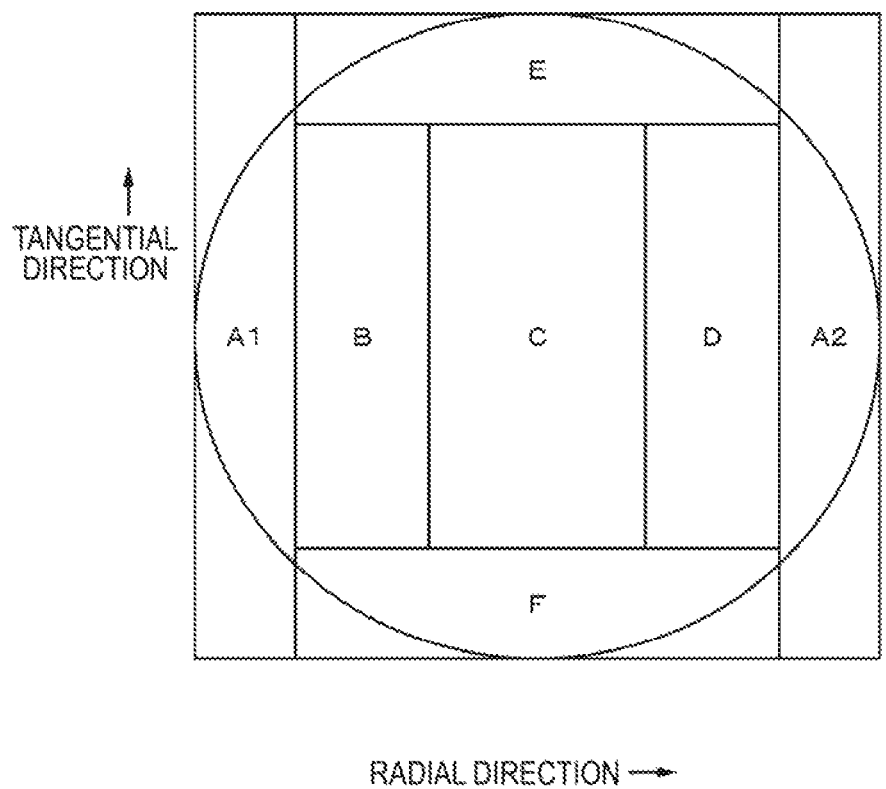

With the same way of thinking regarding a group of the region division patterns shown in Table 3, it is possible to consider TSP5, TSM4, NS5, SP4, and os4 from NST6 in which the central region of T4 is divided into three regions in the radial direction. Similarly, it is possible to consider HTSP5, HTSM4, HNS5, HSP4, and Hos4 from HNST6 (FIG. 122) in which the central region of HT4 is divided into three regions in the radial direction. Those relationships are shown in Table 4. Division positions thereof may be changed as appropriate in consideration of various characteristics while the basic division patterns are being maintained as they are.

TABLE 4

|  | T4<br>HT4 | NST6<br>HNST6 | TSP5<br>HTSP5 | TSM4<br>HTSM4 | NS5<br>HNS5 | SP4<br>HSP4 | os4<br>Hos4 |
|---|---|---|---|---|---|---|---|
| channel 1 | A | A | A | A | A | A | A |
| channel 2 | B + C + D | B | B + Ks × C | C + Ksm × B + Ksm × D | B | B + Ks × C | B + Ks1 × C |
| channel 3 | E | C | D + Ks × C | E |  | C | D + Ks × C | D + Ks2 × C |
| channel 4 | F | D | E | F |  | D | E + F | E + F |
| channel 5 |  | E | F |  | E + F |  |  |
| channel 6 |  | F |  |  |  |  |  |

Figure 123:
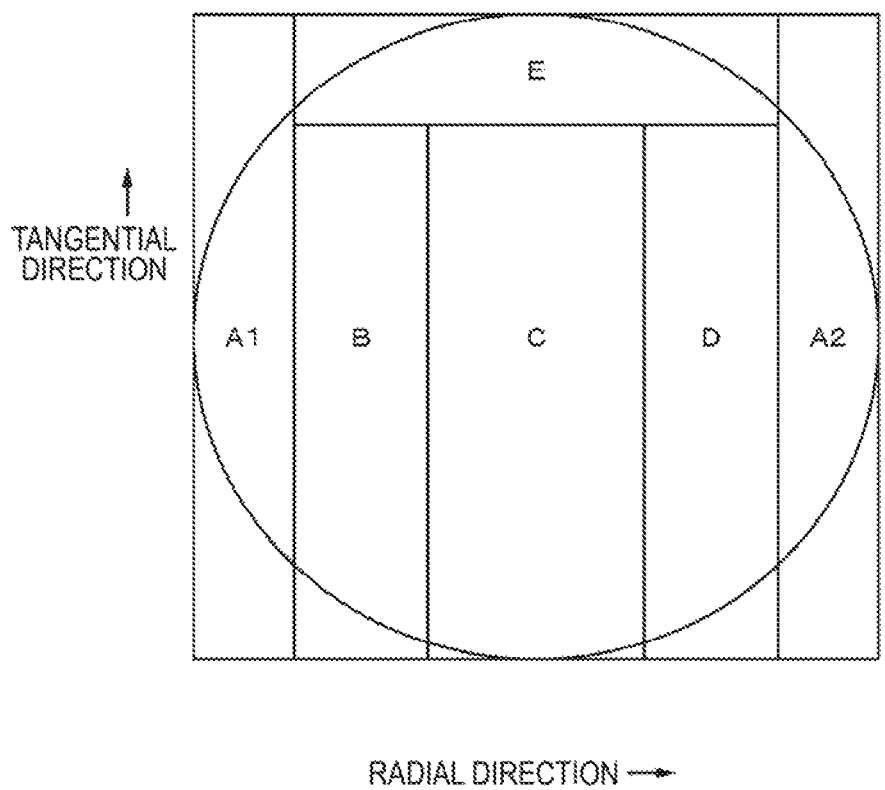

It is possible to consider HiSP4, HiSM3, and Hios4 from HiNS5 (FIG. 123) in which the central region of Hi3 is divided into three regions in the radial direction. Those relationships are shown in Table 5.

TABLE 5

|  | Hi3 | HiNS5 | HiSP4 | HiSM3 | Hios4 |
|---|---|---|---|---|---|
| channel 1 | A | A | A | A | A |
| channel 2 | B + C + D | B | B + Ks × C | C + Ksm × D | B + Ks1 × C |
| channel 3 | E | C | D + Ks × C | B + Ksm × D | D + Ks2 × C |
| channel 4 |  | D | E | E | E |
| channel 5 |  | E |  |  |  |

Figure 124:
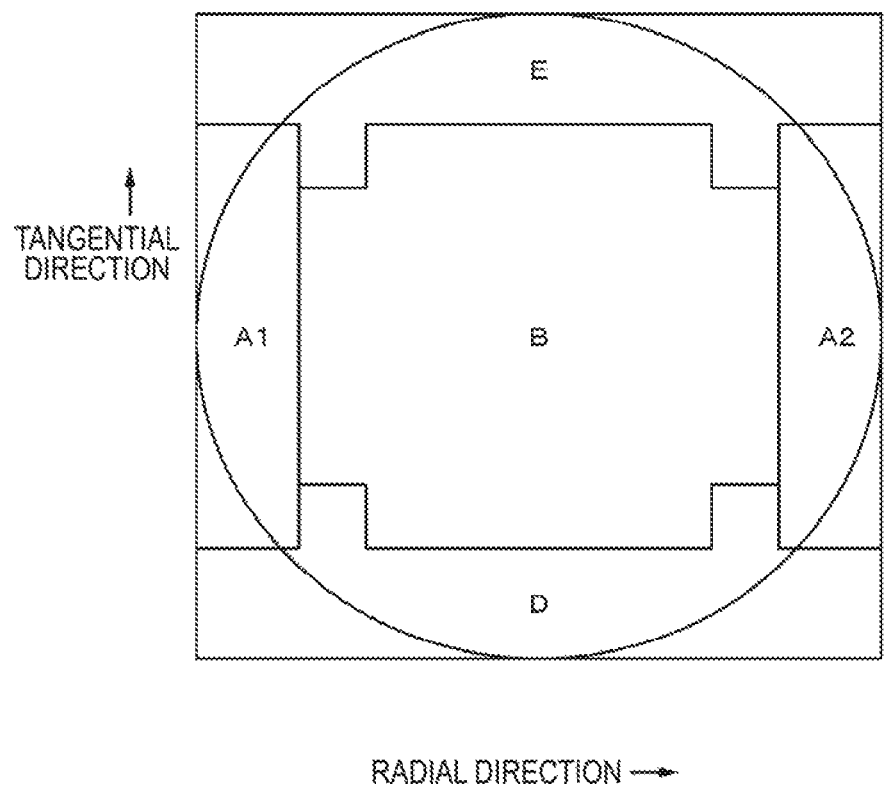
Figure 125:
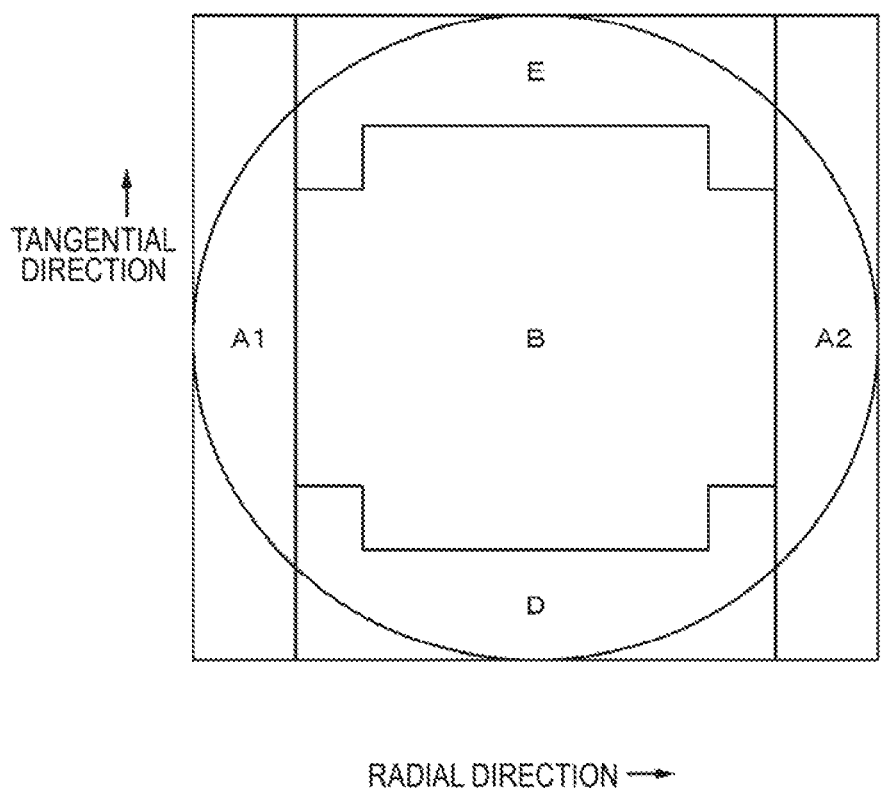
Figure 126:
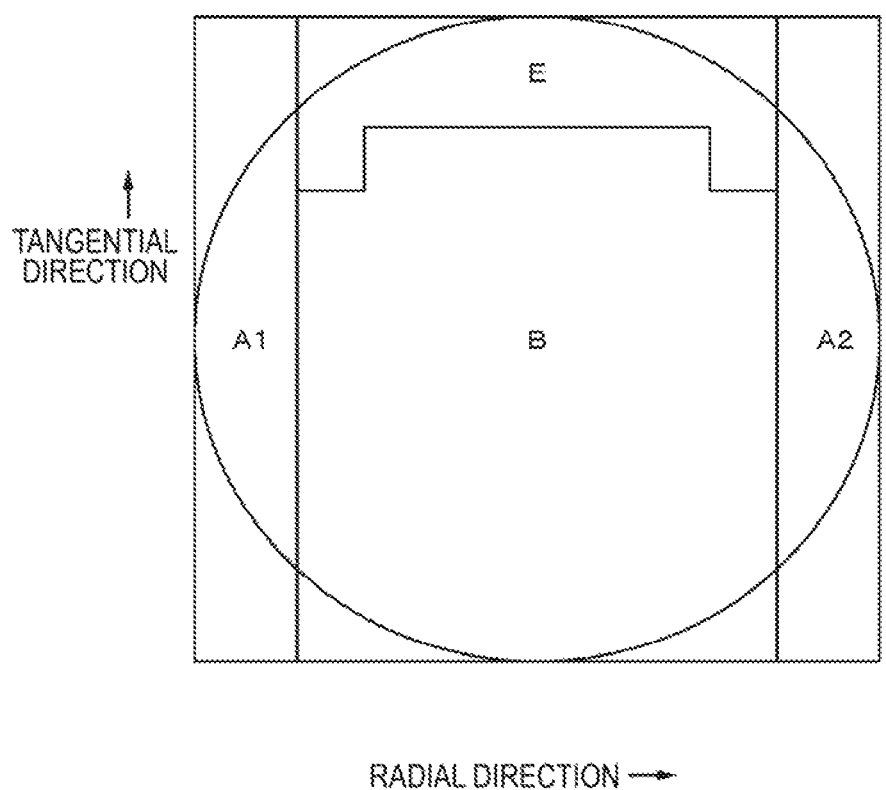

It is also possible to consider VT4 (FIG. 124), VHT4 (FIG. 125), and VHi3 (FIG. 126) by applying the way of thinking regarding IVT4 to the T4, HT4, and Hi3 systems. Further, increase in the division number of regions having space-optically different bands in the radial direction may be considered on the basis of those patterns.

[Pattern NST6] (Case where Density is Further Increased)

Figure 127:
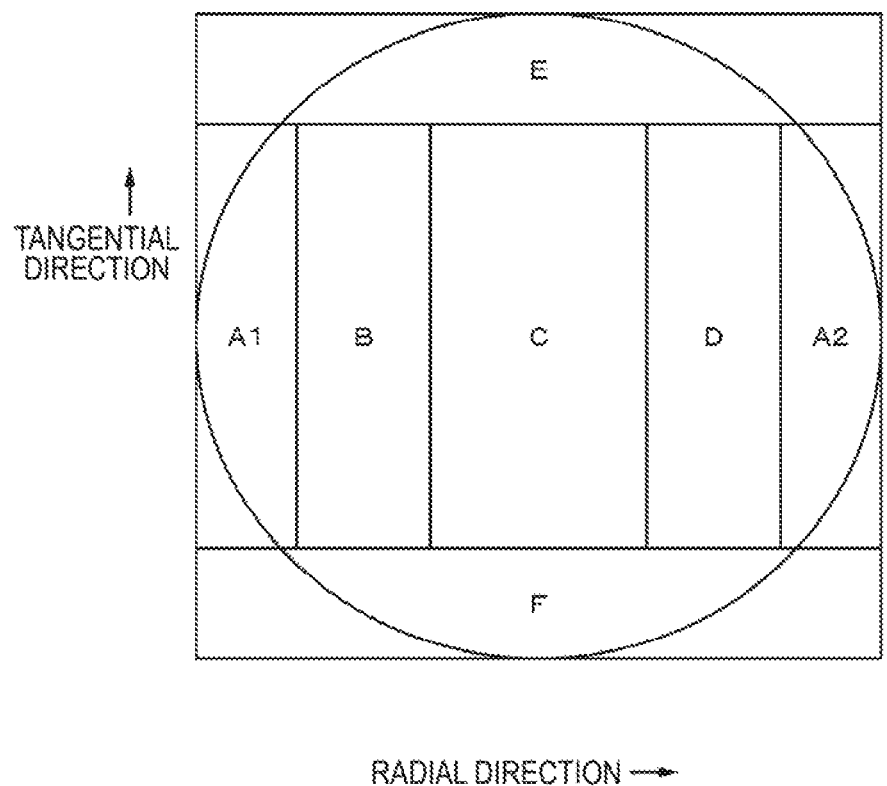

FIG. 127 shows the division pattern NST6 (which is similar to the pattern in FIG. 54). The case where the density is further increased in this division pattern will be described. That is, simulation conditions are as follows.

LD 47 (GB) . . . 0.03967 µm/channel bit

In the case of Tp=0.15 µm (both land and groove), the plane capacity is 100.3 GB.

NA=0.91 •PR (1233321) •Evaluation index: e-MLSE

Mark width=Tp×0.6

Figure 128:
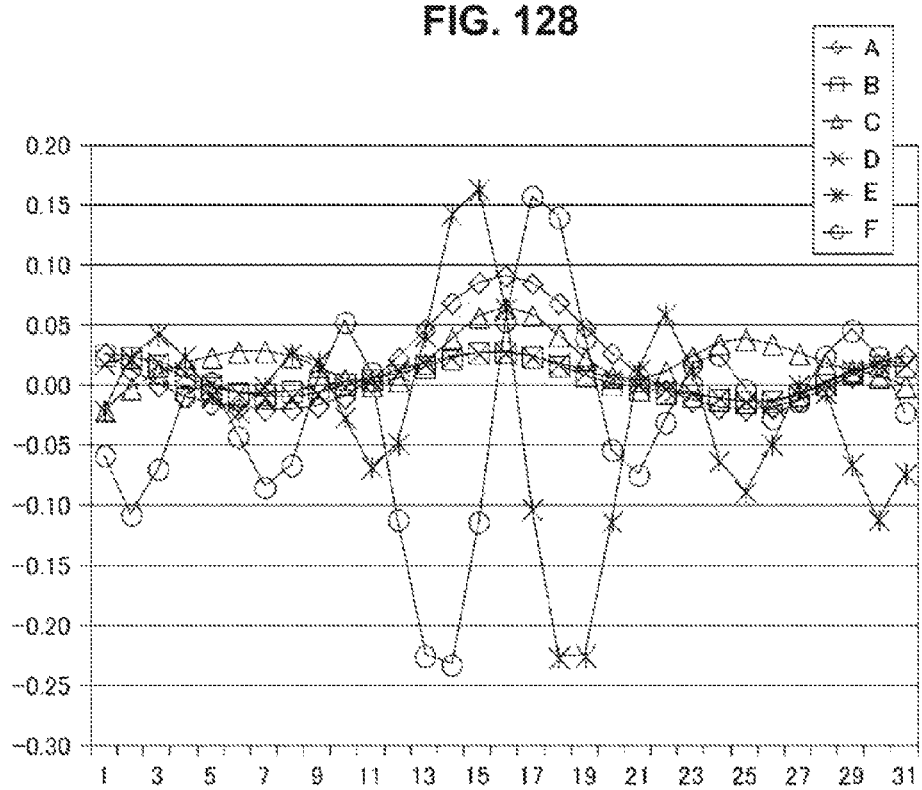
Figure 129:
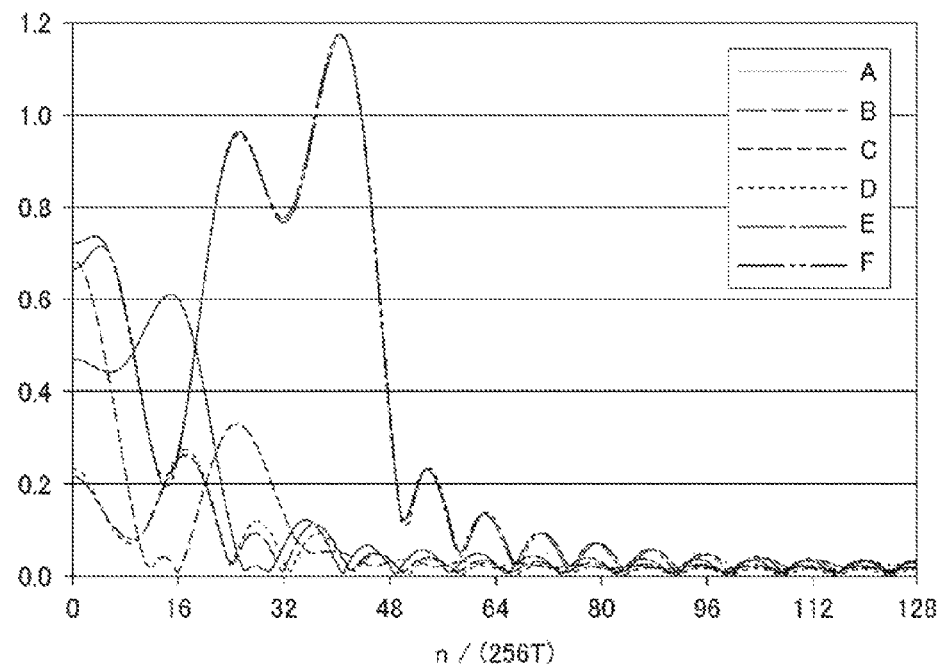

FIG. 128 shows an example of values of the coefficients of 31 taps in the electrical filters in this case. The electrical filters are formed as FIR filters. FIG. 129 shows frequency amplitude characteristics of the respective channels of A to F obtained in the case where the coefficients are set as described above. In the case where the optical filter is not used, e-MLSE is 38.6%, whereas, in the case where the optical filter (NST6) and the electrical filters are used, e-MLSE is improved to 8.6%.

2. Other Embodiments

A signal reproduced from an optical disc is largely diverged from an ideal signal because increase in inter-symbol interference caused by increase in density in a linear direction and increase in leakage of a signal from an adjacent track caused by increase in density in a track direction occur in the ideal signal. This problem has been conventionally solved by an electrical filter. For example, 33.4 GB/L is achieved in BDXL (registered trademark).

Figure 130:
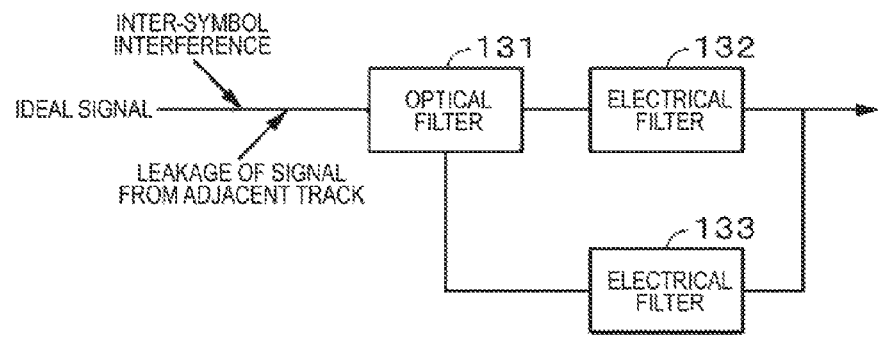

FIG. 130 shows a configuration that reproduces a high-density recorded signal according to the present disclosure. That is, a reproduction signal is supplied to an optical filter 131 and is separated by the optical filter 131 into a plurality of signals having space-optically different bands in the linear-density direction and/or track-density direction. The plurality of separated signals, e.g., two signals are supplied to electrical filters 132 and 133 optimal for the respective signals and outputs of the electrical filters 132 and 133 are summed up, and thus an output signal is obtained.

In the above embodiment, an optical filter is divided into a plurality of regions and signals of a plurality of channels obtained from the respective divided regions are supplied to electrical filters. Another embodiment is an example using a beam splitter as an optical filter.

Figure 131:
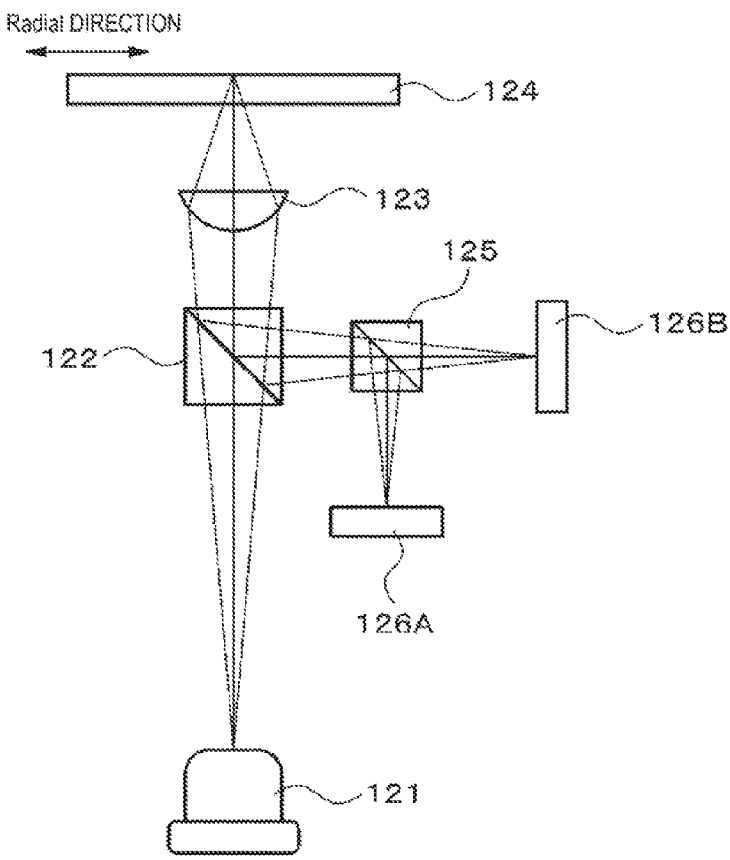

As shown in FIG. 131, a surface of a disc 124 is irradiated with a laser beam from a light source 121 via a beam splitter 122 for forward-path/return-path divergence and an objective lens 123. A returning beam from the disc 124 is reflected by the beam splitter 122 to be incident on a beam splitter 125 for an optical filter. Note that FIG. 131 shows minimum optical elements required for description.

The beam reflected by the beam splitter 125 is converted into an electric signal by a light receiving element 126A, and the beam that has been transmitted through the beam splitter 125 is converted into an electric signal by a light receiving element 126B. The beam splitter 125 has incident angle dependence and space-optically separates the inside of a pupil by using the incident angle dependence. FIG. 132 shows reflection characteristics of the beam splitter 125. In FIG. 132, a vertical axis indicates reflectance, and a horizontal axis indicates a radius position. The radius position is a radius position in the radial direction where a pupil radius is 1.

As is clear from FIG. 132 and FIG. 133, almost all laser light incident on the beam splitter 125 (radius position=0) is transmitted to be introduced to the light receiving element 126B. Almost all laser light incident on (radius position=±1.0) is reflected to be introduced to the light receiving element 126A. As described above, a beam is separated, but this embodiment is different from the above embodiment in that the beams introduced to the light receiving elements 126A and 126B have overlapped parts.

Further, in the configuration in FIG. 131, another beam splitter 127 (see FIG. 134) may be provided between the beam splitter 125 and the light receiving element 126B. The beam splitter 127 has incident angle dependence. The beam splitter 127 introduces the beam introduced to the light receiving element 126A and the beam introduced to the light receiving element 126B at angles having a difference of 90°. That is, in FIG. 131, the beam splitter 127 introduces the beams in a direction from a back surface to a front surface of the sheet and causes a light receiving element 126C to receive the beams.

"Characteristics of Electrical Filter"

FIG. 135 and FIG. 136 show characteristics of electrical filters to which electric signals converted by the light receiving elements 126A and 126B are supplied as shown in FIG. 131. FIG. 135 shows an example of values of the coefficients of 31 taps in the electrical filters. The electrical filters are formed as FIR filters. FIG. 136 shows frequency amplitude characteristics of the reflected-light-side filter and the transmitted-light-side filter obtained in the case where the coefficients are set as described above.

FIG. 137 shows an example of coefficients of 31 taps in electrical filters suitable for a two-stage configuration in which the configuration in FIG. 131 is combined with the beam splitter in FIG. 134. A indicates a coefficient of the light receiving element 126A, B indicates a coefficient of the filter to which output of the light receiving element 126B is supplied, and C indicates a coefficient of the filter to which output of the light receiving element 126C is supplied. FIG. 138 shows frequency amplitude characteristics of the reflected-light-side filter and the transmitted-light-side filter obtained in the case where the coefficients are set as described above.

Note that, although the beam splitter having the incident angle dependence is used as an optical filter in the above example, there may be employed a configuration in which a beam is incident on a half-wave plate and output light of the half-wave plate is incident on a polarizing beam splitter. In this case, an optical axis direction of the half-wave plate has different distributions in a two-dimensional plane. As a result, it is possible to perform different polarization depending on an incident position on the half-wave plate and divide an input beam into two parts by using the polarizing beam splitter.

Additionally, the present technology may also be configured as below.

(1)

An optical medium reproduction device for optically reproducing an optical medium in which a plurality of tracks are provided, the optical medium reproduction device including:

a detection unit configured to form detection signals of respective channels by dividing a cross-section of a beam returning from the optical medium into a plurality of regions and performing division into at least one channel corresponding to the region at an outer side in a radial direction, at least one channel corresponding to the region that is different in position in a tangential direction, and a channel corresponding to the other regions, and, in a case of forming the detection signals of the channels, form the detection signal of at least one of the channels by weighting and adding a signal in a predetermined region among the plurality of regions;

a multi-input equalizer unit configured to include a plurality of equalizer units to which the respective detection signals of the plurality of channels are supplied, and configured to form an equalized signal on the basis of the detection signals of the plurality of channels; and a binarization unit configured to perform a binarization process on the equalized signal to obtain binary data.

(2)

The optical medium reproduction device according to (1), wherein the multi-input equalizer unit is configured as a multi-input adaptive equalizer unit, and the optical medium reproduction device includes an equalization error calculation unit configured to calculate an equalization error by using an equalization target signal obtained on the basis of a binarization detection result of the binarization unit and the equalized signal output from the multi-input adaptive equalizer unit and, supply the equalization error to the adaptive equalizer unit as a control signal for adaptive equalization.

(3)

The optical medium reproduction device according to (2), wherein the multi-input adaptive equalizer unit performs a partial response equalization process on the basis of the detection signals of the plurality of regions, the binarization unit performs a maximum likelihood decoding process as the binarization process performed on the equalized signal of the multi-input adaptive equalizer unit, and the equalization error calculation unit calculates an equalization error by performing calculation with use of the equalization target signal obtained by performing a convolution process of the binarization detection result obtained by the maximum likelihood decoding and the equalized signal output from the multi-input adaptive equalizer unit.

(4)

The optical medium reproduction device according to (1) or (2), wherein a value of a coefficient for setting a ratio of the weighting is controlled to reduce signal deterioration caused by radial comatic aberration or spherical aberration.

(5)

The optical medium reproduction device according to (1) or (2), wherein a value of a coefficient for setting a ratio of the weighting is controlled to reduce signal deterioration caused by defocus or tangential comatic aberration.

(6)

The optical medium reproduction device according to (1) or (2), wherein a value of a coefficient for setting a ratio of the weighting is controlled to reduce signal deterioration caused by detrack or parallactic movement.

(7)

The optical medium reproduction device according to any of (1) to (6), wherein the detection unit includes divided detectors corresponding to the plurality of regions, and the detection signals of the plurality of regions are extracted from the photodetector.

(8)

The optical medium reproduction device according to any of (1) to (7), wherein an optical path conversion element for separating the plurality of regions is provided in an optical path leading to the detectors through an objective lens, and a plurality of beams separated by the optical path conversion element are input to different detectors.

(9)

The optical medium reproduction device according to any of (1) to (8), wherein lands and grooves are alternately provided in the optical medium, and information is recorded on both the lands and the grooves.

(10)

An optical medium reproduction method for optically reproducing an optical medium in which a plurality of tracks are provided, the optical medium reproduction method including:

forming detection signals of respective channels with use of a detection unit by dividing a cross-section of a beam returning from the optical medium into a plurality of regions and performing division into at least one channel corresponding to the region at an outer side in a radial direction, at least one channel corresponding to the region that is different in position in a tangential direction, and a channel corresponding to the other regions, and, in the case of forming the detection signals of the channels, forming the detection signal of at least one of the channels by weighting and adding a signal in a predetermined region among the plurality of regions;

forming an equalized signal with use of a multi-input equalizer unit on the basis of the detection signals of the plurality of channels; and performing a binarization process on the equalized signal with use of a binarization unit to obtain binary data.

(11)

An optical medium reproduction device for optically reproducing an optical medium in which a plurality of tracks are provided, the optical medium reproduction device including:

an optical filter configured to, when a beam returning from the optical medium is incident, form a plurality of signals having space-optically different bands in a linear-density direction and a track-density direction; and a plurality of electrical filters to which the plurality of signals formed by the optical filter are supplied, wherein a reproduction signal is obtained by combining outputs of the plurality of electrical filters.

(12)

The optical medium reproduction device according to (11), wherein the optical filter is a beam splitter having incident angle dependence.

(13)

The optical medium reproduction device according to (1), wherein radial aberration or spherical aberration is detected by distribution of tap coefficients of FIR filters used in the plurality of equalizer units.

(14)

The optical medium reproduction device according to (1), wherein defocus or tangential comatic aberration is detected by distribution of tap coefficients of FIR filters used in the plurality of equalizer units.

(15)

The optical medium reproduction device according to (1), wherein detrack or parallactic movement is detected by distribution of tap coefficients of FIR filters used in the plurality of equalizer units.

3. Modification Example

Embodiments of the present disclosure have been specifically described in the above description. However, the present disclosure is not limited to the above embodiments, and various modifications based on the technical thoughts of the present disclosure can be implemented. For example, the above numerical values of the wavelength of the laser light source, the track pitch, and the recording linear density are merely examples, and other numerical values may be used. Further, as the index for evaluating the reproduction performance, an index other than the above index may be used. Furthermore, the present disclosure is applicable to an optical disc device that performs only one of recording and reproduction on an optical disc.

Also, the configurations, methods, processes, shapes, materials and numerical values described in the above embodiments can be combined with each other as long as the gist of the present disclosure is not departed. For example, the first embodiment and the second embodiment described above may be combined.

REFERENCE SIGNS LIST 13 multi-input adaptive equalizer
14 binarization detector
15 PR convolution unit
21 to 23 adaptive equalizer unit
100 optical disc
101 optical pickup
105 data detection processing unit
125, 127 beam splitter
126A, 126B, 126C light receiving element

The invention claimed is:

1. An optical medium reproduction device, comprising:
a detection unit configured to generate detection signals of respective channels based on a division of a cross-section of a beam that returns from the optical medium into a plurality of regions and divides at least one channel corresponding to the region at an outer side in a radial direction, at least one channel corresponding to the region that is different in position in a tangential direction, and a channel corresponding to the other regions, and, based on the generation of the detection signals of the channels, generate the detection signal of at least one of the channels based on execution of a weighting process and an addition process on a signal in a region among the plurality of regions;
a multi-input equalizer unit configured to include a plurality of equalizer units to which the respective detection signals of the plurality of channels are supplied, and generate an equalized signal based on detection signals of the plurality of channels; and
a binarization unit configured to execute a binarization process on the equalized signal to obtain binary data.

2. The optical medium reproduction device according to claim 1, wherein
the multi-input equalizer unit is configured as a multi-input adaptive equalizer unit, and
the optical medium reproduction device further comprises an equalization error calculation unit configured to calculate an equalization error by an equalization target signal that is obtained based on a binarization detection result of the binarization unit, the equalized signal and, supply the equalization error to the adaptive equalizer unit as a control signal for adaptive equalization.

3. The optical medium reproduction device according to claim 2, wherein
the multi-input adaptive equalizer unit is further configured to execute a partial response equalization process based on the detection signals of the plurality of regions,
the binarization unit is further configured to execute a maximum likelihood decoding process as the binarization process executed on the equalized signal, and
the equalization error calculation unit is further configured to calculate an equalization error based on the equalization target signal obtained by a convolution process of the binarization detection result and the equalized signal.

4. The optical medium reproduction device according to claim 1,
wherein a value of a coefficient, to set a ratio of the weighting process, is controlled to reduce signal deterioration caused by one of radial comatic aberration or spherical aberration.

5. The optical medium reproduction device according to claim 1,
wherein a value of a coefficient, to set a ratio of the weighting process, is controlled to reduce signal deterioration caused by one of defocus or tangential comatic aberration.

6. The optical medium reproduction device according to claim 1,
wherein a value of a coefficient, to set a ratio of the weighting process, is controlled to reduce signal deterioration caused by one of detrack or parallactic movement.

7. The optical medium reproduction device according to claim 1, wherein
the detection unit includes divided detectors corresponding to the plurality of regions, and
the detection signals of the plurality of regions are extracted from a photodetector.

8. The optical medium reproduction device according to claim 1,
wherein an optical path conversion element to separate the plurality of regions is provided in an optical path that leads to a plurality of detectors via an objective lens, and a plurality of beams separated by the optical path conversion element are input to different detectors.

9. The optical medium reproduction device according to claim 1, wherein
lands and grooves are alternately provided in the optical medium, and
information is recorded on both the lands and the grooves.

10. A method, comprising:
generating detection signals of respective channels by dividing a cross-section of a beam returning from an optical medium into a plurality of regions and dividing at least one channel corresponding to the region at an outer side in a radial direction, at least one channel corresponding to the region that is different in position in a tangential direction, and a channel corresponding to the other regions, and, based on the generation of the detection signals of the channels, generating the detection signal of at least one of the channels by weighting and adding a signal in a region among the plurality of regions;
generating an equalized signal by a multi-input equalizer unit based on the detection signals of the plurality of channels; and
executing a binarization process on the equalized signal by a binarization unit to obtain binary data.

11. An optical medium reproduction device, comprising:
an optical filter configured to, based on an incident beam returning from the optical medium, generate a plurality of signals having space-optically different bands in a linear-density direction and a track-density direction; and a plurality of electrical filters to which the plurality of signals are supplied, wherein a reproduction signal is based on combination of outputs of the plurality of electrical filters.

12. The optical medium reproduction device according to claim 11, wherein the optical filter is a beam splitter having incident angle dependence.

13. The optical medium reproduction device according to claim 1, wherein one of radial aberration or spherical aberration is detected by distribution of tap coefficients of FIR filters corresponding to the plurality of equalizer units.

14. The optical medium reproduction device according to claim 1, wherein one of defocus or tangential comatic aberration is detected by distribution of tap coefficients of FIR filters corresponding to the plurality of equalizer units.

15. The optical medium reproduction device according to claim 1, wherein one of detrack or parallactic movement is detected by distribution of tap coefficients of FIR filters corresponding to the plurality of equalizer units.

* * * * *